(12) United States Patent
Coffman et al.

(10) Patent No.: US 12,169,395 B2
(45) Date of Patent: Dec. 17, 2024

(54) USER INTERFACE FOR MANAGING CONTROLLABLE EXTERNAL DEVICES

(71) Applicant: Apple Inc., Cupertino, CA (US)

(72) Inventors: Patrick L. Coffman, San Francisco, CA (US); Arian Behzadi, San Francisco, CA (US); Christopher Patrick Foss, San Francisco, CA (US); Cyrus Daniel Irani, Menlo Park, CA (US); Ieyuki Kawashima, Pleasanton, CA (US); Stephen O. Lemay, Palo Alto, CA (US); Christopher D. Soli, San Francisco, CA (US); Christopher Wilson, Sonoma, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/992,229

(22) Filed: Nov. 22, 2022

(65) Prior Publication Data

US 2023/0082492 A1    Mar. 16, 2023

Related U.S. Application Data

(63) Continuation of application No. 16/830,838, filed on Mar. 26, 2020, which is a continuation of application
(Continued)

(51) Int. Cl.
*G06F 3/048*    (2013.01)
*G05B 15/02*    (2006.01)
(Continued)

(52) U.S. Cl.
CPC ............ *G05B 15/02* (2013.01); *G06F 3/0482* (2013.01); *G06F 3/04847* (2013.01);
(Continued)

(58) Field of Classification Search
None
See application file for complete search history.

(56) References Cited

U.S. PATENT DOCUMENTS

| 5,086,385 A | 2/1992 | Launey et al. |
| 5,974,235 A | 10/1999 | Nunally et al. |

(Continued)

FOREIGN PATENT DOCUMENTS

| CN | 1641589 A | 7/2005 |
| CN | 1679019 A | 10/2005 |

(Continued)

OTHER PUBLICATIONS

Final Office Action received for U.S. Appl. No. 17/742,273, mailed on Feb. 15, 2023, 56 pages.
(Continued)

*Primary Examiner* — Hua Lu
(74) *Attorney, Agent, or Firm* — DLA Piper LLP (US)

(57) ABSTRACT

An electronic device, with a display, a touch-sensitive surface, one or more processors and memory, displays a first representation of a first controllable external device, where the first controllable external device is situated at a location. The device detects a first user input corresponding to a selection of the first representation of the first controllable external device. The device, after detecting the first user input, adds data identifying the first controllable external device and a first state of the first controllable external device in a scene profile.

15 Claims, 67 Drawing Sheets

Related U.S. Application Data

No. 16/143,379, filed on Sep. 26, 2018, now Pat. No. 10,635,303, which is a continuation of application No. 15/427,516, filed on Feb. 8, 2017, now Pat. No. 10,353,576.

(60) Provisional application No. 62/349,057, filed on Jun. 12, 2016.

(51) Int. Cl.

| | |
|---|---|
| *G06F 3/0482* | (2013.01) |
| *G06F 3/04847* | (2022.01) |
| *G06F 3/04883* | (2022.01) |
| *G06F 3/14* | (2006.01) |
| *G06F 3/147* | (2006.01) |
| *G08C 17/02* | (2006.01) |
| *G09G 5/14* | (2006.01) |
| *H05B 45/20* | (2020.01) |
| *H05B 47/19* | (2020.01) |

(52) U.S. Cl.
CPC ........ *G06F 3/04883* (2013.01); *G06F 3/1454* (2013.01); *G06F 3/147* (2013.01); *G08C 17/02* (2013.01); *G09G 5/14* (2013.01); *H05B 45/20* (2020.01); *H05B 47/19* (2020.01); *G05B 2219/2642* (2013.01); *G08C 2201/30* (2013.01); *G08C 2201/50* (2013.01); *G08C 2201/91* (2013.01); *G08C 2201/93* (2013.01); *G09G 2370/22* (2013.01)

(56) References Cited

U.S. PATENT DOCUMENTS

| | | | |
|---|---|---|---|
| 6,140,987 A | 10/2000 | Stein et al. | |
| 6,456,306 B1 | 9/2002 | Chin et al. | |
| 6,483,986 B1 | 11/2002 | Krapf | |
| 6,901,439 B1 | 5/2005 | Bonasia et al. | |
| 6,912,429 B1 | 6/2005 | Bilger | |
| 6,931,594 B1 | 8/2005 | Jun | |
| 7,092,768 B1 | 8/2006 | Labuda | |
| 7,293,280 B1 | 11/2007 | Gupta et al. | |
| 7,401,351 B2 | 7/2008 | Boreczky et al. | |
| 7,571,014 B1 | 8/2009 | Lambourne et al. | |
| 7,730,223 B1 | 6/2010 | Bavor et al. | |
| 7,859,571 B1 | 12/2010 | Brown et al. | |
| 7,904,814 B2 | 3/2011 | Errico et al. | |
| 8,031,230 B2 | 10/2011 | Takada | |
| 8,214,494 B1 | 7/2012 | Slavin | |
| 8,234,395 B2 | 7/2012 | Millington | |
| 8,253,704 B2 | 8/2012 | Jang | |
| 8,462,961 B1 | 6/2013 | Bywaters et al. | |
| 8,516,374 B2 | 8/2013 | Fleischman et al. | |
| 8,745,500 B1 | 6/2014 | Kostello et al. | |
| 8,762,844 B2 | 6/2014 | Kim et al. | |
| 8,914,752 B1 | 12/2014 | Spiegel | |
| 8,954,889 B2 | 2/2015 | Fujibayashi | |
| 8,990,861 B2 | 3/2015 | Nishikawa et al. | |
| 9,021,526 B1 | 4/2015 | Baron et al. | |
| 9,080,736 B1 | 7/2015 | Salzinger et al. | |
| 9,082,018 B1 | 7/2015 | Laska et al. | |
| 9,158,974 B1 | 10/2015 | Laska et al. | |
| 9,170,707 B1 | 10/2015 | Laska et al. | |
| 9,185,062 B1 | 11/2015 | Yang et al. | |
| 9,247,380 B1 | 1/2016 | Vincent | |
| 9,313,556 B1 | 4/2016 | Borel et al. | |
| 9,361,011 B1 | 6/2016 | Burns et al. | |
| 9,361,521 B1 | 6/2016 | Mclean et al. | |
| 9,413,606 B1* | 8/2016 | Roberts | H04L 41/04 |
| 9,433,032 B1 | 8/2016 | Ghadge et al. | |
| 9,454,336 B1* | 9/2016 | Rudradevan | H04W 4/80 |
| 9,582,178 B2 | 2/2017 | Grant et al. | |
| 9,665,242 B2 | 5/2017 | Kim et al. | |
| 9,680,982 B2 | 6/2017 | Fiedler | |
| 9,727,346 B2* | 8/2017 | Shao | G06F 9/4401 |
| 9,728,230 B2 | 8/2017 | Cudak et al. | |
| 9,750,116 B2 | 8/2017 | Witzgall | |
| 9,759,917 B2* | 9/2017 | Osterhout | G06F 3/011 |
| 9,784,417 B1 | 10/2017 | Springer | |
| 9,858,739 B1* | 1/2018 | Johnson | H04L 12/2816 |
| 9,898,175 B2 | 2/2018 | Fiedler | |
| 10,027,775 B1 | 7/2018 | Mierau et al. | |
| 10,055,094 B2 | 8/2018 | Li et al. | |
| 10,068,364 B2 | 9/2018 | Cui | |
| 10,091,017 B2 | 10/2018 | Landow et al. | |
| 10,120,536 B2 | 11/2018 | Cha et al. | |
| 10,142,122 B1 | 11/2018 | Hill et al. | |
| 10,157,040 B2 | 12/2018 | Ballinger et al. | |
| 10,219,026 B2 | 2/2019 | Eim et al. | |
| 10,237,141 B2 | 3/2019 | Sasaki et al. | |
| 10,282,068 B2 | 5/2019 | Dubin et al. | |
| 10,284,980 B1 | 5/2019 | Woo et al. | |
| 10,296,128 B1 | 5/2019 | Nold et al. | |
| 10,298,643 B1 | 5/2019 | Toal et al. | |
| 10,300,394 B1 | 5/2019 | Evans et al. | |
| 10,303,422 B1 | 5/2019 | Woo et al. | |
| 10,310,725 B2 | 6/2019 | Smith et al. | |
| 10,339,769 B2 | 7/2019 | Mixter et al. | |
| 10,409,239 B2 | 9/2019 | Reeder et al. | |
| 10,436,977 B2 | 10/2019 | Bergman et al. | |
| 10,454,781 B2 | 10/2019 | Sasaki et al. | |
| 10,474,349 B2 | 11/2019 | Jang et al. | |
| 10,511,456 B2 | 12/2019 | Smith et al. | |
| 10,523,625 B1 | 12/2019 | Allen et al. | |
| 10,631,123 B2 | 4/2020 | O'keeffe | |
| 10,708,653 B1 | 7/2020 | Stinson et al. | |
| 10,779,085 B1 | 9/2020 | Carrigan | |
| 10,783,883 B2 | 9/2020 | Mixter et al. | |
| 10,924,446 B1 | 2/2021 | Paul | |
| 10,929,099 B2 | 2/2021 | Querze et al. | |
| 10,963,145 B1 | 3/2021 | Voss et al. | |
| 11,024,303 B1 | 6/2021 | Devaraj et al. | |
| 11,079,913 B1 | 8/2021 | Kim et al. | |
| 11,164,580 B2 | 11/2021 | Kraker | |
| 11,176,940 B1 | 11/2021 | Zhong et al. | |
| 11,283,916 B2 | 3/2022 | Coffman et al. | |
| 11,316,709 B2 | 4/2022 | Brown et al. | |
| 11,343,613 B2 | 5/2022 | Gordon et al. | |
| 11,523,166 B1 | 12/2022 | Tu et al. | |
| 12,014,118 B2 | 6/2024 | Gruber et al. | |
| 12,085,421 B2 | 9/2024 | Yedid et al. | |
| 2001/0030597 A1 | 10/2001 | Inoue et al. | |
| 2002/0012526 A1 | 1/2002 | Sai et al. | |
| 2002/0060701 A1 | 5/2002 | Naughton et al. | |
| 2002/0063737 A1 | 5/2002 | Feig et al. | |
| 2002/0154888 A1 | 10/2002 | Allen et al. | |
| 2002/0180774 A1 | 12/2002 | Errico et al. | |
| 2003/0040813 A1 | 2/2003 | Gonzales et al. | |
| 2003/0063130 A1 | 4/2003 | Barbieri et al. | |
| 2003/0093790 A1 | 5/2003 | Logan et al. | |
| 2003/0110511 A1 | 6/2003 | Schutte et al. | |
| 2003/0112938 A1 | 6/2003 | Kanakubo et al. | |
| 2004/0003051 A1 | 1/2004 | Krzyzanowski et al. | |
| 2004/0095377 A1 | 5/2004 | Salandro | |
| 2004/0131254 A1 | 7/2004 | Liang et al. | |
| 2004/0239692 A1 | 12/2004 | Balle et al. | |
| 2005/0055472 A1 | 3/2005 | Krzyzanowski et al. | |
| 2005/0094610 A1 | 5/2005 | De et al. | |
| 2005/0144247 A1 | 6/2005 | Christensen et al. | |
| 2005/0163345 A1 | 7/2005 | Van et al. | |
| 2005/0169503 A1 | 8/2005 | Howell et al. | |
| 2005/0275626 A1* | 12/2005 | Mueller | H05B 47/125 345/156 |
| 2006/0002523 A1 | 1/2006 | Bettis et al. | |
| 2006/0013554 A1 | 1/2006 | Poslinski et al. | |
| 2006/0034586 A1 | 2/2006 | Millar et al. | |
| 2006/0132455 A1* | 6/2006 | Rimas-Ribikauskas | G06F 3/0488 345/173 |
| 2006/0171453 A1 | 8/2006 | Rohlfing et al. | |
| 2006/0174035 A1 | 8/2006 | Tufail | |
| 2006/0221184 A1 | 10/2006 | Vallone et al. | |
| 2006/0279628 A1 | 12/2006 | Fleming | |

(56) References Cited

U.S. PATENT DOCUMENTS

| | | | |
|---|---|---|---|
| 2006/0280186 A1 | 12/2006 | Carlton et al. | |
| 2007/0033632 A1 | 2/2007 | Baynger et al. | |
| 2007/0050452 A1 | 3/2007 | Raju et al. | |
| 2007/0061020 A1 | 3/2007 | Bovee et al. | |
| 2007/0162762 A1 | 7/2007 | Huh et al. | |
| 2007/0174774 A1 | 7/2007 | Lerman et al. | |
| 2007/0192486 A1* | 8/2007 | Wilson | H04N 7/163 348/E7.071 |
| 2007/0198111 A1 | 8/2007 | Oetzel et al. | |
| 2007/0241945 A1 | 10/2007 | Moorer et al. | |
| 2008/0165160 A1 | 7/2008 | Kocienda et al. | |
| 2009/0133070 A1 | 5/2009 | Hamano et al. | |
| 2009/0153289 A1 | 6/2009 | Hope et al. | |
| 2009/0199119 A1 | 8/2009 | Park et al. | |
| 2009/0220206 A1 | 9/2009 | Kisliakov | |
| 2009/0232028 A1 | 9/2009 | Baalbergen et al. | |
| 2009/0282362 A1 | 11/2009 | Matsumoto | |
| 2009/0299810 A1 | 12/2009 | Jardine et al. | |
| 2010/0081375 A1 | 4/2010 | Rosenblatt et al. | |
| 2010/0121636 A1 | 5/2010 | Burke et al. | |
| 2010/0138007 A1 | 6/2010 | Clark et al. | |
| 2010/0145485 A1 | 6/2010 | Duchene et al. | |
| 2010/0191575 A1 | 7/2010 | Raleigh | |
| 2010/0191833 A1 | 7/2010 | Hofrichter et al. | |
| 2010/0201815 A1 | 8/2010 | Anderson et al. | |
| 2010/0267370 A1 | 10/2010 | Lee | |
| 2010/0318917 A1 | 12/2010 | Holladay et al. | |
| 2010/0318928 A1 | 12/2010 | Neuman et al. | |
| 2010/0318939 A1* | 12/2010 | Moon | G06F 16/48 715/830 |
| 2011/0040754 A1 | 2/2011 | Peto et al. | |
| 2011/0040760 A1 | 2/2011 | Fleischman et al. | |
| 2011/0071656 A1 | 3/2011 | Mckiel, Jr. | |
| 2011/0106279 A1* | 5/2011 | Cho | H04L 12/2818 700/90 |
| 2011/0145745 A1 | 6/2011 | Hyeon et al. | |
| 2011/0173545 A1 | 7/2011 | Meola et al. | |
| 2011/0228084 A1 | 9/2011 | Colciago | |
| 2011/0249861 A1 | 10/2011 | Tokutake | |
| 2011/0252357 A1 | 10/2011 | Chaudhri | |
| 2011/0254683 A1* | 10/2011 | Soldan | H04N 21/41265 340/539.13 |
| 2012/0054278 A1 | 3/2012 | Taleb et al. | |
| 2012/0066632 A1 | 3/2012 | Sundermeyer et al. | |
| 2012/0070129 A1 | 3/2012 | Lin et al. | |
| 2012/0098854 A1 | 4/2012 | Ohnishi | |
| 2012/0169583 A1 | 7/2012 | Rippel et al. | |
| 2012/0173767 A1* | 7/2012 | Kim | H04L 12/282 710/11 |
| 2012/0177339 A1 | 7/2012 | Chang et al. | |
| 2012/0223890 A1 | 9/2012 | Borovsky et al. | |
| 2012/0266199 A1 | 10/2012 | Noonan et al. | |
| 2012/0269361 A1 | 10/2012 | Bhow et al. | |
| 2012/0282974 A1 | 11/2012 | Green et al. | |
| 2012/0311499 A1 | 12/2012 | Dellinger et al. | |
| 2013/0060352 A1* | 3/2013 | Kouda | H02J 13/00022 700/22 |
| 2013/0099672 A1 | 4/2013 | Lin et al. | |
| 2013/0113822 A1 | 5/2013 | Putrevu et al. | |
| 2013/0124207 A1 | 5/2013 | Sarin et al. | |
| 2013/0124997 A1 | 5/2013 | Speir et al. | |
| 2013/0132865 A1 | 5/2013 | Li | |
| 2013/0141223 A1 | 6/2013 | Brandsma et al. | |
| 2013/0141378 A1 | 6/2013 | Yumiki et al. | |
| 2013/0225152 A1* | 8/2013 | Matthews, III | H04W 4/21 455/419 |
| 2013/0227414 A1 | 8/2013 | Hwang et al. | |
| 2013/0282180 A1 | 10/2013 | Layton | |
| 2013/0283161 A1 | 10/2013 | Reimann et al. | |
| 2013/0298021 A1 | 11/2013 | Park et al. | |
| 2013/0331083 A1 | 12/2013 | Oslund | |
| 2014/0013243 A1 | 1/2014 | Flynn et al. | |
| 2014/0025798 A1 | 1/2014 | Apte et al. | |
| 2014/0068439 A1 | 3/2014 | Lacaze et al. | |
| 2014/0068486 A1* | 3/2014 | Sellers | H04L 12/2818 715/771 |
| 2014/0070959 A1 | 3/2014 | Bhargava et al. | |
| 2014/0075321 A1 | 3/2014 | Masera | |
| 2014/0082501 A1* | 3/2014 | Bae | H04M 1/72454 715/728 |
| 2014/0092292 A1 | 4/2014 | Kuznetsov et al. | |
| 2014/0150029 A1 | 5/2014 | Avedissian et al. | |
| 2014/0173082 A1* | 6/2014 | Shin | H04L 67/06 709/223 |
| 2014/0215365 A1 | 7/2014 | Hiraga et al. | |
| 2014/0218517 A1 | 8/2014 | Kim | |
| 2014/0232273 A1 | 8/2014 | Sasaki et al. | |
| 2014/0236325 A1* | 8/2014 | Sasaki | G06F 3/0488 700/90 |
| 2014/0237419 A1 | 8/2014 | Ryu | |
| 2014/0257532 A1 | 9/2014 | Kim et al. | |
| 2014/0258854 A1 | 9/2014 | Li | |
| 2014/0267068 A1 | 9/2014 | Smith et al. | |
| 2014/0267549 A1 | 9/2014 | Pinter et al. | |
| 2014/0285017 A1 | 9/2014 | Noguchi et al. | |
| 2014/0293046 A1 | 10/2014 | Ni | |
| 2014/0313032 A1 | 10/2014 | Sager et al. | |
| 2014/0359524 A1* | 12/2014 | Sasaki | G06F 3/04842 715/781 |
| 2014/0363024 A1 | 12/2014 | Apodaca | |
| 2014/0365980 A1 | 12/2014 | Morrison et al. | |
| 2014/0375819 A1 | 12/2014 | Larsen et al. | |
| 2014/0380234 A1 | 12/2014 | Shim et al. | |
| 2015/0008845 A1 | 1/2015 | Kim et al. | |
| 2015/0010167 A1 | 1/2015 | Arling et al. | |
| 2015/0040012 A1 | 2/2015 | Faaborg et al. | |
| 2015/0042576 A1* | 2/2015 | Wang | G06F 3/041 345/173 |
| 2015/0058780 A1 | 2/2015 | Malik et al. | |
| 2015/0071601 A1 | 3/2015 | Dabous et al. | |
| 2015/0081072 A1 | 3/2015 | Kallai et al. | |
| 2015/0082225 A1* | 3/2015 | Shearer | H04L 12/2803 715/771 |
| 2015/0092009 A1 | 4/2015 | Deluca et al. | |
| 2015/0095804 A1 | 4/2015 | Grossman et al. | |
| 2015/0095937 A1 | 4/2015 | Tobin | |
| 2015/0106721 A1 | 4/2015 | Cha et al. | |
| 2015/0113418 A1 | 4/2015 | Sasaki et al. | |
| 2015/0120768 A1 | 4/2015 | Wellen et al. | |
| 2015/0135068 A1 | 5/2015 | Chiu | |
| 2015/0142587 A1 | 5/2015 | Salgar et al. | |
| 2015/0145435 A1 | 5/2015 | Ogawa | |
| 2015/0146945 A1 | 5/2015 | Han | |
| 2015/0147067 A1* | 5/2015 | Ryan | H05B 47/19 398/118 |
| 2015/0159895 A1 | 6/2015 | Quam et al. | |
| 2015/0160797 A1 | 6/2015 | Shearer et al. | |
| 2015/0177914 A1 | 6/2015 | Coyner et al. | |
| 2015/0180922 A1 | 6/2015 | Draznin et al. | |
| 2015/0188724 A1 | 7/2015 | Kim et al. | |
| 2015/0193127 A1 | 7/2015 | Chai et al. | |
| 2015/0193196 A1* | 7/2015 | Lin | G06F 3/165 715/716 |
| 2015/0198938 A1 | 7/2015 | Steele et al. | |
| 2015/0201480 A1 | 7/2015 | Ogawa | |
| 2015/0206529 A1 | 7/2015 | Kwon et al. | |
| 2015/0207849 A1 | 7/2015 | Bingzhou et al. | |
| 2015/0212705 A1* | 7/2015 | Sasaki | G06F 3/04817 715/777 |
| 2015/0244539 A1 | 8/2015 | Ickman et al. | |
| 2015/0256957 A1 | 9/2015 | Kim et al. | |
| 2015/0264304 A1* | 9/2015 | Chastney | G06F 3/0484 715/719 |
| 2015/0319006 A1 | 11/2015 | Plummer et al. | |
| 2015/0319046 A1 | 11/2015 | Plummer et al. | |
| 2015/0332586 A1 | 11/2015 | Hamm et al. | |
| 2015/0341227 A1 | 11/2015 | Tatzel et al. | |
| 2015/0348493 A1 | 12/2015 | Chae et al. | |
| 2015/0350031 A1 | 12/2015 | Burks et al. | |
| 2015/0370230 A1 | 12/2015 | Duchene et al. | |
| 2015/0370426 A1 | 12/2015 | Carrigan et al. | |
| 2015/0373178 A1 | 12/2015 | Felt et al. | |

(56) References Cited

U.S. PATENT DOCUMENTS

| | | |
|---|---|---|
| 2016/0004499 A1 | 1/2016 | Kim et al. |
| 2016/0005280 A1* | 1/2016 | Laska ............... G08B 13/19608 386/230 |
| 2016/0005281 A1 | 1/2016 | Laska et al. |
| 2016/0033985 A1* | 2/2016 | Gulli' ....................... G06N 20/00 700/295 |
| 2016/0037140 A1 | 2/2016 | Lindsey et al. |
| 2016/0037436 A1 | 2/2016 | Spencer et al. |
| 2016/0043905 A1 | 2/2016 | Fiedler |
| 2016/0043962 A1 | 2/2016 | Kim et al. |
| 2016/0070244 A1 | 3/2016 | Cipollo et al. |
| 2016/0073197 A1 | 3/2016 | Hammer et al. |
| 2016/0073439 A1 | 3/2016 | Palin et al. |
| 2016/0073482 A1 | 3/2016 | Fok et al. |
| 2016/0085412 A1 | 3/2016 | Meganathan et al. |
| 2016/0088438 A1* | 3/2016 | O'Keeffe ................ H04W 4/21 455/456.2 |
| 2016/0092072 A1 | 3/2016 | So et al. |
| 2016/0093180 A1 | 3/2016 | Fitzgibbon et al. |
| 2016/0093338 A1 | 3/2016 | Laska et al. |
| 2016/0099901 A1 | 4/2016 | Allen et al. |
| 2016/0103830 A1 | 4/2016 | Cheong et al. |
| 2016/0117402 A1 | 4/2016 | Gowel |
| 2016/0120009 A1* | 4/2016 | Aliakseyeu ............ H05B 47/19 315/131 |
| 2016/0133297 A1 | 5/2016 | Thornton et al. |
| 2016/0139752 A1 | 5/2016 | Shim et al. |
| 2016/0150135 A1 | 5/2016 | Chen |
| 2016/0165390 A1 | 6/2016 | Hartzell et al. |
| 2016/0173318 A1 | 6/2016 | Ha et al. |
| 2016/0179068 A1 | 6/2016 | Qian et al. |
| 2016/0187995 A1* | 6/2016 | Rosewall ............... H04W 4/027 345/156 |
| 2016/0191992 A1 | 6/2016 | Kwon |
| 2016/0224233 A1 | 8/2016 | Phang et al. |
| 2016/0231902 A1 | 8/2016 | Sirpal et al. |
| 2016/0253145 A1 | 9/2016 | Lee et al. |
| 2016/0255706 A1 | 9/2016 | Kim et al. |
| 2016/0259459 A1* | 9/2016 | Yang ....................... G06F 3/041 |
| 2016/0277903 A1 | 9/2016 | Poosala et al. |
| 2016/0286630 A1* | 9/2016 | Witzgall ................. F21S 8/032 |
| 2016/0291824 A1 | 10/2016 | Grossman et al. |
| 2016/0301566 A1 | 10/2016 | Ramasubramani et al. |
| 2016/0320849 A1 | 11/2016 | Koo |
| 2016/0335041 A1 | 11/2016 | Wachter et al. |
| 2016/0364123 A1 | 12/2016 | Burns et al. |
| 2016/0364129 A1 | 12/2016 | Mclean et al. |
| 2016/0366481 A1 | 12/2016 | Lim et al. |
| 2017/0017531 A1 | 1/2017 | Choi et al. |
| 2017/0046025 A1 | 2/2017 | Dascola et al. |
| 2017/0053008 A1 | 2/2017 | Frenkel et al. |
| 2017/0070775 A1 | 3/2017 | Taxier et al. |
| 2017/0078767 A1 | 3/2017 | Borel et al. |
| 2017/0084135 A1* | 3/2017 | Yu ..................... H04N 21/41407 |
| 2017/0091551 A1 | 3/2017 | Zhang et al. |
| 2017/0097621 A1 | 4/2017 | Ackmann et al. |
| 2017/0176035 A1* | 6/2017 | Reeder ................... G05B 15/02 |
| 2017/0185277 A1 | 6/2017 | Sundermeyer et al. |
| 2017/0195130 A1* | 7/2017 | Landow ................. G05B 15/02 |
| 2017/0206779 A1 | 7/2017 | Lee et al. |
| 2017/0230705 A1 | 8/2017 | Pardue et al. |
| 2017/0251314 A1 | 8/2017 | Pye et al. |
| 2017/0285788 A1 | 10/2017 | Park et al. |
| 2017/0302779 A1* | 10/2017 | Zhao ....................... H04W 4/02 |
| 2017/0337791 A1 | 11/2017 | Gordon-Carroll |
| 2017/0352380 A1 | 12/2017 | Doumbouya et al. |
| 2017/0357425 A1 | 12/2017 | Smith et al. |
| 2017/0357434 A1 | 12/2017 | Coffman et al. |
| 2017/0359189 A1 | 12/2017 | Smith et al. |
| 2017/0359191 A1 | 12/2017 | Smith et al. |
| 2017/0359311 A1 | 12/2017 | Chen |
| 2017/0359555 A1 | 12/2017 | Irani et al. |
| 2018/0014043 A1 | 1/2018 | Zhang et al. |
| 2018/0014077 A1 | 1/2018 | Hou et al. |
| 2018/0018081 A1 | 1/2018 | Dattilo-Green et al. |
| 2018/0019889 A1 | 1/2018 | Burns et al. |
| 2018/0020530 A1 | 1/2018 | Scordato et al. |
| 2018/0088795 A1 | 3/2018 | Van Os et al. |
| 2018/0101297 A1 | 4/2018 | Yang et al. |
| 2018/0109754 A1 | 4/2018 | Kwon |
| 2018/0113577 A1 | 4/2018 | Burns et al. |
| 2018/0115788 A1 | 4/2018 | Burns et al. |
| 2018/0199080 A1 | 7/2018 | Jackson et al. |
| 2018/0213396 A1 | 7/2018 | Segal et al. |
| 2018/0227341 A1 | 8/2018 | Rizzi |
| 2018/0228003 A1 | 8/2018 | O'Driscoll et al. |
| 2018/0228006 A1 | 8/2018 | Baker et al. |
| 2018/0232592 A1 | 8/2018 | Stewart et al. |
| 2018/0232705 A1 | 8/2018 | Baker et al. |
| 2018/0246639 A1 | 8/2018 | Han et al. |
| 2018/0249113 A1 | 8/2018 | Faulkner |
| 2018/0267774 A1 | 9/2018 | Williams et al. |
| 2018/0286395 A1 | 10/2018 | Li et al. |
| 2018/0288104 A1 | 10/2018 | Padilla et al. |
| 2018/0308480 A1 | 10/2018 | Jang et al. |
| 2018/0332559 A1 | 11/2018 | Gudivada et al. |
| 2018/0338038 A1 | 11/2018 | Ly et al. |
| 2018/0341448 A1 | 11/2018 | Behzadi et al. |
| 2018/0364665 A1 | 12/2018 | Clymer et al. |
| 2018/0367578 A1 | 12/2018 | Verma et al. |
| 2019/0025943 A1 | 1/2019 | Jobs et al. |
| 2019/0026021 A1 | 1/2019 | Coffman et al. |
| 2019/0028419 A1 | 1/2019 | Sullivan |
| 2019/0056907 A1 | 2/2019 | So et al. |
| 2019/0089934 A1 | 3/2019 | Goulden et al. |
| 2019/0102145 A1 | 4/2019 | Wilberding et al. |
| 2019/0130185 A1 | 5/2019 | Delaney et al. |
| 2019/0138951 A1 | 5/2019 | Brownhill et al. |
| 2019/0208282 A1 | 7/2019 | Singh et al. |
| 2019/0265946 A1* | 8/2019 | Bae ......................... G06F 3/167 |
| 2019/0273664 A1 | 9/2019 | Fujita et al. |
| 2019/0279634 A1 | 9/2019 | Tak et al. |
| 2019/0286651 A1 | 9/2019 | Lee et al. |
| 2019/0295393 A1 | 9/2019 | Lee et al. |
| 2019/0332400 A1 | 10/2019 | Spoor et al. |
| 2019/0339769 A1 | 11/2019 | Cox et al. |
| 2019/0342621 A1 | 11/2019 | Carrigan et al. |
| 2019/0342622 A1 | 11/2019 | Carrigan et al. |
| 2019/0354252 A1 | 11/2019 | Badr |
| 2019/0361575 A1 | 11/2019 | Ni et al. |
| 2020/0050502 A1 | 2/2020 | Ghafourifar et al. |
| 2020/0127908 A1 | 4/2020 | Bradley et al. |
| 2020/0135191 A1 | 4/2020 | Nourbakhsh |
| 2020/0142667 A1 | 5/2020 | Querze et al. |
| 2020/0152186 A1 | 5/2020 | Koh et al. |
| 2020/0186378 A1 | 6/2020 | Six et al. |
| 2020/0220914 A1 | 7/2020 | Carrigan et al. |
| 2020/0225841 A1 | 7/2020 | Coffman et al. |
| 2020/0302913 A1 | 9/2020 | Marcinkiewicz |
| 2020/0312318 A1 | 10/2020 | Olson et al. |
| 2020/0335187 A1 | 10/2020 | Lefkofsky et al. |
| 2020/0382332 A1 | 12/2020 | Carrigan et al. |
| 2020/0382559 A1 | 12/2020 | Kramar et al. |
| 2020/0395012 A1 | 12/2020 | Kim et al. |
| 2020/0413197 A1 | 12/2020 | Carrigan et al. |
| 2021/0043129 A1 | 2/2021 | Pyun |
| 2021/0064317 A1 | 3/2021 | Juenger et al. |
| 2021/0065134 A1 | 3/2021 | Chhabra et al. |
| 2021/0092491 A1 | 3/2021 | Carrigan et al. |
| 2021/0099829 A1 | 4/2021 | Soto et al. |
| 2021/0152655 A1 | 5/2021 | Li |
| 2021/0158830 A1 | 5/2021 | Boehlke |
| 2021/0266274 A1 | 8/2021 | Liu et al. |
| 2021/0321197 A1 | 10/2021 | Annamraju |
| 2021/0323406 A1 | 10/2021 | So et al. |
| 2021/0349680 A1 | 11/2021 | Kim et al. |
| 2021/0352172 A1 | 11/2021 | Kim et al. |
| 2022/0004356 A1 | 1/2022 | Kim et al. |
| 2022/0180862 A1 | 6/2022 | Sharifi et al. |
| 2022/0279022 A1 | 9/2022 | Kramar et al. |
| 2022/0365667 A1 | 11/2022 | Carrigan et al. |
| 2023/0041125 A1 | 2/2023 | Kim et al. |
| 2023/0057851 A1* | 2/2023 | Ansari .................... B05D 3/002 |

(56) References Cited

U.S. PATENT DOCUMENTS

| | | |
|---|---|---|
| 2023/0209016 A1 | 6/2023 | Park et al. |
| 2023/0393714 A1 | 12/2023 | Giuliani |
| 2023/0403509 A1 | 12/2023 | Carrigan et al. |
| 2024/0040198 A1 | 2/2024 | Carrigan et al. |
| 2024/0069711 A1 | 2/2024 | Carrigan et al. |
| 2024/0259638 A1 | 8/2024 | Carrigan et al. |

FOREIGN PATENT DOCUMENTS

| | | |
|---|---|---|
| CN | 101517557 A | 8/2009 |
| CN | 101627361 A | 1/2010 |
| CN | 101989072 A | 3/2011 |
| CN | 102063253 A | 5/2011 |
| CN | 102202192 A | 9/2011 |
| CN | 102915630 A | 2/2013 |
| CN | 102932216 A | 2/2013 |
| CN | 103136497 A | 6/2013 |
| CN | 103347116 A | 10/2013 |
| CN | 103677711 A | 3/2014 |
| CN | 104076757 A | 10/2014 |
| CN | 104155938 A | 11/2014 |
| CN | 104247449 A | 12/2014 |
| CN | 104284477 A | 1/2015 |
| CN | 104298188 A | 1/2015 |
| CN | 204155434 U | 2/2015 |
| CN | 104429094 A | 3/2015 |
| CN | 104469512 A | 3/2015 |
| CN | 104581043 A | 4/2015 |
| CN | 104618672 A | 5/2015 |
| CN | 104684207 A | 6/2015 |
| CN | 104766021 A | 7/2015 |
| CN | 104780654 A | 7/2015 |
| CN | 104820631 A | 8/2015 |
| CN | 104898603 A | 9/2015 |
| CN | 104956276 A | 9/2015 |
| CN | 104956417 A | 9/2015 |
| CN | 105069118 A | 11/2015 |
| CN | 105159107 A | 12/2015 |
| CN | 105204742 A | 12/2015 |
| CN | 105263114 A | 1/2016 |
| CN | 105283840 A | 1/2016 |
| CN | 105359199 A | 2/2016 |
| CN | 105373165 A | 3/2016 |
| CN | 105374192 A | 3/2016 |
| CN | 105388773 A | 3/2016 |
| CN | 105474580 A | 4/2016 |
| CN | 105531671 A | 4/2016 |
| CN | 105553796 A | 5/2016 |
| CN | 105554516 A | 5/2016 |
| CN | 105847746 A | 8/2016 |
| CN | 105900376 A | 8/2016 |
| CN | 107197441 A | 9/2017 |
| CN | 107533368 A | 1/2018 |
| CN | 107613235 A | 1/2018 |
| CN | 107637073 A | 1/2018 |
| CN | 107819928 A | 3/2018 |
| CN | 109117078 A | 1/2019 |
| CN | 109196825 A | 1/2019 |
| CN | 109287140 A | 1/2019 |
| CN | 109302531 A | 2/2019 |
| CN | 109348052 A | 2/2019 |
| CN | 109688441 A | 4/2019 |
| CN | 109688442 A | 4/2019 |
| EP | 1881649 A2 | 1/2008 |
| EP | 2675195 A2 | 12/2013 |
| EP | 2784611 A2 | 10/2014 |
| EP | 2797391 A1 | 10/2014 |
| EP | 2879470 A1 | 6/2015 |
| EP | 2894948 A2 | 7/2015 |
| EP | 2933953 A1 | 10/2015 |
| EP | 2981093 A1 | 2/2016 |
| EP | 3038427 A1 | 6/2016 |
| EP | 3041229 A1 | 7/2016 |
| EP | 3445058 A1 | 2/2019 |
| EP | 3460770 A1 | 3/2019 |
| EP | 3038427 B1 | 12/2019 |
| EP | 3579093 A1 | 12/2019 |
| EP | 3751405 A1 | 12/2020 |
| EP | 4134799 A1 | 2/2023 |
| GB | 2499123 A | 8/2013 |
| GB | 2512821 A | 10/2014 |
| GB | 2533101 A | 6/2016 |
| IN | 1038/MUM/2005 | 6/2007 |
| JP | 4-175921 A | 6/1992 |
| JP | 6-178356 A | 6/1994 |
| JP | 2001-67099 A | 3/2001 |
| JP | 2002-153678 A | 5/2002 |
| JP | 2003-228780 A | 8/2003 |
| JP | 2004-96397 A | 3/2004 |
| JP | 2004-110559 A | 4/2004 |
| JP | 2005-333294 A | 12/2005 |
| JP | 2006-350819 A | 12/2006 |
| JP | 2007-58663 A | 3/2007 |
| JP | 2008-99330 A | 4/2008 |
| JP | 2009-201127 A | 9/2009 |
| JP | 2011-124665 A | 6/2011 |
| JP | 2012-73839 A | 4/2012 |
| JP | 2012-123460 A | 6/2012 |
| JP | 2013-098613 A | 5/2013 |
| JP | 2013-200879 A | 10/2013 |
| JP | 2014-071835 A | 4/2014 |
| JP | 2014-087126 A | 5/2014 |
| JP | 2014-160461 A | 9/2014 |
| JP | 2014-170982 A | 9/2014 |
| JP | 2014-186961 A | 10/2014 |
| JP | 5628461 B1 | 11/2014 |
| JP | 2015-070327 A | 4/2015 |
| JP | 2015-125671 A | 7/2015 |
| JP | 2015-128043 A | 7/2015 |
| JP | 2015-128326 A | 7/2015 |
| JP | 2015-149710 A | 8/2015 |
| JP | 2015-154253 A | 8/2015 |
| JP | 2015-195222 A | 11/2015 |
| JP | 2015-211035 A | 11/2015 |
| JP | 2016-38615 A | 3/2016 |
| JP | 2016-051661 A | 4/2016 |
| JP | 2016-63520 A | 4/2016 |
| JP | 2016-72953 A | 5/2016 |
| JP | 2016-100791 A | 5/2016 |
| JP | 2016-119600 A | 6/2016 |
| JP | 2016-525732 A | 8/2016 |
| JP | 2016-157292 A | 9/2016 |
| JP | 2017-41008 A | 2/2017 |
| JP | 2017-508195 A | 3/2017 |
| JP | 2017-84253 A | 5/2017 |
| JP | 2017-158202 A | 9/2017 |
| JP | 2017-173998 A | 9/2017 |
| JP | 2018-007158 A | 1/2018 |
| JP | 2018-063826 A | 4/2018 |
| JP | 2018-200624 A | 12/2018 |
| JP | 2019-526095 A | 9/2019 |
| KR | 10-2001-0091156 A | 10/2001 |
| KR | 10-2011-0022980 A | 3/2011 |
| KR | 10-2011-0075136 A | 7/2011 |
| KR | 10-2011-0093040 A | 8/2011 |
| KR | 10-2012-0059860 A | 6/2012 |
| KR | 10-2012-0079208 A | 7/2012 |
| KR | 10-2013-0115611 A | 10/2013 |
| KR | 10-2014-0148289 A | 12/2014 |
| KR | 10-2015-0005134 A | 1/2015 |
| KR | 10-2015-0043146 A | 4/2015 |
| KR | 10-15-22311 B1 | 5/2015 |
| KR | 10-2015-0136440 A | 12/2015 |
| KR | 10-2017-0008601 A | 1/2017 |
| KR | 10-2017-0100358 A | 9/2017 |
| KR | 10-2018-0034637 A | 4/2018 |
| KR | 10-2018-0085931 A | 7/2018 |
| KR | 10-2019-0002658 A | 1/2019 |
| KR | 10-2019-0014495 A | 2/2019 |
| KR | 10-2019-0057414 A | 5/2019 |
| KR | 10-2020-0039030 A | 4/2020 |
| TW | 201547326 A | 12/2015 |
| WO | 00/39964 A1 | 7/2000 |
| WO | 2005/055521 A1 | 6/2005 |

(56) References Cited

FOREIGN PATENT DOCUMENTS

| | | | |
|---|---|---|---|
| WO | 2011/027964 A1 | 3/2011 |
| WO | 2011/126502 A1 | 10/2011 |
| WO | 2012/085794 A1 | 6/2012 |
| WO | 2014/030540 A1 | 2/2014 |
| WO | 2014/128800 A1 | 8/2014 |
| WO | 2014/155429 A1 | 10/2014 |
| WO | 2014/197339 A1 | 12/2014 |
| WO | 2014/208057 A1 | 12/2014 |
| WO | 2014/210304 A1 | 12/2014 |
| WO | 2015/008409 A1 | 1/2015 |
| WO | 2015/039000 A1 | 3/2015 |
| WO | 2015/105763 A1 | 7/2015 |
| WO | 2015/114690 A1 | 8/2015 |
| WO | 2015/179031 A1 | 11/2015 |
| WO | 2016/052888 A1 | 4/2016 |
| WO | 2016/079889 A1 | 5/2016 |
| WO | 2016/200603 A1 | 12/2016 |
| WO | 2017/027526 A1 | 2/2017 |
| WO | 2017/058293 A1 | 4/2017 |
| WO | 2017/147081 A1 | 8/2017 |
| WO | 2017/205657 A1 | 11/2017 |
| WO | 2017/218143 A1 | 12/2017 |
| WO | 2017/218192 A1 | 12/2017 |
| WO | 2018/144339 A2 | 8/2018 |
| WO | 2018/213401 A1 | 11/2018 |
| WO | 2018/213415 A1 | 11/2018 |
| WO | 2018/213844 A1 | 11/2018 |
| WO | 2018/232333 A1 | 12/2018 |
| WO | 2019/090653 A1 | 5/2019 |
| WO | 2019/217341 A1 | 11/2019 |
| WO | 2021/231412 A1 | 11/2021 |

OTHER PUBLICATIONS

Notice of Allowance received for Japanese Patent Application No. 2022-014389, mailed on Jan. 27, 2023, 4 pages (1 page of English Translation and 3 pages of Official Copy).
Notice of Allowance received for Japanese Patent Application No. 2022-125792, mailed on Jan. 27, 2023, 4 pages (1 page of English Translation and 3 pages of Official Copy).
Office Action received for European Patent Application No. 20719301.2, mailed on Jan. 24, 2023, 9 pages.
Applicant-Initiated Interview Summary received for U.S. Appl. No. 17/742,273, mailed on Jan. 18, 2023, 4 pages.
Extended European Search Report received for European Patent Application No. 22196865.4, mailed on Jan. 13, 2023, 7 pages.
Notice of Allowance received for Korean Patent Application No. 10-2021-7029861, mailed on Jan. 4, 2023, 7 pages (2 pages of English Translation and 5 pages of Official Copy).
Office Action received for Japanese Patent Application No. 2022-016138, mailed on Apr. 24, 2023, 9 pages (5 pages of English Translation and 4 pages of Official Copy).
Office Action received for Korean Patent Application No. 10-2022-7001332, mailed on Apr. 20, 2023, 8 pages (4 pages of English Translation and 4 pages of Official Copy).
Notice of Reasons for Refusal received for Japanese Patent Application No. 2020-047952, mailed on Apr. 3, 2023, 4 pages (2 pages of English Translation and 2 pages of Official Copy).
Office Action received for Indian Patent Application No. 202215025361, mailed on Mar. 29, 2023, 6 pages.
Applicant-Initiated Interview Summary received for U.S. Appl. No. 17/742,273, mailed on Mar. 30, 2023, 5 pages.
Non-Final Office Action received for U.S. Appl. No. 16/830,838, mailed on Mar. 30, 2023, 16 pages.
Non-Final Office Action received for U.S. Appl. No. 17/476,404, mailed on Mar. 30, 2023, 29 pages.
Notice of Acceptance received for Australian Patent Application No. 2021261941, mailed on Mar. 15, 2023, 3 pages.
Office Action received for Indian Patent Application No. 202215025360, mailed on Mar. 29, 2023, 6 pages.
Office Action received for Indian Patent Application No. 202215025363, mailed on Mar. 29, 2023, 6 pages.
Office Action received for Indian Patent Application No. 202215025364, mailed on Mar. 29, 2023, 6 pages.
Advisory Action received for U.S. Appl. No. 16/404,605, mailed on Apr. 15, 2020, 10 pages.
Androidcentral, "How do i respond to group messages from notification bar?", Available online at: https://forums.androidcentral.com/ask-question/952030-how-do-i-respond-group-messages-notification-bar.html, Mar. 25, 2019, 3 pages.
Applicant-Initiated Interview Summary received for U.S. Appl. No. 16/404,605, mailed on Nov. 13, 2019, 3 pages.
Applicant-Initiated Interview Summary received for U.S. Appl. No. 16/817,328, mailed on Dec. 21, 2021, 3 pages.
Applicant-Initiated Interview Summary received for U.S. Appl. No. 16/584,743, mailed on May 1, 2020, 5 pages.
Applicant-Initiated Interview Summary received for U.S. Appl. No. 16/586,002, mailed on Apr. 28, 2020, 5 pages.
Applicant-Initiated Interview Summary received for U.S. Appl. No. 16/830,838, mailed on Apr. 6, 2022, 2 pages.
Applicant-Initiated Interview Summary received for U.S. Appl. No. 16/830,838, mailed on May 24, 2021, 3 pages.
Applicant-Initiated Interview Summary received for U.S. Appl. No. 16/830,838, mailed on Sep. 21, 2022, 2 pages.
Applicant-Initiated Interview Summary received for U.S. Appl. No. 17/026,818, mailed on Dec. 15, 2020, 7 pages.
Applicant-Initiated Interview Summary received for U.S. Appl. No. 17/026,818, mailed on Mar. 8, 2021, 4 pages.
Applicant-Initiated Interview Summary received for U.S. Appl. No. 17/116,938, mailed on Dec. 13, 2021, 3 pages.
Applicant-Initiated Interview Summary received for U.S. Appl. No. 17/116,938, mailed on Jun. 14, 2022, 2 pages.
Applicant-Initiated Interview Summary received for U.S. Appl. No. 17/223,794, mailed on Sep. 7, 2021, 3 pages.
Applicant-Initiated Interview Summary received for U.S. Appl. No. 17/476,404, mailed on Jul. 27, 2022, 6 pages.
Applicant-Initiated Interview Summary received for U.S. Appl. No. 17/476,404, mailed on Mar. 18, 2022, 2 pages.
Benjamin Jeff, "iOS 10: How to use the new Home app to control HomeKit devices [Video]", Available online at: https://9to5mac.com/2016/09/23/ios-10-how-to-use-new-home-app-control-homekit-devices-video, Sep. 23, 2016, 36 pages.
Brief Communication Regarding Oral Proceedings received for European Patent Application No. 17813777.4, mailed on Nov. 23, 2020, 6 pages.
Brief Communication Regarding Oral Proceedings received for European Patent Application No. 19182037.2, mailed on Apr. 15, 2021, 2 pages.
Brief Communication Regarding Oral Proceedings received for European Patent Application No. 19728558.8, mailed on Jul. 5, 2022, 1 page.
Brief Communication Regarding Oral Proceedings received for European Patent Application No. 20187610.9, mailed on May 31, 2022, 1 page.
Certificate of Examination received for Australian Patent Application No. 2019100487, mailed on Jan. 7, 2020, 2 pages.
Certificate of Examination received for Australian Patent Application No. 2020100303, mailed on Apr. 17, 2020, 2 pages.
Certificate of Examination received for Australian Patent Application No. 2020100886, mailed on Dec. 22, 2020, 2 pages.
Certificate of Examination received for Australian Patent Application No. 2021100721, mailed on Dec. 16, 2021, 2 pages.
Certificate of Examination received for Australian Patent Application No. 2017100666, mailed on Jan. 29, 2018, 2 pages.
Corrected International Search Report and Written Opinion received for PCT Patent Application No. PCT/US2017/035293, mailed on Dec. 8, 2017, 21 pages.
Corrected Notice of Allowance received for U.S. Appl. No. 15/427,516, mailed on Apr. 29, 2019, 2 pages.
Corrected Notice of Allowance received for U.S. Appl. No. 15/427,516, mailed on May 8, 2019, 2 pages.
Corrected Notice of Allowance received for U.S. Appl. No. 16/143,379, mailed on Dec. 18, 2019, 2 pages.

(56) References Cited

OTHER PUBLICATIONS

Corrected Notice of Allowance received for U.S. Appl. No. 16/143,379, mailed on Feb. 14, 2020, 2 pages.
Corrected Notice of Allowance received for U.S. Appl. No. 16/143,379, mailed on Mar. 3, 2020, 2 pages.
Corrected Notice of Allowance received for U.S. Appl. No. 16/143,379, mailed on Mar. 12, 2020, 2 pages.
Corrected Notice of Allowance received for U.S. Appl. No. 16/404,605, mailed on Dec. 23, 2020, 3 pages.
Corrected Notice of Allowance received for U.S. Appl. No. 16/584,743, mailed on Dec. 30, 2020, 3 pages.
Corrected Notice of Allowance received for U.S. Appl. No. 17/027,373, mailed on Jul. 12, 2022, 2 pages.
Corrected Notice of Allowance received for U.S. Appl. No. 16/143,379, mailed on Aug. 15, 2019, 2 pages.
Corrected Notice of Allowance received for U.S. Appl. No. 16/143,379, mailed on Nov. 12, 2019, 2 pages.
Corrected Notice of Allowance received for U.S. Appl. No. 16/143,379, mailed on Oct. 16, 2019, 2 pages.
Decision to Grant received for Danish Patent Application No. PA201670601, mailed on Jun. 21, 2019, 2 pages.
Decision to Grant received for Danish Patent Application No. PA201670602, mailed on Nov. 30, 2018, 2 pages.
Decision to Grant received for Danish Patent Application No. PA201670604, mailed on Aug. 22, 2018, 2 pages.
Decision to Grant received for Danish Patent Application No. PA201670605, mailed on Nov. 29, 2018, 2 pages.
Decision to Grant received for Danish Patent Application No. PA201870293, mailed on Dec. 3, 2018, 2 pages.
Decision to Grant received for Danish Patent Application No. PA201870435, mailed on Oct. 20, 2020, 2 pages.
Decision to Grant received for European Patent Application No. 19182037.2, mailed on Sep. 16, 2021, 3 pages.
Decision to Grant received for Japanese Patent Application No. 2021-051415, mailed on Jan. 6, 2022, 3 pages.
Decision to Refuse received for European Patent Application No. 20187610.9, mailed on Jul. 19, 2022, 13 pages.
D-Link USA,"How to Control Your Network with mydlink Lite", Online Available at: https://www.youtube.com/watch?v=2DWct_P3o7Y, Sep. 6, 2013, 3 pages.
D-Link,"D-Link Wi-Fi app—Complete Wi-Fi Management in the Palm of Your Hand", Online Available at: https://www.youtube.com/watch?v=EA8L7ZHxsbg, Apr. 12, 2019, 3 pages.
Examiner-Initiated Interview Summary received for U.S. Appl. No. 17/027,373, mailed on Mar. 31, 2022, 4 pages.
Extended European Search Report (includes Supplementary European Search Report and Search Opinion) received for European Patent Application No. 17813777.4, mailed on Mar. 25, 2019, 8 pages.
Extended European Search Report received for European Patent Application No. 19182037.2, mailed on Oct. 31, 2019, 8 pages.
Extended European Search Report received for European Patent Application No. 20187610.9, mailed on Nov. 16, 2020, 7 pages.
Extended European Search Report received for European Patent Application No. 21160991.2, mailed on Jul. 16, 2021, 14 pages.
Extended Search Report received for European Patent Application No. 21161005.0, mailed on Jun. 14, 2021, 12 pages.
Final Office Action received for U.S. Appl. No. 16/404,605, mailed on Feb. 10, 2020, 21 pages.
Final Office Action received for U.S. Appl. No. 16/830,838, mailed on Dec. 9, 2021, 16 pages.
Final Office Action received for U.S. Appl. No. 16/830,838, mailed on Oct. 14, 2022, 16 pages.
Final Office Action received for U.S. Appl. No. 17/026,818, mailed on Jan. 29, 2021, 21 pages.
Final Office Action received for U.S. Appl. No. 17/116,938, mailed on Mar. 1, 2022, 27 pages.
Final Office Action received for U.S. Appl. No. 17/476,404, mailed on May 5, 2022, 30 pages.

IDB,"HomeCam is the Best Way to View Multiple HomeKit Cameras on iPhone & Apple TV", Available online at: https://www.youtube.com/watch?v=6x2oCHgSVUU, Feb. 20, 2018, 3 pages.
Intention to Grant received for Danish Patent Application No. PA201670601, mailed on Apr. 10, 2019, 2 pages.
Intention to Grant received for Danish Patent Application No. PA201670602, mailed on Aug. 1, 2018, 2 pages.
Intention to Grant received for Danish Patent Application No. PA201670604, mailed on Jun. 14, 2018, 2 pages.
Intention to Grant received for Danish Patent Application No. PA201670604, mailed on Mar. 15, 2018, 2 pages.
Intention to Grant received for Danish Patent Application No. PA201670605, mailed on Aug. 1, 2018, 2 pages.
Intention to Grant received for Danish Patent Application No. PA201870293, mailed on Aug. 31, 2018, 2 pages.
Intention to Grant received for Danish Patent Application No. PA201870435, mailed on Jul. 1, 2020, 2 pages.
Intention to Grant received for Danish Patent Application No. PA202070617, mailed on Nov. 15, 2021, 2 pages.
Intention to Grant received for European Patent Application No. 19182037.2, mailed on May 4, 2021, 9 pages.
International Preliminary Report on Patentability received for PCT Patent Application No. PCT/US2017/035293, mailed on Dec. 27, 2018, 16 pages.
International Preliminary Report on Patentability received for PCT Patent Application No. PCT/US2019/030963, mailed on Nov. 19, 2020, 12 pages.
International Preliminary Report on Patentability received for PCT Patent Application No. PCT/US2020/024390, mailed on Dec. 9, 2021, 20 pages.
International Preliminary Report on Patentability received for PCT Patent Application No. PCT/US2020/035426, mailed on Dec. 9, 2021, 10 pages.
International Search Report and Written Opinion received for PCT Patent Application No. PCT/US2017/035293, mailed on Oct. 10, 2017, 25 pages.
International Search Report and Written Opinion received for PCT Patent Application No. PCT/US2019/030963, mailed on Oct. 17, 2019, 21 pages.
International Search Report and written Opinion received for PCT Patent Application No. PCT/US2020/024390, mailed on Aug. 17, 2020, 22 pages.
International Search Report and Written Opinion received for PCT Patent Application No. PCT/US2020/024390, mailed on Oct. 23, 2020, 26 pages.
International Search Report and Written Opinion received for PCT Patent Application No. PCT/US2020/035426, mailed on Sep. 11, 2020, 12 pages.
International Search Report and Written Opinion received for PCT Patent Application No. PCT/US2021/031760, mailed on Sep. 16, 2021, 18 pages.
Invitation to Pay Addition Fees received for PCT Patent Application No. PCT/US2017/035293, mailed on Aug. 17, 2017, 3 pages.
Invitation to Pay Additional Fees received for PCT Patent Application No. PCT/US2020/024390, mailed on Jun. 26, 2020, 15 pages.
Invitation to Pay Additional Fees received for PCT Patent Application No. PCT/US2019/030963, mailed on Aug. 22, 2019, 12 pages.
Invitation to Pay Search Fees received for European Patent Application No. 19728558.8, mailed on Apr. 20, 2021, 4 pages.
Invitation to Pay Search Fees received for European Patent Application No. 20719301.2, mailed on Dec. 17, 2020, 5 pages.
Minutes of the Oral Proceedings received for European Patent Application No. 20187610.9, mailed on Jun. 7, 2022, 6 pages.
Non-Final Office Action received for U.S. Appl. No. 17/476,404, mailed on Feb. 8, 2022, 26 pages.
Non-Final Office Action received for U.S. Appl. No. 15/427,516, mailed on Aug. 28, 2018, 11 pages.
Non-Final Office Action received for U.S. Appl. No. 16/404,605, mailed on Jun. 24, 2020, 18 pages.
Non-Final Office Action received for U.S. Appl. No. 16/404,605, mailed on Aug. 1, 2019, 19 pages.

(56) References Cited

OTHER PUBLICATIONS

Non-Final Office Action received for U.S. Appl. No. 16/404,612, mailed on Feb. 28, 2020, 13 pages.
Non-Final Office Action received for U.S. Appl. No. 16/584,743, mailed on Feb. 6, 2020, 15 pages.
Non-Final Office Action received for U.S. Appl. No. 16/586,002, mailed on Feb. 20, 2020, 15 pages.
Non-Final Office Action received for U.S. Appl. No. 16/817,328, mailed on Oct. 29, 2021, 9 pages.
Non-Final Office Action received for U.S. Appl. No. 16/830,838, mailed on Apr. 1, 2021, 13 pages.
Non-Final Office Action received for U.S. Appl. No. 16/830,838, mailed on Jun. 9, 2022, 17 pages.
Non-Final Office Action received for U.S. Appl. No. 17/026,818, mailed on Nov. 25, 2020, 20 pages.
Non-Final Office Action received for U.S. Appl. No. 17/027,373, mailed on Feb. 2, 2022, 17 pages.
Non-Final Office Action received for U.S. Appl. No. 17/116,938, mailed on Aug. 1, 2022, 15 pages.
Non-Final Office Action received for U.S. Appl. No. 17/116,938, mailed on Jul. 30, 2021, 19 pages.
Non-Final Office Action received for U.S. Appl. No. 17/223,794, mailed on Jun. 16, 2021, 32 pages.
Non-Final Office Action received for U.S. Appl. No. 17/476,404, mailed on Sep. 14, 2022, 31 pages.
Non-Final Office Action received for U.S. Appl. No. 16/143,379, mailed on Mar. 14, 2019, 10 pages.
Notice of Acceptance received for Australian Patent Application No. 2020217458, mailed on Sep. 7, 2022, 3 pages.
Notice of Acceptance received for Australian Patent Application No. 2020239711, mailed on Dec. 16, 2021, 3 pages.
Notice of Acceptance received for Australian Patent Application No. 2020257092, mailed on Aug. 27, 2021, 3 pages.
Notice of Acceptance received for Australian Patent Application No. 2021201403, mailed on Oct. 22, 2021, 3 pages.
Notice of Allowance received for Australian Patent Application No. 2017286129, mailed on Dec. 10, 2018, 3 pages.
Notice of Allowance received for Chinese Patent Application No. 201710493025.3, mailed on May 7, 2021, 6 pages.
Notice of Allowance received for Chinese Patent Application No. 201810730279.7, mailed on Nov. 5, 2020, 2 pages.
Notice of Allowance received for Chinese Patent Application No. 201811151702.4, mailed on Jul. 6, 2020, 6 pages.
Notice of Allowance received for Chinese Patent Application No. 201811152097.2, mailed on Oct. 28, 2019, 6 pages.
Notice of Allowance received for Chinese Patent Application No. 202010742019.9, mailed on Jul. 6, 2021, 7 pages.
Notice of Allowance received for Chinese Patent Application No. 202011336156.9, mailed on Jan. 6, 2022, 3 pages.
Notice of Allowance received for Chinese Patent Application No. 202110248576.X, mailed on Mar. 21, 2022, 2 pages.
Notice of Allowance received for Chinese Patent Application No. 202110818370.6, mailed on Sep. 2, 2022, 7 pages.
Notice of Allowance received for Japanese Patent Application No. 2018-562659, mailed on Jul. 30, 2021, 4 pages.
Notice of Allowance received for Japanese Patent Application No. 2020-159840, mailed on Jul. 8, 2022, 4 pages.
Notice of Allowance received for Japanese Patent Application No. 2020-558885, mailed on Jul. 26, 2021, 4 pages.
Notice of Allowance received for Japanese Patent Application No. 2020-560927, mailed on May 30, 2022, 3 pages.
Notice of Allowance received for Japanese Patent Application No. 2021-026630, mailed on Jan. 7, 2022, 4 pages.
Notice of Allowance received for Korean Patent Application No. 10-2018-7034909, mailed on Sep. 30, 2019, 4 pages.
Notice of Allowance received for Korean Patent Application No. 10-2019-7038093, mailed on Aug. 10, 2020, 5 pages.
Notice of Allowance received for Korean Patent Application No. 10-2020-0123805, mailed on Jun. 19, 2022, 5 pages.
Notice of Allowance received for Korean Patent Application No. 10-2020-7031319, mailed on Apr. 6, 2021, 5 pages.
Notice of Allowance received for Korean Patent Application No. 10-2020-7031700, mailed on Apr. 21, 2021, 4 pages.
Notice of Allowance received for Korean Patent Application No. 10-2020-7032488, mailed on Jun. 16, 2021, 4 pages.
Notice of Allowance received for Korean Patent Application No. 10-2021-7021047, mailed on Dec. 6, 2021, 3 pages.
Notice of Allowance received for Korean Patent Application No. 10-2021-7022610, mailed on Oct. 13, 2021, 3 pages.
Notice of Allowance received for U.S. Appl. No. 15/427,516, mailed on Mar. 4, 2019, 7 pages.
Notice of Allowance received for U.S. Appl. No. 16/143,379, mailed on Jan. 29, 2020, 5 pages.
Notice of Allowance received for U.S. Appl. No. 16/404,605, mailed on Sep. 18, 2020, 5 pages.
Notice of Allowance received for U.S. Appl. No. 16/404,612, mailed on Jul. 13, 2020, 6 pages.
Notice of Allowance received for U.S. Appl. No. 16/404,612. mailed on Aug. 7, 2019, 9 pages.
Notice of Allowance received for U.S. Appl. No. 16/584,743, mailed on Aug. 7, 2020, 8 pages.
Notice of Allowance received for U.S. Appl. No. 16/584,743, mailed on Nov. 16, 2020, 7 pages.
Notice of Allowance received for U.S. Appl. No. 16/586,002, mailed on Jun. 9, 2020, 5 pages.
Notice of Allowance received for U.S. Appl. No. 16/817,328, mailed on Apr. 18, 2022, 8 pages.
Notice of Allowance received for U.S. Appl. No. 16/817,328, mailed on Feb. 16, 2022, 9 pages.
Notice of Allowance received for U.S. Appl. No. 17/026,818, mailed on May 13, 2021, 10 pages.
Notice of Allowance received for U.S. Appl. No. 17/027,373, mailed on Aug. 2, 2022, 2 pages.
Notice of Allowance received for U.S. Appl. No. 17/027,373, mailed on Jun. 3, 2022, 8 pages.
Notice of Allowance received for U.S. Appl. No. 16/143,379, mailed on Jun. 26, 2019, 5 pages.
Notice of Allowance received for U.S. Appl. No. 16/143,379, mailed on Sep. 25, 2019, 5 pages.
Office Action received for Australian Patent Application No. 2017100666, mailed on Jul. 27, 2017, 4 pages.
Office Action received for Australian Patent Application No. 2017286129, mailed on Oct. 18, 2018, 3 pages.
Office Action received for Australian Patent Application No. 2019100487, mailed on Aug. 16, 2019, 5 pages.
Office Action received for Australian Patent Application No. 2019100523, mailed on Jan. 23, 2020, 3 pages.
Office Action received for Australian Patent Application No. 2019100523, mailed on Mar. 2, 2020, 3 pages.
Office Action received for Australian Patent Application No. 2019100523, mailed on Sep. 2, 2019, 3 pages.
Office Action received for Australian Patent Application No. 2019201853, mailed on Apr. 23, 2020, 5 pages.
Office Action received for Australian Patent Application No. 2019201853, mailed on Aug. 10, 2020, 4 pages.
Office Action received for Australian Patent Application No. 2019201853, mailed on Aug. 16, 2019, 5 pages.
Office Action received for Australian Patent Application No. 2019201853, mailed on Dec. 9, 2019, 5 pages.
Office Action received for Australian Patent Application No. 2019267527, mailed on Dec. 2, 2021, 4 pages.
Office Action received for Australian Patent Application No. 2019267527, mailed on Jun. 15, 2022, 3 pages.
Office Action received for Australian Patent Application No. 2019267527, mailed on Jun. 24, 2021, 8 pages.
Office Action received for Australian Patent Application No. 2019267527, mailed on Mar. 3, 2022, 3 pages.
Office Action received for Australian Patent Application No. 2020100886, mailed on Aug. 5, 2020, 6 pages.
Office Action received for Australian Patent Application No. 2020217458, mailed on Aug. 2, 2022, 4 pages.

(56) References Cited

OTHER PUBLICATIONS

Office Action received for Australian Patent Application No. 2020217458, mailed on May 10, 2022, 3 pages.
Office Action received for Australian Patent Application No. 2020217458, mailed on Sep. 2, 2021, 6 pages.
Office Action received for Australian Patent Application No. 2020239711, mailed on Sep. 13, 2021, 5 pages.
Office Action received for Australian Patent Application No. 2020257092, mailed on Mar. 3, 2021, 7 pages.
Office Action received for Australian Patent Application No. 2020257092, mailed on Nov. 30, 2020, 6 pages.
Office Action received for Australian Patent Application No. 2021100721, mailed on Jun. 4, 2021, 7 pages.
Office Action received for Australian Patent Application No. 2021100721, mailed on Oct. 18, 2021, 4 pages.
Office Action received for Australian Patent Application No. 2021201403, mailed on Mar. 16, 2021, 3 pages.
Office Action received for Chinese Patent Application No. 201710493025.3, mailed on Dec. 6, 2019, 11 pages.
Office Action received for Chinese Patent Application No. 201710493025.3, mailed on Jan. 6, 2021, 17 pages.
Office Action received for Chinese Patent Application No. 201710493025.3, mailed on Jul. 10, 2020, 17 pages.
Office Action received for Chinese Patent Application No. 201710493025.3, mailed on Sep. 19, 2017, 2 pages.
Office Action received for Chinese Patent Application No. 201810730279.7, mailed on Jul. 6, 2020, 7 pages.
Office Action received for Chinese Patent Application No. 201810730279.7, mailed on Mar. 4, 2020, 14 pages.
Office Action received for Chinese Patent Application No. 201810730279.7, mailed on May 7, 2019, 15 pages.
Office Action received for Chinese Patent Application No. 201810730279.7, mailed on Nov. 5, 2019, 14 pages.
Office Action received for Chinese Patent Application No. 201811151702.4, mailed on Mar. 4, 2020, 13 pages.
Office Action received for Chinese Patent Application No. 201811151702.4, mailed on May 7, 2019, 16 pages.
Office Action received for Chinese Patent Application No. 201811151702.4, mailed on Oct. 9, 2019, 11 pages.
Office Action received for Chinese Patent Application No. 201811152097.2, mailed on May 7, 2019, 18 pages.
Office Action received for Chinese Patent Application No. 201811152726.1, mailed on Apr. 22, 2019, 15 pages.
Office Action received for Chinese Patent Application No. 201811152726.1, mailed on Apr. 28, 2021, 14 pages.
Office Action received for Chinese Patent Application No. 201811152726.1, mailed on Jan. 28, 2021, 13 pages.
Office Action received for Chinese Patent Application No. 201811152726.1, mailed on Mar. 18, 2020, 12 pages.
Office Action received for Chinese Patent Application No. 201811152726.1, mailed on Oct. 24, 2019, 14 pages.
Office Action received for Chinese Patent Application No. 201811152726.1, mailed on Oct. 29, 2020, 12 pages.
Office Action received for Chinese Patent Application No. 202010742019.9, mailed on Feb. 3, 2021, 17 pages.
Office Action received for Chinese Patent Application No. 202011336156.9, mailed on May 20, 2021, 13 pages.
Office Action received for Chinese Patent Application No. 202011450203.2, mailed on Apr. 20, 2022, 9 pages.
Office Action received for Chinese Patent Application No. 202011450203.2, mailed on Sep. 1, 2021, 12 pages.
Office Action received for Chinese Patent Application No. 202110235995.X, mailed on Mar. 22, 2022, 17 pages.
Office Action received for Chinese Patent Application No. 202110248576.X, mailed on Sep. 15, 2021, 28 pages.
Office Action received for Chinese Patent Application No. 202110818370.6, mailed on Jun. 22, 2022, 7 pages.
Office Action received for Chinese Patent Application No. 202110818370.6, mailed on Mar. 2, 2022, 13 pages.
Office Action received for Chinese Patent Application No. 202110819254.6, mailed on May 16, 2022, 16 pages.
Office Action received for Chinese Patent Application No. 202110819254.6, mailed on Sep. 15, 2022, 13 pages.
Office Action Received for Danish Patent Application No. PA201670601, mailed on Apr. 10, 2018, 3 pages.
Office Action received for Danish Patent Application No. PA201670601, mailed on Aug. 9, 2018, 2 pages.
Office Action Received for Danish Patent Application No. PA201670601, mailed on Dec. 11, 2018, 3 pages.
Office Action Received for Danish Patent Application No. PA201670601, mailed on Feb. 6, 2017, 5 pages.
Office Action Received for Danish Patent Application No. PA201670601, mailed on Oct. 21, 2016, 9 pages.
Office Action Received for Danish Patent Application No. PA201670601, mailed on Sep. 26, 2017, 3 pages.
Office Action received for Danish Patent Application No. PA201670602, mailed on Apr. 16, 2018, 3 pages.
Office Action received for Danish Patent Application No. PA201670602, mailed on Feb. 9, 2017, 3 pages.
Office Action received for Danish Patent Application No. PA201670602, mailed on Oct. 25, 2016, 9 pages.
Office Action received for Danish Patent Application No. PA201670602, mailed on Sep. 26, 2017, 3 pages.
Office Action received for Danish Patent Application No. PA201670603, mailed on Nov. 1, 2016, 9 pages.
Office Action received for Danish Patent Application No. PA201670604, mailed on Feb. 19, 2018, 3 pages.
Office Action received for Danish Patent Application No. PA201670604, mailed on Jun. 9, 2017, 3 pages.
Office Action received for Danish Patent Application No. PA201670604, mailed on Nov. 8, 2016, 8 pages.
Office Action received for Danish Patent Application No. PA201670605, mailed on Apr. 9, 2018, 2 pages.
Office Action received for Danish Patent Application No. PA201670605, mailed on Feb. 19, 2018, 2 pages.
Office Action received for Danish Patent Application No. PA201670605, mailed on Jun. 13, 2017, 4 pages.
Office Action received for Danish Patent Application No. PA201670605, mailed on Nov. 14, 2016, 8 pages.
Office Action received for Danish Patent Application No. PA201870293, mailed on Jul. 17, 2018, 2 pages.
Office Action received for Danish Patent Application No. PA201870293, mailed on Jun. 19, 2018, 8 pages.
Office Action received for Danish Patent Application No. PA201870435, mailed on Feb. 6, 2020, 3 pages.
Office Action received for Danish Patent Application No. PA201870435, mailed on May 2, 2019, 3 pages.
Office Action received for Danish Patent Application No. PA201870435, mailed on May 25, 2020, 3 pages.
Office Action received for Danish Patent Application No. PA202070617, mailed on Sep. 24, 2021, 4 pages.
Office Action received for European Patent Application No. 17813777.4, mailed on Jan. 3, 2020, 5 pages.
Office Action received for European Patent Application No. 19182037.2, mailed on Jun. 16, 2020, 6 pages.
Office Action received for European Patent Application No. 19728558.8, mailed on Jun. 21, 2021, 9 pages.
Office Action received for European Patent Application No. 20187610.9, mailed on May 21, 2021, 7 pages.
Office Action received for European Patent Application No. 20719301.2, mailed on Feb. 21, 2022, 9 pages.
Office Action received for European Patent Application No. 20719301.2, mailed on Jan. 28, 2021, 15 pages.
Office Action received for European Patent Application No. 21160991.2, mailed on Mar. 24, 2022, 11 pages.
Office Action received for European Patent Application No. 21161005.0, mailed on Apr. 22, 2022, 11 pages.
Office Action received for Indian Patent Application No. 202014041529, mailed on Dec. 6, 2021, 6 pages.
Office Action received for Indian Patent Application No. 202118046028, mailed on Apr. 6, 2022, 6 pages.

(56) References Cited

OTHER PUBLICATIONS

Office Action received for Japanese Patent Application No. 2018-562659, mailed on Dec. 6, 2019, 7 pages.
Office Action received for Japanese Patent Application No. 2018-562659, mailed on Jul. 26, 2019, 9 pages.
Office Action received for Japanese Patent Application No. 2018-562659, mailed on Mar. 12, 2021, 79 pages.
Office Action received for Japanese Patent Application No. 2018-562659, mailed on May 28, 2020, 5 pages.
Office Action received for Japanese Patent Application No. 2020-047952, mailed on Aug. 27, 2021, 13 pages.
Office Action received for Japanese Patent Application No. 2020-047952, mailed on Feb. 8, 2021, 6 pages.
Office Action received for Japanese Patent Application No. 2020-047952, mailed on Jul. 1, 2022, 8 pages.
Office Action received for Japanese Patent Application No. 2020-159840, mailed on Dec. 10, 2021, 13 pages.
Office Action received for Japanese Patent Application No. 2020-159840, mailed on Mar. 28, 2022, 6 pages.
Office Action received for Japanese Patent Application No. 2020-560927, mailed on Dec. 1, 2021, 3 pages.
Office Action received for Japanese Patent Application No. 2020-560927, mailed on Jun. 10, 2021, 5 pages.
Office Action received for Japanese Patent Application No. 2021-026630, mailed on Aug. 20, 2021, 7 pages.
Office Action received for Japanese Patent Application No. 2021-051415, mailed on Jul. 19, 2021, 4 pages.
Office Action received for Korean Patent Application No. 10-2019-7038093, mailed on Feb. 13, 2020, 11 pages.
Office Action received for Korean Patent Application No. 10-2020-7031319, mailed on Dec. 8, 2020, 14 pages.
Office Action received for Korean Patent Application No. 10-2020-7031700, mailed on Dec. 15, 2020, 6 pages.
Office Action received for Korean Patent Application No. 10-2020-7032488, mailed on Feb. 9, 2021, 11 pages.
Office Action received for Korean Patent Application No. 10-2021-7021047, mailed on Aug. 13, 2021, 5 pages.
Office Action received for Korean Patent Application No. 10-2021-7029861, mailed on Jan. 25, 2022, 11 pages.
Office Action received for Korean Patent Application No. 10-2021-7029861, mailed on Nov. 1, 2022, 7 pages.
Result of Consultation received for European Patent Application No. 19182037.2, mailed on Mar. 22, 2021, 5 pages.
Result of Consultation received for European Patent Application No. 19728558.8, mailed on Jun. 28, 2022, 4 pages.
Result of Consultation received for European Patent Application No. 20187610.9, mailed on Jun. 1, 2022, 3 pages.
Reviewdork, "Linksys Smart Wifi App Linksys Wireless Router Setup and Tutorial (Android or Iphone)", Online Available at: https://www.youtube.com/watch?v=UjJUq1g1738, Feb. 13, 2017, 3 pages.
Rossignol Joe, "iOS 10 Concept Simplifies Lock Screen With Collapsed Notifications", Available online at: https://www.macrumors.com/2016/06/16/ios-10-collapsed-notifications-concept/, Jun. 16, 2016, 10 pages.
Search Report and Opinion received for Danish Patent Application No. PA201870435, mailed on Oct. 26, 2018, 9 pages.
Search Report and Opinion received for Danish Patent Application No. PA202070617, mailed on Dec. 23, 2020, 8 pages.
Senicar et al., "User-Centred Design and Development of an Intelligent Light Switch for Sensor Systems", Technical Gazette, vol. 26, No. 2, available online at: https://hrcak.srce.hr/file/320403, 2019, pp. 339-345.
SolarWinds Network Configuration Manager Administrator Guide, Available online at: https://web.archive.org/web/20141031133207/http://www.solarwinds.com/documentation/orionNCM/docs/OrionNCMAdministratorGuide.pdf, Oct. 31, 2014, 466 pages.
Summons to Attend Oral Proceedings received for European Patent Application No. 17813777.4, mailed on Jun. 18, 2020, 8 pages.
Summons to Attend Oral Proceedings received for European Patent Application No. 19182037.2, mailed on Nov. 24, 2020, 12 pages.
Summons to Attend Oral Proceedings received for European Patent Application No. 19728558.8, mailed on Jan. 18, 2022, 9 pages.
Summons to Attend Oral Proceedings received for European Patent Application No. 20187610.9, mailed on Dec. 16, 2021, 12 pages.
Summons to Attend Oral Proceedings received for European Patent Application No. 20187610.9, mailed on Jan. 27, 2022, 2 pages.
Supplemental Notice of Allowance received for U.S. Appl. No. 16/584,743, mailed on Nov. 25, 2020, 2 pages.
Office Action received for Chinese Patent Application No. 202111652452.4, mailed on Feb. 11, 2023, 28 pages (13 pages of English Translation and 15 pages of Official Copy).
Office Action received for European Patent Application No. 21728781.2, mailed on Mar. 1, 2023, 13 pages.
Examiner's Pre-Review Report received for Japanese Patent Application No. 2020-047952, mailed on Dec. 13, 2022, 10 pages (5 pages of English Translation and 5 pages of Official Copy).
Final Office Action received for U.S. Appl. No. 17/116,938, mailed on Dec. 29, 2022, 42 pages.
Notice of Allowance received for Chinese Patent Application No. 202110819254.6, mailed on Dec. 27, 2022, 4 pages (1 page of English Translation and 3 pages of Official Copy).
Office Action received for Korean Patent Application No. 10-2022-7001521, mailed on Dec. 26, 2022, 13 pages (6 pages of English Translation and 7 pages of Official Copy).
Applicant-Initiated Interview Summary received for U.S. Appl. No. 16/830,838, mailed on Jun. 1, 2023, 2 pages.
Applicant-Initiated Interview Summary received for U.S. Appl. No. 17/476,404, mailed on Jun. 2, 2023, 2 pages.
Notice of Acceptance received for Australian Patent Application No. 2022201532, mailed on May 22, 2023, 3 pages.
Notice of Allowance received for U.S. Appl. No. 17/019,845, mailed on Jun. 5, 2023, 10 pages.
Applicant-Initiated Interview Summary received for U.S. Appl. No. 16/830,838, mailed on Dec. 16, 2022, 2 pages.
Applicant-Initiated Interview Summary received for U.S. Appl. No. 17/116,938, mailed on Oct. 13, 2022, 3 pages.
Applicant-Initiated Interview Summary received for U.S. Appl. No. 17/476,404, mailed on Dec. 20, 2022, 2 pages.
Corrected Notice of Allowance received for U.S. Appl. No. 17/027,373, mailed on Oct. 26, 2022, 2 pages.
Extended European Search Report received for European Patent Application No. 22191264.5, mailed on Nov. 11, 2022, 8 pages.
International Preliminary Report on Patentability received for PCT Patent Application No. PCT/US2021/031760, mailed on Nov. 24, 2022, 11 pages.
International Search Report and Written Opinion received for PCT Patent Application No. PCT/US2022/029282, mailed on Nov. 9, 2022, 22 pages.
Invitation to Pay Additional Fees and Partial International Search Report received for PCT Patent Application No. PCT/US2022/029282, mailed on Sep. 15, 2022, 15 pages.
Invitation to Pay Search Fees received for European Patent Application No. 21728781.2, mailed on Dec. 2, 2022, 3 pages.
Non-Final Office Action received for U.S. Appl. No. 17/742,273, mailed on Dec. 7, 2022, 47 pages.
Notice of Allowance received for Chinese Patent Application No. 202011450203.2, mailed on Sep. 30, 2022, 4 pages (1 page of English Translation and 3 pages of Official Copy).
Notice of Allowance received for Korean Patent Application No. 10-2022-0091730, mailed on Oct. 4, 2022, 5 pages (2 pages of English Translation and 3 pages of Official Copy).
Notice of Allowance received for U.S. Appl. No. 17/027,373, mailed on Oct. 3, 2022, 5 pages.
Office Action received for Australian Patent Application No. 2021261941, mailed on Nov. 3, 2022, 3 pages.
Office Action received for Australian Patent Application No. 2022201532, mailed on Dec. 19, 2022, 5 pages.
Office Action received for Chinese Patent Application No. 202110235995.X, mailed on Sep. 30, 2022, 13 pages (7 pages of English Translation and 6 pages of Official Copy).

(56) References Cited

OTHER PUBLICATIONS

Office Action received for Chinese Patent Application No. 202111652452.4, mailed on Aug. 29, 2022, 23 pages (12 pages of English Translation and 11 pages of Official Copy).
Summons to Attend Oral Proceedings received for European Patent Application No. 21160991.2, mailed on Oct. 19, 2022, 10 pages.
Summons to Attend Oral Proceedings received for European Patent Application No. 21161005.0, mailed on Dec. 13, 2022, 9 pages.
Notice of Allowance received for Japanese Patent Application No. 2020-047952, mailed on Jun. 26, 2023, 25 pages (1 page of English Translation and 24 pages of Official Copy).
Office Action received for Korean Patent Application No. 10-2022-7001521, mailed on Jun. 21, 2023, 10 pages (5 page of English Translation and 5 pages of Official Copy).
Office Action received for Korean Patent Application No. 10-2022-7040554, mailed on Jun. 20, 2023, 5 pages (2 pages of English Translation and 3 pages of Official Copy).
Office Action received for European Patent Application No. 20746426.4, mailed on Aug. 17, 2023, 5 pages.
Final Office Action received for U.S. Appl. No. 16/830,838, mailed on Jun. 26, 2023, 16 pages.
Non-Final Office Action received for U.S. Appl. No. 17/746,789, mailed on Jun. 22, 2023, 8 pages.
Office Action received for Australian Patent Application No. 2022204466, mailed on Jun. 7, 2023, 4 pages.
Office Action received for Chinese Patent Application No. 202111652452.4, mailed on May 19, 2023, 15 pages (8 pages of English Translation and 7 pages of Official Copy).
Corrected Notice of Allowance received for U.S. Appl. No. 17/019,845, mailed on Aug. 7, 2023, 4 pages.
Intention to Grant received for European Patent Application No. 21728781.2, mailed on Jul. 28, 2023, 9 pages.
Notice of Acceptance received for Australian Patent Application No. 2022204466, mailed on Jul. 25, 2023, 3 pages.
Notice of Allowance received for U.S. Appl. No. 17/746,789, mailed on Aug. 9, 2023, 7 pages.
Office Action received for Australian Patent Application No. 2022291522, mailed on Jul. 20, 2023, 3 pages.
Decision to Grant received for Japanese Patent Application No. 2022-104306, mailed on Jan. 4, 2024, 3 pages (1 page of English Translation and 2 pages of Official Copy).
Intention to Grant received for European Patent Application No. 20746426.4, mailed on Jan. 5, 2024, 9 pages.
Office Action received for Korean Patent Application No. 10-2022-7001521, mailed on Dec. 19, 2023, 7 pages (3 pages of English Translation and 4 pages of Official Copy).
Office Action received for Australian Patent Application No. 2022291522, mailed on Oct. 11, 2023, 2 pages.
Office Action received for Japanese Patent Application No. 2022-155232, mailed on Dec. 15, 2023, 9 pages (4 pages of English Translation and 5 pages of Official Copy).
Office Action received for Korean Patent Application No. 10-2023-7011715, mailed on Dec. 20, 2023, 9 pages (4 pages of English Translation and 5 pages of Official Copy).
Advisory Action received for U.S. Appl. No. 16/830,838, mailed on Oct. 10, 2023, 5 pages.
Applicant-Initiated Interview Summary received for U.S. Appl. No. 16/830,838, mailed on Sep. 22, 2023, 2 pages.
Applicant-Initiated Interview Summary received for U.S. Appl. No. 17/476,404, mailed on Oct. 31, 2023, 4 pages.
Applicant-Initiated Interview Summary received for U.S. Appl. No. 17/742,273, mailed on Sep. 27, 2023, 4 pages.
Examiner's Answer to Appeal Brief received for U.S. Appl. No. 17/116,938, mailed on Oct. 31, 2023, 55 pages.
Final Office Action received for U.S. Appl. No. 17/742,273, mailed on Oct. 12, 2023, 58 pages.
Non-Final Office Action received for U.S. Appl. No. 17/742,273, mailed on Sep. 13, 2023, 58 pages.
Notice of Allowance received for Japanese Patent Application No. 2022-016138, mailed on Sep. 25, 2023, 3 pages (1 page of English Translation and 2 pages of Official Copy).
Notice of Allowance received for Korean Patent Application No. 10-2022-7001332, mailed on Oct. 25, 2023, 7 pages (2 pages of English Translation and 5 pages of Official Copy).
Office Action received for European Patent Application No. 20719301.2, mailed on Oct. 20, 2023, 11 pages.
Office Action received for Japanese Patent Application No. 2022-104306, mailed on Sep. 19, 2023, 4 pages (2 pages of English Translation and 2 pages of Official Copy).
Office Action received for Korean Patent Application No. 10-2023-0001668, mailed on Nov. 3, 2023, 5 pages (2 pages of English Translation and 3 pages of Official Copy).
Final Office Action received for U.S. Appl. No. 17/476,404, mailed on Sep. 12, 2023, 30 pages.
Office Action received for Korean Patent Application No. 10-2022-7044372, mailed on Aug. 21, 2023, 9 pages (4 pages of English Translation and 5 pages of Official Copy).
Non-Final Office Action received for U.S. Appl. No. 16/830,838, mailed on Jan. 22, 2024, 17 pages.
Office Action received for Australian Patent Application No. 2023204396, mailed on Jan. 8, 2024, 5 pages.
Office Action received for Chinese Patent Application No. 202210463449.6, mailed on Dec. 19, 2023, 11 pages (6 pages of English Translation and 5 pages of Official Copy).
Intention to Grant received for European Patent Application No. 21728781.2, mailed on Dec. 12, 2023, 9 pages.
International Preliminary Report on Patentability received for PCT Patent Application No. PCT/US2022/029282, mailed on Nov. 30, 2023, 17 pages.
International Search Report and Written Opinion received for PCT Patent Application No. PCT/US2023/024279, mailed on Nov. 17, 2023, 20 pages.
Invitation to Pay Additional Fees and Partial International Search Report received for PCT Patent Application No. PCT/US2023/024279, mailed on Sep. 26, 2023, 12 pages.
Office Action received for Chinese Patent Application No. 202110817799.3, mailed on Oct. 26, 2023, 22 pages (13 pages of English Translation and 9 pages of Official Copy).
Applicant-Initiated Interview Summary received for U.S. Appl. No. 16/830,838, mailed on Mar. 11, 2024, 2 pages.
Notice of Allowance received for Chinese Patent Application No. 202210463449.6, mailed on Mar. 9, 2024, 2 pages (1 page of English Translation and 1 page of Official Copy).
Office Action received for Chinese Patent Application No. 202110817799.3, mailed on Feb. 22, 2024, 24 pages (15 pages of English Translation and 9 pages of Official Copy).
Decision to Grant received for European Patent Application No. 21728781.2, mailed on Feb. 8, 2024, 3 pages.
Extended European Search Report received for European Patent Application No. 23203433.0, mailed on Feb. 7, 2024, 7 pages.
Notice of Acceptance received for Australian Patent Application No. 2022291522, mailed on Jan. 31, 2024, 3 pages.
Notice of Allowance received for Japanese Patent Application No. 2022-155232, mailed on Feb. 26, 2024, 4 pages (1 page of English Translation and 3 pages of Official Copy).
Notice of Allowance received for U.S. Appl. No. 18/375,457, mailed on Feb. 23, 2024, 16 pages.
Office Action received for Australian Patent Application No. 2023203357, mailed on Feb. 14, 2024, 3 pages.
Office Action received for Japanese Patent Application No. 2023-022576, mailed on Feb. 26, 2024, 10 pages (5 pages of English Translation and 5 pages of Official Copy).
Office Action received for Korean Patent Application No. 10-2022-7044372, mailed on Feb. 13, 2024, 10 pages (4 pages of English Translation and 6 pages of Official Copy).
Extended European Search Report received for European Patent Application No. 23203414.0, mailed on Jan. 26, 2024, 10 pages.
Office Action received for Australian Patent Application No. 2022291522, mailed on Jan. 19, 2024, 2 pages.

(56) References Cited

OTHER PUBLICATIONS

Office Action received for Japanese Patent Application No. 2023-028786, mailed on Aug. 23, 2024, 10 pages (5 pages of English Translation and 5 pages of Official Copy).
Corrected Notice of Allowance received for U.S. Appl. No. 18/235,291, mailed on Aug. 7, 2024, 2 pages.
Notice of Allowance received for Korean Patent Application No. 10-2022-7044372, mailed on Jul. 30, 2024, 7 pages (2 pages of English Translation and 5 pages of Official Copy).
Notice of Allowance received for Korean Patent Application No. 10-2023-7011715, mailed on Jul. 25, 2024, 7 pages (2 pages of English Translation and 5 pages of Official Copy).
Final Office Action received for U.S. Appl. No. 17/970,417, mailed on Sep. 18, 2024, 24 pages.
Notice of Allowance received for U.S. Appl. No. 17/116,938, mailed on Sep. 18, 2024, 5 pages.
Office Action received for Chinese Patent Application No. 202410229610.2, mailed on Sep. 3, 2024, 14 pages (7 pages of English Translation and 7 pages of Official Copy).
Office Action received for Australian Patent Application No. 2023251497, mailed on Aug. 9, 2024, 2 pages.
Corrected Notice of Allowance received for U.S. Appl. No. 18/235,291, mailed on Jul. 18, 2024, 3 pages.
Extended European Search Report received for European Patent Application No. 24165156.1, mailed on Jul. 16, 2024, 7 pages.
Non-Final Office Action received for U.S. Appl. No. 18/204,888, mailed on Jul. 18, 2024, 21 pages.
Notice of Allowance received for U.S. Appl. No. 16/830,838, mailed on Jul. 15, 2024, 8 pages.
Office Action received for European Patent Application No. 23203433.0, mailed on Jul. 9, 2024, 6 pages.
Applicant-Initiated Interview Summary received for U.S. Appl. No. 18/204,888, mailed on Aug. 5, 2024, 4 pages.
Decision to Refuse received for Japanese Patent Application No. 2023-022576, mailed on Jul. 26, 2024, 6 pages (3 pages of English Translation and 3 pages of Official Copy).
Applicant-Initiated Interview Summary received for U.S. Appl. No. 16/830,838, mailed on Jun. 17, 2024, 6 pages.
Applicant-Initiated Interview Summary received for U.S. Appl. No. 17/970,417, mailed on Jun. 26, 2024, 2 pages.
Corrected Notice of Allowance received for U.S. Appl. No. 18/375,457, mailed on Apr. 11, 2024, 2 pages.
Decision on Appeal received for U.S. Appl. No. 17/116,938, mailed on Jun. 14, 2024, 12 pages.
Decision to Grant received for European Patent Application No. 20746426.4, mailed on May 10, 2024, 2 pages.
Final Office Action received for U.S. Appl. No. 16/830,838, mailed on Apr. 11, 2024, 17 pages.
Intention to Grant received for European Patent Application No. 20719301.2, mailed on Jul. 2, 2024, 9 pages.
Intention to Grant received for European Patent Application No. 20746426.4, mailed on Apr. 12, 2024, 9 pages.
Non-Final Office Action received for U.S. Appl. No. 17/970,417, mailed on Apr. 10, 2024, 16 pages.
Notice of Acceptance received for Australian Patent Application No. 2023203357, mailed on May 16, 2024, 3 pages.
Notice of Acceptance received for Australian Patent Application No. 2023204396, mailed on Apr. 15, 2024, 3 pages.
Notice of Allowance received for Korean Patent Application No. 10-2022-7001521, mailed on Mar. 22, 2024, 7 pages (2 pages of English Translation and 5 pages of Official Copy).
Notice of Allowance received for Korean Patent Application No. 10-2023-0001668, mailed on May 22, 2024, 6 pages (2 pages of English Translation and 4 pages of Official Copy).
Notice of Allowance received for Korean Patent Application No. 10-2024-7001084, mailed on May 22, 2024, 7 pages (2 pages of English Translation and 5 pages of Official Copy).
Notice of Allowance received for U.S. Appl. No. 18/235,291, mailed on Jul. 3, 2024, 18 pages.
Notice of Allowance received for U.S. Appl. No. 18/375,457, mailed on May 16, 2024, 15 pages.
Office Action received for Japanese Patent Application No. 2023-028786, mailed on Mar. 22, 2024, 10 pages (5 pages of English Translation and 5 pages of Official Copy).
Record of Oral Hearing received for U.S. Appl. No. 17/116,938, mailed on May 29, 2024, 13 pages.
Corrected Notice of Allowance received for U.S. Appl. No. 18/375,457, mailed on Aug. 16, 2024, 2 pages.
Notice of Acceptance received for Australian Patent Application No. 2023251497, mailed on Sep. 19, 2024, 3 pages.
Office Action received for Chinese Patent Application No. 202110817799.3, mailed on Sep. 4, 2024, 23 pages (15 pages of English Translation and 8 pages of Official Copy).
Non-Final Office Action received for U.S. Appl. No. 18/504,001, mailed on Oct. 9, 2024, 28 pages.
Office Action received for European Patent Application No. 22196865.4, mailed on Oct. 18, 2024, 6 pages.

* cited by examiner

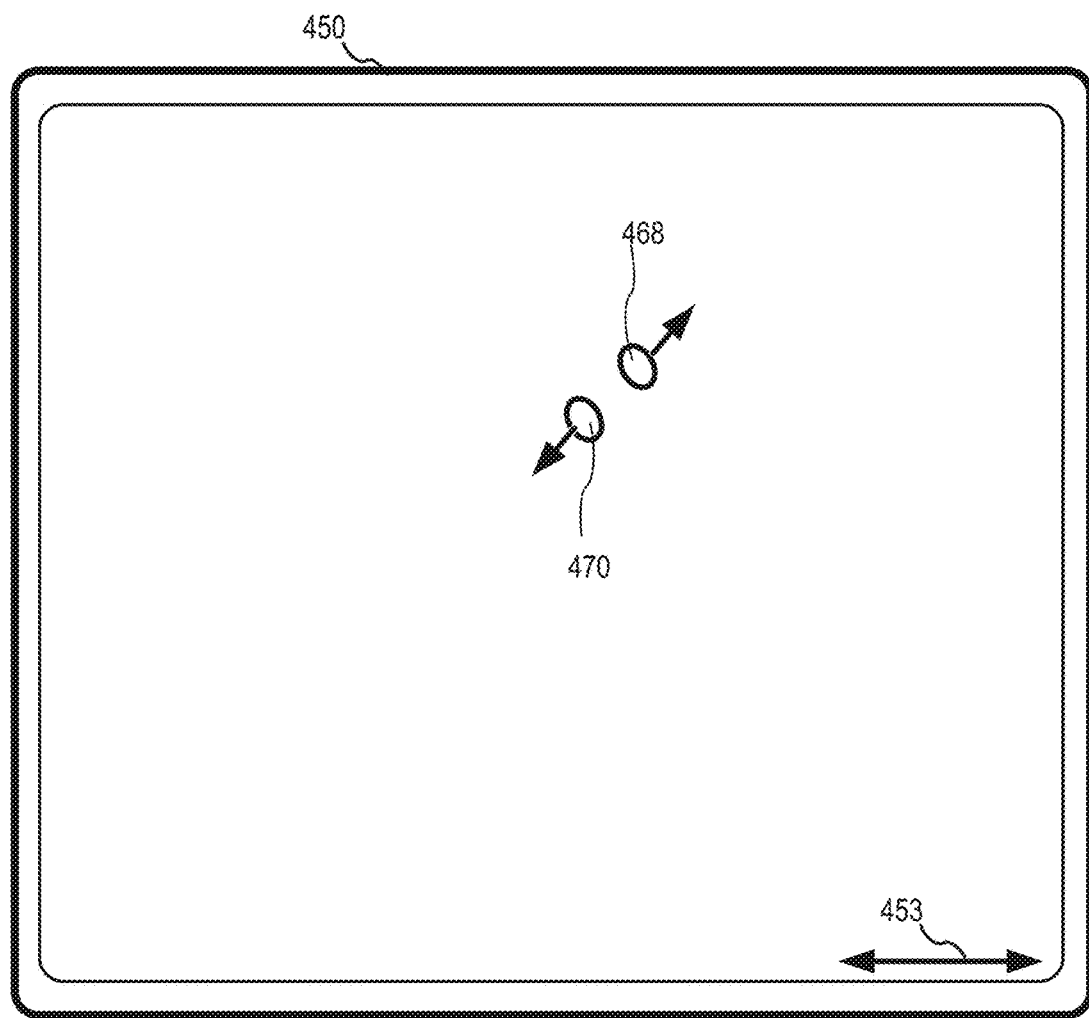
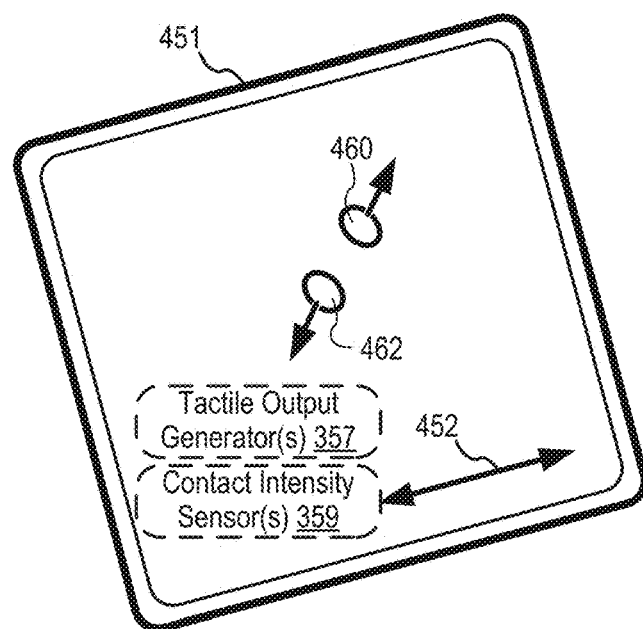
*FIG. 4B*

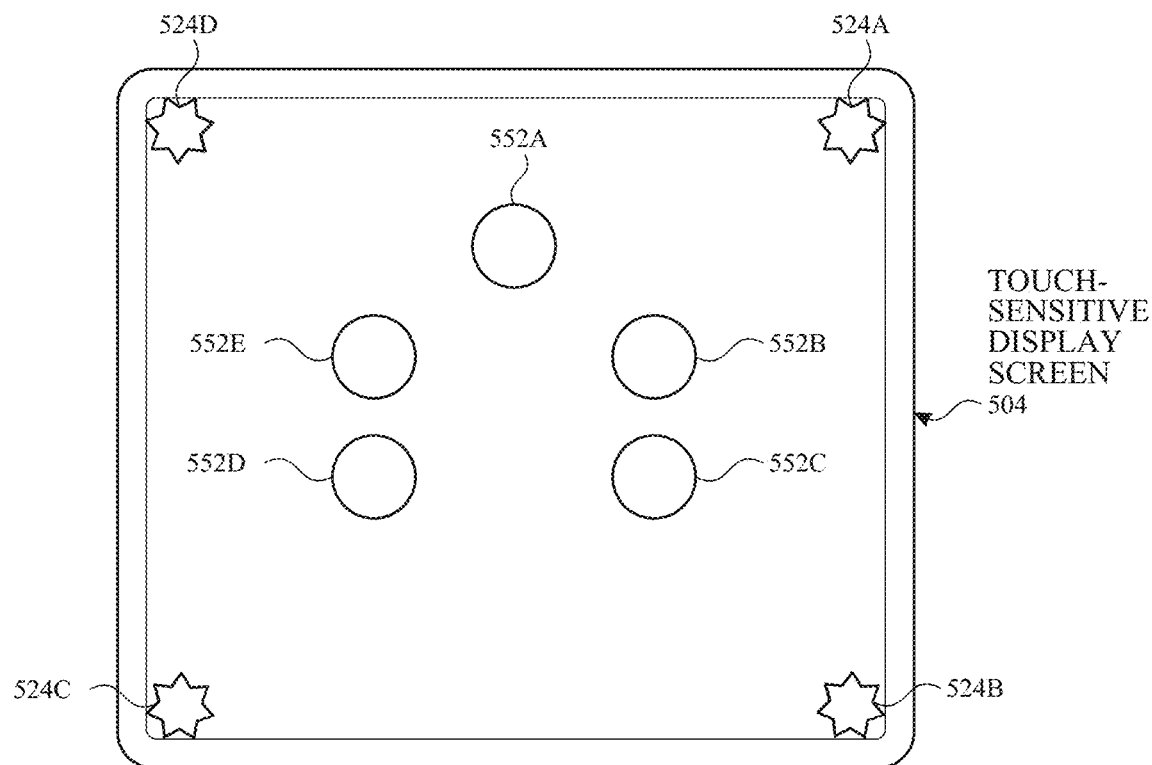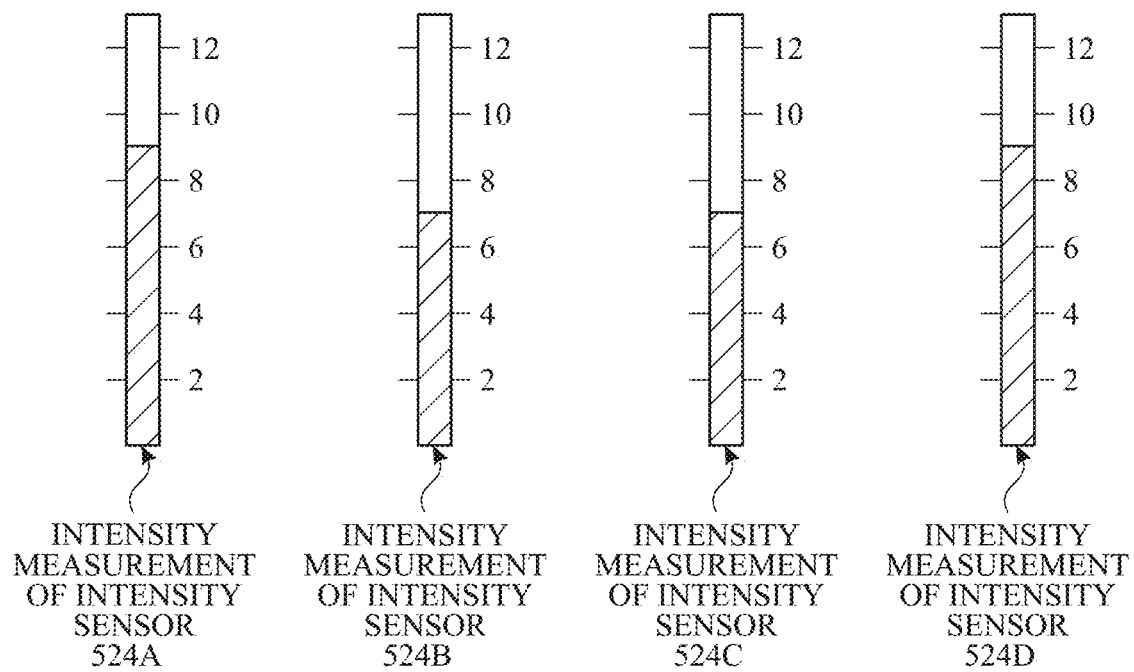
FIG. 5C

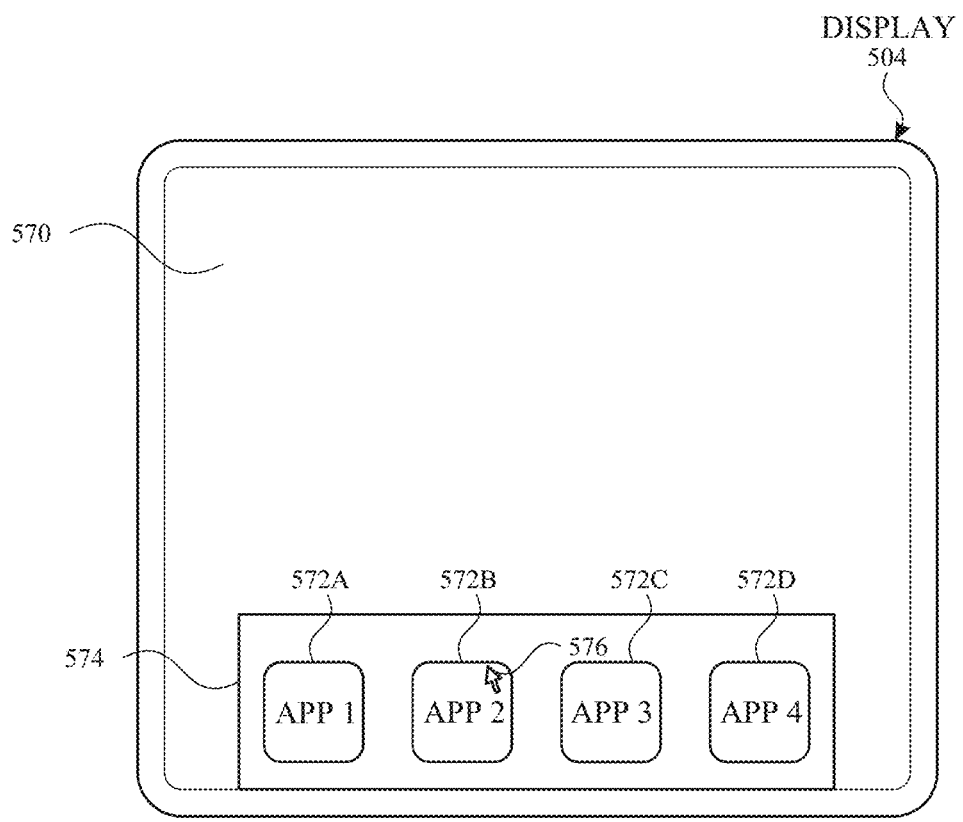
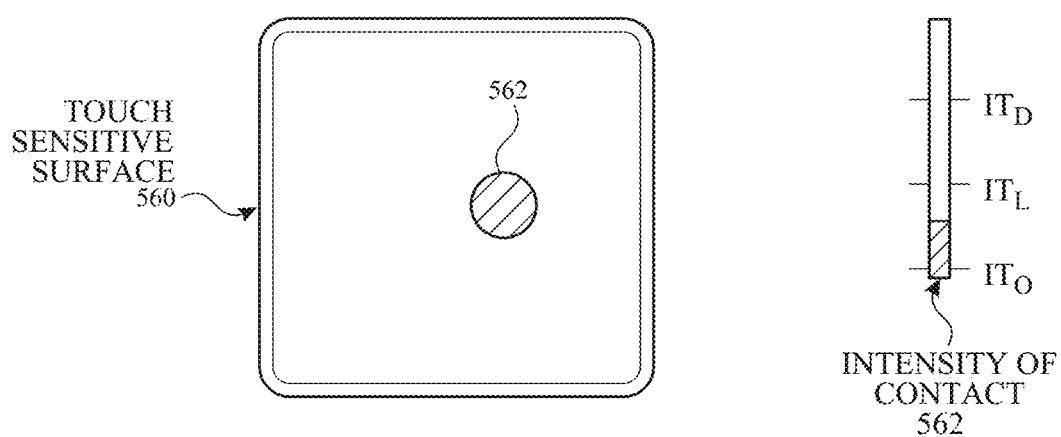
*FIG. 5E*

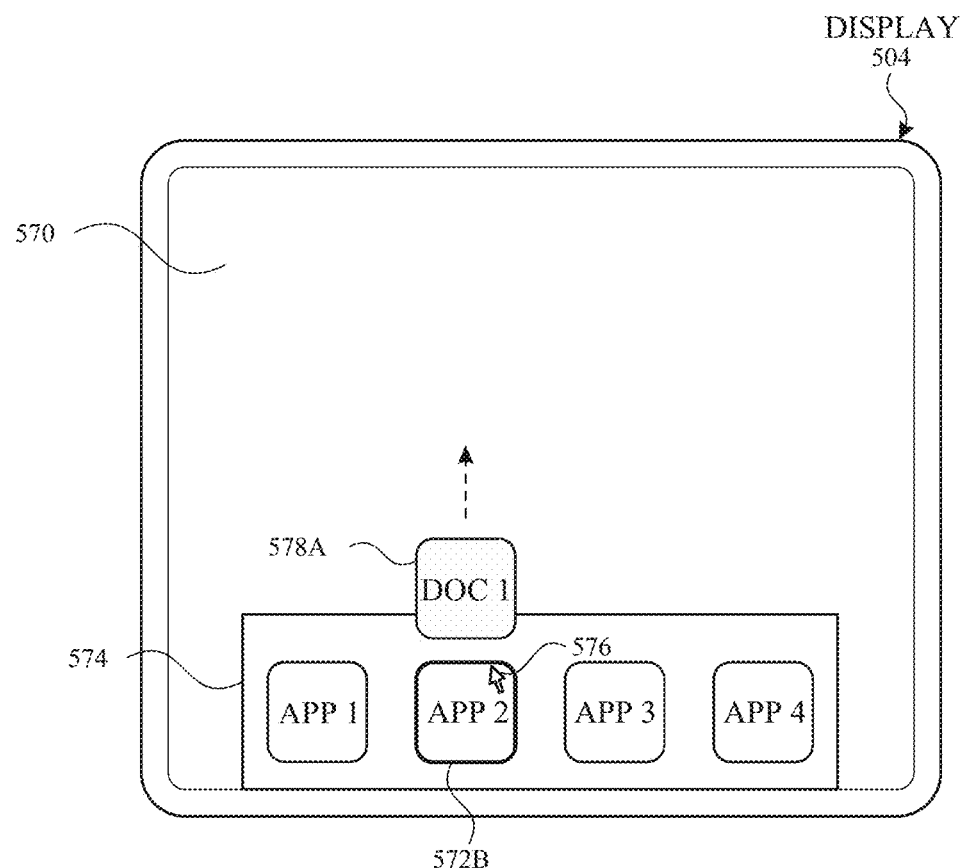
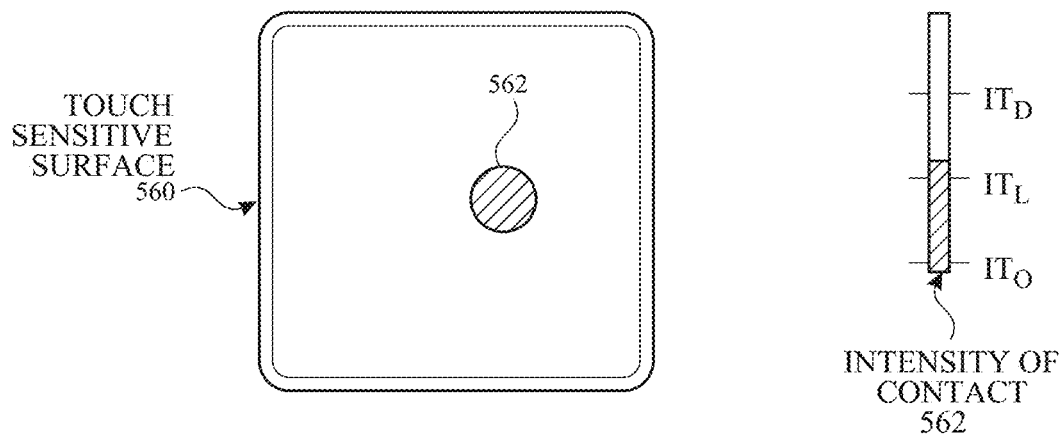
*FIG. 5F*

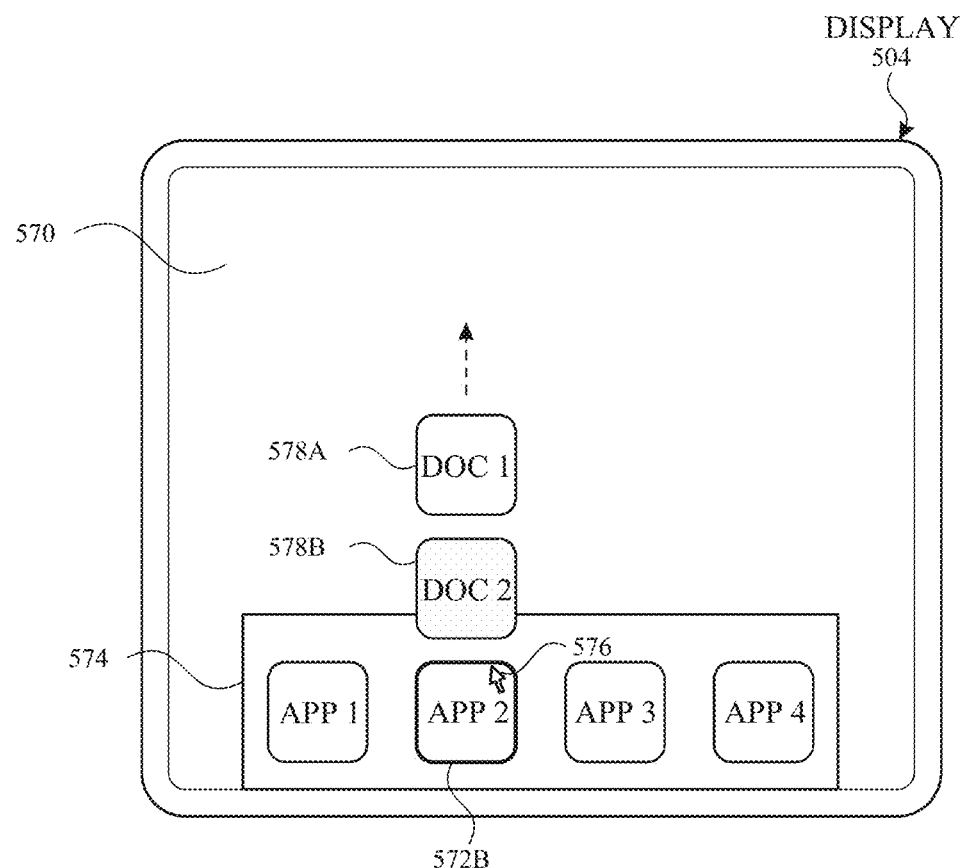
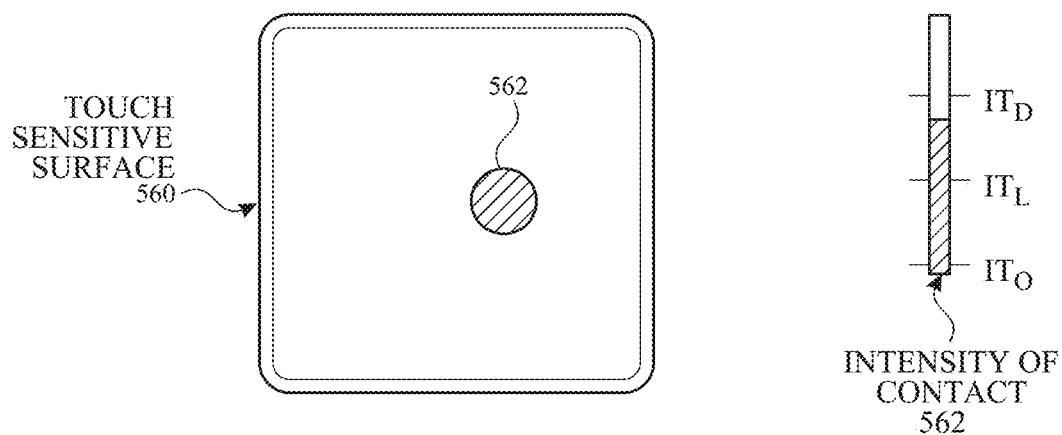
FIG. 5G

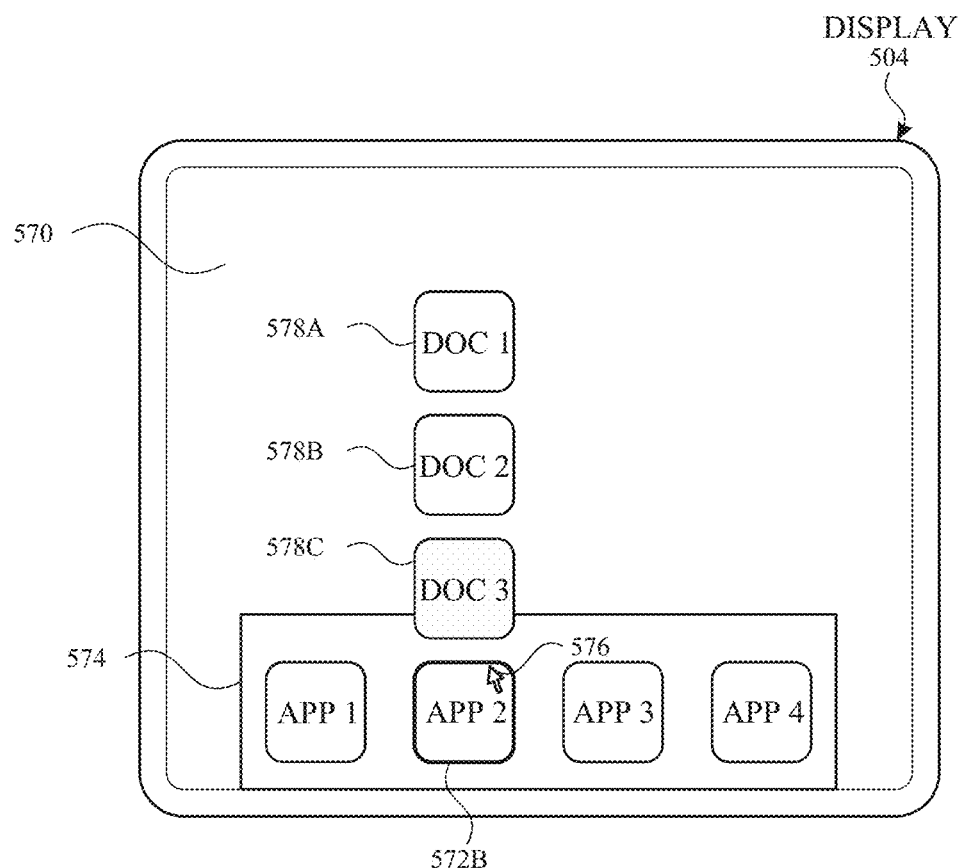
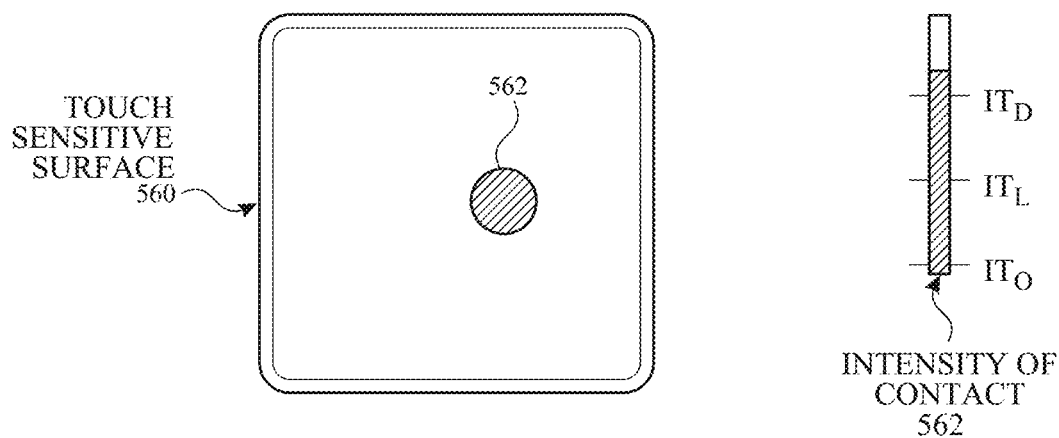
*FIG. 5H*

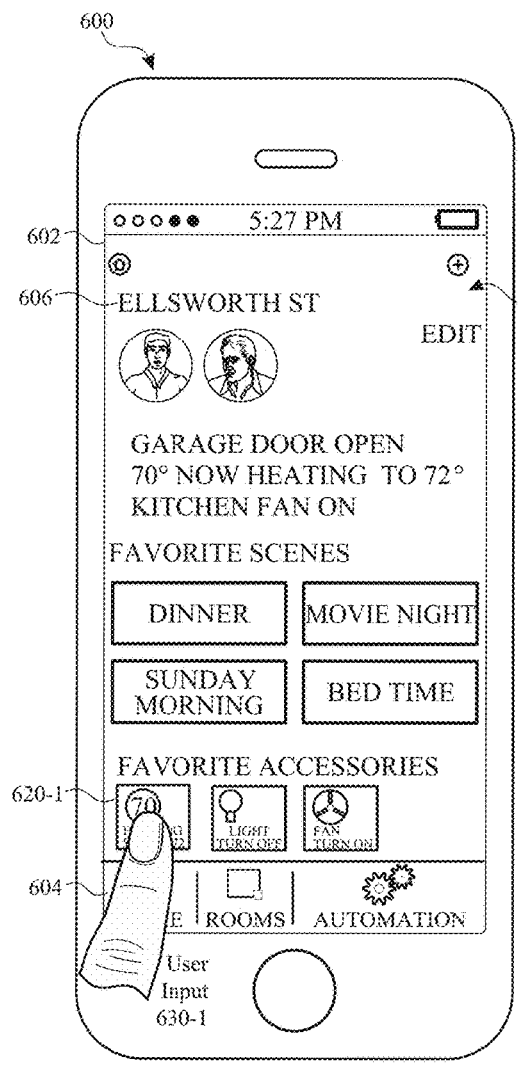 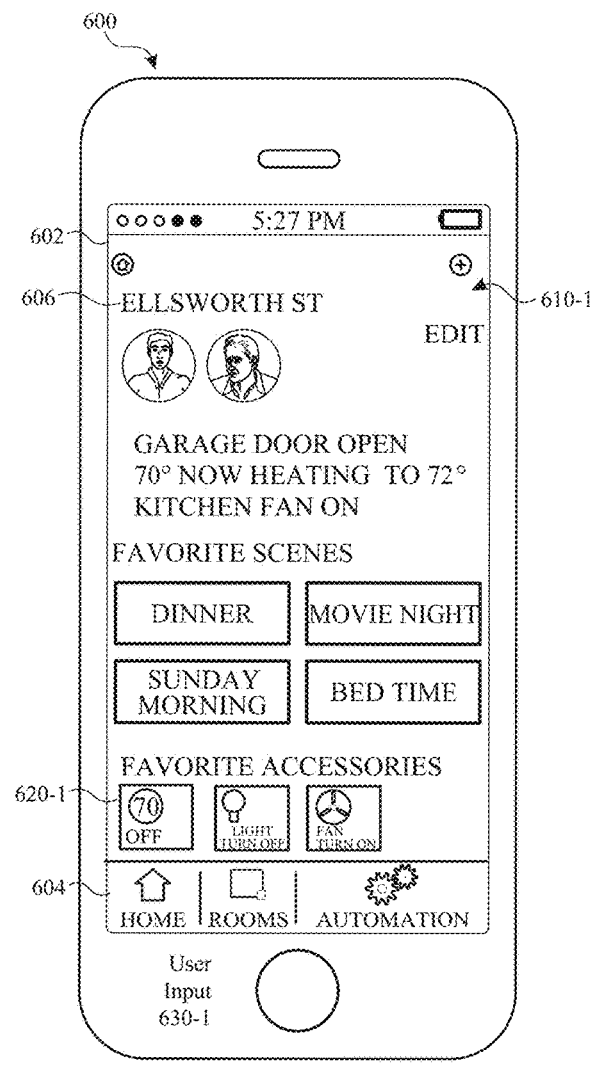
*FIG. 6B*  *FIG. 6C*

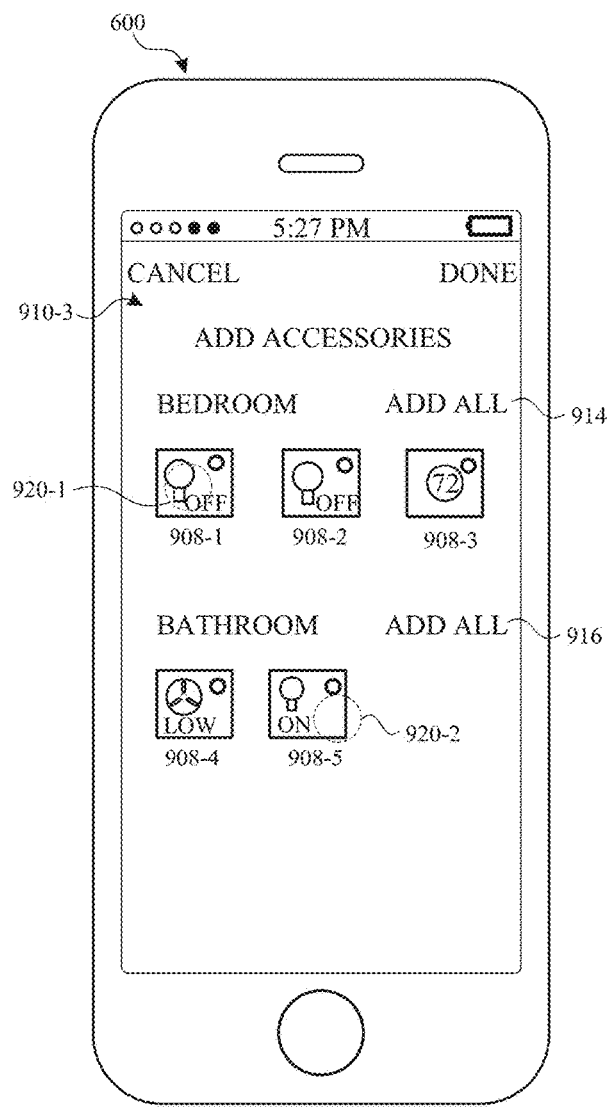
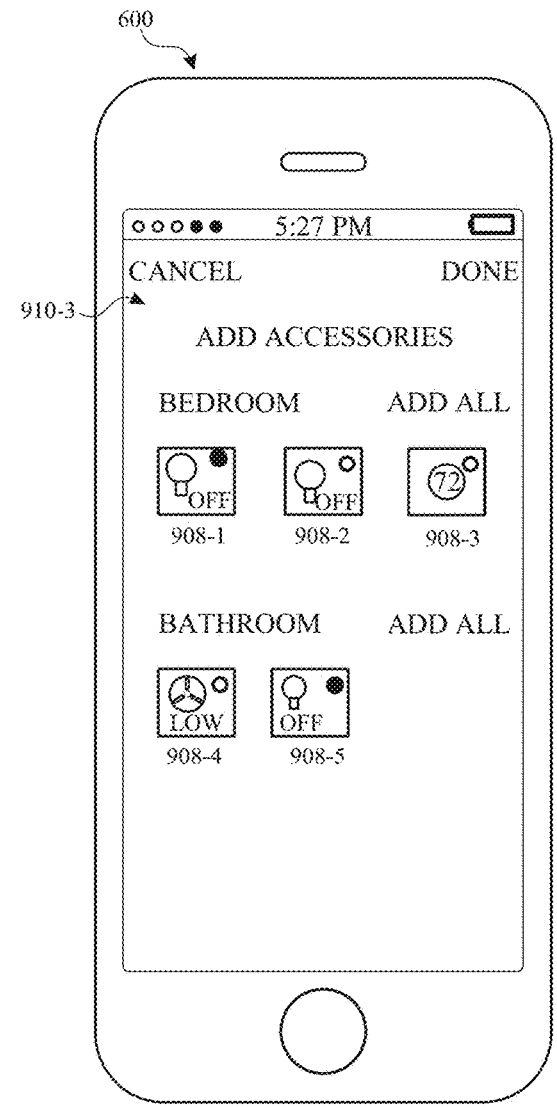
FIG. 9C
FIG. 9D

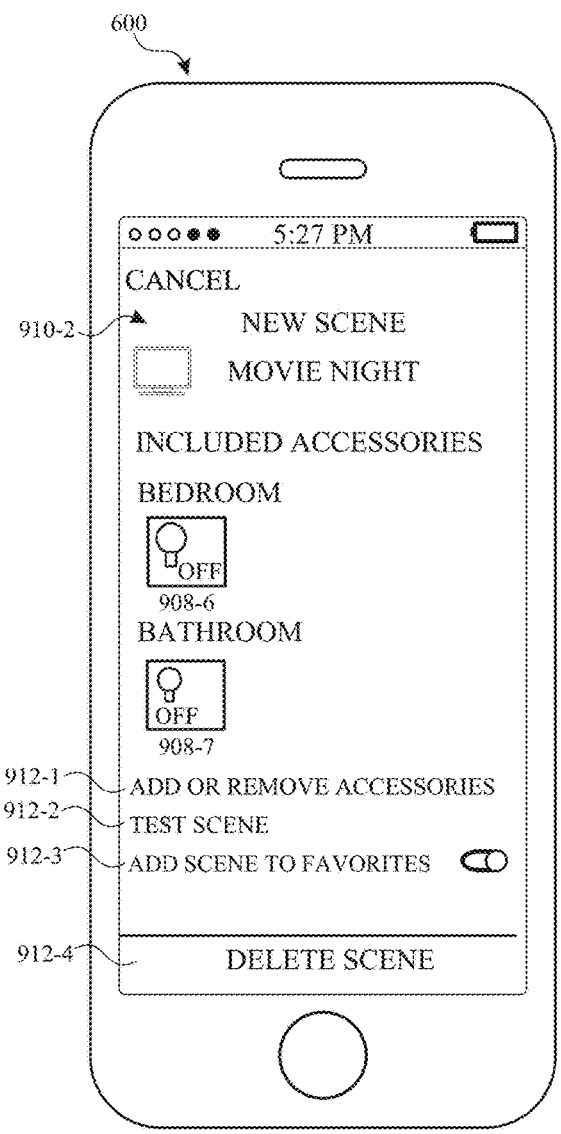
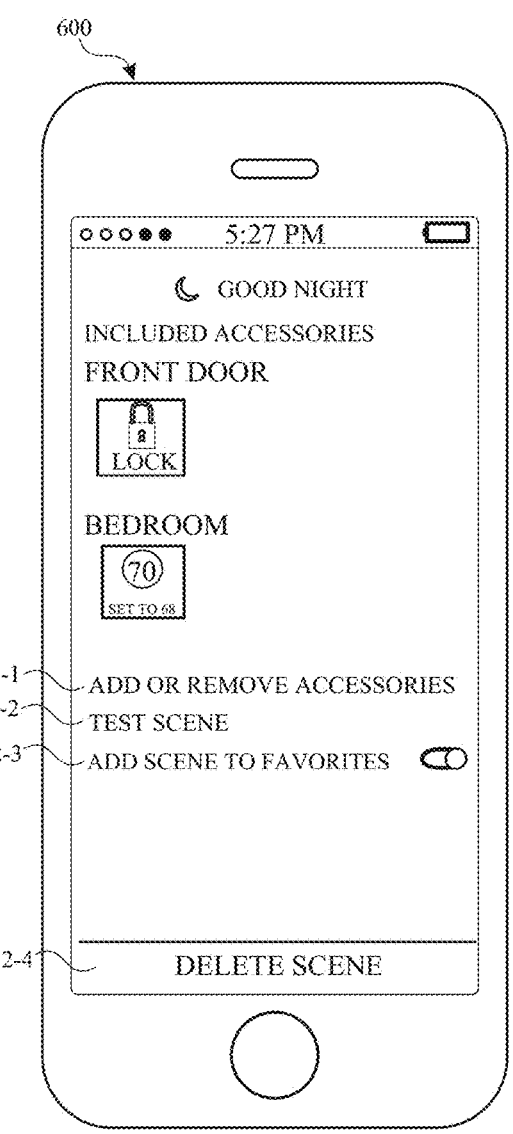
*FIG. 9E*       *FIG. 9F*

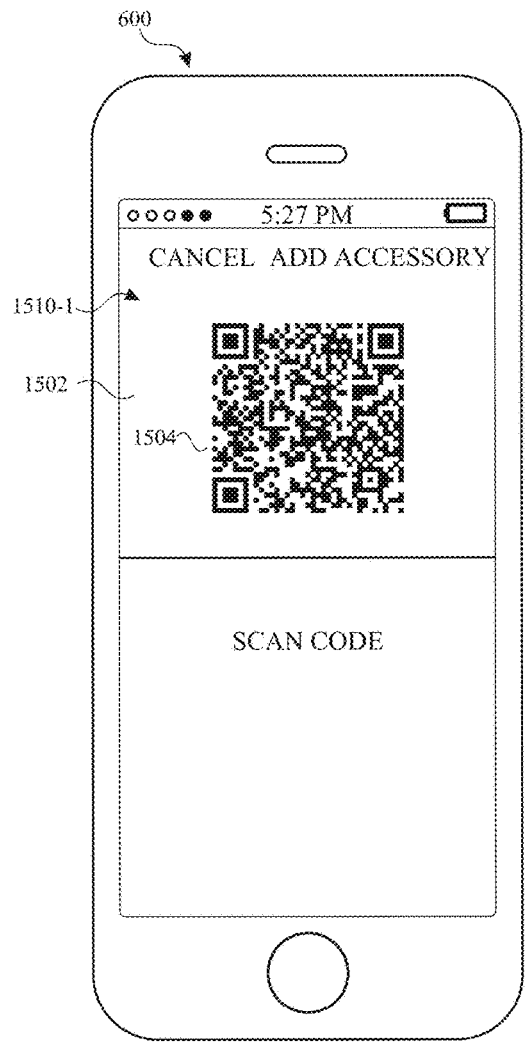
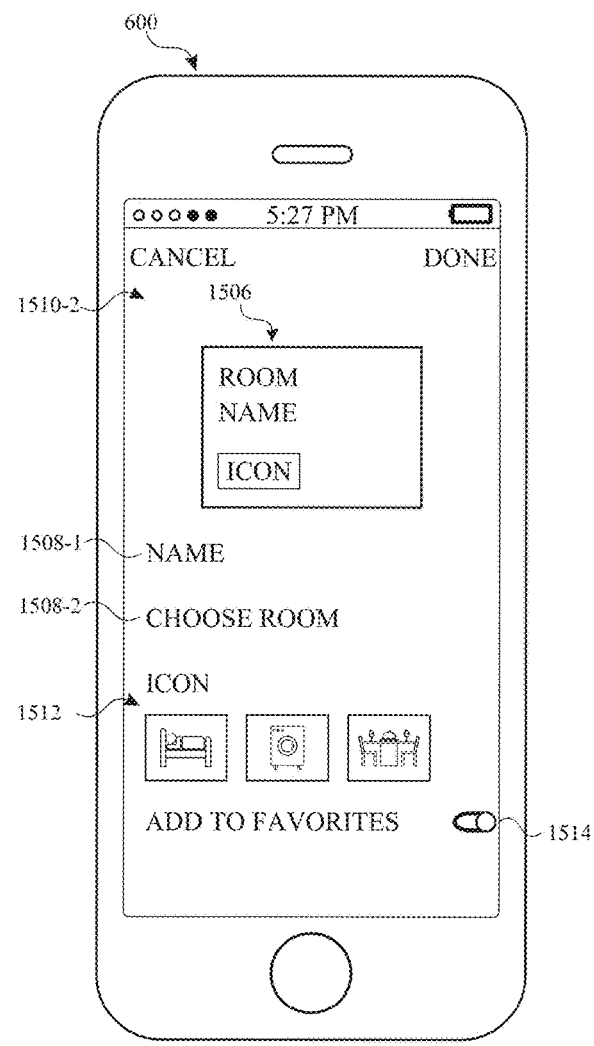
FIG. 15A                    FIG. 15B

2100 ↘

2102
Determine whether criteria of an automation profile are met, wherein the automation profile includes data representing criteria for controlling a state of at least one controllable external device and designated states for the at least one controllable external device.

2104
In accordance with a determination that the criteria of the automation profile are met, display a notification, where the notification includes an indication that identifies the automation profile and an indication to confirm implementation of the automation profile.

2106
Detect a user input.

2108
In response to detecting the user input, :

In accordance with the user input corresponding to confirmation of implementation of the automation profile, send instructions to implement the designated states of the automation profile.

In accordance with the user input corresponding to non-confirmation of implementation of the automation profile, send instructions not to implement the designated states of the automation profile.

2302
Display a representation of a controllable external device, wherein the controllable external device is configured to operate in a plurality of states, and wherein the controllable external device is in a first state of a plurality of states.

2304
Detect a first user input corresponding to a selection of the controllable external device.

2306
Determine whether the first user input meets input criteria.

2308
In accordance with a determination that the first user input does not meet the input criteria, send instructions to set the state of the controllable external device to a second state of the plurality of states.

2310
In accordance with a determination that the first user input meets the input criteria: display an affordance indicating the plurality of states of the controllable external device; while displaying the affordance indicating the plurality of states of the controllable external device, detect a second user input on the affordance corresponding to selection of a third state of the plurality of states; and in response to detecting the second user input, send instructions to set the state of the controllable external device to the third state.

2312
Optionally, while displaying the affordance indicating the plurality of states of the controllable external device, detect a third user input corresponding to selection of a location on the display that does not correspond to the affordance; and in response to detecting the third user input, cease to display the affordance.

2602
Determine a first position of the device within a location, where the location includes at least one designated room.

2604
Determine that the first position corresponds to a first room of the at least one designated room.

2606
In response to determining that the first position corresponds to the first room, display a representation of a first controllable external device associated with the first room.

2608
Optionally, detect a first user input; and in response to the first user input, send instructions to set the first controllable external device to a first state.

2610
Optionally, while displaying the representation of the first controllable external device, detect a second user input; and in response to detecting the second user input, open an application for controlling a plurality of controllable external devices at the location.

2612
Optionally, determine a second position of the electronic device within the location; determine that the second position corresponds to a second room of the at least one designated room, where the second room is different than the first room; and in response to determining that the second position corresponds to the second room: cease to display the representation of the first controllable external device associated with the first room; and display a representation of a second controllable external device associated with the second room.

2902
Display a first affordance representing a first personal contact.

2904
Detect a first user input corresponding to selection of the first affordance representing the first personal contact.

2906
Display a second affordance representing an access parameter that determines access to a location profile associated with a location, wherein the location profile includes information regarding a controllable external device at the location.

2908
Detect a second user input corresponding to selection of the second affordance.

2910
Grant an external device associated with the first personal contact access to the location profile, where the access is based on the access parameter.

2912
Send data to the external device associated with the first personal contact, where the data includes an invitation to access the location profile.

2914
Optionally, after sending the invitation to the external device associated with the first personal contact, display an indication that the first personal contact has been invited to the location.

*FIG. 29*

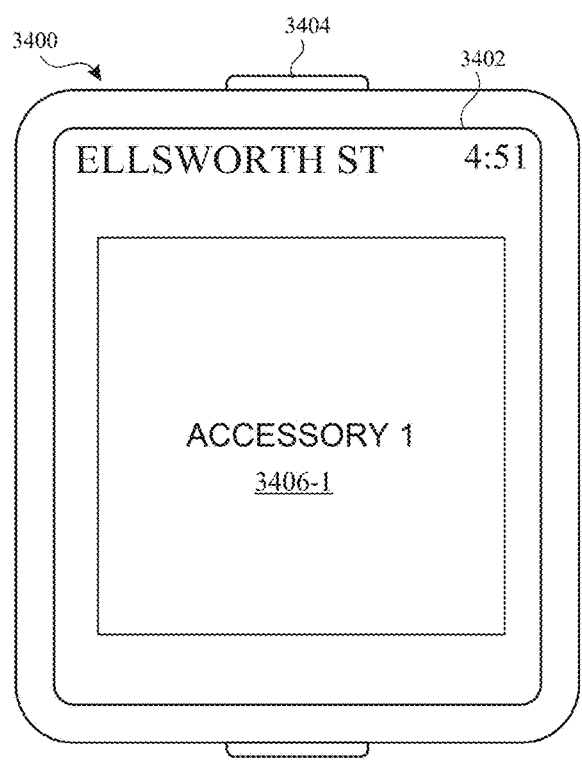
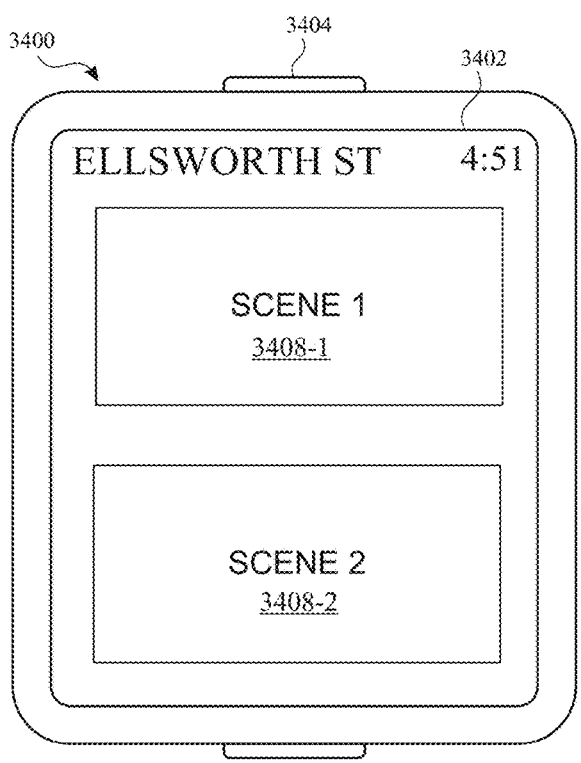
*FIG. 34A*  *FIG. 34B*

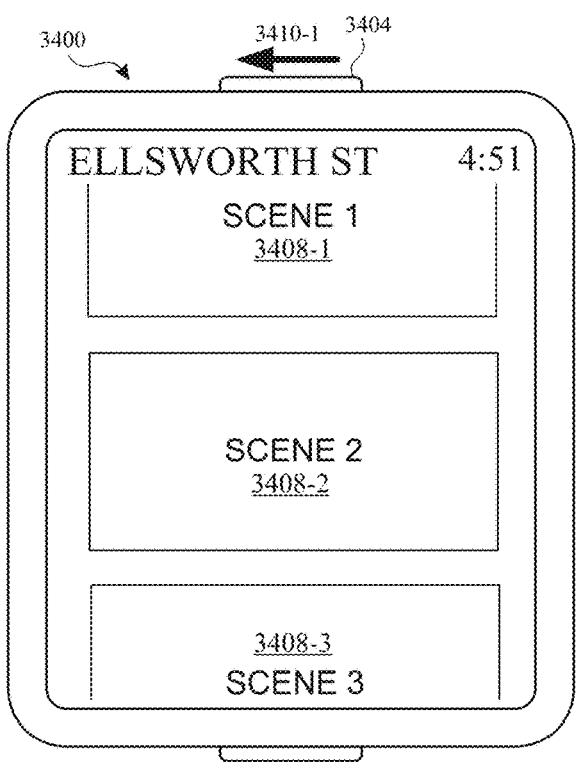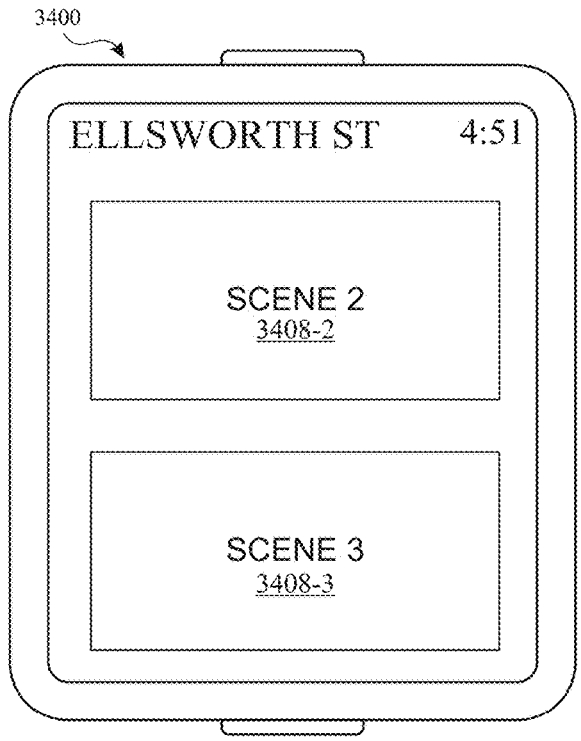
*FIG. 34C*  *FIG. 34D*

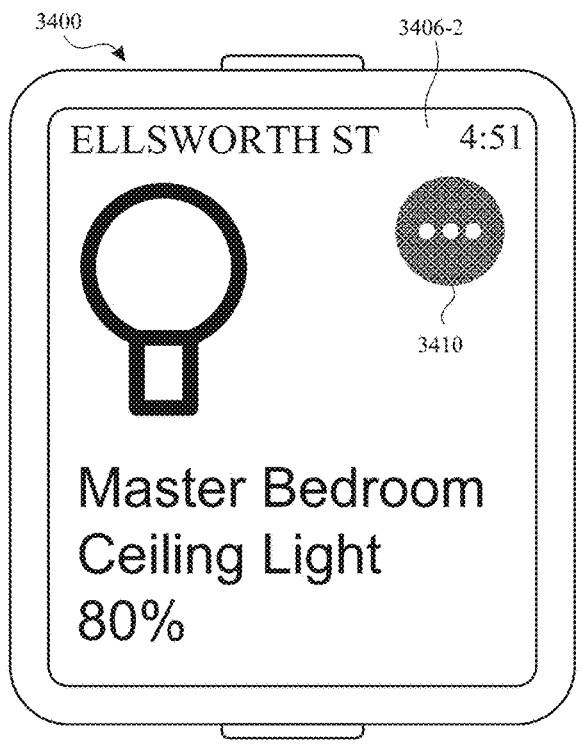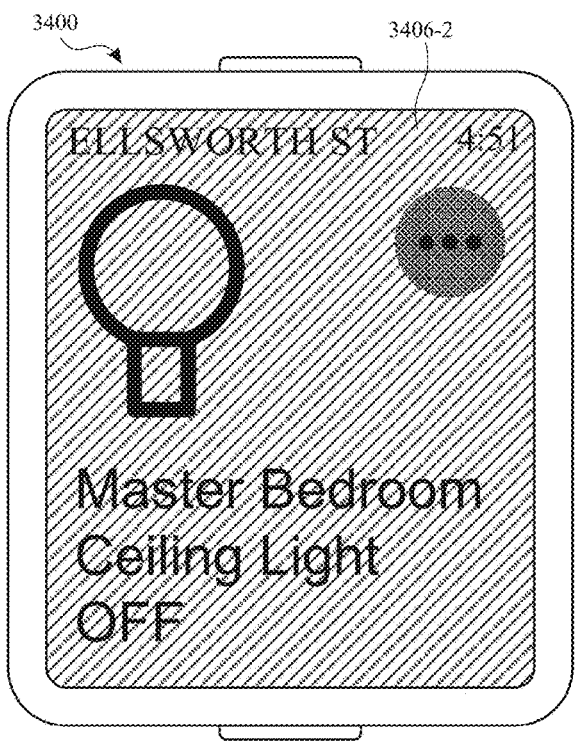
FIG. 34E
FIG. 34F

USER INTERFACE FOR MANAGING CONTROLLABLE EXTERNAL DEVICES

CROSS-REFERENCE TO RELATED APPLICATIONS

This application is a continuation of U.S. patent application Ser. No. 16/830,838, titled "USER INTERFACE FOR MANAGING CONTROLLABLE EXTERNAL DEVICES," filed on Mar. 26, 2020, which is a continuation of U.S. patent application Ser. No. 16/143,379, titled "USER INTERFACE FOR MANAGING CONTROLLABLE EXTERNAL DEVICES," filed on Sep. 26, 2018, which is a continuation of U.S. patent application Ser. No. 15/427,516, now U.S. Pat. No. 10,353,576, titled "USER INTERFACE FOR MANAGING CONTROLLABLE EXTERNAL DEVICES," filed on Feb. 8, 2017, which claims priority to U.S. provisional patent application 62/349,057, titled "USER INTERFACE FOR MANAGING CONTROLLABLE EXTERNAL DEVICES," filed on Jun. 12, 2016, the contents of which are hereby incorporated by reference in their entireties.

This application relates to U.S. patent application Ser. No. 14/725,912, titled "Accessory Management System Using Environment Model," filed May 28, 2015, the content of which is hereby incorporated by reference in its entirety. This application also relates to the U.S. Provisional Patent Application No. 62/349,100, titled "Devices and Methods for Accessing Prevalent Device Functions," filed Jun. 12, 2016, the content of which is hereby incorporated by reference in its entirety.

FIELD

The present disclosure relates generally to computer user interfaces, and more specifically to techniques for managing controllable external devices.

BACKGROUND

Electronic devices are becoming increasingly popular in a range of applications. Mobile phones, tablet computers, home entertainment systems, and the like are just some of the electronic devices users interact with regularly.

In addition, various electronically controllable devices, such as thermostats, lighting devices, household appliances, etc. are also becoming more popular.

BRIEF SUMMARY

Some techniques for managing controllable external devices using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing controllable external devices. Such methods and interfaces optionally complement or replace other methods for managing controllable external devices. Such methods and interfaces reduce the cognitive burden on a user and produce a more efficient human-machine interface. For battery-operated computing devices, such methods and interfaces conserve power and increase the time between battery charges.

A method includes: at an electronic device with a display, a touch-sensitive surface, one or more processors, and memory: displaying, on a first user interface screen, an indication of a location; displaying, on the first user interface screen, a representation of a controllable external device at the location; detecting a first user input corresponding to selection of the controllable external device; in response to detecting the first user input, displaying a user interface object indicating a plurality of possible states of the controllable external device; while displaying the user interface object indicating the plurality of possible states of the controllable external device, detecting a second user input corresponding to selection of a designated state of the controllable external device; and in response to detecting the second user input, sending instructions to set the controllable external device to the designated state.

An electronic device includes: a display; a touch-sensitive surface; one or more processors; a memory; and one or more programs, where the one or more programs are stored in the memory and configured to be executed by the one or more processors, the one or more programs including instructions for: displaying, on a first user interface screen, an indication of a location; displaying, on the first user interface screen, a representation of a controllable external device at the location; detecting a first user input corresponding to selection of the controllable external device; in response to detecting the first user input, displaying a user interface object indicating a plurality of possible states of the controllable external device; while displaying the user interface object indicating the plurality of possible states of the controllable external device, detecting a second user input corresponding to selection of a designated state of the controllable external device; and in response to detecting the second user input, sending instructions to set the controllable external device to the designated state.

A non-transitory computer-readable storage medium stores one or more programs, the one or more programs comprising instructions, which when executed by one or more processors of an electronic device with a display and a touch-sensitive surface, cause the device to: display, on a first user interface screen, an indication of a location; display, on the first user interface screen, a representation of a controllable external device at the location; detect a first user input corresponding to selection of the controllable external device; in response to detecting the first user input, display a user interface object indicating a plurality of possible states of the controllable external device; while displaying the user interface object indicating the plurality of possible states of the controllable external device, detect a second user input corresponding to selection of a designated state of the controllable external device; and in response to detecting the second user input, send instructions to set the controllable external device to the designated state.

A transitory computer-readable storage medium stores one or more programs, the one or more programs comprising instructions, which when executed by one or more processors of an electronic device with a display and a touch-sensitive surface, cause the device to: display, on a first user interface screen, an indication of a location; display, on the first user interface screen, a representation of a controllable external device at the location; detect a first user input corresponding to selection of the controllable external device; in response to detecting the first user input, display a user interface object indicating a plurality of possible states of the controllable external device; while displaying the user interface object indicating the plurality of possible states of the controllable external device, detect a second user input corresponding to selection of a designated state of the controllable external device; and in response to detecting the second user input, send instructions to set the controllable external device to the designated state.

An electronic device includes: a display; a touch-sensitive surface; means for displaying, on a first user interface screen, an indication of a location; means for displaying, on the first user interface screen, a representation of a controllable external device at the location; means for detecting a first user input corresponding to selection of the controllable external device; means responsive to detecting the first user input for displaying a user interface object indicating a plurality of possible states of the controllable external device; means for, while displaying the user interface object indicating the plurality of possible states of the controllable external device, detecting a second user input corresponding to selection of a designated state of the controllable external device; and means responsive to detecting the second user input for sending instructions to set the controllable external device to the designated state.

An electronic device includes: a display unit configured to display a graphic user interface; a touch-sensitive surface unit configured to receive contacts; and a processing unit coupled to the display unit and the touch-sensitive surface unit, the processing unit configured to: enable display of, on a first user interface screen, an indication of a location; enable display of, on the first user interface screen, a representation of a controllable external device at the location; detect a first user input corresponding to selection of the controllable external device; in response to detecting the first user input, enable display of a user interface object indicating a plurality of possible states of the controllable external device; while the user interface object indicating the plurality of possible states of the controllable external device is displayed, detect a second user input corresponding to selection of a designated state of the controllable external device; and in response to detecting the second user input, cause sending of instructions to set the controllable external device to the designated state.

A method includes: at an electronic device with a display, a touch-sensitive surface, one or more processors, and memory: displaying a first representation of a first controllable external device, where the first controllable external device is situated at a location; detecting a first user input corresponding to a selection of the first controllable external device; and after detecting the first user input, including data identifying the first controllable external device and a first state of the first controllable external device in a scene profile.

An electronic device includes: a display; a touch-sensitive surface; one or more processors; a memory; and one or more programs, where the one or more programs are stored in the memory and configured to be executed by the one or more processors, the one or more programs including instructions for: displaying a first representation of a first controllable external device, where the first controllable external device is situated at a location; detecting a first user input corresponding to a selection of the first controllable external device; and after detecting the first user input, including data identifying the first controllable external device and a first state of the first controllable external device in a scene profile.

A non-transitory computer-readable storage medium stores one or more programs, the one or more programs comprising instructions, which when executed by one or more processors of an electronic device with a display and a touch-sensitive surface, cause the device to: display a first representation of a first controllable external device, where the first controllable external device is situated at a location; detect a first user input corresponding to a selection of the first controllable external device; and after detecting the first user input, include data identifying the first controllable external device and a first state of the first controllable external device in a scene profile.

A transitory computer-readable storage medium stores one or more programs, the one or more programs comprising instructions, which when executed by one or more processors of an electronic device with a display and a touch-sensitive surface, cause the device to: display a first representation of a first controllable external device, where the first controllable external device is situated at a location; detect a first user input corresponding to a selection of the first controllable external device; and after detecting the first user input, include data identifying the first controllable external device and a first state of the first controllable external device in a scene profile.

An electronic device includes: a display; a touch-sensitive surface; means for displaying a first representation of a first controllable external device, where the first controllable external device is situated at a location; means for detecting a first user input corresponding to a selection of the first controllable external device; and means for, after detecting the first user input, including data identifying the first controllable external device and a first state of the first controllable external device in a scene profile.

An electronic device includes: a display unit configured to display a graphic user interface; a touch-sensitive surface unit configured to receive contacts; and a processing unit coupled to the display unit and the touch-sensitive surface unit, the processing unit configured to: enable display of a first representation of a first controllable external device, where the first controllable external device is situated at a location; detect a first user input corresponding to a selection of the first controllable external device; and after detecting the first user input, include data identifying the first controllable external device and a first state of the first controllable external device in a scene profile.

A method includes: at an electronic device with a display, a touch-sensitive surface, one or more processors, and memory: detecting a first user input corresponding to selection of a first criterion; in response to detecting the first user input, associating the first criterion with an automation profile, where the automation profile includes data representing: automation criteria including at least the first criterion, and at least one designated state for at least one controllable external device situated at a location; detecting a second user input corresponding to selection of a first controllable external device situated at the location; adding data indicating a designated state of the first controllable external device to the automation profile; determining whether the automation criteria has been met; and in accordance with a determination that the automation criteria has been met, sending instructions to set the first controllable external device to the designated state.

An electronic device includes: a display; a touch-sensitive surface; one or more processors; a memory; and one or more programs, where the one or more programs are stored in the memory and configured to be executed by the one or more processors, the one or more programs including instructions for: detecting a first user input corresponding to selection of a first criterion; in response to detecting the first user input, associating the first criterion with an automation profile, where the automation profile includes data representing: automation criteria including at least the first criterion, and at least one designated state for at least one controllable external device situated at a location; detecting a second user input corresponding to selection of a first controllable external device situated at the location; adding data indicating a designated state of the first controllable external device to the automation profile; determining whether the automation criteria has been met; and in accordance with a determination that the automation criteria has been met, sending instructions to set the first controllable external device to the designated state.

A non-transitory computer-readable storage medium stores one or more programs, the one or more programs comprising instructions, which when executed by one or more processors of an electronic device with a display and a touch-sensitive surface, cause the device to: detect a first user input corresponding to selection of a first criterion; in response to detecting the first user input, associate the first criterion with an automation profile, where the automation profile includes data representing: automation criteria including at least the first criterion, and at least one designated state for at least one controllable external device situated at a location; detect a second user input corresponding to selection of a first controllable external device situated at the location; add data indicating a designated state of the first controllable external device to the automation profile; determine whether the automation criteria has been met; and in accordance with a determination that the automation criteria has been met, send instructions to set the first controllable external device to the designated state.

A transitory computer-readable storage medium stores one or more programs, the one or more programs comprising instructions, which when executed by one or more processors of an electronic device with a display and a touch-sensitive surface, cause the device to: detect a first user input corresponding to selection of a first criterion; in response to detecting the first user input, associate the first criterion with an automation profile, where the automation profile includes data representing: automation criteria including at least the first criterion, and at least one designated state for at least one controllable external device situated at a location; detect a second user input corresponding to selection of a first controllable external device situated at the location; add data indicating a designated state of the first controllable external device to the automation profile; determine whether the automation criteria has been met; and in accordance with a determination that the automation criteria has been met, send instructions to set the first controllable external device to the designated state.

An electronic device comprises: a display; a touch-sensitive surface; means for detecting a first user input corresponding to selection of a first criterion; means responsive to detecting the first user input for associating the first criterion with an automation profile, where the automation profile includes data representing: automation criteria including at least the first criterion, and at least one designated state for at least one controllable external device situated at a location; means for detecting a second user input corresponding to selection of a first controllable external device situated at the location; means for adding data indicating a designated state of the first controllable external device to the automation profile; means for determining whether the automation criteria has been met; and means for, in accordance with a determination that the automation criteria has been met, sending instructions to set the first controllable external device to the designated state.

An electronic device includes: a display unit configured to display a graphic user interface; a touch-sensitive surface unit configured to receive contacts; and a processing unit coupled to the display unit and the touch-sensitive surface unit, the processing unit configured to: detect a first user input corresponding to selection of a first criterion; in response to detecting the first user input, associate the first criterion with an automation profile, where the automation profile includes data representing: automation criteria including at least the first criterion, and at least one designated state for at least one controllable external device situated at a location; detect a second user input corresponding to selection of a first controllable external device situated at the location; add data indicating a designated state of the first controllable external device to the automation profile; determine whether the automation criteria has been met; and in accordance with a determination that the automation criteria has been met, cause sending of instructions to set the first controllable external device to the designated state.

A method includes: at an electronic device with a display, a touch-sensitive surface, a camera, one or more processors, and memory: capturing, using the camera, an image of a pattern; determining that the pattern corresponds to a controllable external device, where the controllable external device is configured to operate in two or more states and is remotely controllable between the two or more states; in response to a determination that the pattern corresponds to the controllable external device, associating the controllable external device with a location, where the location has at least one designated room; detecting a first user input representing selection of a room from the at least one designated room; and in response to detecting the first user input, associating the selected room with the controllable external device.

An electronic device includes: a display; a touch-sensitive surface; a camera; one or more processors; a memory; and one or more programs, where the one or more programs are stored in the memory and configured to be executed by the one or more processors, the one or more programs including instructions for: capturing, using the camera, an image of a pattern; determining that the pattern corresponds to a controllable external device, where the controllable external device is configured to operate in two or more states and is remotely controllable between the two or more states; in response to a determination that the pattern corresponds to the controllable external device, associating the controllable external device with a location, where the location has at least one designated room; detecting a first user input representing selection of a room from the at least one designated room; and in response to detecting the first user input, associating the selected room with the controllable external device.

A non-transitory computer-readable storage medium stores one or more programs, the one or more programs comprising instructions, which when executed by one or more processors of an electronic device with a display, a touch-sensitive surface, and a camera, cause the device to: capture, using the camera, an image of a pattern; determine that the pattern corresponds to a controllable external device, where the controllable external device is configured to operate in two or more states and is remotely controllable between the two or more states; in response to a determination that the pattern corresponds to the controllable external device, associate the controllable external device with a location, where the location has at least one designated room; detect a first user input representing selection of a room from the at least one designated room; and in response to detecting the first user input, associate the selected room with the controllable external device.

A transitory computer-readable storage medium stores one or more programs, the one or more programs comprising instructions, which when executed by one or more processors of an electronic device with a display, a touch-sensitive surface, and a camera, cause the device to: capture, using the camera, an image of a pattern; determine that the pattern corresponds to a controllable external device, where the controllable external device is configured to operate in two or more states and is remotely controllable between the two or more states; in response to a determination that the pattern corresponds to the controllable external device, associate the controllable external device with a location, where the location has at least one designated room; detect a first user input representing selection of a room from the at least one designated room; and in response to detecting the first user input, associate the selected room with the controllable external device.

An electronic device includes: a display; a touch-sensitive surface; a camera; means for capturing, using the camera, an image of a pattern; means for determining that the pattern corresponds to a controllable external device, where the controllable external device is configured to operate in two or more states and is remotely controllable between the two or more states; means response to a determination that the pattern corresponds to the controllable external device for associating the controllable external device with a location, where the location has at least one designated room; means for detecting a first user input representing selection of a room from the at least one designated room; and means responsive to detecting the first user input, associating the selected room with the controllable external device.

An electronic device includes: a display unit configured to display a graphic user interface; a touch-sensitive surface unit configured to receive contacts; a camera unit configured to capture images; and a processing unit coupled to the display unit and the touch-sensitive surface unit, the processing unit configured to: cause capturing, using the camera, an image of a pattern; determine that the pattern corresponds to a controllable external device, where the controllable external device is configured to operate in two or more states and is remotely controllable between the two or more states; in response to a determination that the pattern corresponds to the controllable external device, associate the controllable external device with a location, where the location has at least one designated room; detect a first user input representing selection of a room from the at least one designated room; and in response to detecting the first user input, associate the selected room with the controllable external device.

A method includes: at an electronic device with a display, a touch-sensitive surface, one or more processors, and memory: detecting user input corresponding to designation of location-based criteria, where the location-based criteria are based at least in part on the location of the electronic device with respect to a first location having at least one controllable external device; in response to detecting the user input corresponding to designation of the criteria, adding the location-based criteria to an automation profile associated with the location, where the automation profile includes data representing automation criteria for controlling the at least one controllable external device and a designated state of the at least one controllable external device, and where the automation criteria for controlling the at least one controllable external device includes the location-based criteria; determining the location of the electronic device; determining whether the automation criteria for controlling the at least one controllable external device is met based at least in part on the determined location of the electronic device; and in accordance with a determination that the automation criteria for controlling the at least one controllable external device is met, sending instructions to set the at least one controllable external device to the designated state.

An electronic device includes: a display; a touch-sensitive surface; one or more processors; a memory; and one or more programs, where the one or more programs are stored in the memory and configured to be executed by the one or more processors, the one or more programs including instructions for: detecting user input corresponding to designation of location-based criteria, where the location-based criteria are based at least in part on the location of the electronic device with respect to a first location having at least one controllable external device; in response to detecting the user input corresponding to designation of the criteria, adding the location-based criteria to an automation profile associated with the location, where the automation profile includes data representing automation criteria for controlling the at least one controllable external device and a designated state of the at least one controllable external device, and where the automation criteria for controlling the at least one controllable external device includes the location-based criteria; determining the location of the electronic device; determining whether the automation criteria for controlling the at least one controllable external device is met based at least in part on the determined location of the electronic device; and in accordance with a determination that the automation criteria for controlling the at least one controllable external device is met, sending instructions to set the at least one controllable external device to the designated state.

A non-transitory computer-readable storage medium stores one or more programs, the one or more programs comprising instructions, which when executed by one or more processors of an electronic device with a display and a touch-sensitive surface, cause the device to: detect user input corresponding to designation of location-based criteria, where the location-based criteria are based at least in part on the location of the electronic device with respect to a first location having at least one controllable external device; in response to detecting the user input corresponding to designation of the criteria, add the location-based criteria to an automation profile associated with the location, where the automation profile includes data representing automation criteria for controlling the at least one controllable external device and a designated state of the at least one controllable external device, and where the automation criteria for controlling the at least one controllable external device includes the location-based criteria; determine the location of the electronic device; determine whether the automation criteria for controlling the at least one controllable external device is met based at least in part on the determined location of the electronic device; and in accordance with a determination that the automation criteria for controlling the at least one controllable external device is met, send instructions to set the at least one controllable external device to the designated state.

A transitory computer-readable storage medium stores one or more programs, the one or more programs comprising instructions, which when executed by one or more processors of an electronic device with a display and a touch-sensitive surface, cause the device to: detect user input corresponding to designation of location-based criteria, where the location-based criteria are based at least in part on the location of the electronic device with respect to a first location having at least one controllable external device; in response to detecting the user input corresponding to designation of the criteria, add the location-based criteria to an automation profile associated with the location, where the automation profile includes data representing automation criteria for controlling the at least one controllable external device and a designated state of the at least one controllable external device, and where the automation criteria for controlling the at least one controllable external device includes the location-based criteria; determine the location of the electronic device; determine whether the automation criteria for controlling the at least one controllable external device is met based at least in part on the determined location of the electronic device; and in accordance with a determination that the automation criteria for controlling the at least one controllable external device is met, send instructions to set the at least one controllable external device to the designated state.

An electronic device includes: a display; a touch-sensitive surface; means for detecting user input corresponding to designation of location-based criteria, where the location-based criteria are based at least in part on the location of the electronic device with respect to a first location having at least one controllable external device; means responsive to detecting the user input corresponding to designation of the criteria for adding the location-based criteria to an automation profile associated with the location, where the automation profile includes data representing automation criteria for controlling the at least one controllable external device and a designated state of the at least one controllable external device, and where the automation criteria for controlling the at least one controllable external device includes the location-based criteria; means for determining the location of the electronic device; means for determining whether the automation criteria for controlling the at least one controllable external device is met based at least in part on the determined location of the electronic device; and means for, in accordance with a determination that the automation criteria for controlling the at least one controllable external device is met, sending instructions to set the at least one controllable external device to the designated state.

An electronic device includes: a display unit configured to display a graphic user interface; a touch-sensitive surface unit configured to receive contacts; and a processing unit coupled to the display unit and the touch-sensitive surface unit, the processing unit configured to: detect user input corresponding to designation of location-based criteria, where the location-based criteria are based at least in part on the location of the electronic device with respect to a first location having at least one controllable external device; in response to detecting the user input corresponding to designation of the criteria, add the location-based criteria to an automation profile associated with the location, where the automation profile includes data representing automation criteria for controlling the at least one controllable external device and a designated state of the at least one controllable external device, and where the automation criteria for controlling the at least one controllable external device includes the location-based criteria; determine the location of the electronic device; determine whether the automation criteria for controlling the at least one controllable external device is met based at least in part on the determined location of the electronic device; and in accordance with a determination that the automation criteria for controlling the at least one controllable external device is met, cause sending of instructions to set the at least one controllable external device to the designated state.

A method includes: at an electronic device with a display, a touch-sensitive surface, one or more processors, and memory: determining whether criteria of an automation profile are met, where the automation profile includes data representing criteria for controlling a state of at least one controllable external device and designated states for the at least one controllable external device; in accordance with a determination that the criteria of the automation profile are met, displaying a notification, where the notification includes an indication that identifies the automation profile and an indication to confirm implementation of the automation profile; detecting a user input; and in response to detecting the user input: in accordance with the user input corresponding to confirmation of implementation of the automation profile, sending instructions to implement the designated states of the automation profile; and in accordance with the user input corresponding to non-confirmation of implementation of the automation profile, sending instructions not to implement the designated states of the automation profile.

An electronic device includes: a display; a touch-sensitive surface; one or more processors; a memory; and one or more programs, where the one or more programs are stored in the memory and configured to be executed by the one or more processors, the one or more programs including instructions for: determining whether criteria of an automation profile are met, where the automation profile includes data representing criteria for controlling a state of at least one controllable external device and designated states for the at least one controllable external device; in accordance with a determination that the criteria of the automation profile are met, displaying a notification, where the notification includes an indication that identifies the automation profile and an indication to confirm implementation of the automation profile; detecting a user input; and in response to detecting the user input: in accordance with the user input corresponding to confirmation of implementation of the automation profile, sending instructions to implement the designated states of the automation profile; and in accordance with the user input corresponding to non-confirmation of implementation of the automation profile, sending instructions not to implement the designated states of the automation profile.

A non-transitory computer-readable storage medium stores one or more programs, the one or more programs comprising instructions, which when executed by one or more processors of an electronic device with a display and a touch-sensitive surface, cause the device to: determine whether criteria of an automation profile are met, where the automation profile includes data representing criteria for controlling a state of at least one controllable external device and designated states for the at least one controllable external device; in accordance with a determination that the criteria of the automation profile are met, display a notification, where the notification includes an indication that identifies the automation profile and an indication to confirm implementation of the automation profile; detect a user input; and in response to detecting the user input: in accordance with the user input corresponding to confirmation of implementation of the automation profile, send instructions to implement the designated states of the automation profile; and in accordance with the user input corresponding to non-confirmation of implementation of the automation profile, send instructions not to implement the designated states of the automation profile.

A transitory computer-readable storage medium stores one or more programs, the one or more programs comprising instructions, which when executed by one or more processors of an electronic device with a display and a touch-sensitive surface, cause the device to: determine whether criteria of an automation profile are met, where the automation profile includes data representing criteria for controlling a state of at least one controllable external device and designated states for the at least one controllable external device; in accordance with a determination that the criteria of the automation profile are met, display a notification, where the notification includes an indication that identifies the automation profile and an indication to confirm implementation of the automation profile; detect a user input; and in response to detecting the user input: in accordance with the user input corresponding to confirmation of implementation of the automation profile, send instructions to implement the designated states of the automation profile; and in accordance with the user input corresponding to non-confirmation of implementation of the automation profile, send instructions not to implement the designated states of the automation profile.

An electronic device includes: a display; a touch-sensitive surface; means for determining whether criteria of an automation profile are met, where the automation profile includes data representing criteria for controlling a state of at least one controllable external device and designated states for the at least one controllable external device; means for, in accordance with a determination that the criteria of the automation profile are met, displaying a notification, where the notification includes an indication that identifies the automation profile and an indication to confirm implementation of the automation profile; means for detecting a user input; and means responsive to detecting the user input for: in accordance with the user input corresponding to confirmation of implementation of the automation profile, sending instructions to implement the designated states of the automation profile; and in accordance with the user input corresponding to non-confirmation of implementation of the automation profile, sending instructions not to implement the designated states of the automation profile.

An electronic device includes: a display unit configured to display a graphic user interface; a touch-sensitive surface unit configured to receive contacts; and a processing unit coupled to the display unit and the touch-sensitive surface unit, the processing unit configured to: determine whether criteria of an automation profile are met, where the automation profile includes data representing criteria for controlling a state of at least one controllable external device and designated states for the at least one controllable external device; in accordance with a determination that the criteria of the automation profile are met, enable display of a notification, where the notification includes an indication that identifies the automation profile and an indication to confirm implementation of the automation profile; detect a user input; and in response to detecting the user input: in accordance with the user input corresponding to confirmation of implementation of the automation profile, cause sending of instructions to implement the designated states of the automation profile; and in accordance with the user input corresponding to non-confirmation of implementation of the automation profile, cause sending of instructions not to implement the designated states of the automation profile.

A method includes: at an electronic device with a display, a touch-sensitive surface, one or more processors, and memory: displaying a representation of a controllable external device, where the controllable external device is configured to operate in a plurality of states, and where the controllable external device is in a first state of a plurality of states; detecting a first user input corresponding to a selection of the controllable external device; determining whether the first user input meets input criteria; in accordance with a determination that the first user input does not meet the input criteria, sending instructions to set the state of the controllable external device to a second state of the plurality of states; and in accordance with a determination that the first user input meets the input criteria: displaying an affordance indicating the plurality of states of the controllable external device; while displaying the affordance indicating the plurality of states of the controllable external device, detecting a second user input on the affordance corresponding to selection of a third state of the plurality of states; and in response to detecting the second user input, sending instructions to set the state of the controllable external device to the third state.

An electronic device includes: a display; a touch-sensitive surface; one or more processors; a memory; and one or more programs, where the one or more programs are stored in the memory and configured to be executed by the one or more processors, the one or more programs including instructions for: displaying a representation of a controllable external device, where the controllable external device is configured to operate in a plurality of states, and where the controllable external device is in a first state of a plurality of states; detecting a first user input corresponding to a selection of the controllable external device; determining whether the first user input meets input criteria; in accordance with a determination that the first user input does not meet the input criteria, sending instructions to set the state of the controllable external device to a second state of the plurality of states; and in accordance with a determination that the first user input meets the input criteria: displaying an affordance indicating the plurality of states of the controllable external device; while displaying the affordance indicating the plurality of states of the controllable external device, detecting a second user input on the affordance corresponding to selection of a third state of the plurality of states; and in response to detecting the second user input, sending instructions to set the state of the controllable external device to the third state.

A non-transitory computer-readable storage medium stores one or more programs, the one or more programs comprising instructions, which when executed by one or more processors of an electronic device with a display and a touch-sensitive surface, cause the device to: display a representation of a controllable external device, where the controllable external device is configured to operate in a plurality of states, and where the controllable external device is in a first state of a plurality of states; detect a first user input corresponding to a selection of the controllable external device; determine whether the first user input meets input criteria; in accordance with a determination that the first user input does not meet the input criteria, send instructions to set the state of the controllable external device to a second state of the plurality of states; and in accordance with a determination that the first user input meets the input criteria: display an affordance indicating the plurality of states of the controllable external device; while displaying the affordance indicating the plurality of states of the controllable external device, detect a second user input on the affordance corresponding to selection of a third state of the plurality of states; and in response to detecting the second user input, send instructions to set the state of the controllable external device to the third state.

A transitory computer-readable storage medium stores one or more programs, the one or more programs comprising instructions, which when executed by one or more processors of an electronic device with a display and a touch-sensitive surface, cause the device to: display a representation of a controllable external device, where the controllable external device is configured to operate in a plurality of states, and where the controllable external device is in a first state of a plurality of states; detect a first user input corresponding to a selection of the controllable external device; determine whether the first user input meets input criteria; in accordance with a determination that the first user input does not meet the input criteria, send instructions to set the state of the controllable external device to a second state of the plurality of states; and in accordance with a determination that the first user input meets the input criteria: display an affordance indicating the plurality of states of the controllable external device; while displaying the affordance indicating the plurality of states of the controllable external device, detect a second user input on the affordance corresponding to selection of a third state of the plurality of states; and in response to detecting the second user input, send instructions to set the state of the controllable external device to the third state.

An electronic device includes: a display; a touch-sensitive surface; means for displaying a representation of a controllable external device, where the controllable external device is configured to operate in a plurality of states, and where the controllable external device is in a first state of a plurality of states; means for detecting a first user input corresponding to a selection of the controllable external device; means for determining whether the first user input meets input criteria; means for, in accordance with a determination that the first user input does not meet the input criteria, sending instructions to set the state of the controllable external device to a second state of the plurality of states; and means for, in accordance with a determination that the first user input meets the input criteria: displaying an affordance indicating the plurality of states of the controllable external device; while displaying the affordance indicating the plurality of states of the controllable external device, detecting a second user input on the affordance corresponding to selection of a third state of the plurality of states; and in response to detecting the second user input, sending instructions to set the state of the controllable external device to the third state.

An electronic device includes: a display unit configured to display a graphic user interface; a touch-sensitive surface unit configured to receive contacts; and a processing unit coupled to the display unit and the touch-sensitive surface unit, the processing unit configured to: enable display of a representation of a controllable external device, where the controllable external device is configured to operate in a plurality of states, and where the controllable external device is in a first state of a plurality of states; detect a first user input corresponding to a selection of the controllable external device; determine whether the first user input meets input criteria; in accordance with a determination that the first user input does not meet the input criteria, cause sending of instructions to set the state of the controllable external device to a second state of the plurality of states; and in accordance with a determination that the first user input meets the input criteria: enable display of an affordance indicating the plurality of states of the controllable external device; while displaying the affordance indicating the plurality of states of the controllable external device, detect a second user input on the affordance corresponding to selection of a third state of the plurality of states; and in response to detecting the second user input, cause sending of instructions to set the state of the controllable external device to the third state.

A method includes: at an electronic device with a display, one or more processors, and memory: determining a first position of the electronic device within a location, where the location includes at least one designated room; determining that the first position corresponds to a first room of the at least one designated room; and in response to determining that the first position corresponds to the first room, displaying a representation of a first controllable external device associated with the first room.

An electronic device includes: a display; a touch-sensitive surface; one or more processors; a memory; and one or more programs, where the one or more programs are stored in the memory and configured to be executed by the one or more processors, the one or more programs including instructions for: determining a first position of the electronic device within a location, where the location includes at least one designated room; determining that the first position corresponds to a first room of the at least one designated room; and in response to determining that the first position corresponds to the first room, displaying a representation of a first controllable external device associated with the first room.

A non-transitory computer-readable storage medium stores one or more programs, the one or more programs comprising instructions, which when executed by one or more processors of an electronic device with a display, cause the device to: determine a first position of the electronic device within a location, where the location includes at least one designated room; determine that the first position corresponds to a first room of the at least one designated room; and in response to determining that the first position corresponds to the first room, display a representation of a first controllable external device associated with the first room.

A transitory computer-readable storage medium stores one or more programs, the one or more programs comprising instructions, which when executed by one or more processors of an electronic device with a display, cause the device to: determine a first position of the electronic device within a location, where the location includes at least one designated room; determine that the first position corresponds to a first room of the at least one designated room; and in response to determining that the first position corresponds to the first room, display a representation of a first controllable external device associated with the first room.

An electronic device includes: a display; means for determining a first position of the electronic device within a location, where the location includes at least one designated room; means for determining that the first position corresponds to a first room of the at least one designated room; and means responsive to determining that the first position corresponds to the first room for displaying a representation of a first controllable external device associated with the first room.

An electronic device includes: a display unit configured to display a graphic user interface; and a processing unit coupled to the display unit and the touch-sensitive surface unit, the processing unit configured to: determine a first position of the electronic device within a location, where the location includes at least one designated room; determine that the first position corresponds to a first room of the at least one designated room; and in response to determining that the first position corresponds to the first room, enable display of a representation of a first controllable external device associated with the first room.

A method includes: at an electronic device with a display, a touch-sensitive surface, one or more processors, and memory: displaying a first affordance representing a first personal contact; detecting a first user input corresponding to selection of the first affordance representing the first personal contact; displaying a second affordance representing an access parameter that determines access to a location profile associated with a location, where the location profile includes information regarding a controllable external device at the location; detecting a second user input corresponding to selection of the second affordance; granting an external device associated with the first personal contact access to the location profile, where the access is based on the access parameter; and sending data to the external device associated with the first personal contact, the data including an invitation to access the location profile.

An electronic device includes: a display; a touch-sensitive surface; one or more processors; a memory; and one or more programs, where the one or more programs are stored in the memory and configured to be executed by the one or more processors, the one or more programs including instructions for: displaying a first affordance representing a first personal contact; detecting a first user input corresponding to selection of the first affordance representing the first personal contact; displaying a second affordance representing an access parameter that determines access to a location profile associated with a location, where the location profile includes information regarding a controllable external device at the location; detecting a second user input corresponding to selection of the second affordance; granting an external device associated with the first personal contact access to the location profile, where the access is based on the access parameter; and sending data to the external device associated with the first personal contact, the data including an invitation to access the location profile.

A non-transitory computer-readable storage medium stores one or more programs, the one or more programs comprising instructions, which when executed by one or more processors of an electronic device with a display and a touch-sensitive surface, cause the device to: display a first affordance representing a first personal contact; detect a first user input corresponding to selection of the first affordance representing the first personal contact; display a second affordance representing an access parameter that determines access to a location profile associated with a location, where the location profile includes information regarding a controllable external device at the location; detect a second user input corresponding to selection of the second affordance; grant an external device associated with the first personal contact access to the location profile, where the access is based on the access parameter; and send data to the external device associated with the first personal contact, the data including an invitation to access the location profile.

A transitory computer-readable storage medium stores one or more programs, the one or more programs comprising instructions, which when executed by one or more processors of an electronic device with a display and a touch-sensitive surface, cause the device to: display a first affordance representing a first personal contact; detect a first user input corresponding to selection of the first affordance representing the first personal contact; display a second affordance representing an access parameter that determines access to a location profile associated with a location, where the location profile includes information regarding a controllable external device at the location; detect a second user input corresponding to selection of the second affordance; grant an external device associated with the first personal contact access to the location profile, where the access is based on the access parameter; and send data to the external device associated with the first personal contact, the data including an invitation to access the location profile.

An electronic device includes: a display; a touch-sensitive surface; means for displaying a first affordance representing a first personal contact; means for detecting a first user input corresponding to selection of the first affordance representing the first personal contact; means for displaying a second affordance representing an access parameter that determines access to a location profile associated with a location, where the location profile includes information regarding a controllable external device at the location; means for detecting a second user input corresponding to selection of the second affordance; means for granting an external device associated with the first personal contact access to the location profile, where the access is based on the access parameter; and means for sending data to the external device associated with the first personal contact, the data including an invitation to access the location profile.

An electronic device includes: a display unit configured to display a graphic user interface; a touch-sensitive surface unit configured to receive contacts; and a processing unit coupled to the display unit and the touch-sensitive surface unit, the processing unit configured to: enable display of a first affordance representing a first personal contact; detect a first user input corresponding to selection of the first affordance representing the first personal contact; enable display of a second affordance representing an access parameter that determines access to a location profile associated with a location, where the location profile includes information regarding a controllable external device at the location; detect a second user input corresponding to selection of the second affordance; cause an external device associated with the first personal contact to be granted access to the location profile, where the access is based on the access parameter; and cause sending data to the external device associated with the first personal contact, the data including an invitation to access the location profile.

A method includes: at an electronic device with a display, a touch-sensitive surface, one or more processors, and memory: receiving data including information related to a location, where the data includes information related to a first controllable external device at the location; in accordance with receiving the data, displaying an affordance corresponding to the first controllable external device; detecting a first user input corresponding to selection of the affordance; and in response to detecting the first user input, displaying a user interface screen including an indication of the location and a representation of the first controllable external device.

An electronic device includes: a display; a touch-sensitive surface; one or more processors; a memory; and one or more programs, where the one or more programs are stored in the memory and configured to be executed by the one or more processors, the one or more programs including instructions for: receiving data including information related to a location, where the data includes information related to a first controllable external device at the location; in accordance with receiving the data, displaying an affordance corresponding to the first controllable external device; detecting a first user input corresponding to selection of the affordance; and in response to detecting the first user input, displaying a user interface screen including an indication of the location and a representation of the first controllable external device.

A non-transitory computer-readable storage medium stores one or more programs, the one or more programs comprising instructions, which when executed by one or more processors of an electronic device with a display and a touch-sensitive surface, cause the device to: receive data including information related to a location, where the data includes information related to a first controllable external device at the location; in accordance with receiving the data, display an affordance corresponding to the first controllable external device; detect a first user input corresponding to selection of the affordance; and in response to detecting the first user input, display a user interface screen including an indication of the location and a representation of the first controllable external device.

A transitory computer-readable storage medium stores one or more programs, the one or more programs comprising instructions, which when executed by one or more processors of an electronic device with a display and a touch-sensitive surface, cause the device to: receive data including information related to a location, where the data includes information related to a first controllable external device at the location; in accordance with receiving the data, display an affordance corresponding to the first controllable external device; detect a first user input corresponding to selection of the affordance; and in response to detecting the first user input, display a user interface screen including an indication of the location and a representation of the first controllable external device.

An electronic device includes: a display; a touch-sensitive surface; means for receiving data including information related to a location, where the data includes information related to a first controllable external device at the location; means for, in accordance with receiving the data, displaying an affordance corresponding to the first controllable external device; means for detecting a first user input corresponding to selection of the affordance; and means responsive to detecting the first user input for displaying a user interface screen including an indication of the location and a representation of the first controllable external device.

An electronic device includes: a display unit configured to display a graphic user interface; a touch-sensitive surface unit configured to receive contacts; and a processing unit coupled to the display unit and the touch-sensitive surface unit, the processing unit configured to: receive data including information related to a location, where the data includes information related to a first controllable external device at the location; in accordance with receiving the data, display an affordance corresponding to the first controllable external device; detect a first user input corresponding to selection of the affordance; and in response to detecting the first user input, display a user interface screen including an indication of the location and a representation of the first controllable external device.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing controllable external devices, thereby increasing the effectiveness, efficiency, and user satisfaction with such devices. Such methods and interfaces may complement or replace other methods for managing controllable external devices.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIGS. 9A-9F illustrate exemplary user interfaces in accordance with some embodiments.

FIGS. 15A-15B illustrate exemplary user interfaces in accordance with some embodiments.

FIG. 21 is a flow diagram illustrating a process for managing controllable external devices in accordance with some embodiments.

FIG. 23 is a flow diagram illustrating a process for managing controllable external devices in accordance with some embodiments.

FIG. 26 is a flow diagram illustrating a process for managing controllable external devices in accordance with some embodiments.

FIG. 29 is a flow diagram illustrating a process for managing controllable external devices in accordance with some embodiments.

FIGS. 34A-34K illustrate exemplary user interfaces in accordance with some embodiments.

DESCRIPTION OF EMBODIMENTS

Figure 1A:
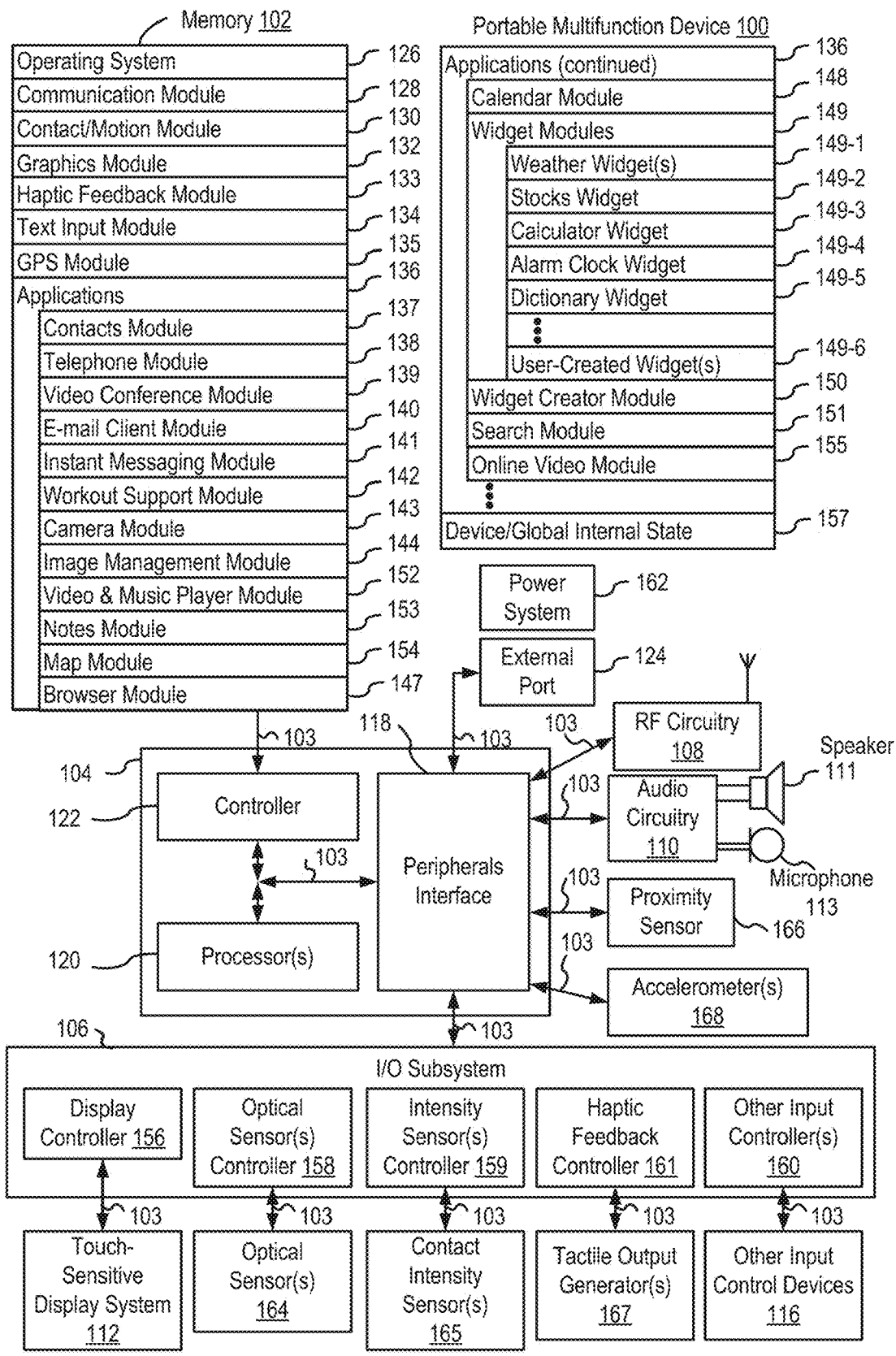
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing controllable external devices. In some embodiments, an electronic device provides access to designated (e.g., favorite) controllable devices on a home screen for managing a system of controllable devices. In some embodiments, a user can coarsely control a device by toggling the state between two states (e.g., ON/OFF) using input with one type of characteristic and obtain more detailed control of the device using input with a different characteristic. In some embodiments, a user-defined collection of devices is controlled in response to user-defined conditions. Various other techniques are also described. Such techniques can reduce the cognitive burden on a user who manages controllable external devices, thereby enhancing productivity. Further, such techniques can reduce processor and battery power otherwise wasted on redundant user inputs.

Below, FIGS. 1A-1B, 2, 3, 4A-4B, and 5A-5H provide a description of exemplary devices for performing the techniques for managing controllable external devices. FIGS. 6A-6S, 9A-9F, 12A-12C, 15A-15B, 18A-18C, 25, 28A-28E, 31A-31B, and 34A-34K illustrate exemplary user interfaces for managing controllable external devices. FIGS. 7A-7C, 10, 13, 16, 19, 21, 23, 26, 29, and 32 are flow diagrams illustrating methods of managing controllable external devices in accordance with some embodiments. The user interfaces in FIGS. 6A-6S, 9A-9F, 12A-12C, 15A-15B, 18A-18C, 25, 28A-28E, 31A-31B, and 34A-34K are used to illustrate the processes described below, including the processes in FIGS. 7A-7C, 10, 13, 16, 19, 21, 23, 26, 29, and 32.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display)

technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
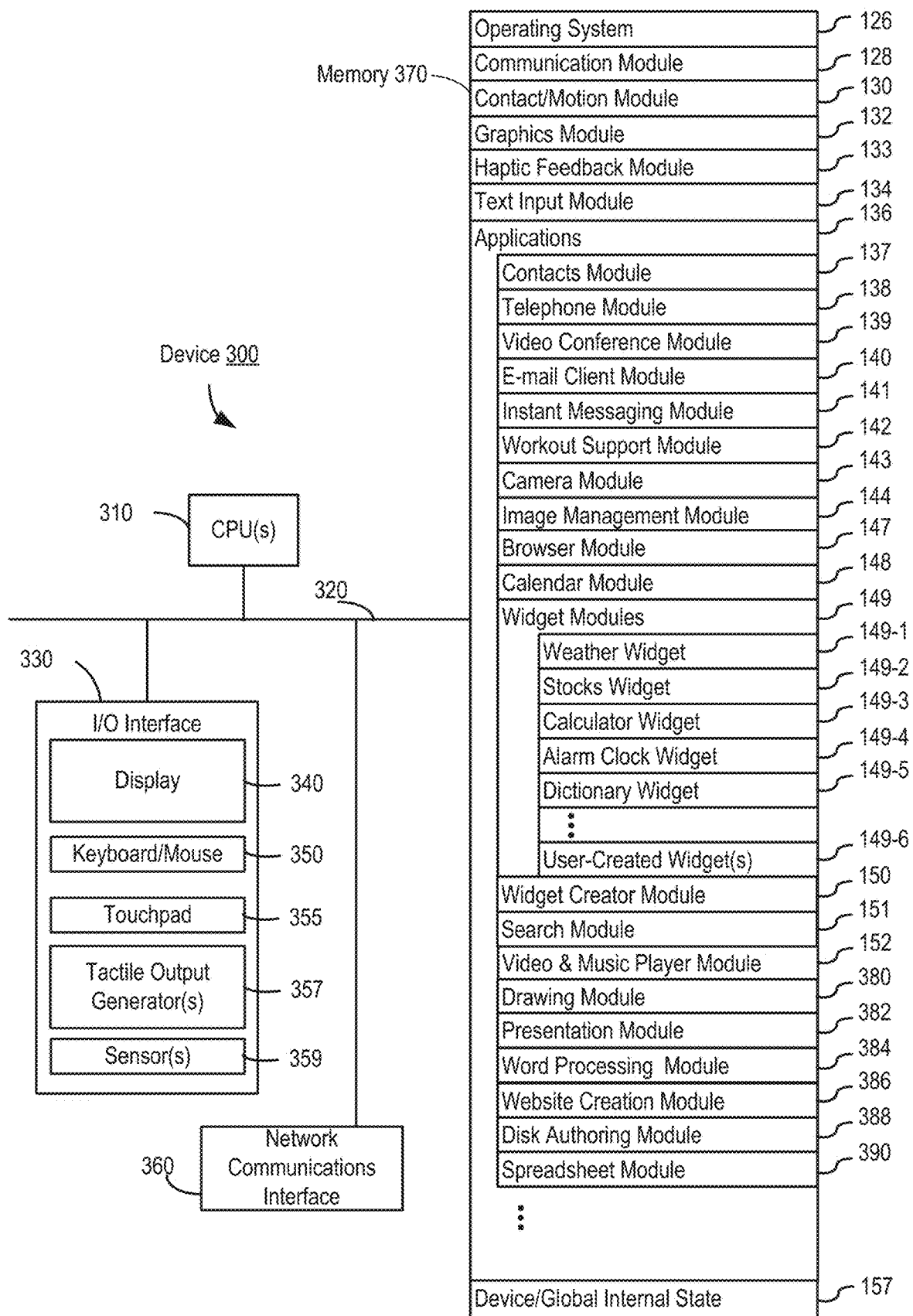
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
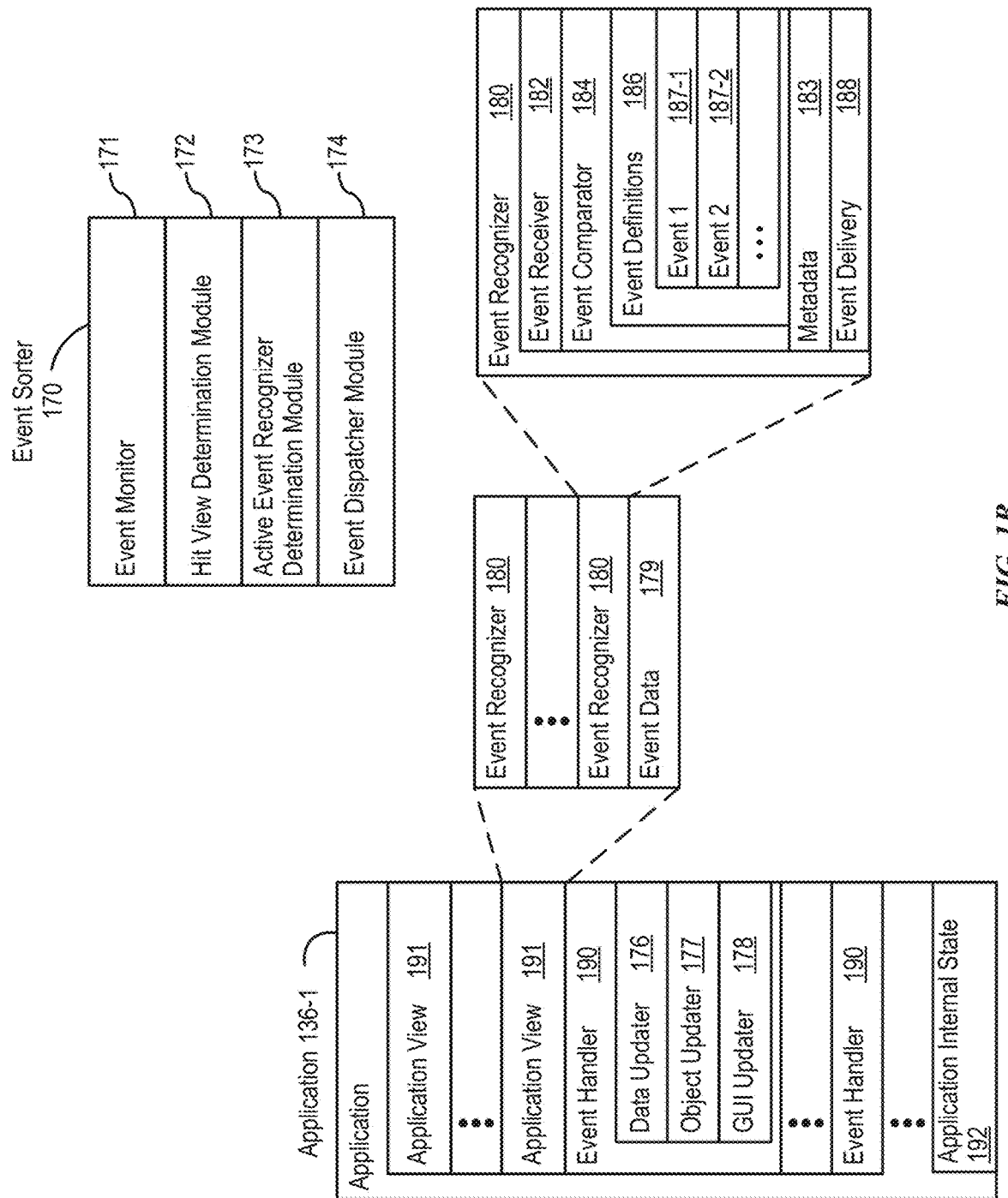
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
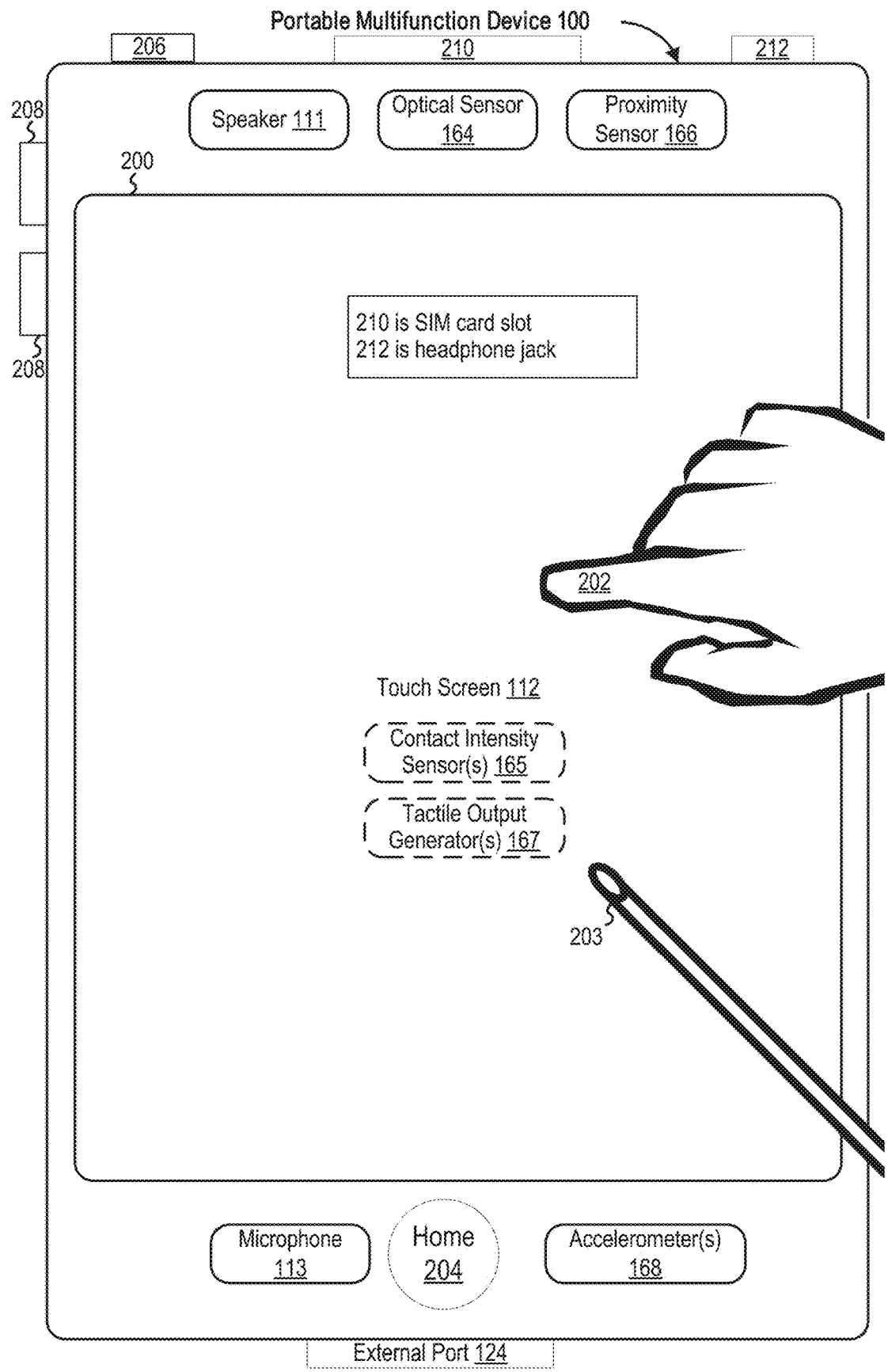
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
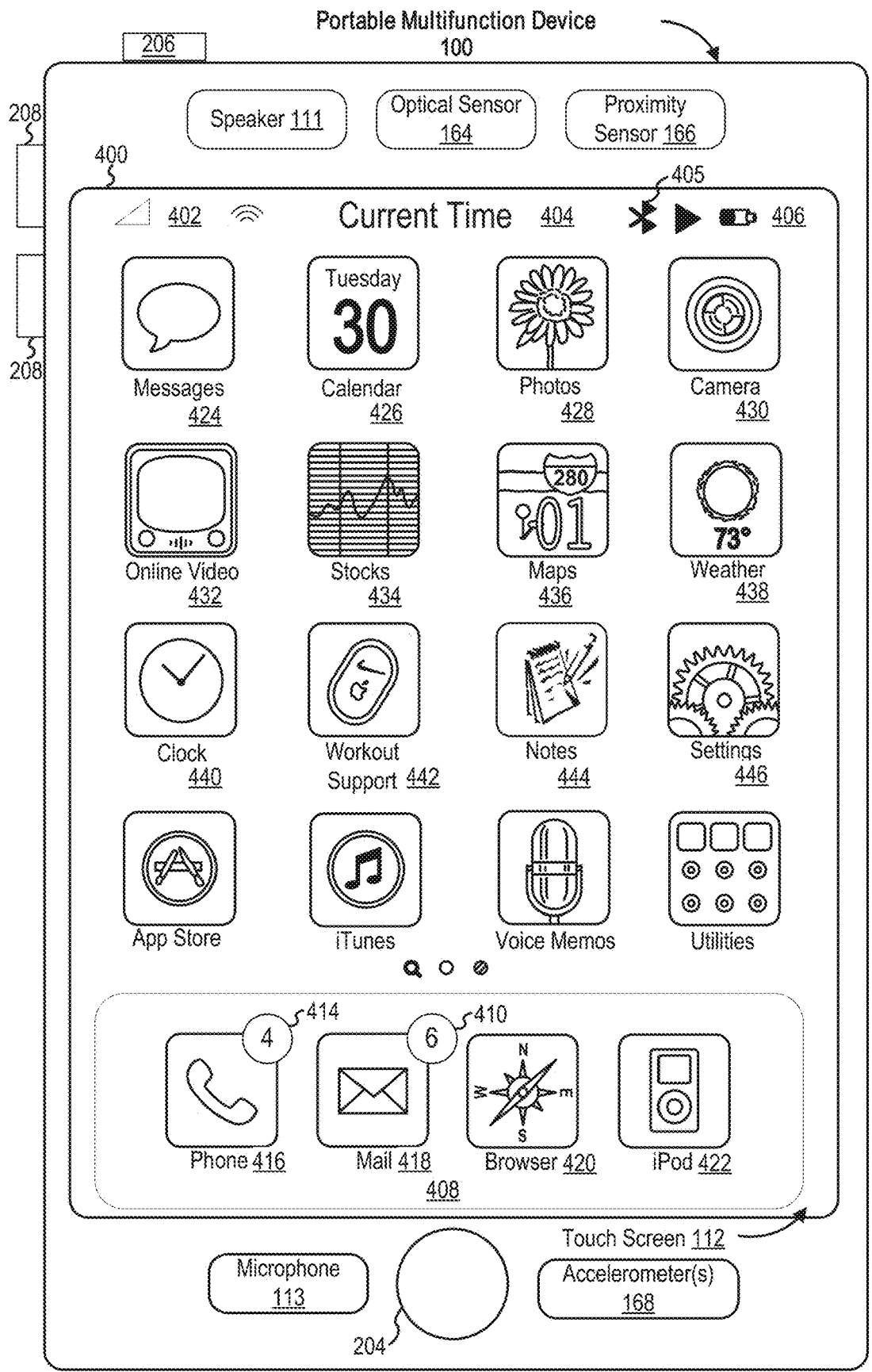
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;

Tray 408 with icons for frequently used applications, such as:
- Icon 416 for telephone module 138, labeled "Phone," which optionally includes an indicator 414 of the number of missed calls or voicemail messages;
- Icon 418 for e-mail client module 140, labeled "Mail," which optionally includes an indicator 410 of the number of unread e-mails;
- Icon 420 for browser module 147, labeled "Browser;" and
- Icon 422 for video and music player module 152, also referred to as iPod (trademark of Apple Inc.) module 152, labeled "iPod;" and Icons for other applications, such as:
- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video;"
- Icon 434 for stocks widget 149-2, labeled "Stocks;"
- Icon 436 for map module 154, labeled "Maps;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
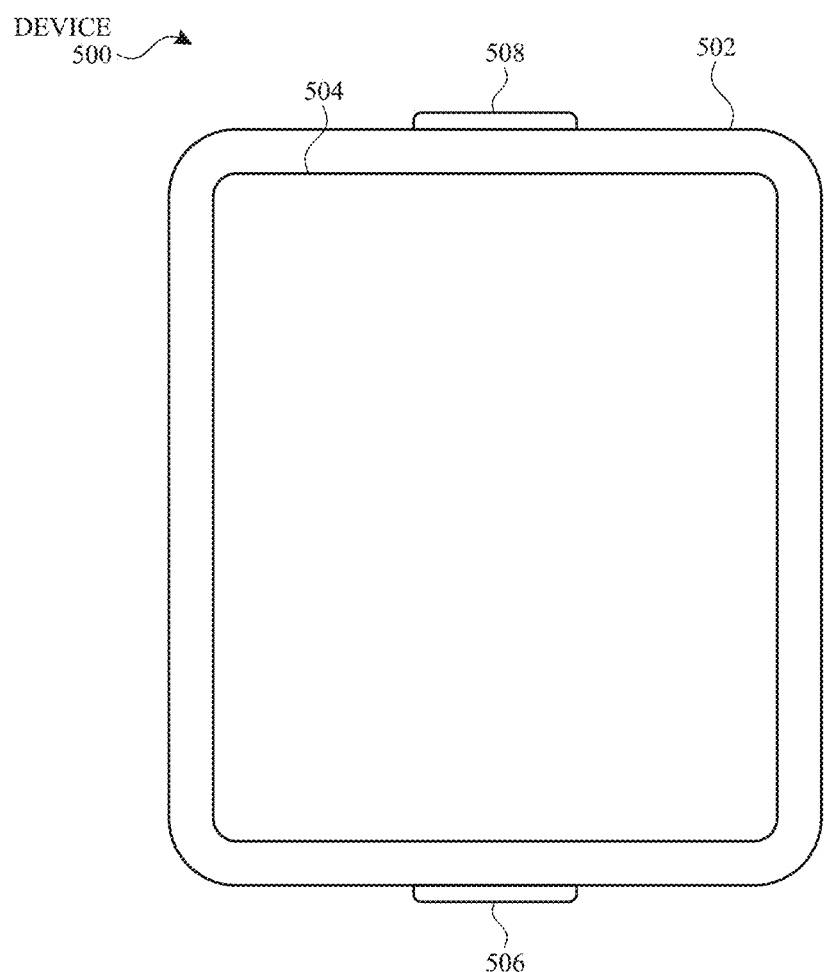
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
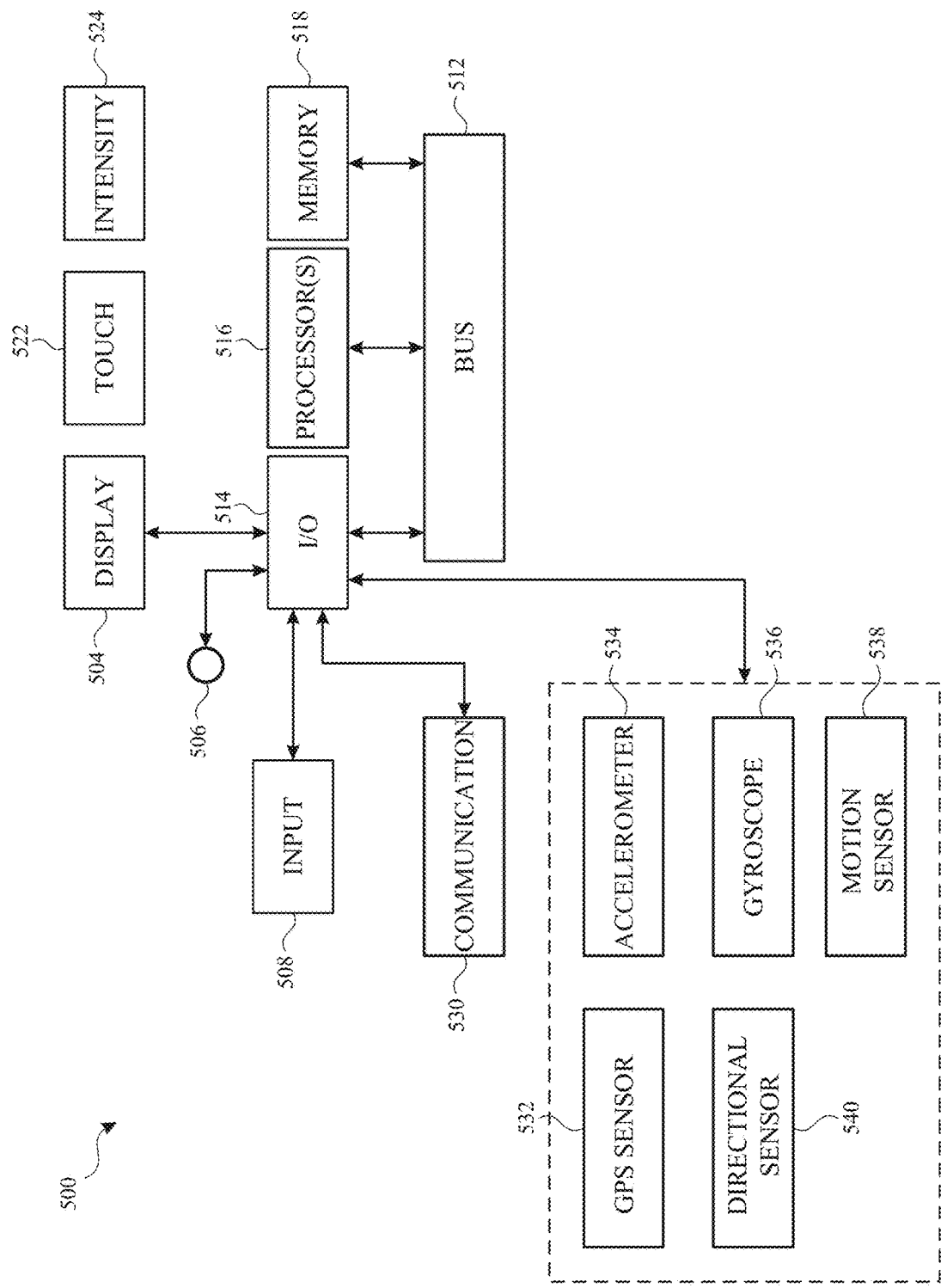
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 1000, 1300, 1600, 1900, 2100, 2300, 2600, 2900, and 3200 (FIGS. 7A-7C, 10, 13, 16, 19, 21, 23, 26, 29, and 32). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A-1B, 3, and 5A-5H). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
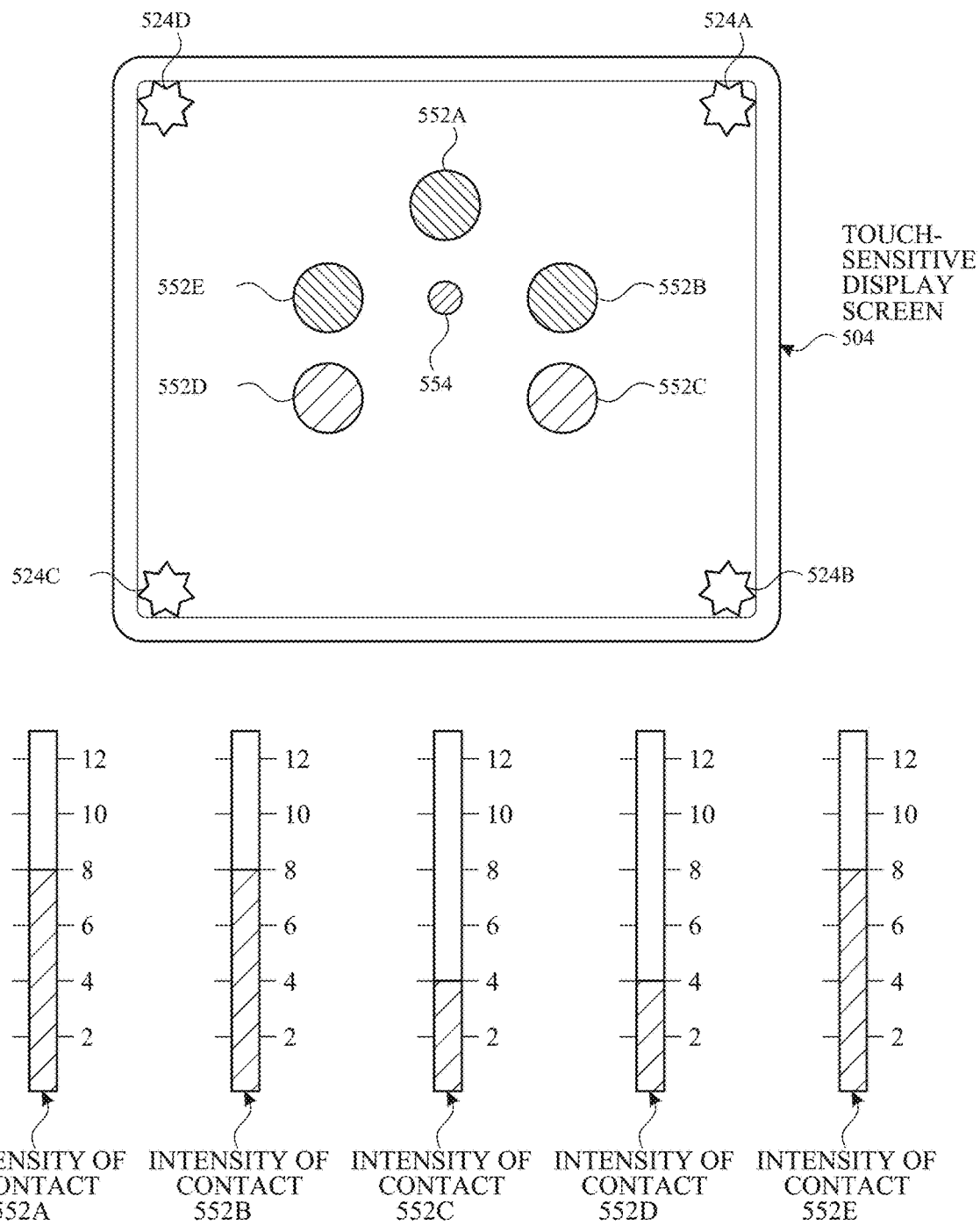

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, Ij=A·(Dj/ΣDi), where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

Figure 6A:
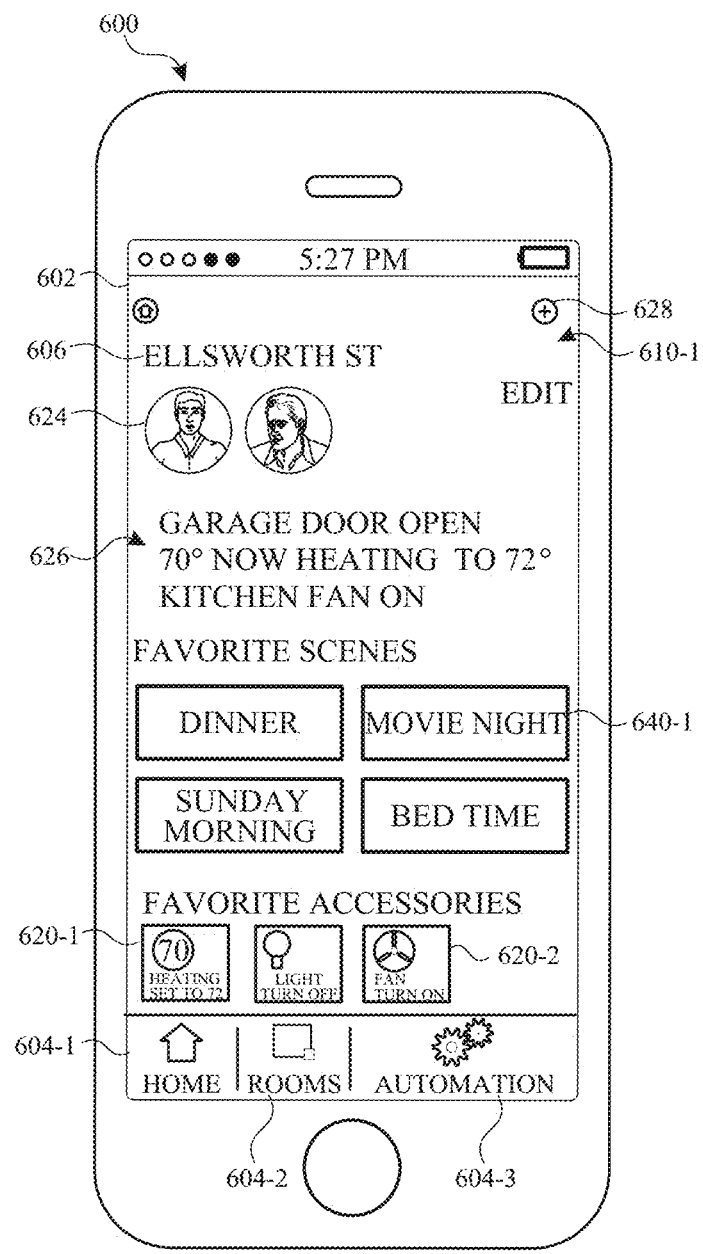
FIGS. 6A-6S illustrate exemplary user interfaces in accordance with some embodiments.
Figure 6D:
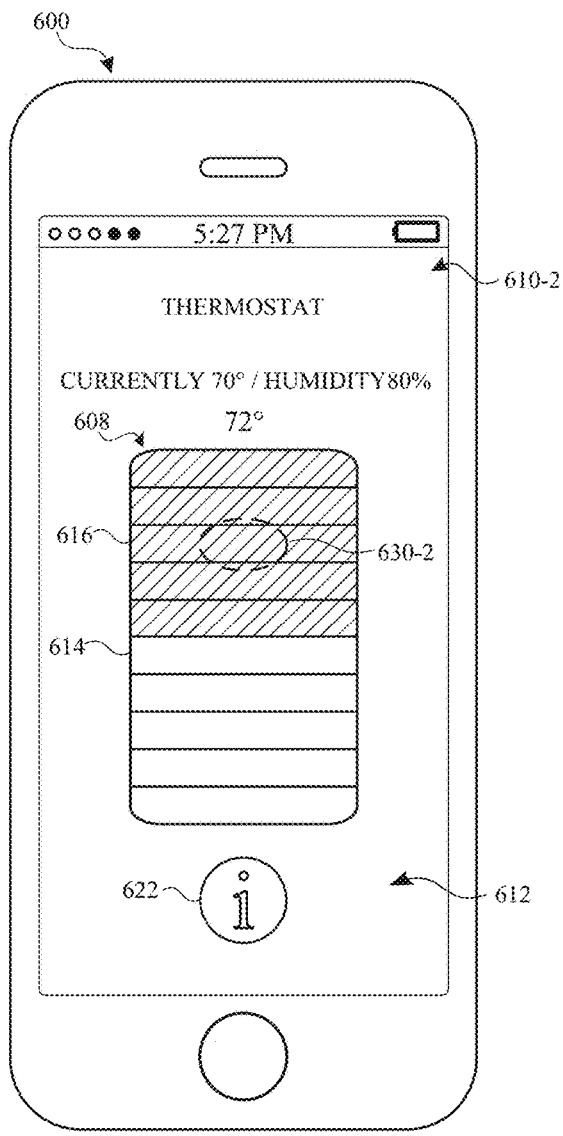
Figure 6E:
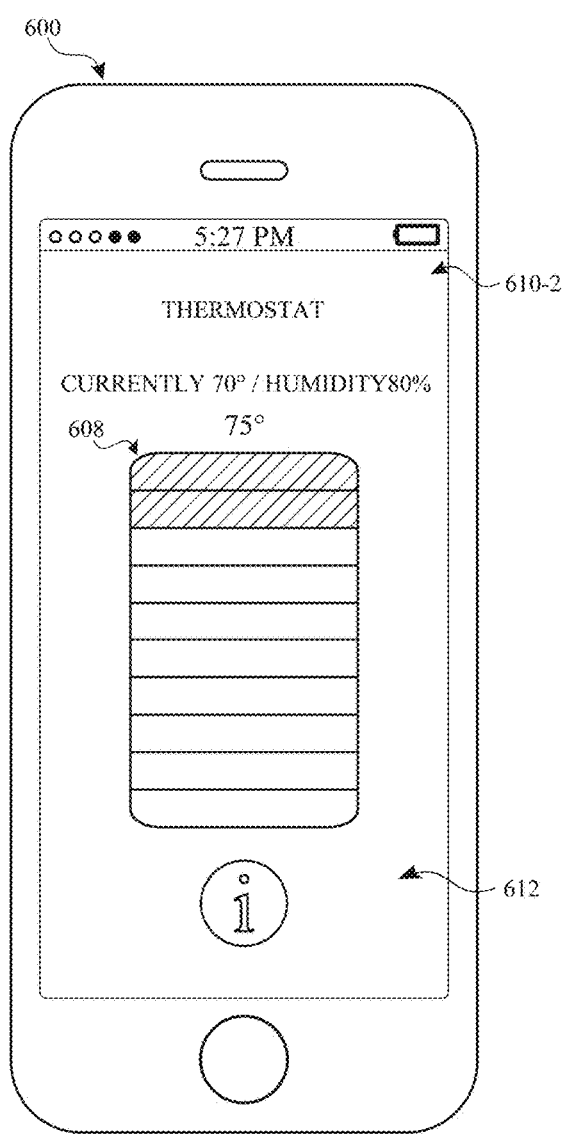
Figure 6F:
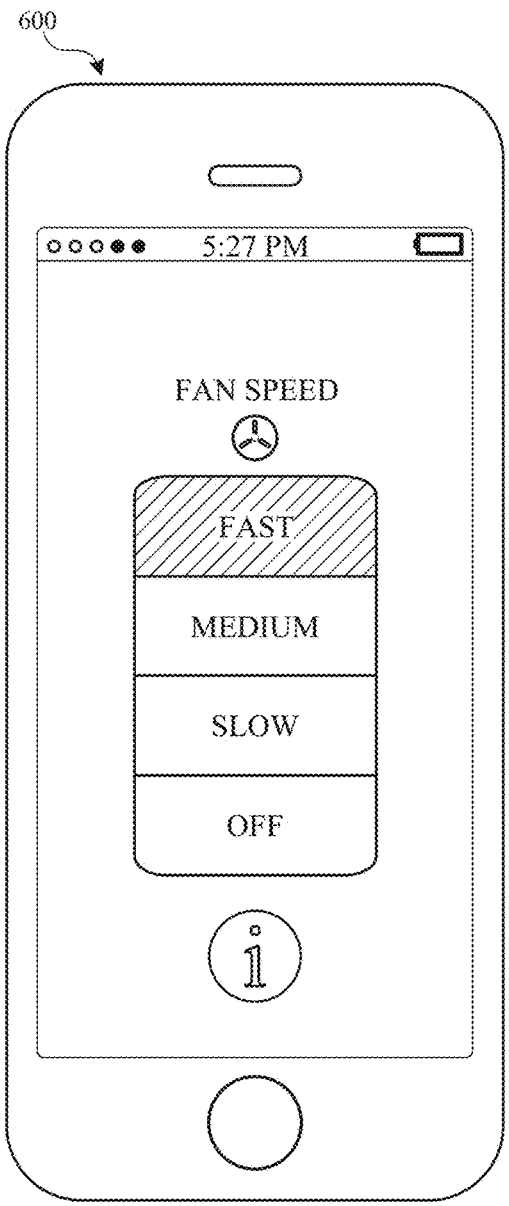
Figure 6G:
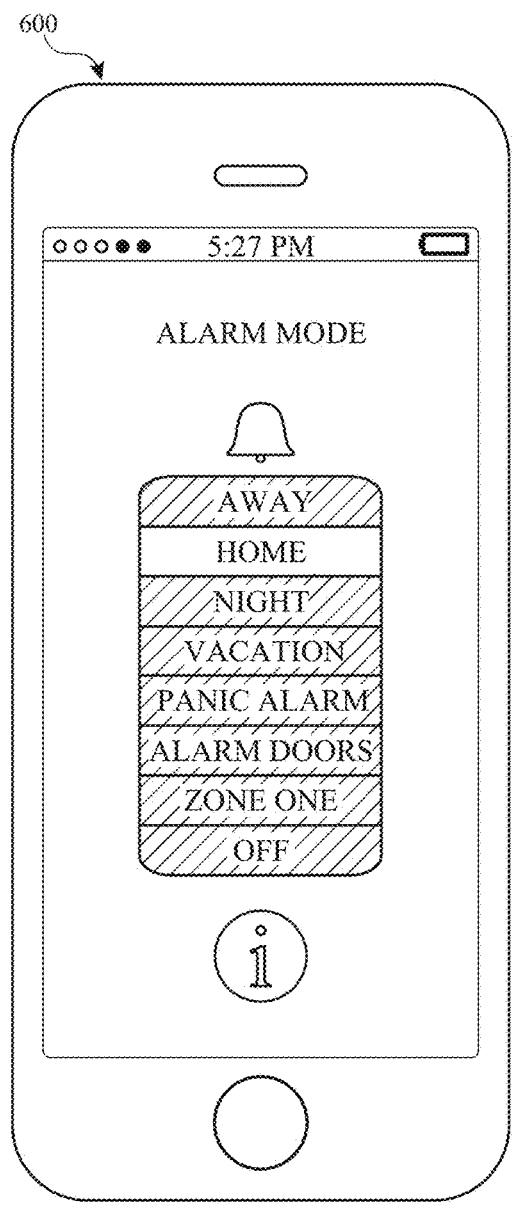
Figure 6H:
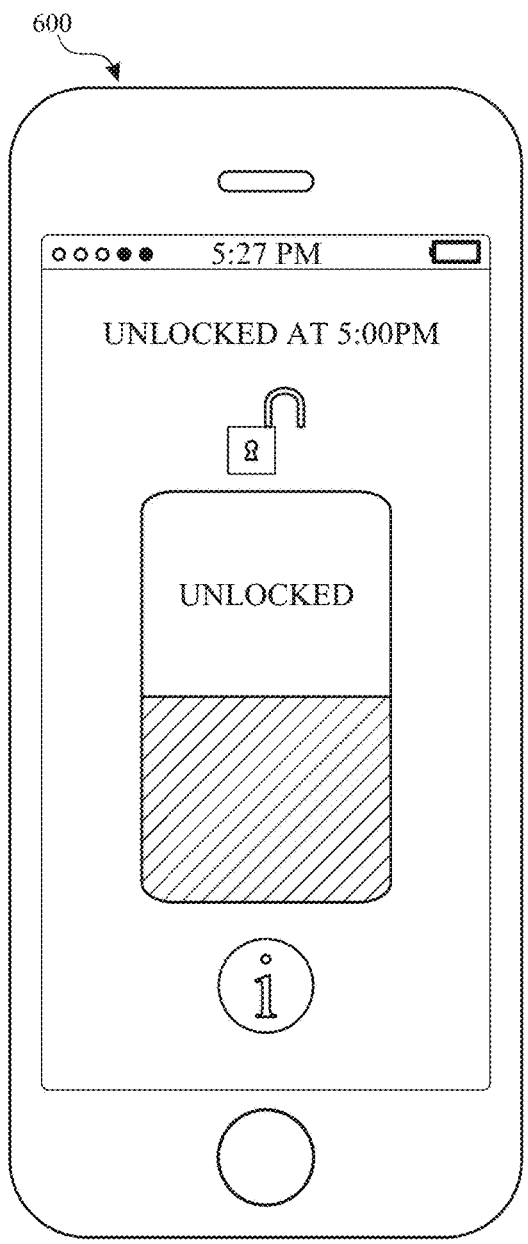
Figure 6I:
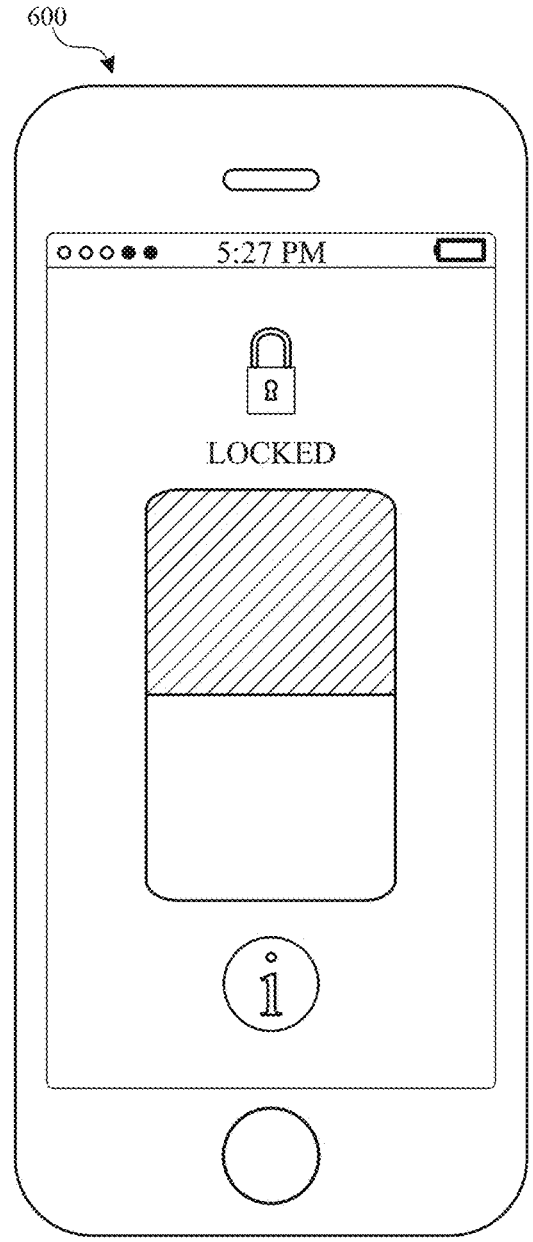
Figure 6J:
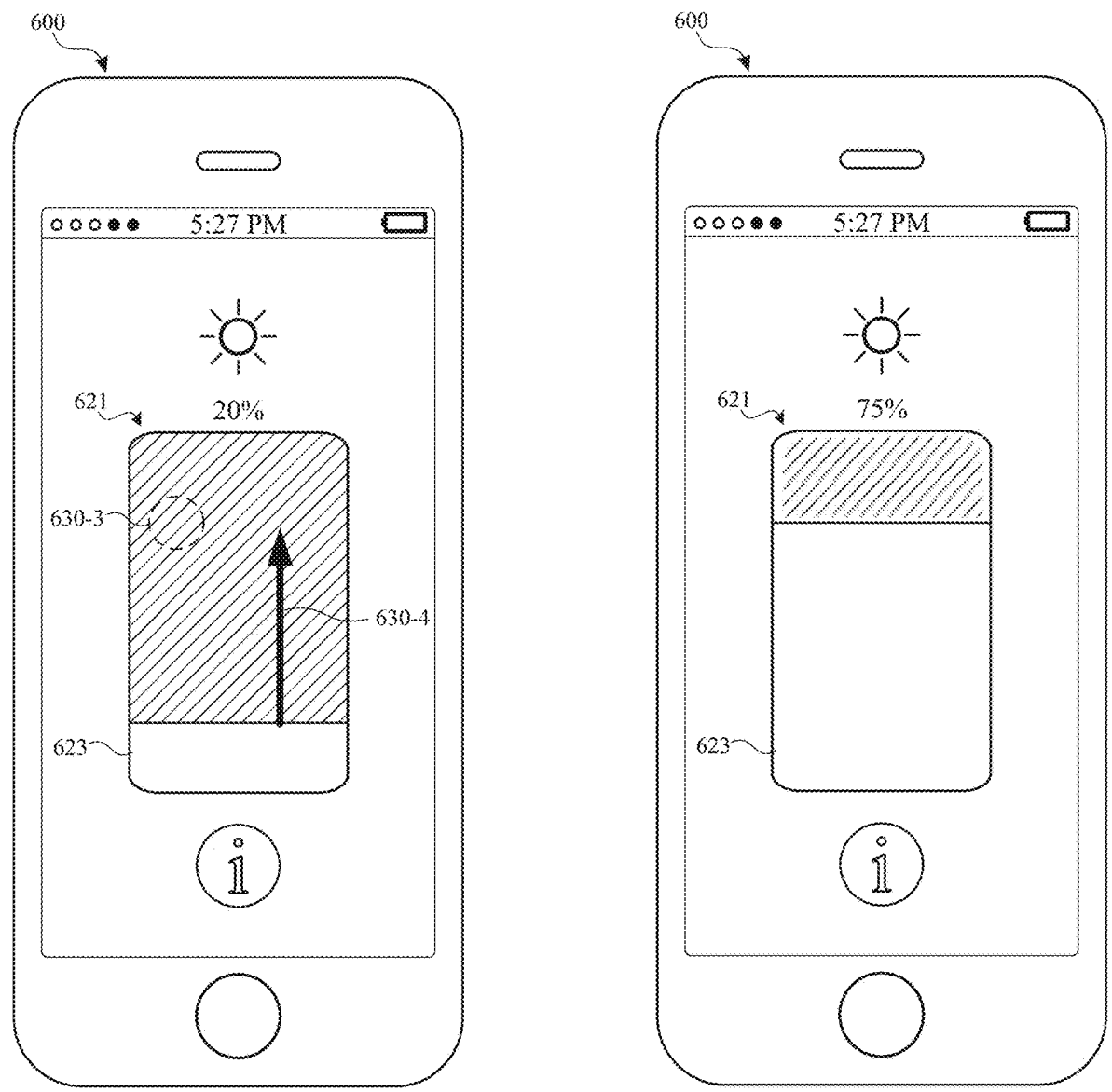
Figure 6K:
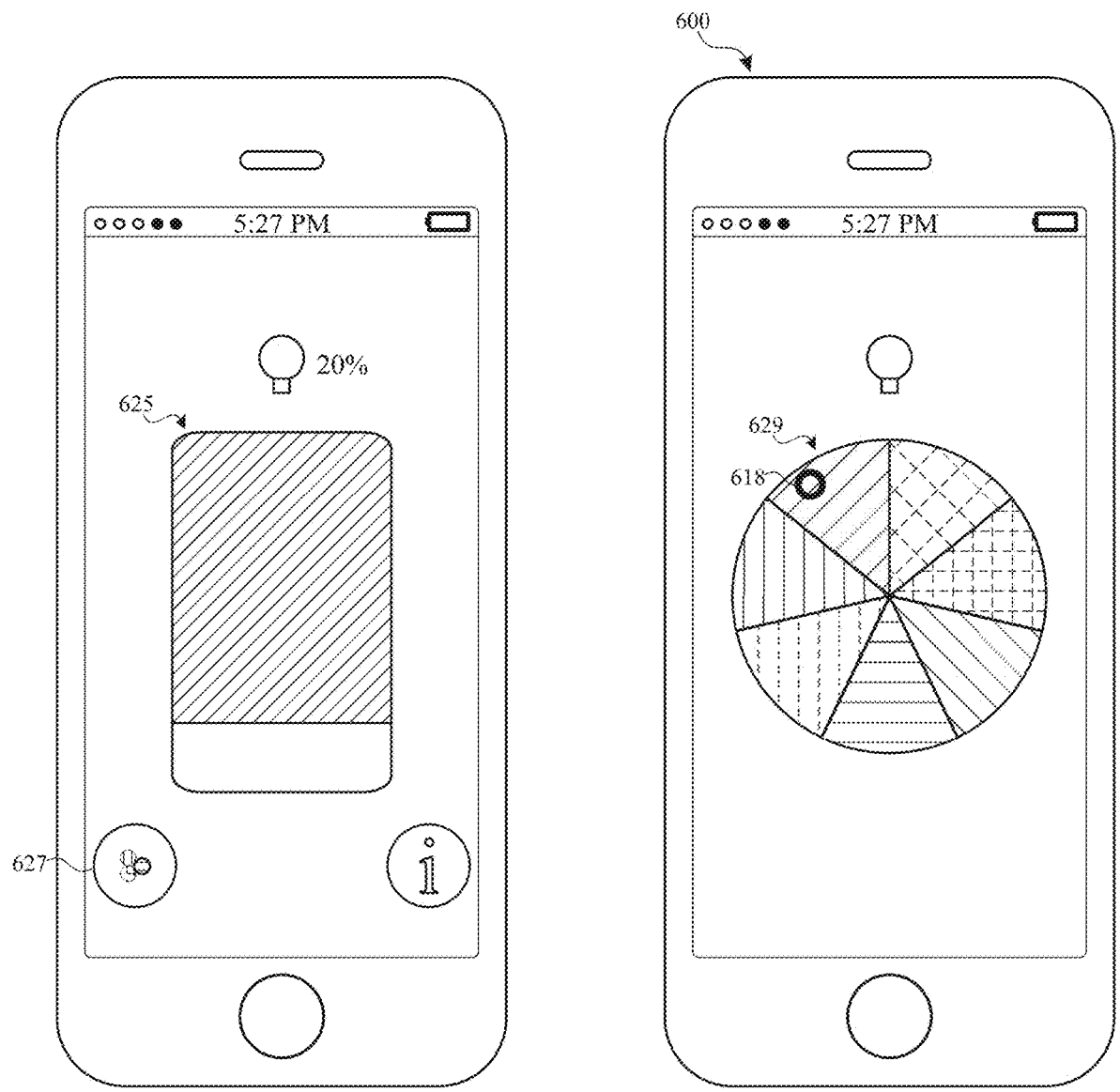
Figure 6L:
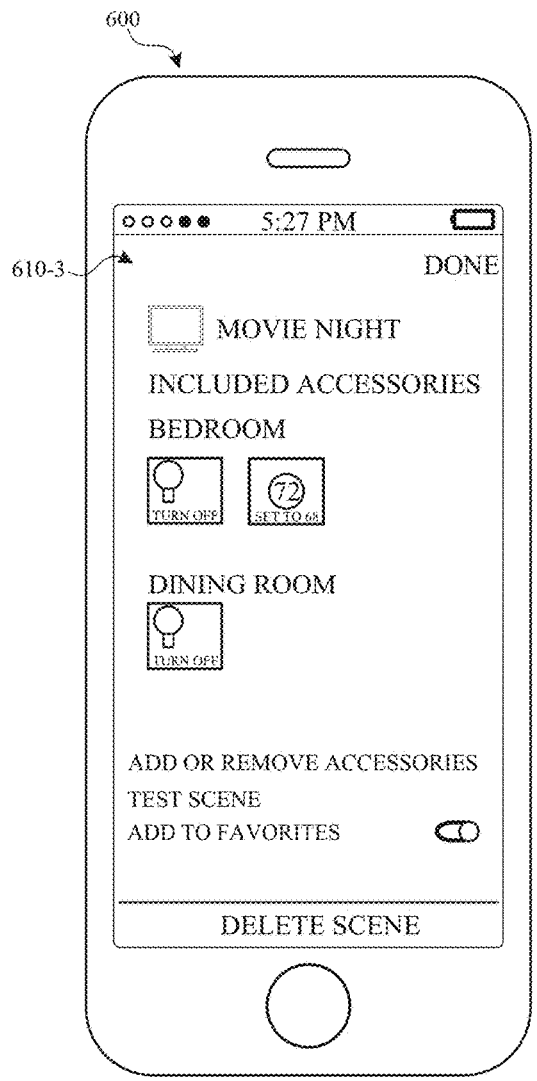
Figure 6M:
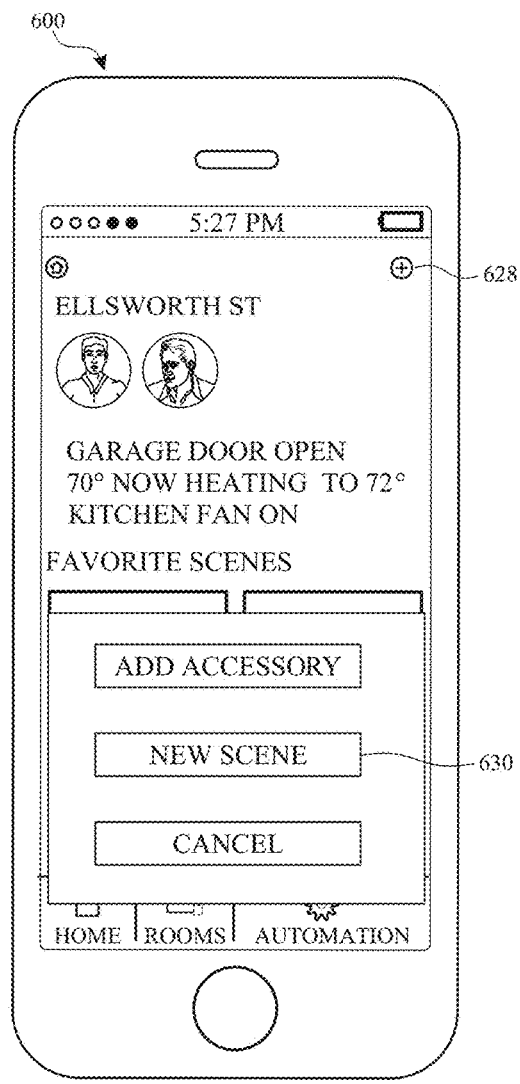
Figure 6N:
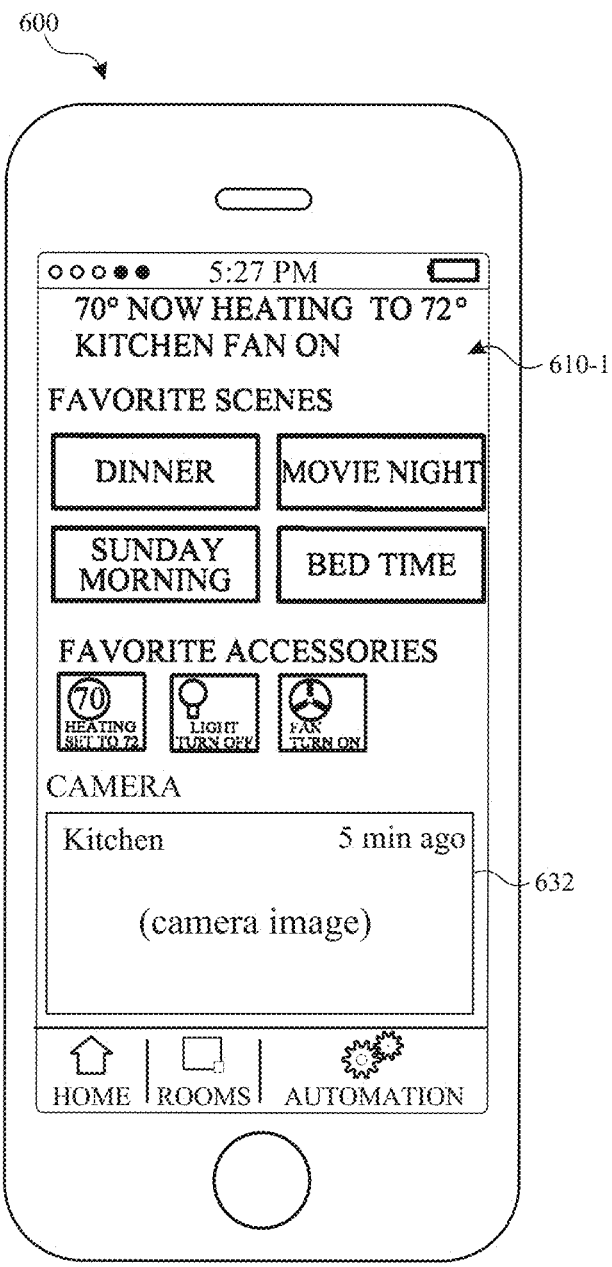
Figure 6O:
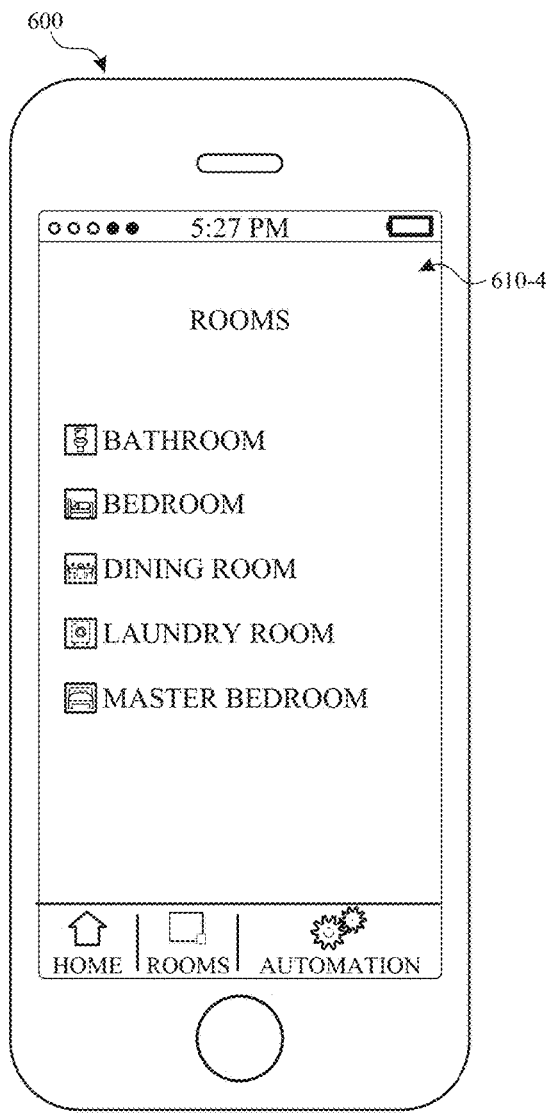
Figure 6P:
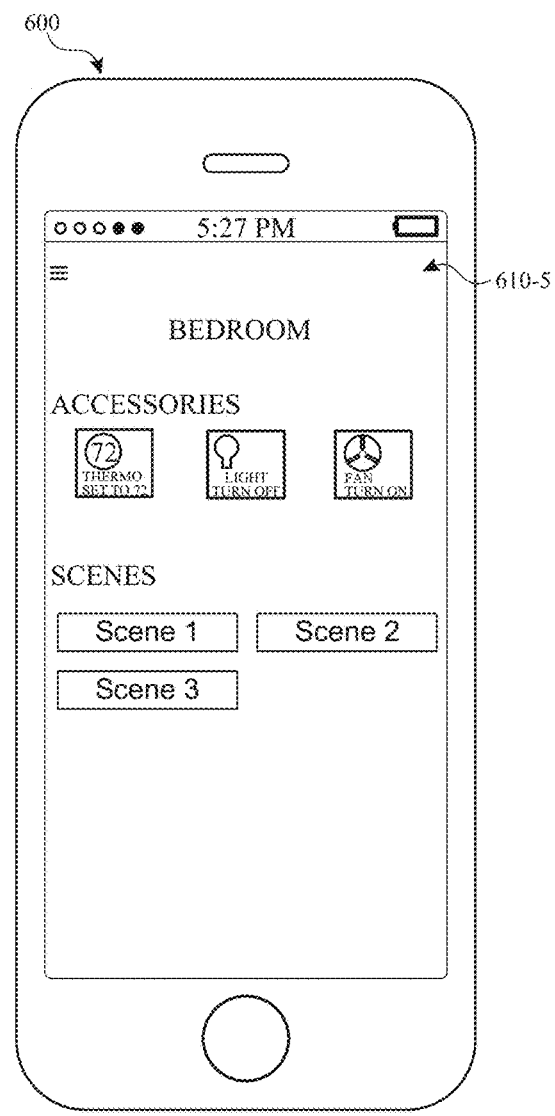
Figure 6Q:
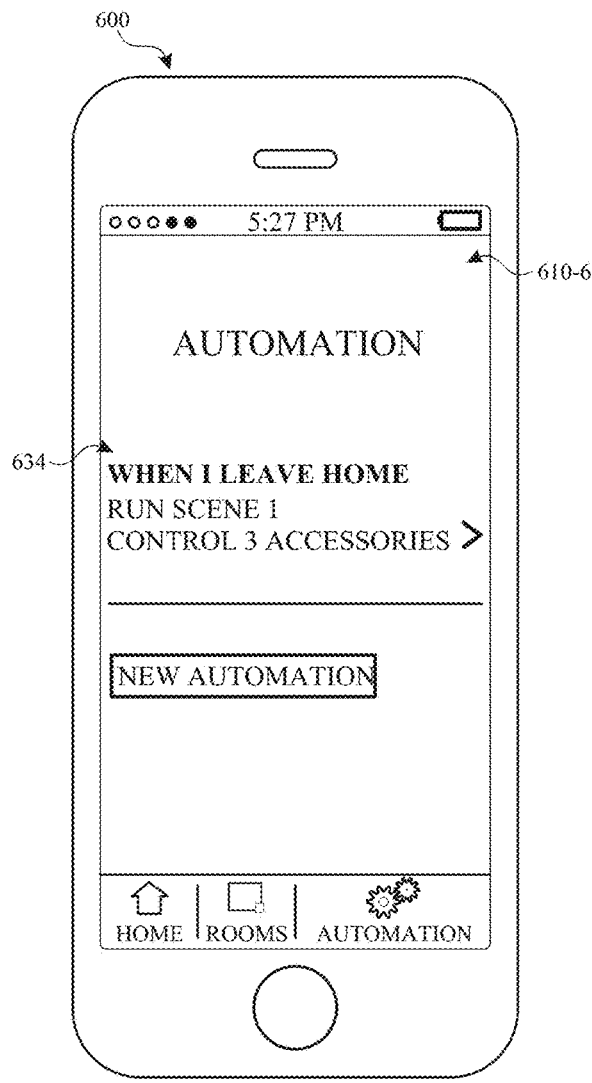
Figure 6R:
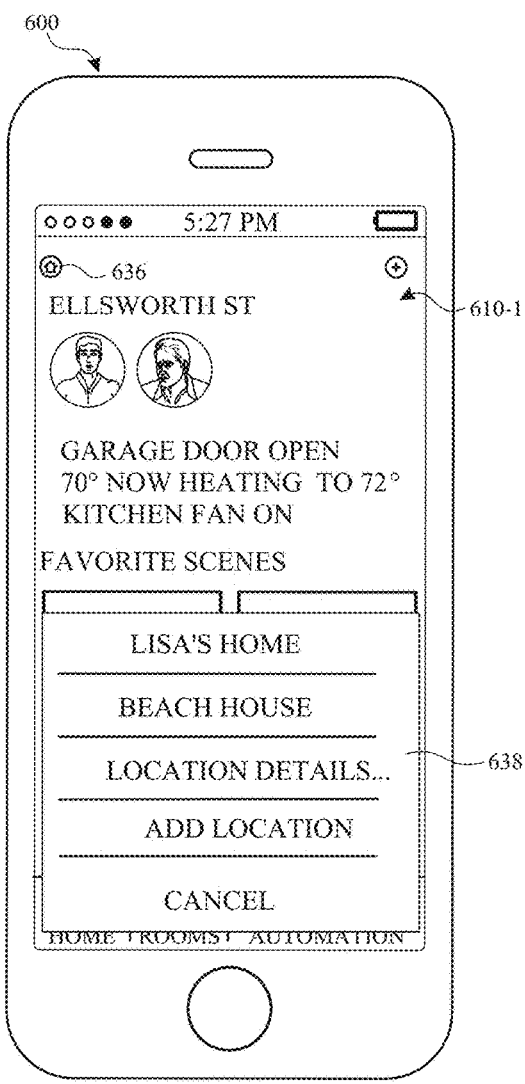
Figure 6S:
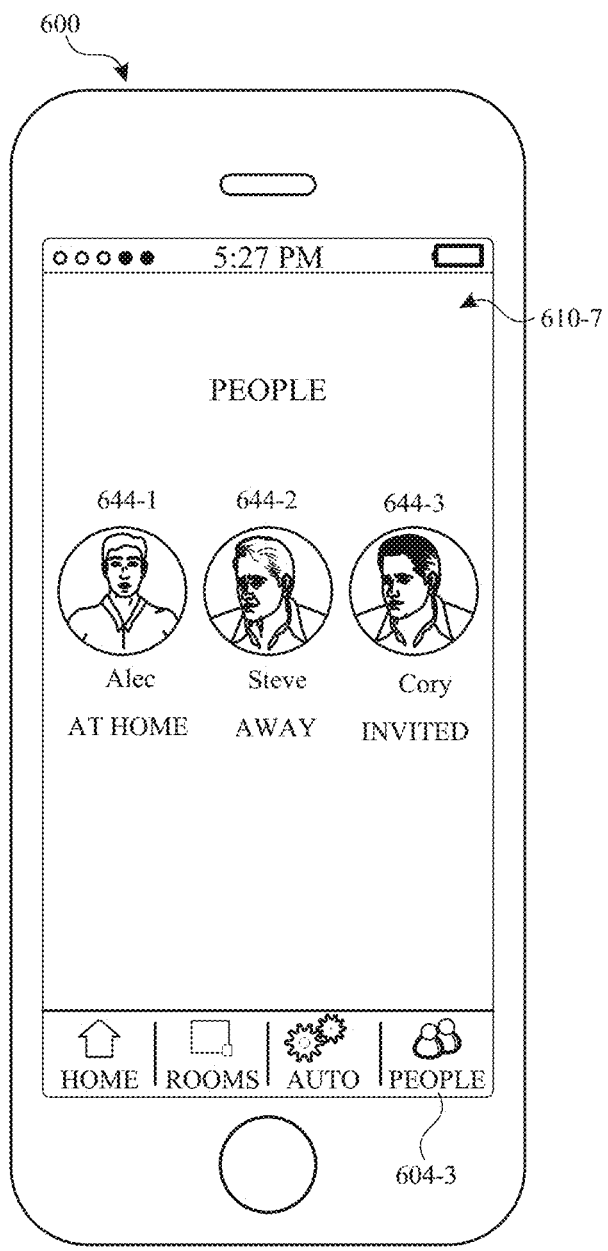

FIGS. 6A-6S illustrate exemplary user interfaces for managing controllable external devices, in accordance with some embodiments. The user interfaces in these figures are used to illustrate the processes described below, including the processes in FIGS. 7A-7C and 23.

FIG. 6A illustrates an electronic device 600 with touch-sensitive display 602. In some embodiments, device 600 includes some or all of the features of devices 100, 300, and 500, discussed above. Device 600 is configured to receive data associated with controllable external devices. Device 600 is also configured to send instructions to control controllable external devices.

In FIG. 6A, device 600 displays a user interface screen 610-1 for managing controllable external devices associated with a particular location. In some embodiments, user interface screen 610 is included in an application for managing controllable external devices associated with one or more locations. Examples of locations include, but are not limited to, an address, place, building, business, environment (e.g., backyard, automobile, porch), and so forth. In some embodiments, the location includes a plurality of designated areas within or associated with the location, such as rooms within a location. In some embodiments, a location includes an environment model with a hierarchical representation of a physical environment (e.g., a home) that can include a lowest level of objects (e.g., rooms), as described in paragraph [0017] of filed U.S. patent application Ser. No. 14/725,912 titled "Accessory management Systems Using Environment Model," filed May 29, 2015, which is incorporated by reference above.

Device 600 is configured to access a location profile for the location indicated on user interface screen 610-1. In some embodiments, the location profile is accessed from local memory on device 600 or from a remote server. A location profile includes information associated with a location, which may include, e.g., a name, address, people associated with the location, an image associated with the location (e.g., a wallpaper image), a year (e.g., when the location was built), notes, accessories associated with the location, current states of accessories at the location, automation profiles associated with the location, and scene profiles associated with the location. The terms accessory, automation profile, and scene profile are described in greater detail below.

In some embodiments, a user selects the location profile with user input (e.g., by selecting the location from a list of locations). In some embodiments, device 600 determines its position and determines a location profile based on the position of device 600. In this way, device 600 automatically presents the user with information and controls for the location corresponding to the user's current position.

User interface screen 610-1 is a Home screen corresponding to tab 604-1 and may be referred to as "Home screen 610-1". Home screen 610-1 includes an indication 606 of the location ("Ellsworth St."). In the illustrated embodiment, indication 606 includes text. In some embodiments, an indication of a location includes an image or other identifying information.

Home screen 610-1 also includes a representation 620-1 of a controllable external device at or associated with the location. A controllable external device is also called an "accessory" for purposes of this disclosure and refers to any item or device that is configured to be monitored and/or controlled by another device. In some embodiments, an accessory is configured to operate in two or more states and is remotely controllable between the two or more states. Non-limiting examples of accessories include light fixtures, thermostats, outlets, fans, appliances (e.g., TV, washer, dryer, dishwasher, coffee machine), doors (e.g., door locks), automatic door openers (e.g., garage door opener), air conditioners, furnaces, still or video cameras, smoke alarms, CO alarms, security systems and alarms, and so on. An accessory can include electronic devices that can be controlled with a special-purpose computing device or a general-purpose computing device, such as a desktop computer, laptop computer, smart phone, other mobile phone, other handheld or wearable computing device, by providing the general-purpose computing device with appropriate executable program code or instructions, as described in paragraph [0008] of filed U.S. patent application Ser. No. 14/725,912 titled "Accessory management Systems Using Environment Model," filed May 29, 2015, which is incorporated by reference above.

Representation 620-1 corresponds to a thermostat accessory and includes an indication of the current state of the thermostat. In particular, representation 620-1 indicates that the current temperature is 70 degrees and that the thermostat is heating to a set temperature of 72 degrees. In some embodiments, the representation of an accessory includes an indication of an action that selection of the representation would cause. For example, representation 620-2, which corresponds to a fan accessory, includes the text "TURN ON". This indicates that selecting the representation will turn the fan on, and also implies that the fan is currently off.

Representation 620-1 is located on Home screen 610-1 under the heading "Favorite Accessories". In some embodiments, a user can manually designate an accessory as a favorite accessory. In some embodiments, an accessory is represented as a favorite accessory based on its operation, such as how frequently it is controlled or triggered. In some embodiments, an accessory is represented as a favorite accessory based on its operation with respect to a particular device or user profile, such as how frequently it is controlled by a particular device or user associated with the particular device.

In the illustrated embodiment, representation 620-1 includes an affordance. In FIG. 6B, device 600 detects a user input 630-1 (e.g., a finger tap) on representation 620-1 corresponding to a selection of the thermostat accessory. At the time of user input 630-1, the thermostat accessory is in a first state of heading to 72 degrees. In some embodiments, device 600 sends instructions to set the thermostat accessory to a second state in response to user input 630-1.

In some embodiments, device 600 determines a duration of the user input 630-1 (e.g., the duration of a contact on touch-sensitive display 602). In some embodiments, device 600 determines a characteristic intensity of the user input (e.g., a characteristic intensity of a contact on touch-sensitive display 602). Device 600 determines whether user input 630-1 meets input criteria. In some embodiments, the input criteria include whether the duration of the user input exceeds a predetermined amount of time and/or whether the characteristic intensity of the user input exceeds a predetermined intensity.

In accordance with a determination that user input 630-1 does not meet the input criteria, device 600 sends instructions to set the state of the thermostat accessory to a second state. In some embodiments, the representation of an accessory includes an indication of the state to which the accessory will be set in response to user input that does not meet the input criteria. For example, representation 620-2 in FIG. 6A indicates that a fan accessory can be turned ON by selecting representation 620-2.

FIG. 6C illustrates an exemplary response when user input 630-1 does not meet the input criteria. As indicated in FIG. 6C, device 600 sends instructions to turn off the thermostat and updates representation 620-1 to indicate an OFF status. In some embodiments, device 600 outputs a haptic to indicate that the state has been changed.

Optionally, in accordance with a determination that user input 630-1 does not meet the input criteria, device 600 sends instructions to switch the state of an accessory from a first of two predetermined states to the second of the two predetermined states (e.g., ON/OFF, open/closed, locked/unlocked). In one example of this technique, in response to another user input identical to user input 630-1, device 600 sends instructions to set the thermostat back on to its previous state (e.g., Heating, Set to 72 degrees). In this way, a user can provide relatively short or light taps to quickly toggle the state of an accessory between two predetermined states. In some embodiments, in accordance with a determination that user input does not meet the input criteria, device 600 sends instructions to switch the state to an adjacent state in a predetermined sequence of states (e.g., OFF→LOW→HIGH→OFF). In this way, a user can easily cycle though a sequence of states.

Alternatively, in accordance with a determination that user input 630-1 meets the input criteria, device 600 displays a control affordance indicating the available states of the accessory. FIG. 6D illustrates an exemplary user interface screen 610-2 with control affordance 608 indicating the current state of the accessory (set to 72 degrees) and available states of the accessory. User interface screen 610-2 also includes affordance 622 that, when selected, displays information about the corresponding accessory and, optionally, displays affordances for changing the information associated with the accessory. Information associated with the accessory optionally includes name, room, type, manufacturer, and a representative icon. Optionally, user interface screen 610-2 is partially translucent such that Home screen 610-1 is partly visible.

With respect to control affordance 698, the horizontal bars on control affordance 608 represent temperatures to which the thermostat can be set, e.g., in one degree increments. In response to detecting user input on control affordance 608 corresponding to selection of a particular state, device 600 sends instructions to set the state of the accessory to the selected state. In this way, a user can interact with control affordance 608 to select a state that is not available in response to a user input that does not meet the input criteria or to go directly to a state that is not adjacent to the current state. In FIG. 6D, device 600 detects user input 630-2 (e.g., a tap), and in response, sets the thermostat to 75 degrees.

Optionally, the thermostat can be changed to 75 degrees by a vertical swipe from bar 614 to bar 616 on control affordance 608.

Optionally, in response to detecting user input 631-2 on control affordance 608 corresponding to selection of a particular state, the device updates the visual appearance of control affordance 608 to indicate that the accessory is set to the selected state, as shown for example in FIG. 6E. Optionally, device 600 ceases to display control affordance 608 in response to selection of a state (e.g., device 600 returns to user interface screen 610-1). In some embodiments, device 600 ceases to display control affordance 608 in response to detecting user input corresponding to selection of a location on the touch-sensitive display 602 that does not correspond to the control affordance 608 (e.g., area 612).

In some embodiments, device 600 updates the appearance of control affordance 608 to indicate the selected state but does not send instructions to set the state of the accessory until further user input is detected. In some embodiments, device 600 sends instructions to set the accessory to the selected state in response to selection of another affordance (e.g., a "Set" or "Done" affordance) or an input on the touch-sensitive display 602 located outside of the responsive area of the control affordance 608 (e.g., area 612).

Control affordance 608 is an example of a control affordance for an accessory that operates in discrete states (e.g., a digital thermostat that is adjustable in increments of one degree). FIGS. 6F-6I illustrates other examples of control affordances for accessories that operate in discrete states. More specifically, FIG. 6F illustrates an exemplary control affordance for a fan accessory that can operate in four discrete states; FIG. 6G illustrates an exemplary control affordance for a home security system that can operate in various discrete alarm modes; and FIGS. 6H-6I illustrate an exemplary control affordance for a door or other lockable accessory with two discrete states. In some embodiments, device 600 displays the time at which the current state of an accessory was set, as shown in the example of FIG. 6H (e.g., Unlocked at 5:00 PM).

In some embodiments, the available states of an accessory are continuous. FIG. 6J illustrates an exemplary control affordance 621 for a dimmable light switch that can operate over a continuous range of brightness. In some embodiments, a particular state is selected by, e.g., either tapping a corresponding position on affordance 621 (as indicated by element 630-3) or vertically dragging the top of bar 623 until the desired state is obtained (as indicated by arrow 630-4).

In some embodiments, the accessory is a color-adjustable light bulb that is configured to operate in different color states. The left side of FIG. 6K illustrates a control affordance 625 for a color-adjustable light bulb similar to control affordance 621 in FIG. 6J. But an affordance 627 is also displayed. Selection of affordance 627 provides the control affordance 629 for selecting the operating color of the color-adjustable light bulb, as illustrated on the right side of FIG. 6K. Marker 618 indicates the current color of the bulb. In some embodiments, touching a position on control affordance 629 selects a different color.

In some embodiments, a relationship exists between two or more accessories such that when one accessory is controlled or operated, another related accessory is controlled. In some embodiments, in response to device 600 sending instructions to change the state of a first accessory, a related second accessory is automatically controlled in addition to the first accessory. For example, an instruction to operate a camera on the front porch of a location automatically turns on a microphone and/or speaker on the porch. In some embodiments, in response to a first accessory being activated, a related second accessory is automatically controlled. For example, when a visitor rings a doorbell at the front door, a front door lock, porch camera, and intercom system associated with the front porch are automatically operated (e.g., set to designated state).

In some embodiments, when an accessory is activated, device 600 displays a notification indicating that the accessory has been activated. In some embodiments, the notification includes information regarding accessories related to the activated accessory and/or affordances for controlling accessories related to the activated accessory. In one example, when the doorbell is rung, device 600 displays a notification including an image captured by a camera on the front porch and affordances to activate an intercom system at the front door, unlock the front door, and turn on a porch light. Exemplary embodiments of notifications corresponding to this example are described in greater detail below with reference to FIGS. 34I-34K.

In some embodiments, the relationship between accessories is designated by the user (e.g., by user input) to explicitly tie the functions of two or more devices together—either triggering each to function together when one is triggered manually or through an automatic trigger (e.g., time of day, sensor, etc.). In some embodiments, the relationship is established automatically based on the positions of the accessories within a location (e.g., a relationship is automatically established between certain accessories because they are associated with a common area or room of a location). Similarly, the devices that are associated based on location function together when one is triggered manually or through an automatic trigger (e.g., time of day, sensor, etc.).

In some embodiments, a relationship between accessories is establishes based on the type of accessory. In one example, a television, sound bar, AppleTV, and a home theater amplifier are automatically related because they are associated with an entertainment system. In this example, selection of an affordance to turn off the television optionally causes the other accessories (sound bar, AppleTV, and home theater amplifier) to be powered off. In some embodiments, device 600 displays an affordance, that may be automatically generated by the system, representing a group of accessories having the same type. Referring again to the entertainment system example, device 600 optionally displays an affordance labeled "Entertainment System" that controls all of the accessories of the system listed above.

Referring back to FIG. 6A, Home screen 610-1 also includes a representation 624 of a person (e.g., a personal contact, friend, family member) associated with the location. In some embodiments, device 600 receives data indicating that a remote electronic device (e.g., a smartphone, tablet) associated with the person is present at the location. In some embodiments, representation 624 is displayed on Home screen 610-1 in response to receiving the data indicating that the remote electronic device is present at the location. In the illustrated embodiment, representation 624 includes an image of the person. In some embodiments, the representation includes the person's name, initials, a designated image associated with the person, or other text, image, video, or the like that is associated with the person. In some embodiments, a person associated with a device that is not present at the location or that has an unknown position (e.g., away or inactive) are not represented on Home screen 610-1. In some embodiments, Home screen 610-1 includes one or more representations of persons who are determined not to be present at the location.

In some embodiments, Home screen 610-1 includes an indication of the status or position of the person. In some embodiments, the status or position is relative to the location. For example, in some embodiments, Home screen 610-1 includes an indication of whether the person is determined to be present at the location or away from the location or whether the status of the person is determined to be unknown or inactive. In some embodiments, a status of away or unknown is indicated by shading or greying out the representation of the person. In some embodiments, the status of the person is determined based on the location of a device associated with the person. The status optionally also indicates whether the person has been invited to be associated with the location for the purposes of accessing information about location.

Home screen 610-1 also includes an indication 626 of a status of the location. In some embodiments, the status includes an overall assessment of the location (e.g., "All safe and sound"). In the embodiment shown in FIG. 6A, indication 626 includes the status of accessories associated with the location (e.g., Garage door open; thermostat at 70 degrees now heating to 72 degrees; kitchen fan ON). In some embodiments, the status of an accessory is categorized (e.g., as Urgent, Attention, or Non-critical) and displayed based on criticality with more critical status displayed above less critical status. Examples of an Urgent status can include activation of a security alarm, smoke detector, CO detector, or an indication that a hub that provides the status of an accessory is not working. Examples of an Attention status can include an open or unlocked door or window or that an accessory is disconnected or unavailable. Examples of non-critical status can include that a light is on and the state of a thermostat.

Home screen 610-1 also includes a representation 640-1 of a scene profile. A scene profile includes data regarding designated states of one or more accessories at the location. A scene profile may also be referred to simply as a "scene." In FIG. 6A, the scene profile corresponding to representation 640-1 is designated as a "Favorite Scene". In some embodiments, a scene profile is designated based on one or more of the following: (1) a user input explicitly designating the scene profile, (2) the frequency with which the scene profile is applied, (3) how recently the scene profile was applied, and (4) how frequently or recently accessories associated with the scene profile have been selected, controlled, or triggered. Similar to designated accessories described above, in some embodiments, a scene profile is designated based on actions taken by a particular device or user associated with a device (e.g., which scene profiles are frequently selected by a user).

In the embodiment of FIG. 6A, representation 640-1 includes an affordance. In some embodiments, in response to detecting user input corresponding to selection of representation 640-1, device 600 sends instructions to apply the designated states of the accessories included in the corresponding scene profile. In some embodiments, in response to detecting user input corresponding to selection representation 640-1 of a scene profile, device 600 displays user interface screen 610-3 shown in FIG. 6L, which includes representations of the accessories associated with the scene profile. The representations of the plurality of accessories in user interface screen 610-3 include indications of the designated states of the respective accessories (e.g., the state to which the accessory is set when the scene profile is implemented). In some embodiments, the indication of the designated state includes the action to be taken when the scene profile is implements (e.g., turn off).

Home screen 610-1 also includes affordance 628. In response to detecting user input on affordance 628, device 600 displays an option 630 to create an additional scene profile, as shown for example in FIG. 6M. In some embodiments, device 600 displays the option to create an additional scene profile in response to other types of user input.

In some embodiments, Home screen 610-1 includes an image captured by a controllable external camera the location. In the embodiment shown in FIG. 6N, Home screen 610-1 is scrollable and is scrolled by known techniques to reveal area 632 for display of an image included in a live video feed from a controllable external camera in the kitchen of the location. In some embodiments, the image is from a single point in time. In some embodiments, the image is a live video feed. In some embodiments, the image is a single image that can be selected (e.g., tapped) to display a live video feed from the controllable external camera. In some embodiments, one or more affordances or camera images may be off screen and may be displayed with an input, such as a button or scrolling gesture such as a swipe. In some embodiments, displaying the one or more affordances or camera images that were initially off screen displaces one or more affordances such that they are no longer displayed.

Device 600 also displays a Rooms tab 604-2. In response to detecting user input (e.g., a tap) on Rooms tab 604-2, device 600 displays a representation of at least one room associated with the location, as shown, for example, on user interface screen 610-4 in FIG. 6O. In the embodiment of FIG. 6O, the representations of the rooms include images associated with the corresponding rooms. In response to detecting user input selecting a room on user interface 610-4, device 600 displays representations of accessories associated with the selected room and, optionally, representations of scene profiles including accessories associated with the selected room. FIG. 6P illustrates an exemplary user interface screen 610-5 corresponding to the Bedroom with representations of accessories and scene profiles associated with the Bedroom. In some embodiments, the representations of the accessories indicate the current states of the accessories. In some embodiments, an image associated with the room is displayed as wallpaper on user interface screen 610-5 behind the representations of the accessories. In some embodiments, the representations of the accessories associated with the selected room are affordances for controlling the accessories or accessing user interface screens for controlling the corresponding accessories as described above with reference to representation 620-1 and FIGS. 6B-6K.

User interface screen 610-1 also includes an Automation tab 604-3. In response to detecting user input on Automation tab 604-3, device 600 displays a representation of an automation profile and/or an option to create an automation profile. An automation profile includes data representing criteria for controlling a state of at least one accessory at a location and designated states for the at least one accessory. In other words, an automation profile includes the states to which selected accessories are set when the criteria of the automation profile is met. An "automation profile" may be referred to simply as an "automation". Setting the accessories associated with the automation profile to the designated states in response to determining that the criteria of the automation profile is met is sometimes referred to as implementing the automation profile. An automation profile can include data for a scene profile, which also includes data regarding a state of an accessory.

FIG. 6Q illustrates an exemplary user interface screen 610-6 displayed in response to detecting user input on Automation tab 604-3. User interface screen 610-6 includes representation 634 of an automation profile named "When I leave home" associated with the location. Representation 634 also includes an indication of the scenes and/or accessories associated with the automation profile, "Run Scene 1" and "Control 3 accessories". In some embodiments, the name of the automation profile is indicative of the criteria of the automation profile. In some embodiments, the representation of the automation profile includes an affordance that when selected displays representations of the accessories and/or scene profiles associated with the automation profile. In some embodiments, the representation of an accessory associated with an automation profile includes an affordance that when selected changes the designated state of the accessory for the automation profile or provides a user interface for selecting a designated state of the accessory for the automation profile. In some embodiments, the designated state of an accessory associated with an automation profile is selected by applying the techniques described with respect to FIGS. 6B-6K.

Device 600 also provides the ability to view information associated with a different location and/or create a location profile for an additional location. In the embodiment shown in FIG. 6R, device 600 detects user input on affordance 636 included on Home screen 610-1. In response to detecting selection of affordance 636, device 600 displays menu 638, which provides options to view information associated with a different location (e.g., Lisa's Home or Beach House) and add an additional location (e.g., Add Location). Device 600 also provides an option (e.g., Location Details . . . ) to view and or change profile information associated with the location, such as the location profile information described above.

Device 600 also provides the ability to add an accessory associated with the location. Referring again to FIG. 6M, device 600 detects user input on affordance 628 included on Home screen 610-1, and in response, displays option 642 to associate an accessory with the location.

In some embodiments, device 600 displays a People tab 604-4, as shown in FIG. 6S. In response to detecting a user input on People tab 604-4, device 600 displays representations of people associated with the location. In the illustrated embodiments, the representations 644-1, 644-2, and 644-3 of the people are displayed on user interface screen 610-7. In the illustrated embodiment, the representations of the people include images of the people. In some embodiments, the representations include the person's name, initials, a designated image associated with the person, or other text, image, video, or the like that is associated with the person. In some embodiments, user interface screen 610-7 includes representation of all the people associated with the location. In some embodiments, people with a status indicating that they are not present at the location or that their position is unknown (e.g., away, inactive, etc.) are not displayed (e.g., only representations of people determined to be present at the location are displayed). In some embodiments, one or more representations of persons who are determined not to be present at the location are displayed.

In FIG. 6S, user interface screen 610-7 includes indications of the status or position of the people. In some embodiments, the status or position is relative to the location. For example, in some embodiments, an indication of whether the person is determined to be present at the location or away from the location or whether the status of the person is determined to be unknown or inactive is displayed. In some embodiments, the status of the person is determined based on the location of a device associated with the person. In some embodiments, speaker identification using one or more microphones may be used to determine the presence and identity of an individual. The status may also indicate whether the person has been invited to be associated with the location for the purposes of accessing information about location (e.g., Invited).

Figure 7A:
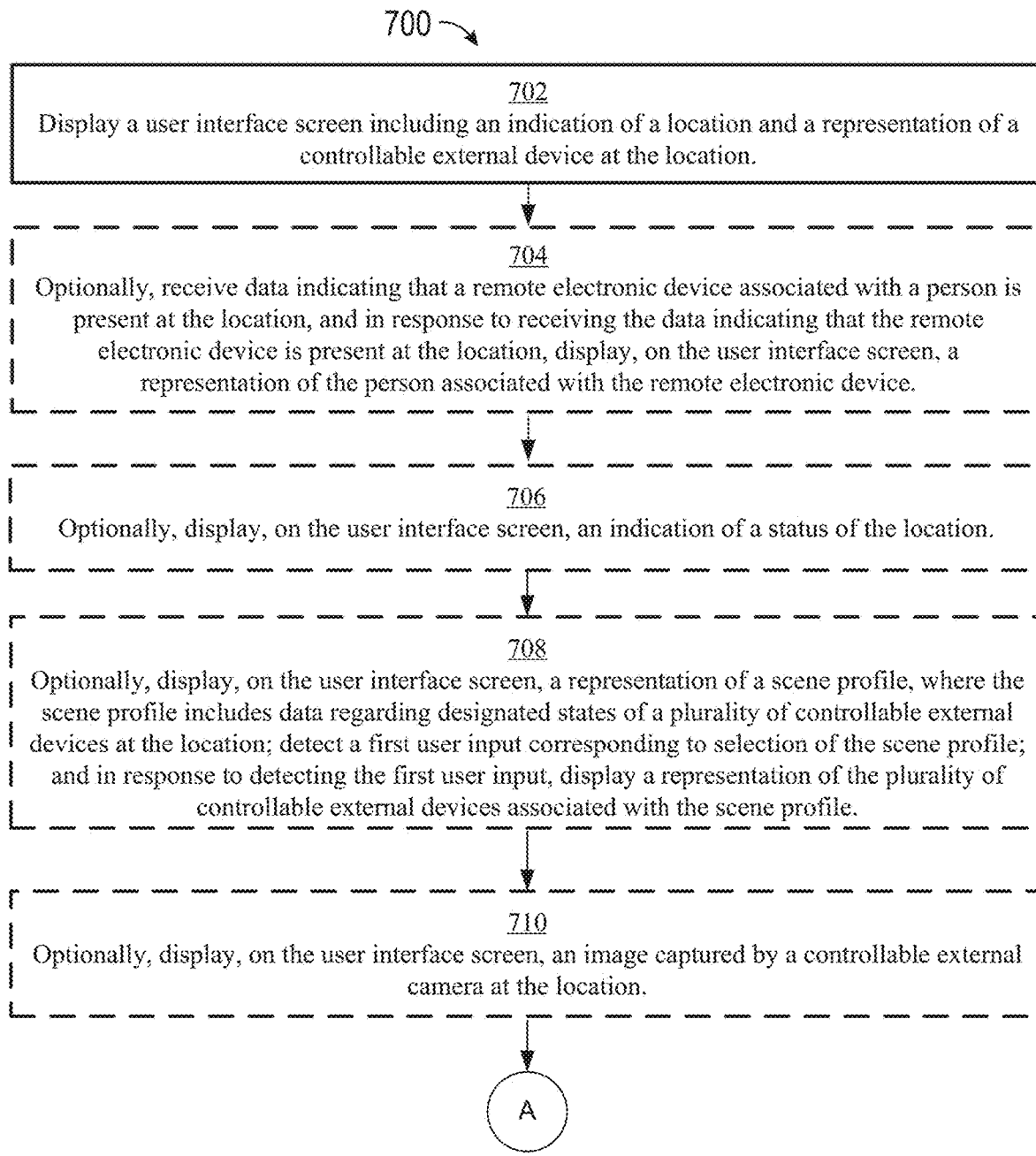
FIGS. 7A-7C are flow diagrams illustrating a process for managing controllable external devices in accordance with some embodiments.
Figure 7B:
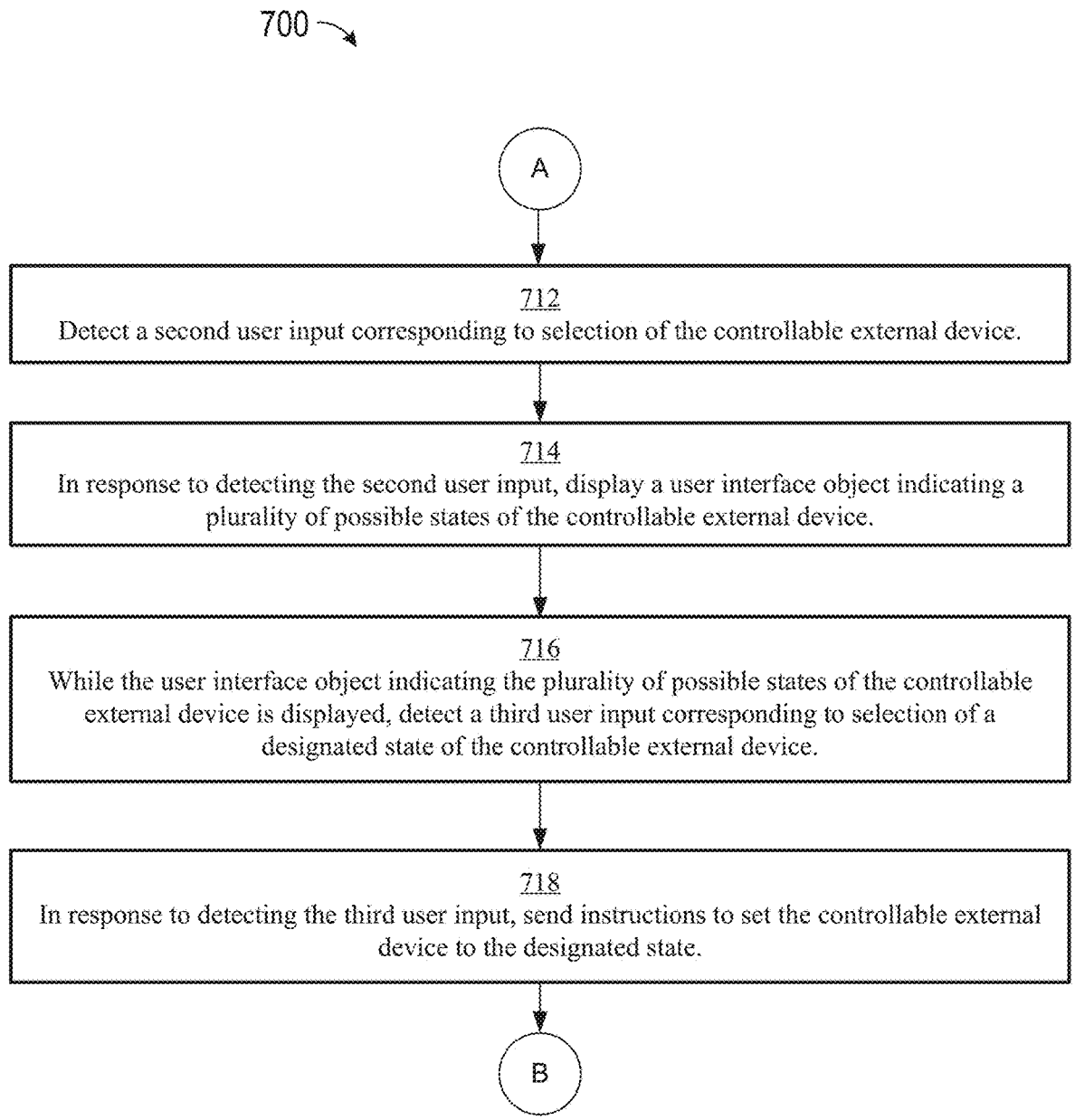
Figure 7C:
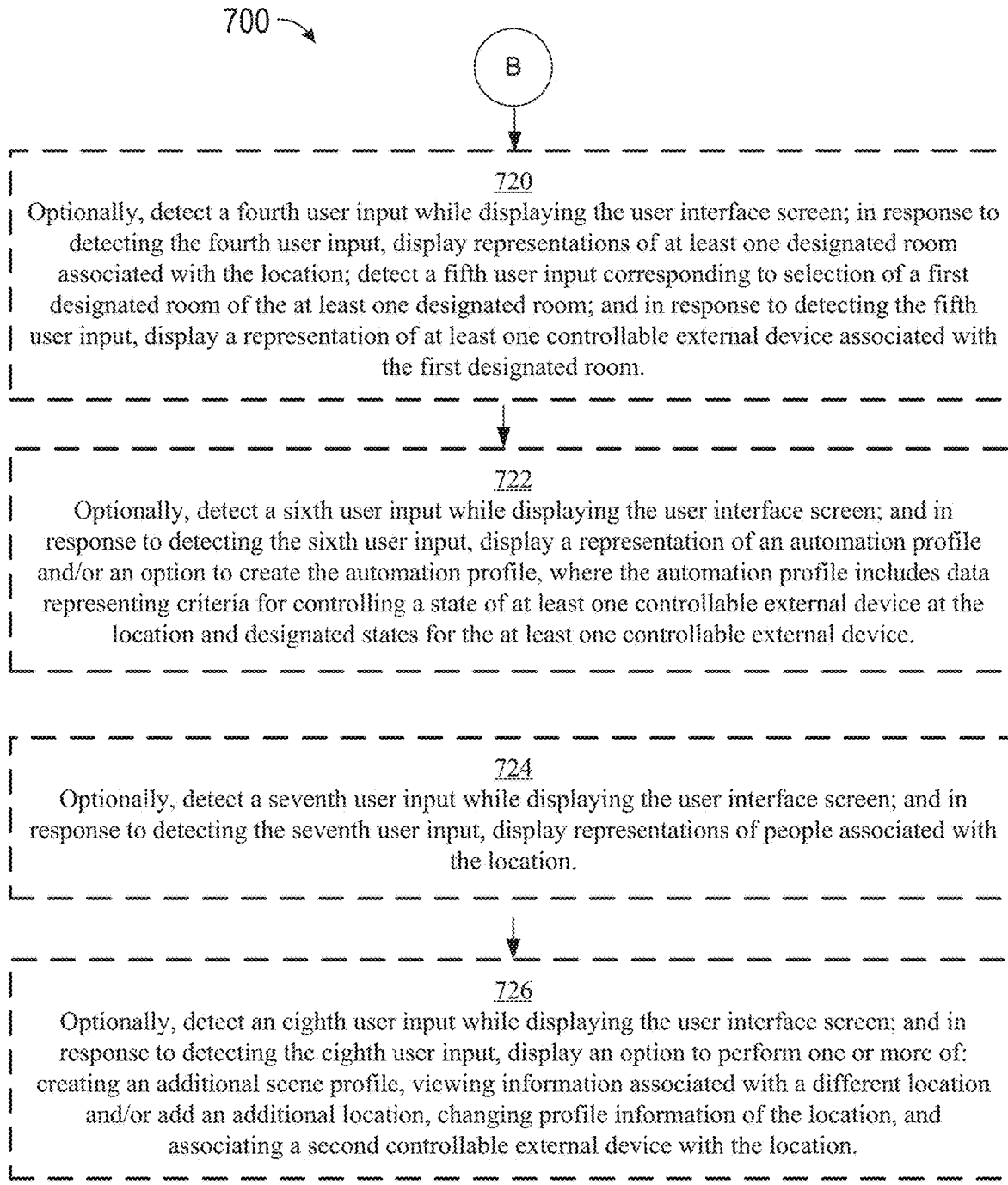

FIGS. 7A-7C depict a flow diagram illustrating a method for managing controllable external devices using an electronic device in accordance with some embodiments. Method 700 is performed at a device (e.g., 100, 300, 500, or 600) with a display and, optionally, a touch-sensitive surface. Some operations in method 700 are, optionally, combined, the order of some operations is, optionally, changed, and some operations are, optionally, omitted.

As described below, method 700 provides an intuitive way for managing controllable external devices. The method reduces the cognitive burden on a user for managing controllable external devices, thereby creating a more efficient human-machine interface. For battery-operated computing devices, enabling a user to manage controllable external devices faster and more efficiently conserves power and increases the time between battery charges.

At block 702, the device displays a user interface screen (e.g., 610-1) including an indication of a location and a representation of a controllable external (e.g., 620-1) device at the location.

Optionally, at block 704, the device receives data indicating that a remote electronic device associated with a person is present at the location, and in response to receiving the data indicating that the remote electronic device is present at the location, displays, on the user interface screen, a representation of the person associated with the remote electronic device (e.g., 624).

Optionally, at block 706, the device displays, on the user interface screen, an indication of a status of the location (e.g., 626).

Optionally, at block 708, the device displays, on the user interface screen, a representation of a scene profile (e.g., 640-1), where the scene profile includes data regarding designated states of a plurality of controllable external devices at the location; detects a first user input corresponding to selection of the scene profile; and in response to detecting the first user input, displays a representation of the plurality of controllable external devices associated with the scene profile (e.g., 910-2).

Optionally, at block 710, the device displays, on the user interface screen, an image captured by a controllable external camera at the location (e.g., 632).

At block 712, the device detects a second user input (e.g., 630-1) corresponding to selection of the controllable external device.

At block 714, in response to detecting the second user input, the device displays a user interface object (e.g., 608) indicating a plurality of possible states of the controllable external device.

At block 716, while the user interface object indicating the plurality of possible states of the controllable external device is displayed, the device detects a third user input (e.g., 630-2) corresponding to selection of a designated state of the controllable external device.

At block 718, in response to detecting the third user input, the device sends instructions to set the controllable external device to the designated state.

Optionally, at block 720, the device detects a fourth user input while displaying the user interface screen; in response to detecting the fourth user input, displays representations of at least one designated room associated with the location (e.g., FIG. 6O); detects a fifth user input corresponding to selection of a first designated room of the at least one designated room; and in response to detecting the fifth user input, displays a representation of at least one controllable external device associated with the first designated room (e.g., FIG. 6P).

Optionally, at block 722, the device detects a sixth user input while displaying the user interface screen; and in response to detecting the sixth user input, displays a representation of an automation profile and/or an option to create the automation profile (e.g., FIG. 6Q), where the automation profile includes data representing criteria for controlling a state of at least one controllable external device at the location and designated states for the at least one controllable external device.

Optionally, at block 724, the device detects a seventh user input while displaying the user interface screen; and in response to detecting the seventh user input, displays representations of people associated with the location (e.g., FIG. 6S).

Optionally, at block 726, the device detects an eighth user input while displaying the user interface screen; and in response to detecting the eighth user input, displays an option to perform one or more of: creating an additional scene profile, viewing information associated with a different location and/or add an additional location, changing profile information of the location, and associating a second controllable external device with the location (e.g., FIGS. 6M (630) and 6R (638)).

Note that details of the processes described above with respect to method 700 (e.g., FIGS. 7A-7C) are also applicable in an analogous manner to the methods described below. For example, methods 1000, 1300, 1600, 1900, 2100, 2300, 2600, 2900, and 3200 optionally include one or more of the characteristics of the various methods described above with reference to method 700.

Figure 8:
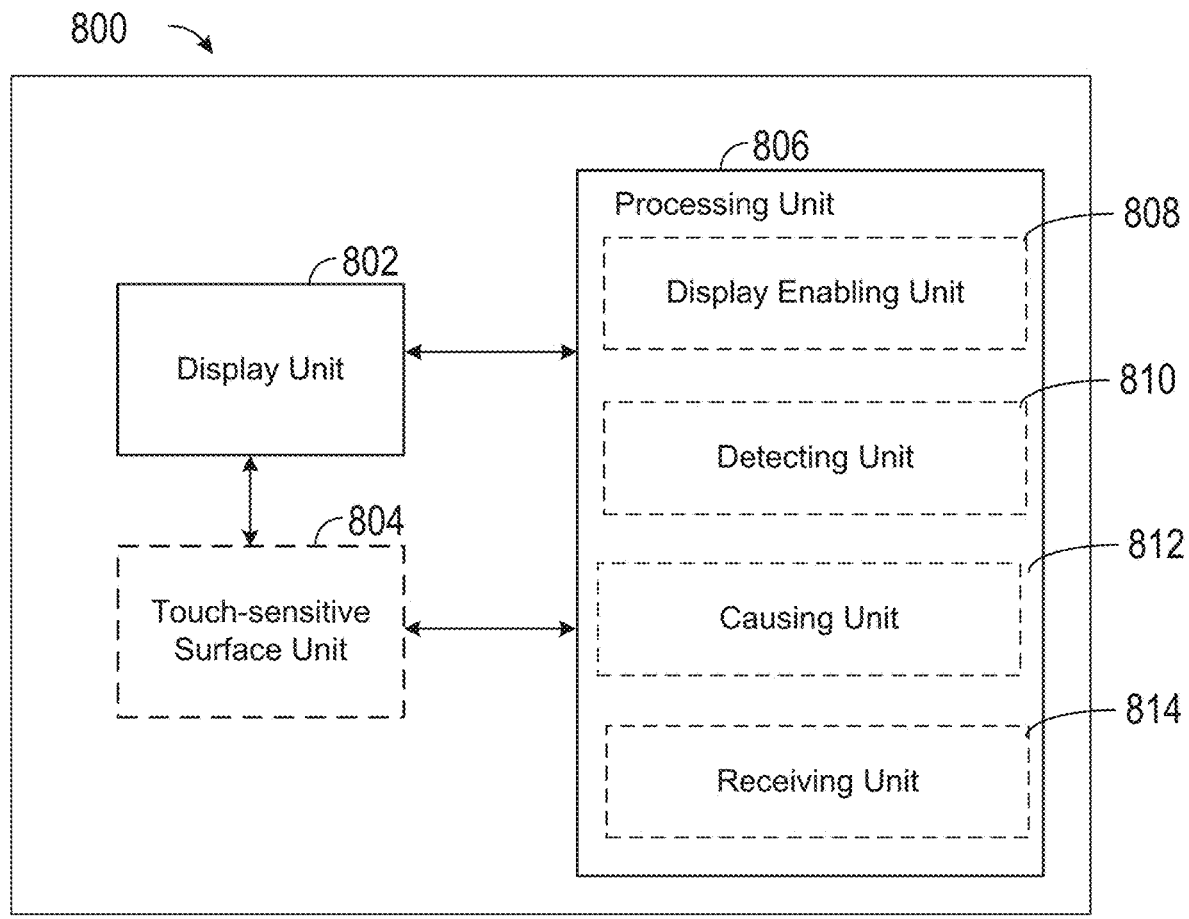
FIG. 8 is a functional block diagram of an electronic device in accordance with some embodiments.

In accordance with some embodiments, FIG. 8 shows an exemplary functional block diagram of an electronic device 800 configured in accordance with the principles of the various described embodiments. In accordance with some embodiments, the functional blocks of electronic device 800 are configured to perform the techniques described above. The functional blocks of the device 800 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

As shown in FIG. 8, an electronic device 800 includes a display unit 802 configured to display a graphic user interface, optionally, a touch-sensitive surface unit 804 configured to receive contacts, and a processing unit 806 coupled to the display unit 802 and, optionally, the touch-sensitive surface unit 804. In some embodiments, the processing unit 806 includes a display enabling unit 808, a detecting unit 810, a causing unit 812, and receiving unit 814.

The processing unit 806 is configured to: enable display (e.g., with display enabling unit 808) of, on a first user interface screen, an indication of a location; enable display (e.g., with display enabling unit 808) of, on the first user interface screen, a representation of a controllable external device at the location; detect (e.g., with detecting unit 810) a first user input corresponding to selection of the controllable external device; in response to detecting the first user input, enable display (e.g., with display enabling unit 808) of a user interface object indicating a plurality of possible states of the controllable external device; while the user interface object indicating the plurality of possible states of the controllable external device is displayed, detect (e.g., with detecting unit 810) a second user input corresponding to selection of a designated state of the controllable external device; and in response to detecting the second user input, cause (e.g., with causing unit 812) sending of instructions to set the controllable external device to the designated state.

In some embodiments, the processing unit 806 is further configured to: receive (e.g., with receiving unit 814) data indicating that a remote electronic device associated with a person is present at the location; and in response to receiving the data indicating that the remote electronic device is present at the location, enable display (e.g., with display enabling unit 808) of, on the first user interface screen, a representation of the person associated with the remote electronic device.

In some embodiments, the processing unit 806 is further configured to: enable display (e.g., with display enabling unit 810) of, on the first user interface screen, an indication of a status of the location.

In some embodiments, the processing unit 806 is further configured to: enable display (e.g., with display enabling unit 808) of, on the first user interface screen, a representation of a scene profile, where the scene profile includes data regarding designated states of a plurality of controllable external devices at the location; detect (e.g., with detecting unit 810) a third user input corresponding to selection of the scene profile; and in response to detecting the third user input, enable display (e.g., with display enabling unit 808) of a representation of the plurality of controllable external devices associated with the scene profile. In some embodiments, the processing unit 806 is further configured to: while the first user interface screen is displayed, detect (e.g., with detecting unit 810) a fourth user input; and in response to detecting the fourth user input, enable display (e.g., with display enabling unit 808) of an option to create an additional scene profile.

In some embodiments, the processing unit 806 is further configured to: enable display (e.g., with display enabling unit 808) of, on the first user interface screen, an image captured by a controllable external camera at the location, where the image captured by the controllable external camera is included in a live video feed from the controllable external camera.

In some embodiments, the processing unit 806 is further configured to: while the first user interface screen is displayed, detect (e.g., with detecting unit 810) a fifth user input; in response to detecting the fifth user input, enable display (e.g., with display enabling unit 808) of representations of at least one designated room associated with the location; detect (e.g., with detecting unit 810) a sixth user input corresponding to selection of a first designated room of the at least one designated room; and in response to detecting the sixth user input, enable display (e.g., with display enabling unit 808) of a representation of at least one controllable external device associated with the first designated room.

In some embodiments, the processing unit 806 is further configured to: while the first user interface screen is displayed, detect (e.g., with detecting unit 810) a seventh user input; and in response to detecting the seventh user input, enable display (e.g., with display enabling unit 808) of a representation of an automation profile and/or an option to create the automation profile, where the automation profile includes data representing criteria for controlling a state of at least one controllable external device at the location and designated states for the at least one controllable external device.

In some embodiments, the processing unit 806 is further configured to: while the first user interface screen is displayed, detect (e.g., with detecting unit 810) an eighth user input; and in response to detecting the eighth user input, enable display (e.g., with display enabling unit 808) of an option to view information associated with a different location and/or add an additional location.

In some embodiments, the processing unit 806 is further configured to: while the first user interface screen is displayed, detect (e.g., with detecting unit 810) a ninth user input; and in response to detecting the ninth user input, enable display (e.g., with display enabling unit 808) of an option to change profile information of the location.

In some embodiments, the processing unit 806 is further configured to: while the first user interface screen is displayed, detect (e.g., with detecting unit 810) a tenth user input; and in response to detecting the tenth user input, enable display (e.g., with display enabling unit 808) of an option to associate a second controllable external device with the location.

In some embodiments, the processing unit 806 is further configured to: while the first user interface screen is displayed, detect (e.g., with detecting unit 810) a eleventh user input; and in response to detecting the eleventh user input, enable display (e.g., with display enabling unit 808) of representations of people associated with the location.

The operations described above with reference to FIGS. 7A-7C are, optionally, implemented by components depicted in FIGS. 1A-1B or FIG. 8. For example, displaying operations 702, 704, 706, 708, 710, 714, 720, 722, 724, and 726, detecting operations 708, 712, 716, 720, 722, 724, and 726, sending operation 718, and receiving operation 704 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 9A-9F illustrate exemplary user interfaces for creating and/or configuring scene profiles for controllable external devices, in accordance with some embodiments. The user interfaces in these figures are used to illustrate the processes described below, including the processes in FIG. 10.

Figure 9A:
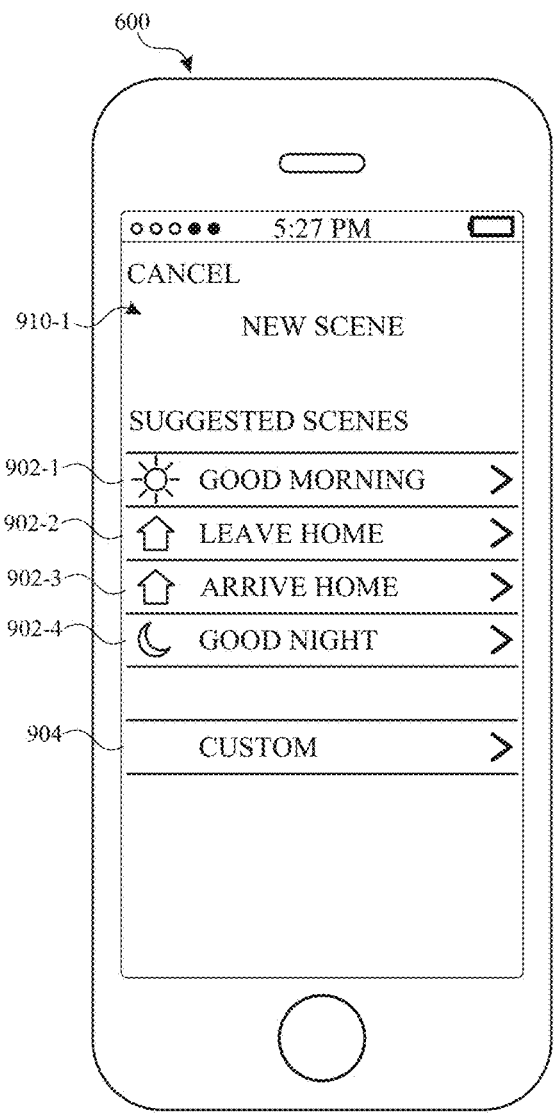

FIG. 9A illustrates user interface screen 910-1 for creating a new scene profile displayed on device 600. In some embodiments, user interface screen 910-1 is displayed in response to selection of the "New Scene" option shown in FIG. 6M. User interface screen 910-1 prompts the user to create a new scene profile and/or provides one or more predefined (e.g., suggested) scene profiles. A predefined scene profile includes data regarding predetermined states of predetermined controllable electronic devices at a location. User interface screen 910-1 includes an affordance 904 for creating a new custom scene profile and representations 902-1, 902-2, 902-3, and 902-4 of exemplary predefined scene profiles named "Good Morning", "Leave Home", "Arrive Home", and "Good Night".

Figure 9B:
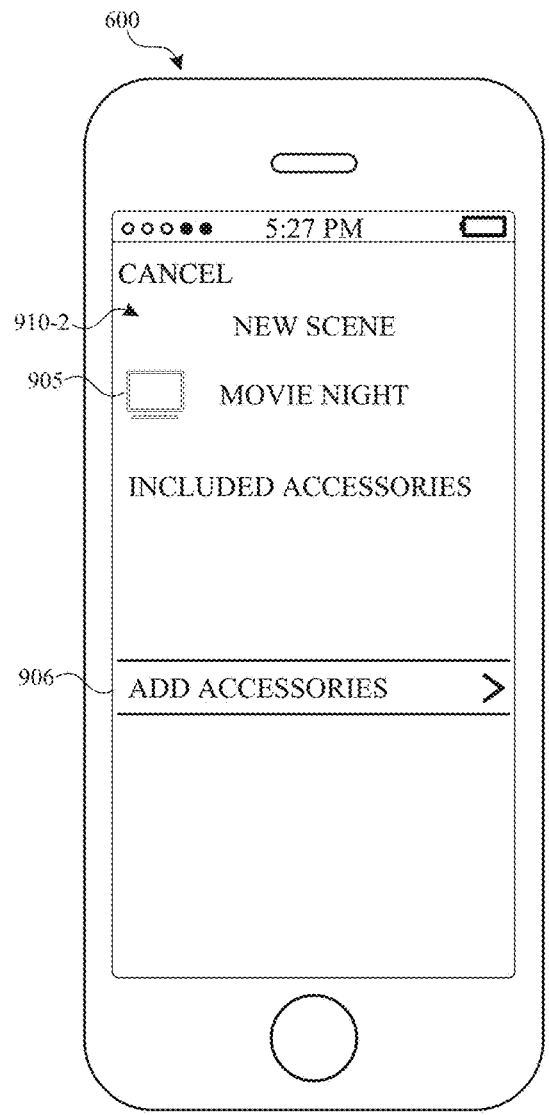

FIG. 9B illustrates device 600 displaying user interface screen 910-2 corresponding to a new custom scene profile named Movie Night. In addition to the name of the scene profile, user interface screen 910-2 also includes an image 905 (e.g., a glyph, symbol, picture) associated with the scene profile. In some embodiments, a user can manually select the image associated with the scene profile. User interface screen 910-2 also includes affordance 906 labeled "Add Accessories" for adding accessories to the scene profile. In response to user input selecting affordance 906, device 600 displays user interface screen 910-3 (FIG. 9C), which includes representations 908-1 to 908-5 of accessories that are situated at the location. Representations 908-1 to 908-5 are arranged based on the corresponding rooms to which they are associated. The representations include indications of whether the corresponding accessory is associated with the scene profile. In the illustrated example, the circle in the upper right corner of each representation 908-1 to 908-5 is checked or filled-in if the corresponding accessory is associated with the scene profile. Otherwise, the circle is blank. Other examples of indications that an accessory is included in the scene profile include highlighting, bolding, or the like.

In the embodiment of FIG. 9C, representations 908-1 to 908-5 are affordances. Device 600 detects user input 920-1 corresponding to a selection of a first accessory (e.g., a tap on representation 908-1). After detecting user input 920-1, device 600 associates the first accessory with the scene profile. FIG. 9D shows an updated version of user interface screen 910-3 indicating that the accessory corresponding to representation 908-1 is associated with the scene profile. Device 600 associates the first accessory with the scene profile by including data identifying the first accessory and a first state of the first accessory in the scene profile. If the scene profile already exists, then including the data in the scene profile includes updating the existing profile (e.g., adding the data to the existing scene profile). In some embodiments, if the scene profile does not yet exist when the accessory is selected, then including the data in the scene profile includes creating a new scene profile with the data.

In response to detecting selection of affordance 914, device 600 causes all of the accessories associated with the Bedroom to be included in the scene profile. Affordance 916 provides analogous functionality with respect to the Bathroom. In some embodiments, user interface screen 910-3 includes an affordance that when selected causes all of the accessories on user interface screen to be included in the scene profile.

In some embodiments, the representations 908-1 to 908-5 on user interface screen 910-3 include indications of the current states of the corresponding accessories. In some embodiments, device 600 includes in the scene profile the current state of the accessory at the time the accessory is selected. In some embodiments, if an accessory is already associated with the scene profile, the representation on user interface screen 910-3 corresponding to the accessory indicates the state of the accessory included in the scene profile, which is not necessarily the same as the current state of the accessory. In some embodiments, the representations 908-1 to 908-5 include indications of the states that will be included in the scene profile if the accessory is selected, which may be, for example, the current state of the accessory or a state designated by a user.

In some embodiments, device 600 detects second user input 920-2 corresponding to selection of a second accessory (e.g., a contact at a position on the touch-sensitive display 602 corresponding to the representation 908-5). Device 600 determines whether second user input 920-2 meets threshold criteria. In some embodiment, threshold criteria include, e.g., a threshold duration of time of a contact or a threshold characteristic intensity of the contact.

In response to detecting the second user input 920-2 and in accordance with a determination that the threshold criteria are met, device 600 displays an indication of a first state of the second accessory. In some embodiments, the indication of the first state is displayed as part of a control affordance such as those illustrated in FIGS. 6C-6K. In the embodiment illustrated in FIG. 9C, the accessory corresponding to selected representation 908-5 is a light. In some embodiments, the control affordance displayed in FIG. 6J is displayed so that the user can select state of the light.

Device 600 detects an input corresponding to a selection of the first state (e.g., a tap on the control affordance in FIG. 6J). After detecting selection of the first state, device 600 includes data identifying the second accessory and the first state of the second accessory in the scene profile. In some embodiments, after detecting the selection of the first state, device 600 displays representation 908-5 of the second accessory with an indication of the first state (e.g., OFF) and that the accessory has been added to the scene profile, as shown in FIG. 9D. In some embodiments, device 600 includes the data identifying the first state in the scene profile directly in response to user input 920-2 upon determining that the threshold criteria are met. In some embodiments, device 600 indicates that the designated state of the accessory for the scene has been selected, e.g., by outputting a haptic.

FIG. 9E illustrates an updated version of user interface screen 910-2 on device 600 with a summary of the scene profile. Device 600 displays user interface screen 910-2 in response to detecting user input, e.g., selection of the affordance labeled "Done" on user interface screen 910-3. User interface screen 910-2 includes representations 908-6 and 908-7 of the accessories associated with the scene profile.

Updated user interface screen 910-2 also includes options (e.g., affordances) to add or remove the data associated with the accessory from the scene profile (e.g., 912-1), test the scene profile (e.g., 912-2), designate the scene profile (e.g., 912-3), and delete the scene profile (e.g., 912-4). In some embodiments, testing the scene profile includes sending instructions to implement (at least temporarily) the designated states of the accessories included in the scene profile. In some embodiments, a designated scene is displayed as a favorite scene on the Home screen 610-1.

Returning now to FIG. 9A, in response to detecting user input corresponding to selection of one of the predefined scene profiles 902-1 to 902-4, device 600 displays a user interface screen including representations of predetermined accessories at the location. FIG. 9F illustrates an exemplary user interface screen corresponding to the predefined scene profile Good Night 902-4. As shown in FIG. 9F, the Good Night scene profile is pre-populated with two predetermined accessories with predetermined states. More specifically, the front door is set to be locked and the thermostat in the Bedroom is set to be turned down to 68 degrees. Additional exemplary embodiments related to predefined scene profiles are described below.

In some embodiments, the predetermined accessories are default accessories based on the selected predefined scene profile that are automatically included in the scene profile without requiring user selection (e.g., the Garage door may be predetermined for the "Arrive Home" predefined scene). In some embodiment, the predetermined accessories are determined based on actions previously performed by device 600 (or a user profile associated with device 600) with respect to the predetermined accessories. In some embodiments, an accessory is suggested based on, e.g., frequency of use or correlation between an event or time and use of an accessory (e.g., a bedroom light is determined for the "Good Morning" scene profile if device 600 typically operates the light in the bedroom in the morning or the dishwasher may be predetermined for the "Good Night" scene profile if it is commonly operated after 11 pm).

In some embodiments, the representations of the predetermined accessories include indications of predetermined states (e.g., suggested states) for the predetermined accessories, as shown in the embodiment of FIG. 9F. In some embodiments, the predetermined states are default states based on the selected predefined scene profile that are automatically included in the scene profile without requiring user selection (e.g., the suggested status of the Garage Door for "Arrive Home" is "open").

In some embodiments, the predetermined states of the predetermined accessories are determined based on actions associated with a user of device 600 previously taken with respect to the predetermined accessories. In some embodiments, a state of an accessory is suggested based on, e.g., frequency of selection or correlation between an event or time and state of an accessory (e.g., the bedroom light set to ON for the "Good Morning" scene profile if device 600 typically turns on the light in the bedroom in the morning or the state of the dishwasher may be predetermined to "start" for the "Good Night" scene profile if it is commonly started after 11 pm).

Figure 10:
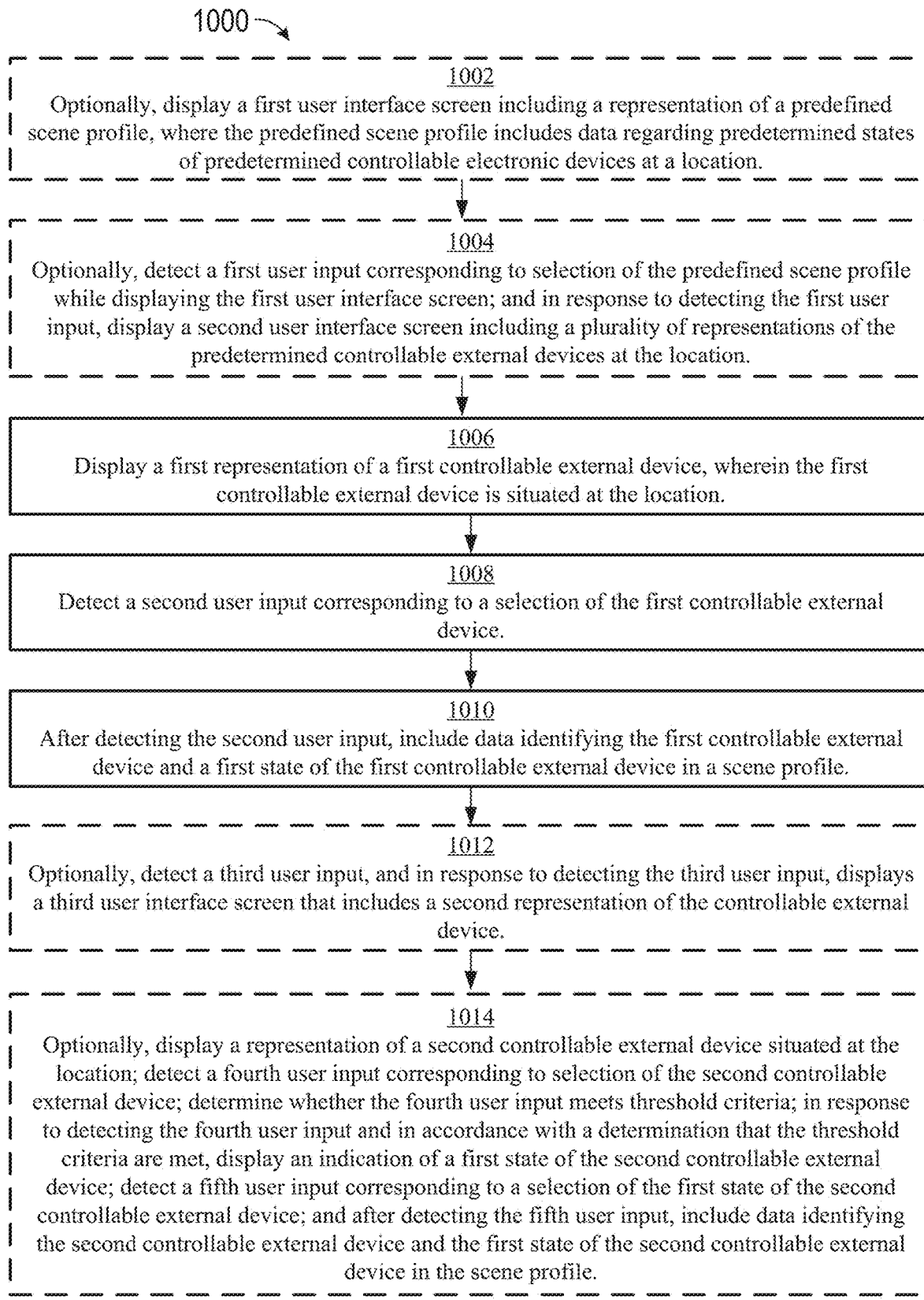
FIG. 10 is a flow diagram illustrating a process for managing controllable external devices in accordance with some embodiments.

FIG. 10 is a flow diagram illustrating a method for managing controllable external devices using an electronic device in accordance with some embodiments. Method 1000 is performed at a device (e.g., 100, 300, 500, or 600) with a display and, optionally, a touch-sensitive surface. Some operations in method 1000 are, optionally, combined, the order of some operations is, optionally, changed, and some operations are, optionally, omitted.

As described below, method 1000 provides an intuitive way for managing controllable external devices. The method reduces the cognitive burden on a user for managing controllable external devices, thereby creating a more efficient human-machine interface. For battery-operated computing devices, enabling a user to manage controllable external devices faster and more efficiently conserves power and increases the time between battery charges.

Optionally, at block 1002, the device displays a first user interface screen (e.g., 910-1) including a representation of a predefined scene profile (e.g., 902-1 to 902-4), where the predefined scene profile includes data regarding predetermined states of predetermined controllable electronic devices at a location.

Optionally, at block 1004, the device, while displaying the first user interface screen, detects a first user input corresponding to selection of the predefined scene profile; and in response to detecting the first user input, displays a second user interface screen (e.g., FIG. 9F) including a plurality of representations of the predetermined controllable external devices at the location. Optionally, the plurality of representations of the predetermined controllable external devices at the location includes indications of the predetermined states for the predetermined controllable external devices. Optionally, the predetermined controllable external devices are determined based on actions previously performed by the device with respect to the predetermined controllable external devices. Optionally, the predetermined states of the predetermined controllable external devices are determined based on actions associated with a user of the electronic device previously taken with respect to the predetermined controllable external devices.

At block 1006, the device displays a first representation of a first controllable external device, where the first controllable external device is situated at the location (e.g., 908-1 to 908-5 in FIG. 9C). Optionally, the first representation of the controllable external device includes an indication of the current state of the controllable external device.

At block 1008, the device detects a second user input (e.g., 920-1) corresponding to a selection of the first controllable external device.

At block 1010, after detecting the second user input, the device includes data identifying the first controllable external device and a first state of the first controllable external device in a scene profile (e.g., FIG. 9D).

Optionally, at block 1012, the device detects a third user input, and in response to detecting the third user input, displays a third user interface screen that includes a second representation of the controllable external device (e.g., 908-6). Optionally, the third user interface screen includes an option to perform at least one of removing the data associated with the controllable external device from the scene profile (e.g., 912-1), testing the scene profile (e.g., 912-2), designating the scene profile (e.g., 912-3), and deleting the scene profile (e.g., 912-4).

Optionally, at block 1014, the device: displays a representation of a second controllable external device situated at the location (e.g., 908-5); detects a fourth user input (e.g., 920-2) corresponding to selection of the second controllable external device; determines whether the fourth user input meets threshold criteria; in response to detecting the fourth user input and in accordance with a determination that the threshold criteria are met, displays an indication of a first state of the second controllable external device (e.g., 608); detects a fifth user input corresponding to a selection of the first state of the second controllable external device (e.g., 630-2); and after detecting the fifth user input, includes data identifying the second controllable external device and the first state of the second controllable external device in the scene profile.

Note that details of the processes described above with respect to method 1000 (e.g., FIG. 10) are also applicable in an analogous manner to the methods described above and below. For example, methods 700, 1300, 1600, 1900, 2100, 2300, 2600, 2900, and 3200 optionally include one or more of the characteristics of the various methods described above with reference to method 1000.

Figure 11:
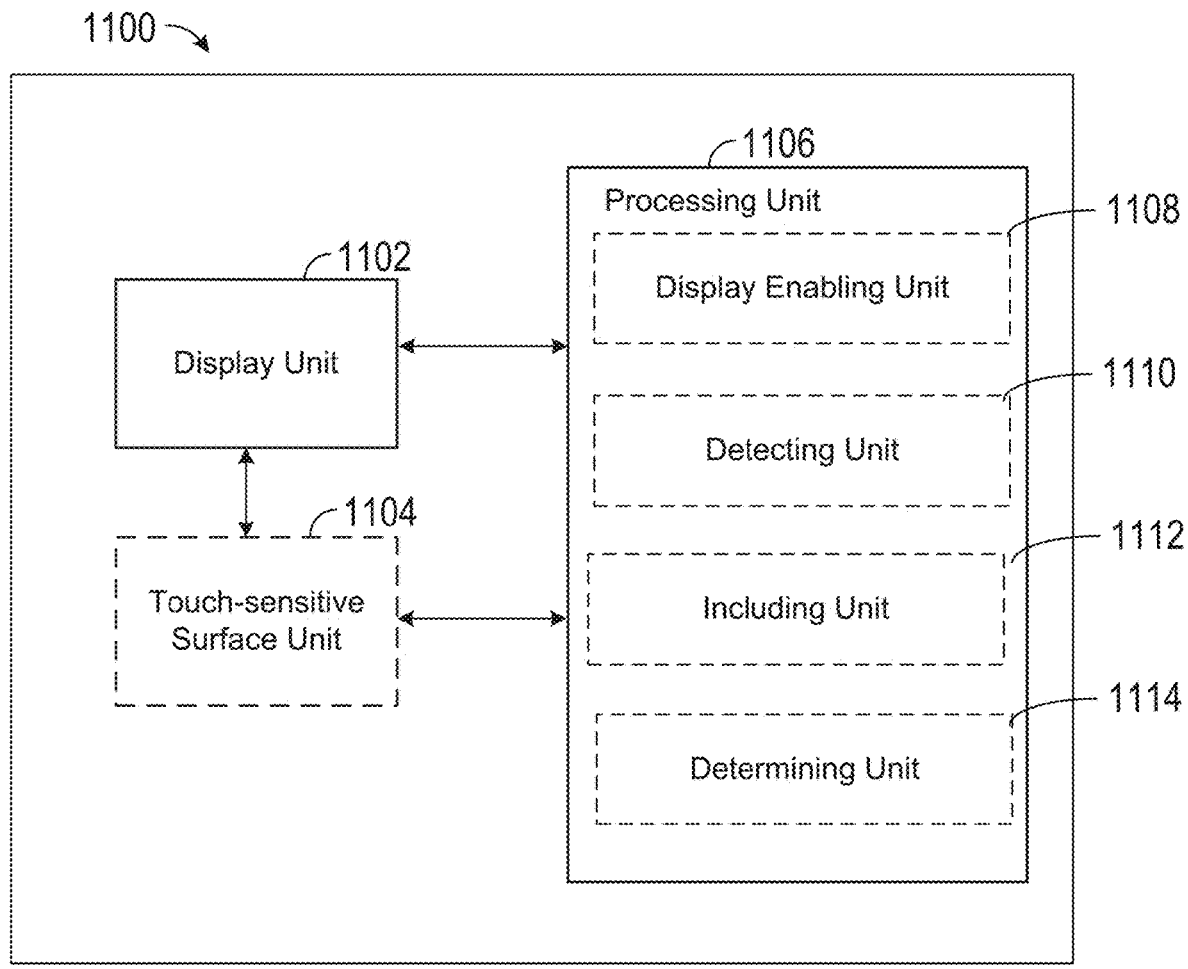
FIG. 11 is a functional block diagram of an electronic device in accordance with some embodiments.

In accordance with some embodiments, FIG. 11 shows an exemplary functional block diagram of an electronic device 1100 configured in accordance with the principles of the various described embodiments. In accordance with some embodiments, the functional blocks of electronic device 1100 are configured to perform the techniques described above. The functional blocks of the device 1100 are, optionally, implemented by hardware, software, or a combination of hardware and software to carry out the principles of the various described examples. It is understood by persons of skill in the art that the functional blocks described in FIG. 11 are, optionally, combined or separated into sub-blocks to implement the principles of the various described examples. Therefore, the description herein optionally supports any possible combination or separation or further definition of the functional blocks described herein.

As shown in FIG. 11, an electronic device 1100 includes a display unit 1102 configured to display a graphic user interface, optionally, a touch-sensitive surface unit 1104 configured to receive contacts, and a processing unit 1106 coupled to the display unit 1102 and, optionally, the touch-sensitive surface unit 1104. In some embodiments, the processing unit 1106 includes a display enabling unit 1108, a detecting unit 1110, an including unit 1112, and a determining unit 1114.

The processing unit 1106 is configured to: enable display (e.g., with display enabling unit 1108) of a first representation of a first controllable external device, where the first controllable external device is situated at a location; detect (e.g., with detecting unit 1110) a first user input corresponding to a selection of the first controllable external device; and include (e.g., with including unit 1112) data identifying the first controllable external device and a first state of the first controllable external device in a scene profile after detecting the first user input. In some embodiments, the first representation of the controllable external device includes an indication of the current state of the controllable external device.

In some embodiments, the processing unit 1106 is further configured to: enable display (e.g., with display enabling unit 1108) of a representation of a second controllable external device situated at the location; detect (e.g., with detecting unit 1110) a second user input corresponding to selection of the second controllable external device; determine (e.g., with determining unit 1114) whether the second user input meets threshold criteria; in response to detecting the second user input and in accordance with a determination that the threshold criteria are met, enable display (e.g., with display enabling unit 1108) of an indication of a first state of the second controllable external device; detect (e.g., with detecting unit 1110) a third user input corresponding to a selection of the first state of the second controllable external device; and after detecting the third user input, include (e.g., with including unit 1112) data identifying the second controllable external device and the first state of the second controllable external device in the scene profile.

In some embodiments, the processing unit 1106 is further configured to: detect (e.g., with detecting unit 1110) a fourth user input; and in response to detecting the fourth user input, enable display (e.g., with display enabling unit 1108) of a first user interface screen that includes a second representation of the controllable external device. In some embodiments, the first user interface screen includes an option to perform at least one of removing the data associated with the controllable external device from the scene profile, testing the scene profile, designating the scene profile, and deleting the scene profile.

In some embodiments, the processing unit 1106 is further configured to enable display (e.g., with display enabling unit 1108) of a second user interface screen including a representation of a predefined scene profile prior to the first representation of the controllable external device being displayed, where the scene profile includes data regarding predetermined states of predetermined controllable electronic devices at a location.

In some embodiments, the processing unit 1106 is further configured to detect (e.g., with detecting unit 1110) a fifth user input corresponding to selection of the predefined scene profile while the second user interface screen is displayed; and in response to detecting the fifth user input, enable display (e.g., with display enabling unit 1108) of a third user interface screen including a plurality of representations of the predetermined controllable external devices at the location. In some embodiments, the plurality of representations of the predetermined controllable external devices at the location includes indications of the predetermined states for the predetermined controllable external devices.

In some embodiments, the predetermined controllable external devices are determined based on actions previously performed by the electronic device with respect to the predetermined controllable external devices. In some embodiments, the predetermined states of the predetermined controllable external devices are determined based on actions associated with a user of the electronic device previously taken with respect to the predetermined controllable external devices.

The operations described above with reference to FIG. 10 are, optionally, implemented by components depicted in FIGS. 1A-1B or FIG. 11. For example, displaying operations 1002, 1004, 1006, and 1014, detecting operations 1004, 1008, 1012, and 1014, including operations 1010 and 1014, and determining operation 1014 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 12A:
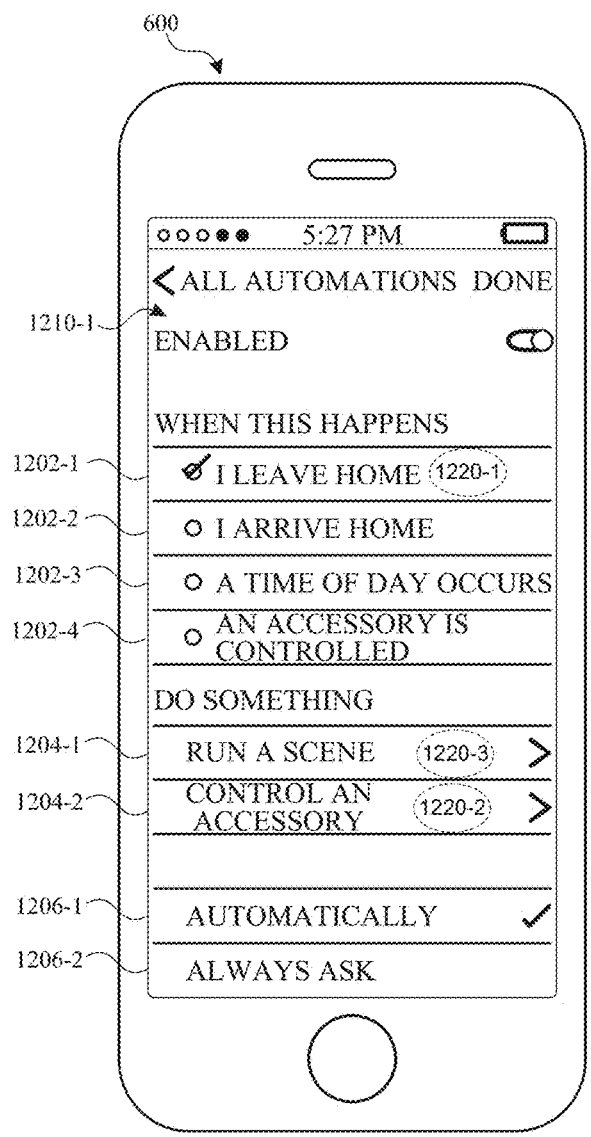
FIGS. 12A-12C illustrate exemplary user interfaces in accordance with some embodiments.
Figure 12B:
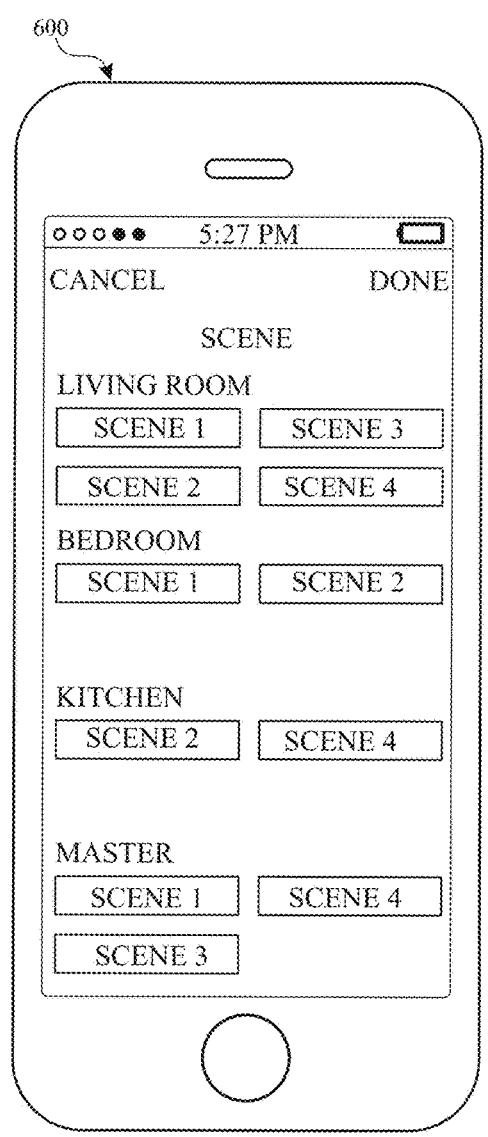
Figure 12C:
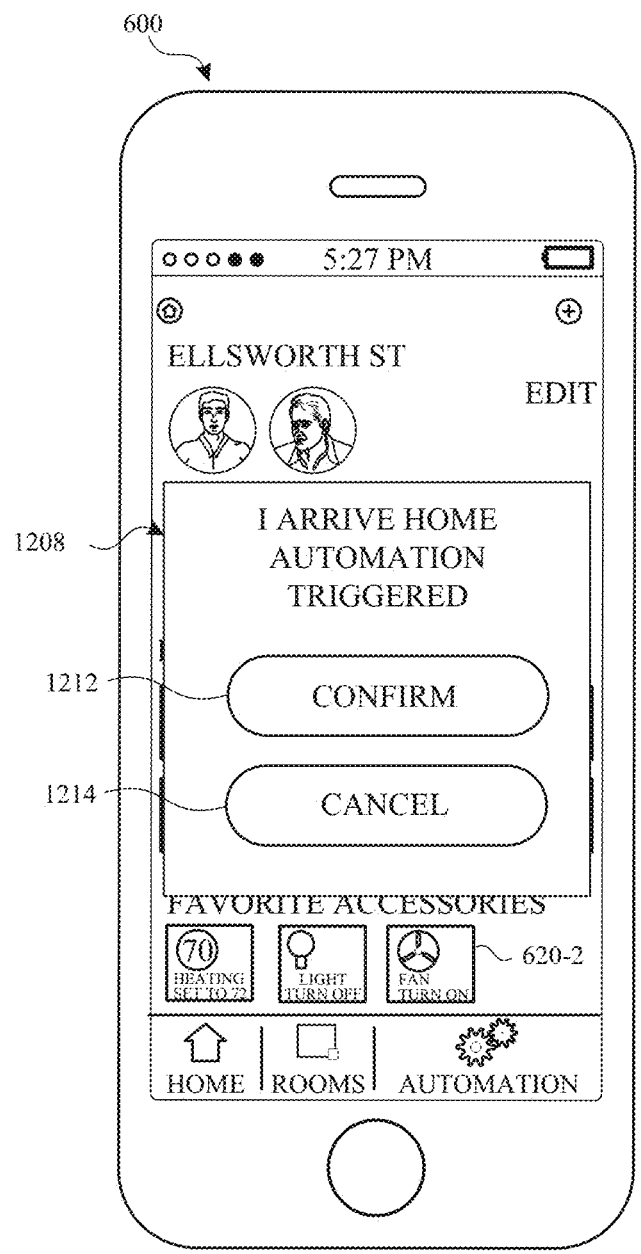

FIGS. 12A-12C illustrate exemplary user interfaces for creating and/or configuring automation profiles for controllable external devices, in accordance with some embodiments. The user interfaces in these figures are used to illustrate the processes described below, including the processes in FIGS. 13 and 21.

FIG. 12A illustrates device 600 displaying user interface screen 1210-1 for defining an automation profile associated with a location. In some embodiments, user interface screen 1210-1 is displayed in response to selection of the affordance in FIG. 6Q labeled "New Automation." User interface screen 1210-1 includes representations 1202-1 to 1202-4 of criteria that may be selected for an automation profile. An automation profile includes data representing at least one accessory, a designated state for each represented accessory, and automation criteria for controlling the at least one accessory. In some embodiments, an automation profile includes a scene profile (or a portion thereof) that is executed when the automation criteria of the automation profile is met. The automation criteria represented by items 1202-1 to 1202-4 may also be referred to as a "triggering event", which is an event that in response to which an automation profile is to be implemented.

In some embodiments, the automation criteria are based at least in part on the position of device 600 relative to the location. Examples of location-based criteria include, but are not limited to: whether the electronic device is less than a threshold distance from the first location (e.g., "I am at home"); whether the electronic device is greater than a threshold distance from the first location (e.g., "I am away from home"); whether the electronic device has moved from greater than a threshold distance from the first location to less than the threshold distance from the location (e.g., "I arrive home" 1202-2); and whether the electronic device has moved from less than a threshold distance from the first location to greater than the threshold distance from the location (e.g., "I leave home" 1202-1). In some embodiments, the threshold distance is the same in all directions from the location (e.g., a circular boundary). In some embodiments, the threshold distance varies with direction from the location.

In some embodiments, the automation criteria are based at least in part on a time (e.g., "A time of day occurs" 1202-3). Examples of time-based automation criteria include, but are not limited to, a time of day (e.g., 10:30 AM) and a relative time (e.g., sunrise or sunset).

In some embodiments, the automation criteria are based at least in part on a state of an accessory or a condition or event detected by an accessory (e.g., by a sensor). Examples of criteria based on a state of an accessory include, but are not limited to, an accessory being controlled (e.g., "An accessory is controlled" 1202-4) and an accessory being triggered or changing state (e.g., an alarm, motion sensitive light, rain sensor, etc.). Examples of criteria based on a condition or event detected by an accessory include, but are not limited to: weather events, notification events (e.g., receiving a notification), the presence or absence of a user at a location, the absence of an expected event, machine learning, or manual (user) input as described in U.S. patent application Ser. No. 14/725,912 titled "Accessory management Systems Using Environment Model," filed May 29, 2015, which is incorporated by reference above.

Returning to FIG. 12A, Device 600 detects a user input corresponding to selection of a first criterion. In the embodiment shown in FIG. 12A, the user input includes a contact 1220-1 on a representation 1202-1 of a first criterion labeled "I leave home." An example of the "I leave home" criterion is described above. In response to detecting user input 1220-1, device 600 associates the first criterion with an automation profile by including the first criterion in the automation criteria of the automation profile. As mentioned above, in addition to the automation criteria, the automation profile also includes data representing at least one designated state for at least one accessory situated at the location.

FIG. 12A also shows user input 1220-2 on an affordance labeled "Control an accessory." In response to detecting user input 1220-2, device 600 displays one or more representations of accessories at the location. In some embodiments, device 600 displays a user interface analogous to user interface 910-3 described above with reference to FIG. 9C. In FIG. 9C, representations of accessories at the location are displayed and can be selected to be included in a scene profile. Designated states of the accessories can also be selected for the scene profile. Analogous user interfaces and techniques can be used to select an accessory and a corresponding designated state of the accessory in order to add data indicating the designated state of an accessory to the automation profile. Similar to FIG. 9C, in some embodiments, the representations of the accessories include an indication of the current states of the accessories. Also, similar to the predefined scenes described above with reference to FIGS. 9A and 9F, in some embodiments, the representations of the accessories include an indication of suggested states of the accessories. In some embodiments, the designated state is the current state of the accessory. In some embodiments, the designated state is a state selected by the user by one of the techniques described above with reference to FIGS. 6B-6K.

In the embodiment illustrated in FIG. 12A, a user can also choose to run a scene profile as part of the automation. In response to user input 1220-3 corresponding to selection of affordance 1204-1, device 600 displays a list of any scene profiles associated with the location, as shown for example in FIG. 12B, where the scene profiles include data regarding designated states of accessories associated with the location. In the embodiment illustrated in FIG. 12B, the scene profiles are organized by room. In some embodiments, a scene profile is listed under a room if it includes an accessory associated with that room. A user can select one or more of the listed scene profiles to add data indicating the designated states of the accessories in the scene profile to the automation profile.

In some embodiments, after adding data indicating the designated state of an accessory to the automation profile, device 600 displays a summary of the automation profile based on the first accessory. An exemplary summary of an automation profile is illustrated by element 634 in FIG. 6Q.

After the automation criteria and accessory data is established for the automation profile, device 600 determines whether the automation criteria have been met, and in accordance with a determination that the automation criteria have been met, sends instructions to set the first accessory to the designated state. In some embodiments, device 600 sends the instructions directly to the accessory. In some embodiments, device 600 sends the instructions to a controller, server, host, or other external device that is configured to control the accessory.

In some embodiments, device 600 sends the instructions automatically once it determines that the automation criteria have been met. For example, device 600 sends the instructions automatically if option 1206-1 labeled "Automatically" in FIG. 12A is selected. In some embodiments, in accordance with the determination that the automation criteria are met, device 600 displays a notification or request that identifies the automation profile and provides options (e.g., affordances) to confirm or deny implementation of the automation profile. For example, a request to confirm implementation of the automation profile is displayed if option 1206-2 labeled "Always ask" in FIG. 12A is selected. FIG. 12C illustrates an exemplary embodiment of a notification 1208 including a confirm affordance 1212 and a cancel affordance 1214. In accordance with user input corresponding to confirmation of implementation of the automation profile (e.g., a tap on affordance 1212), device 600 sends instructions to implement the designated states of the automation profile. In accordance with user input corresponding to non-confirmation or denial of implementation of the automation profile (e.g., a tap on affordance 1214), device 600 forgoes sending instructions to implement the designated states of the automation profile or sends instructions not to implement the designated states of the automation profile.

Figure 13:
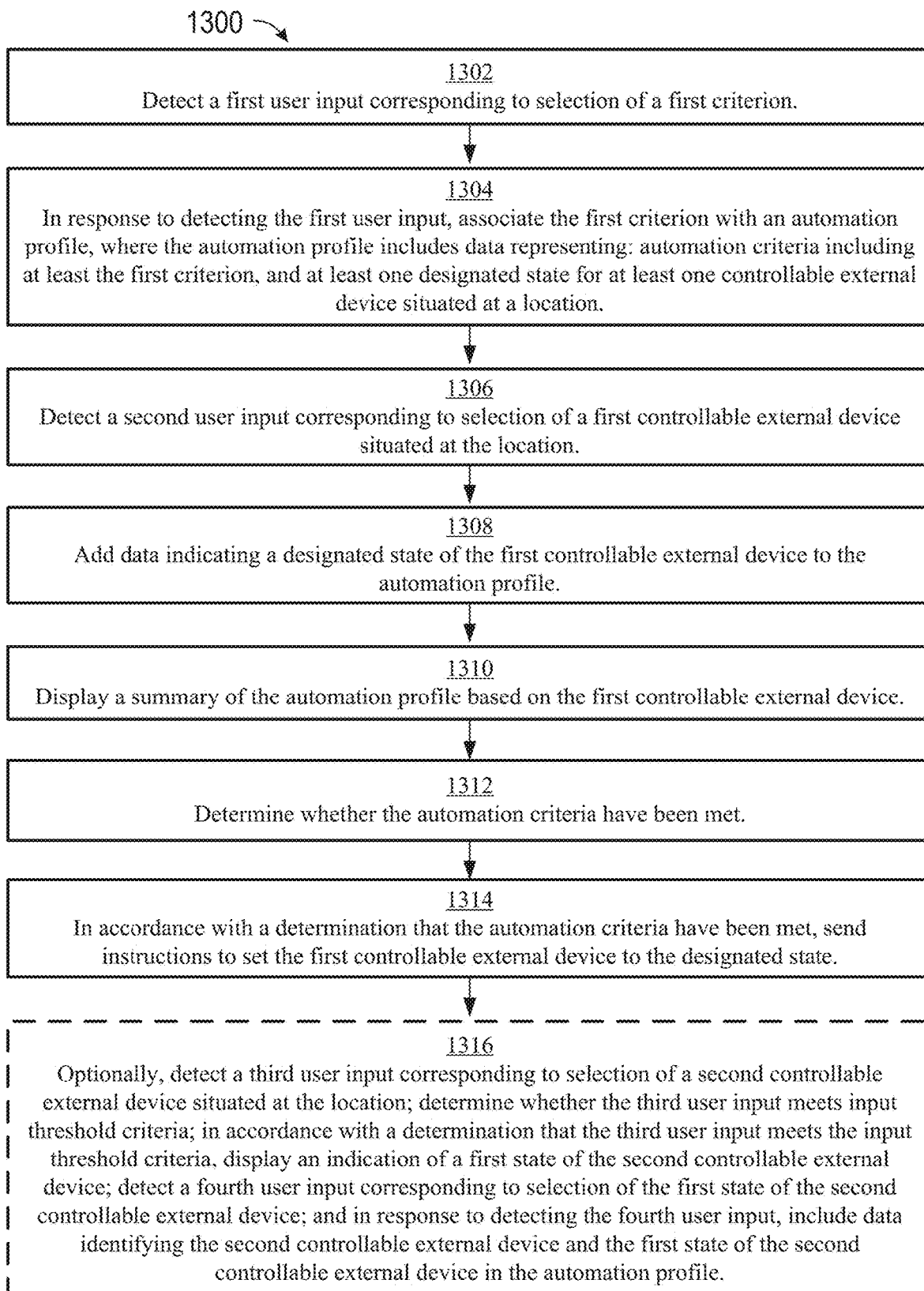
FIG. 13 is a flow diagram illustrating a process for managing controllable external devices in accordance with some embodiments.

FIG. 13 is a flow diagram illustrating a method for managing controllable external devices using an electronic device in accordance with some embodiments. Method 1300 is performed at a device (e.g., 100, 300, 500, or 600) with a display and, optionally, a touch-sensitive surface. Some operations in method 1300 are, optionally, combined, the order of some operations is, optionally, changed, and some operations are, optionally, omitted.

As described below, method 1300 provides an intuitive way for managing controllable external devices. The method reduces the cognitive burden on a user for managing controllable external devices, thereby creating a more efficient human-machine interface. For battery-operated computing devices, enabling a user to manage controllable external devices faster and more efficiently conserves power and increases the time between battery charges.

At block 1302, the device detects a first user input (e.g., 1220-1) corresponding to selection of a first criterion (e.g., 1202-1).

At block 1304, in response to detecting the first user input, the device associates the first criterion with an automation profile, where the automation profile includes data representing: automation criteria including at least the first criterion, and at least one designated state for at least one controllable external device situated at a location. Optionally, the automation criteria are based at least in part on the position of the electronic device relative to the location. Optionally, the automation criteria are based at least in part on a time. Optionally, the automation criteria are based at least in part on a state of a controllable external device at the location.

At block 1306, the device detects a second user input corresponding to selection of a first controllable external device situated at the location (e.g., 920-2). Optionally, the selection of the first controllable external device includes selection of a scene profile (e.g., FIG. 12B), and the scene profile includes data regarding designated states of a plurality of controllable external devices at the location including the first controllable external device.

At block 1308, the device adds data indicating a designated state of the first controllable external device to the automation profile.

Optionally, at block 1310, the device displays a summary of the automation profile based on the first controllable external device (e.g., FIG. 6Q).

At block 1312, the device determines whether the automation criteria have been met.

At block 1314, in accordance with a determination that the automation criteria have been met, the device sends instructions to set the first controllable external device to the designated state.

Optionally, at block 1316, the device: detects a third user input corresponding to selection of a second controllable external device situated at the location; determines whether the third user input meets input threshold criteria; in accordance with a determination that the third user input meets the input threshold criteria, displays an indication of a first state of the second controllable external device (e.g., FIG. 6D, 608); detects a fourth user input corresponding to selection of the first state of the second controllable external device; and in response to detecting the fourth user input, includes data identifying the second controllable external device and the first state of the second controllable external device in the automation profile.

Note that details of the processes described above with respect to method 1300 (e.g., FIG. 13) are also applicable in an analogous manner to the methods described above and below. For example, methods 700, 1000, 1600, 1900, 2100, 2300, 2600, 2900, and 3200 optionally include one or more of the characteristics of the various methods described above with reference to method 1300.

Figure 14:
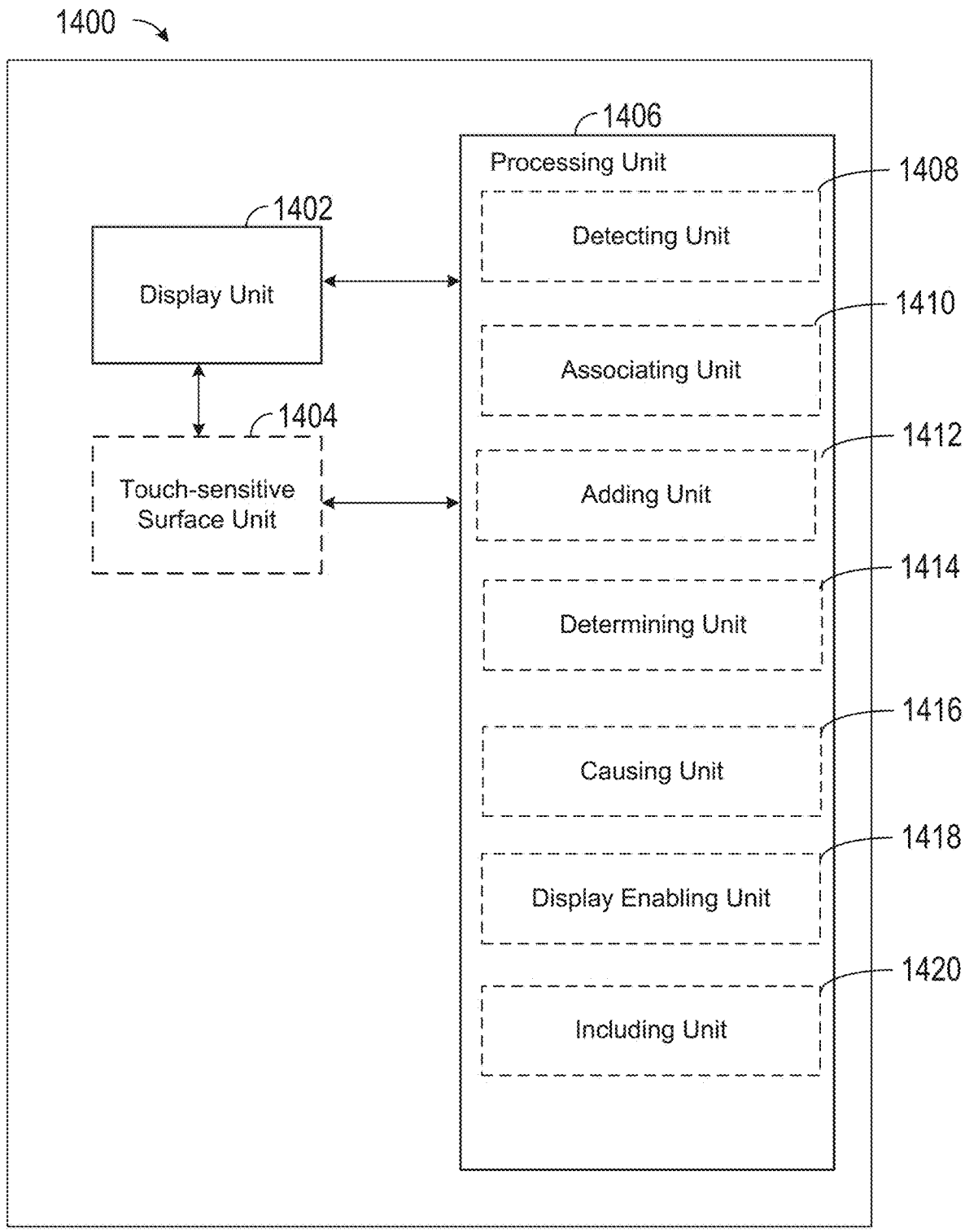
FIG. 14 is a functional block diagram of an electronic device in accordance with some embodiments.

In accordance with some embodiments, FIG. 14 shows an exemplary functional block diagram of an electronic device 1400 configured in accordance with the principles of the various described embodiments. In accordance with some embodiments, the functional blocks of electronic device 800 are configured to perform the techniques described above. The functional blocks of the device 1400 are, optionally, implemented by hardware, software, or a combination of hardware and software to carry out the principles of the various described examples. It is understood by persons of skill in the art that the functional blocks described in FIG. 14 are, optionally, combined or separated into sub-blocks to implement the principles of the various described examples. Therefore, the description herein optionally supports any possible combination or separation or further definition of the functional blocks described herein.

As shown in FIG. 14, an electronic device 1400 includes a display unit 1402 configured to display a graphic user interface, optionally, a touch-sensitive surface unit 1404 configured to receive contacts, and a processing unit 1406 coupled to the display unit 1402 and, optionally, the touch-sensitive surface unit 1404. In some embodiments, the processing unit 1406 includes a detecting unit 1408, an associating unit 1410, an adding unit 1412, a determining unit 1414, a causing unit 1416, a display enabling unit 1418, and an including unit 1420.

The processing unit 1406 is configured to: detect (e.g., with detecting unit 1408) a first user input corresponding to selection of a first criterion; in response to detecting the first user input, associate (e.g., with associating unit 1410) the first criterion with an automation profile, where the automation profile includes data representing: automation criteria including at least the first criterion, and at least one designated state for at least one controllable external device situated at a location; detect (e.g., with detecting unit 1408) a second user input corresponding to selection of a first controllable external device situated at the location; add (e.g., with adding unit 1412) data indicating a designated state of the first controllable external device to the automation profile; determine (e.g., with determining unit 1414) whether the automation criteria have been met; and in accordance with a determination that the automation criteria have been met, cause (e.g., with causing unit 1416) sending of instructions to set the first controllable external device to the designated state.

In some embodiments, the selection of the first controllable external device includes selection of a scene profile, and the scene profile includes data regarding designated states of a plurality of controllable external devices at the location including the first controllable external device.

In some embodiments, the automation criteria are based at least in part on the position of the electronic device relative to the location. In some embodiments, the automation criteria are based at least in part on a time. In some embodiments, the automation criteria are based at least in part on a state of a controllable external device at the location.

In some embodiments, the processing unit is further configured to: after adding the data indicating the designated state of the first controllable external device to the automation profile, enable display (e.g., with display enabling unit 1418) of a summary of the automation profile based on the first controllable external device.

In some embodiments, the processing unit is further configured to: detect (e.g., with detecting unit 1408) a third user input corresponding to selection of a second controllable external device situated at the location; determine (e.g., with determining unit 1414) whether the third user input meets input threshold criteria; in accordance with a determination that the third user input meets the input threshold criteria, enable display (e.g., with display enabling unit 1418) of an indication of a first state of the second controllable external device; detect (e.g., with detecting unit 1408) a fourth user input corresponding to selection of the first state of the second controllable external device; and in response to detecting the fourth user input, include (e.g., with including unit 1420) data identifying the second controllable external device and the first state of the second controllable external device in the automation profile.

The operations described above with reference to FIG. 13 are, optionally, implemented by components depicted in FIGS. 1A-1B or FIG. 14. For example, detecting operations 1302, 1306, and 1316, associating operation 1304, adding operation 1308, displaying operations 1310 and 1316, determining operation 1312 and 1316, sending operation 1314, and including operation 1316 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 15A-15B illustrate exemplary user interfaces for associating an accessory with a location, in accordance with some embodiments. The user interfaces in these figures are used to illustrate the processes described below, including the processes in FIG. 16.

In some embodiments, an accessory is associated with a location (e.g., added to a location profile) using an image (e.g., a barcode, quick response (QR) code, or the like) that identifies the accessory. The image may be included, for example, on the accessory itself or materials provided or associated with the accessory (e.g., packaging, instructions, etc.).

FIG. 15A illustrates device 600 displaying a user interface screen 1510-1 including instructions to capture an image of a pattern (e.g., "Scan Code"). Device 600 displays a live video feed from a camera associated with device 600 in area 1502 of user interface screen 1510-1 to help the user align the image with the field of view of the camera. In some embodiments, user interface screen 1510-1 is displayed in response to selection of the affordance shown in FIG. 6M labeled "Add Accessory".

Using the camera, device 600 captures an image of pattern 1504. Device 600 then determines that the pattern corresponds to an accessory. In some embodiments, instead of capturing the image itself, device 600 obtains the image from an external device. In some embodiments, device 600 compares the pattern in the image to accessory information stored in a data repository (e.g., a local or remote memory, database, etc.). In some embodiments, device 600 also receives identification data from the accessory (e.g., via Bluetooth communication) and compares it with the pattern in the image to determine whether the pattern corresponds to the accessory. In this way, device 600 verifies that it is correctly identifying the accessory associated with the image.

In response to a determination that the pattern corresponds to the accessory, device 600 associates the accessory with a location. In some embodiments, device 600 creates a profile (an "accessory profile") associated with the accessory, where the profile includes data representing the operational states of the accessory. In some embodiments, in response to determining that the pattern corresponds to an accessory, device 600 establishes a paired relationship with the accessory which enables the electronic device to exchange information with the accessory (e.g., via fear-field communication, Bluetooth protocol, Internet, a local network, etc.) so that device 600 can monitor and/or control the state of the accessory.

In some embodiments, device 600 displays a user interface for inputting information about the accessory, including assigning the accessory to a room or designated area of the location. FIG. 15B illustrates a user interface screen 1510-2 that displays information about the accessory, a representation 1506 of the accessory, and options 1508-1 and 1508-2 for inputting information about the accessory. User interface screen 1510-2 and/or representation 1506 can be populated, e.g., automatically based on information obtained from capturing the image and identifying the accessory. In some embodiments, information is obtained manually based on input from a user. In the embodiment illustrated in FIG. 15B, the representation of the accessory includes an icon, a name, and a room associated with the accessory. In some embodiments, the designated name, image, room, or other information is included in a data profile of the accessory.

To associate the accessory with a room, user interface screen 1510-2 includes an affordance 1508-2 labeled "Choose Room" that when selected allows a user to designate a room. In some embodiments, the device displays a list of rooms, drop-down menu, text entry field, etc. for a user to select a room. In some embodiments, a list of rooms is displayed and arranged based on the position of device 600 in relation to the location. For example, in some embodiments, device 600 estimates which room it is in based on its position and presents the estimated room as a first option. Device 600 detects user input representing selection of a room (e.g., a tap on a room in a dropdown menu), and in response to detecting the user input, associates the selected room with the accessory. In some embodiments, a similar technique is used to input a name for the accessory. In some embodiments, device 600 updates user interface screen 1510-2 and/or representation 1506 to include the room information in the profile associated with the accessory.

User interface screen 1510-2 also includes icons 1512 with images that can be associated with the accessory in response to selection of the corresponding icon. User interface screen 1510-2 also includes an affordance 1514 for designating the accessory as a "Favorite." In some embodiments, device 600 detects a user input on affordance 1541, and in response, displays a representation of the accessory on the Home screen 610-1, e.g., under the Favorite Accessories heading.

Figure 16:
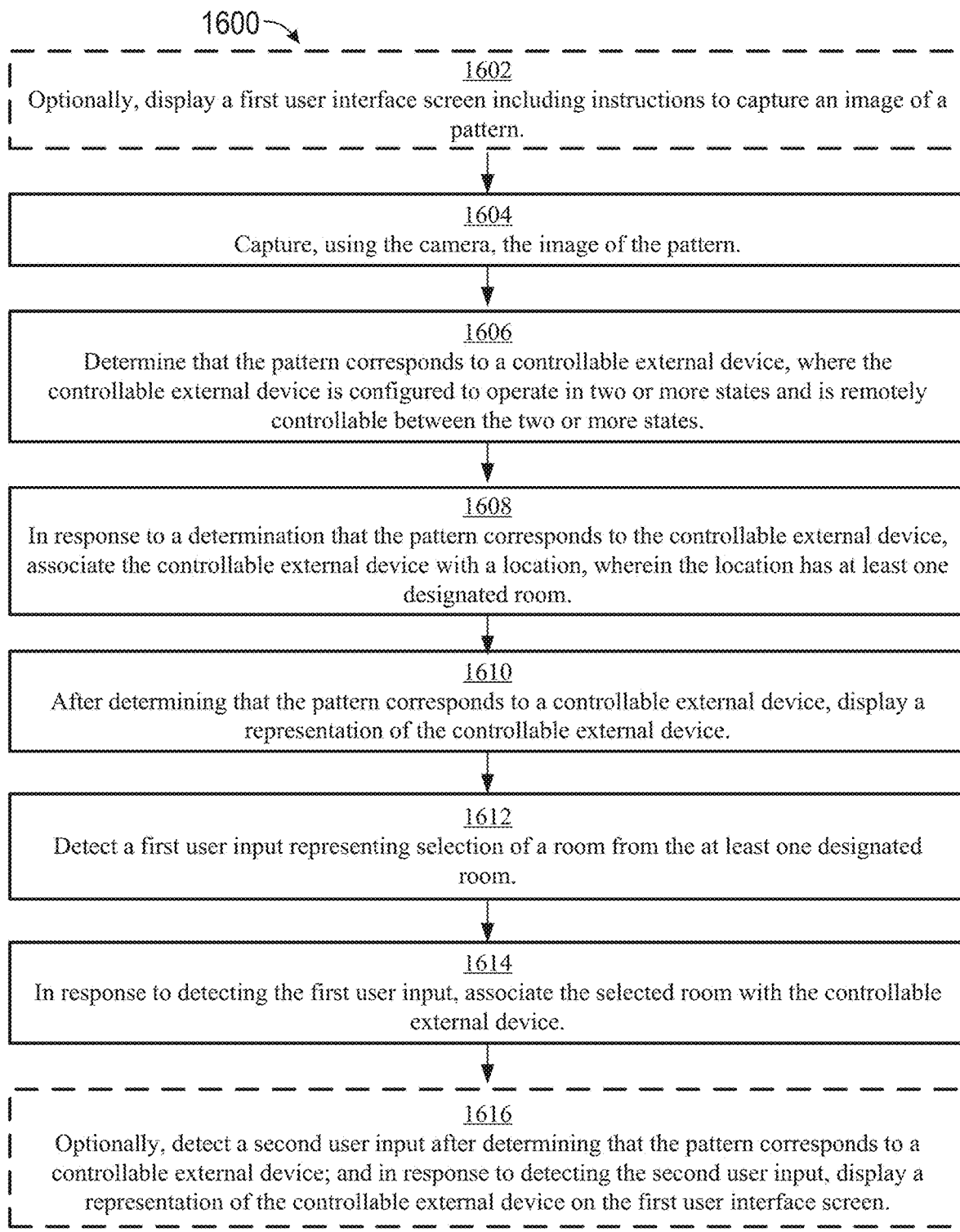
FIG. 16 is a flow diagram illustrating a process for managing controllable external devices in accordance with some embodiments.

FIG. 16 is a flow diagram illustrating a method for managing controllable external devices using an electronic device in accordance with some embodiments. Method 1600 is performed at a device (e.g., 100, 300, 500, or 600) with a display, optionally, a touch-sensitive surface, and, optionally, a camera. Some operations in method 1600 are, optionally, combined, the order of some operations is, optionally, changed, and some operations are, optionally, omitted.

As described below, method 1600 provides an intuitive way for managing controllable external devices. The method reduces the cognitive burden on a user for managing controllable external devices, thereby creating a more efficient human-machine interface. For battery-operated computing devices, enabling a user to manage controllable external devices faster and more efficiently conserves power and increases the time between battery charges.

Optionally, at block 1602, the device displays a first user interface screen (e.g., 1510-1)) including instructions to capture an image of a pattern. Optionally, the first user interface screen is displayed in response to selection of a first affordance on a second user interface screen (e.g., FIG. 6M).

At block 1604, the device captures, using the camera, the image of the pattern (e.g., 1504).

At block 1606, the device determines that the pattern corresponds to a controllable external device, where the controllable external device is configured to operate in two or more states and is remotely controllable between the two or more states.

At block 1608, in response to a determination that the pattern corresponds to the controllable external device, the device associates the controllable external device with a location, where the location has at least one designated room.

Optionally, at block 1610, after determining that the pattern corresponds to a controllable external device, the device displays a representation of the controllable external device (e.g., 1506).

At block 1612, the device detects a first user input representing selection of a room from the at least one designated room (e.g., 1508-2).

At block 1614, in response to detecting the first user input, the device associates the selected room with the controllable external device.

Optionally, at block 1616, the device detects a second user input (e.g., selection of affordance 1514) after determining that the pattern corresponds to a controllable external device; and in response to detecting the second user input, displays a representation of the controllable external device on the first user interface screen (e.g., 610-1).

Note that details of the processes described above with respect to method 1600 (e.g., FIG. 16) are also applicable in an analogous manner to the methods described above and below. For example, methods 700, 1000, 1300, 1900, 2100, 2300, 2600, 2900, and 3200 optionally include one or more of the characteristics of the various methods described above with reference to method 1600.

Figure 17:
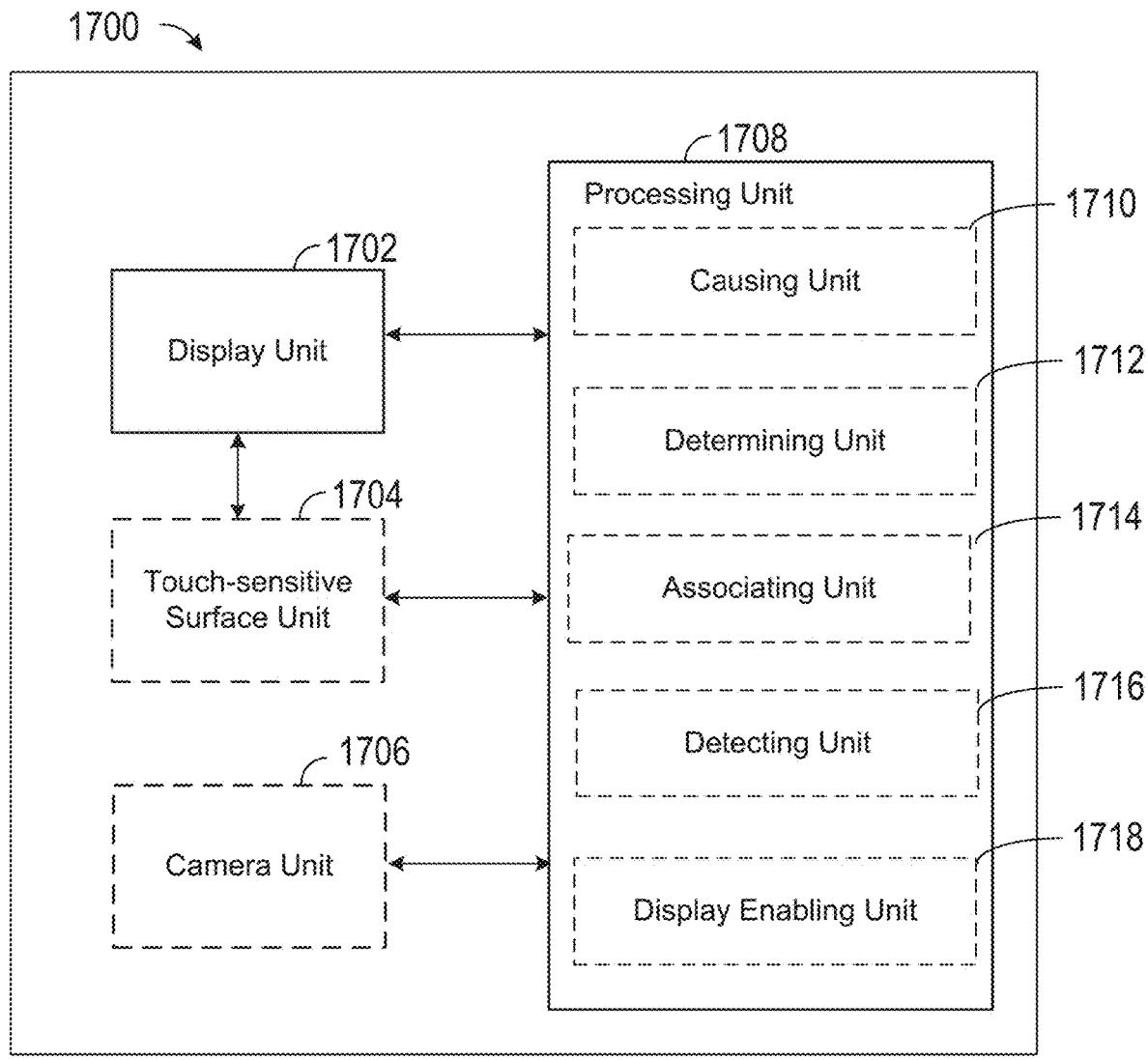
FIG. 17 is a functional block diagram of an electronic device in accordance with some embodiments.

In accordance with some embodiments, FIG. 17 shows an exemplary functional block diagram of an electronic device 1700 configured in accordance with the principles of the various described embodiments. In accordance with some embodiments, the functional blocks of electronic device 1700 are configured to perform the techniques described above. The functional blocks of the device 1700 are, optionally, implemented by hardware, software, or a combination of hardware and software to carry out the principles of the various described examples. It is understood by persons of skill in the art that the functional blocks described in FIG. 17 are, optionally, combined or separated into sub-blocks to implement the principles of the various described examples. Therefore, the description herein optionally supports any possible combination or separation or further definition of the functional blocks described herein.

As shown in FIG. 17, an electronic device 1700 includes a display unit 1702 configured to display a graphic user interface, optionally, a touch-sensitive surface unit 1704 configured to receive contacts, optionally, a camera unit 1706 configured to capture images, and a processing unit 1708 coupled to the display unit 1702, optionally, the touch-sensitive surface unit 1704, and, optionally, the camera unit 1706. In some embodiments, the processing unit 1708 includes a causing unit 1710, a determining unit 1712, an associating unit 1714, a detecting unit 1716, and a display enabling unit 1718.

The processing unit 1708 is configured to: cause (e.g., causing unit 1710) capturing, using the camera unit, an image of a pattern; determine (e.g., with determining unit 1712) that the pattern corresponds to a controllable external device, where the controllable external device is configured to operate in two or more states and is remotely controllable between the two or more states; in response to a determination that the pattern corresponds to the controllable external device, associate (e.g., with associating unit 1714) the controllable external device with a location, where the location has at least one designated room; detect (e.g., with detecting unit 1716) a first user input representing selection of a room from the at least one designated room; and in response to detecting the first user input, associate (e.g., with the associating unit 1714) the selected room with the controllable external device.

In some embodiments, the processing unit 1708 is further configured to: before the image of the pattern is captured, enable display (e.g., with display enabling unit 1718) of a first user interface screen including instructions to capture the image of the pattern. In some embodiments, the first user interface screen is displayed in response to selection of a first affordance on a second user interface screen. In some embodiments, the processing unit is further configured to: after determining that the pattern corresponds to a controllable external device, detect (e.g., with detecting unit 1716) a second user input; and in response to detecting the second user input, enable display (e.g., with display enabling unit 1718) of a representation of the controllable external device on the second user interface screen.

In some embodiments, the processing unit 1708 is further configured to: after determining that the pattern corresponds to a controllable external device, enable display (e.g., with display enabling unit 1718) of a representation of the controllable external device.

The operations described above with reference to FIG. 16 are, optionally, implemented by components depicted in FIGS. 1A-1B or FIG. 17. For example, displaying operations 1602 and 1610, capturing operation 1604, determining operation 1606, associating operations 1608 and 1614, and detecting operations 1612 and 1616 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 18A:
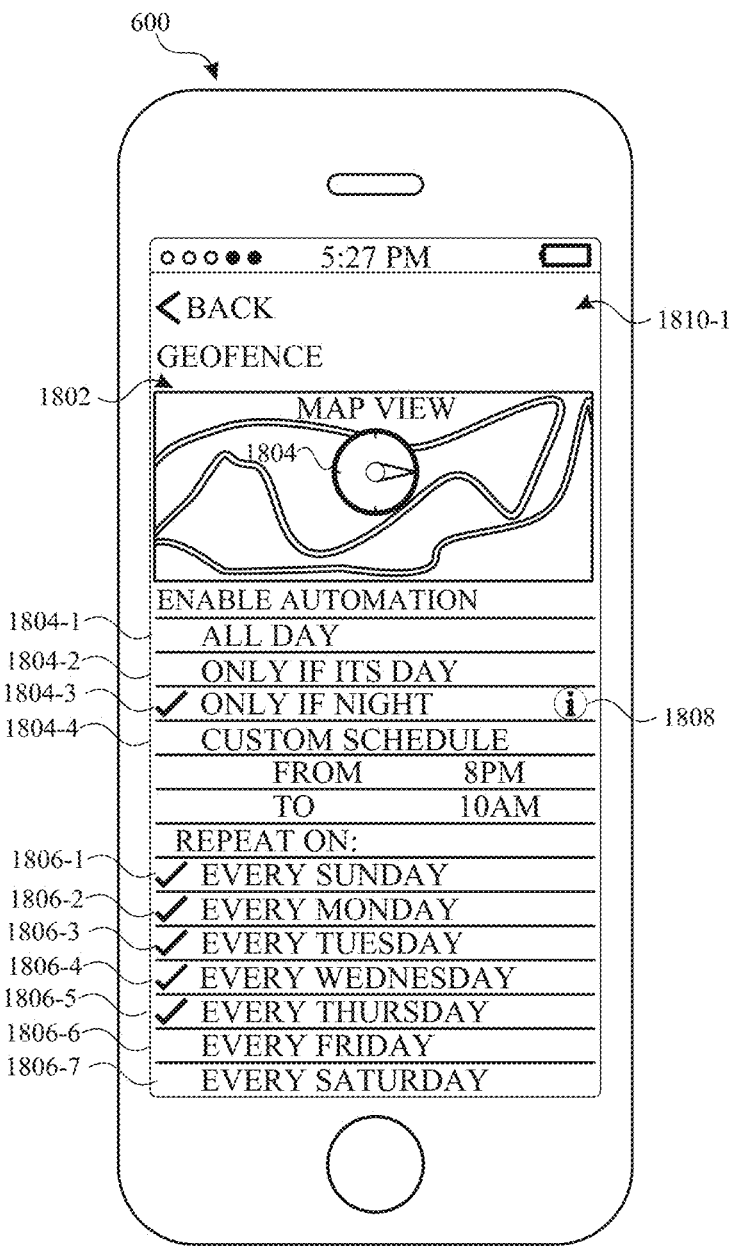
FIGS. 18A-18C illustrate exemplary user interfaces in accordance with some embodiments.
Figure 18B:
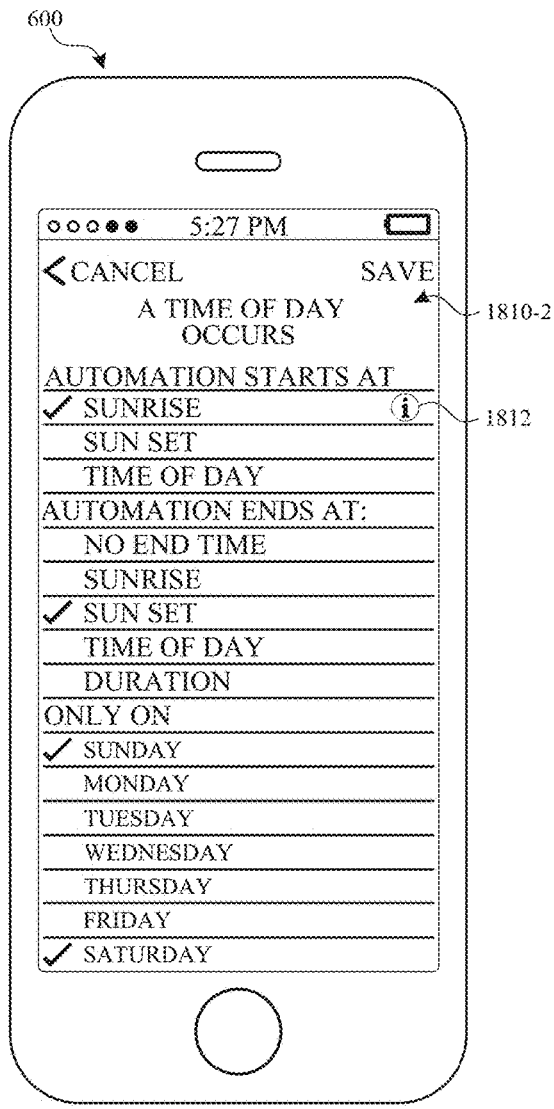
Figure 18C:
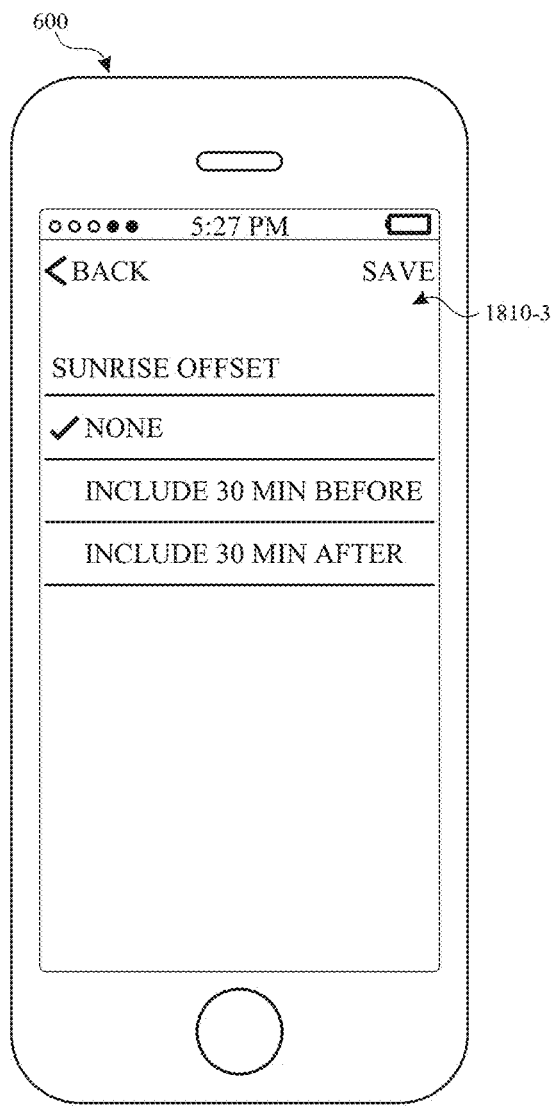

FIGS. 18A-18C illustrate exemplary user interfaces for setting criteria for an automation profile associated with a location, in accordance with some embodiments. The user interfaces in these figures are used to illustrate the processes described below, including the processes in FIG. 19.

FIG. 18A illustrates user interface screen 1810-1 displaying a map view 1802. Map view 1802 is substantially centered on the location associated with the automation profile. Map view 1802 also includes an indication 1804 of a location-based criteria, and in particular, a circular threshold around the position of the location. The location-based criteria are based at least in part on the position of device 600 with respect to the location. In some embodiments, the location-based criteria include whether device 600 is within a threshold distance of the location, where the threshold distance is represented by the radius of the circle. In some embodiments, the threshold distance is the same in all directions from the location (e.g., a circular boundary). In some embodiments, the threshold distance varies with direction from the location.

In some embodiments, the location-based criteria include whether device 600 is less than a threshold distance from the location. In some embodiments, the location-based criteria include whether device 600 is greater than a threshold distance from the location. In some embodiments, the location-based criteria include whether device 600 has moved from greater than a threshold distance from the location to less than the threshold distance from the location. This criterion optionally corresponds to the "I arrive home" criteria 1202-2 represented in FIG. 12A. In some embodiments, the location-based criteria include whether device 600 has moved from less than a threshold distance from the first location to greater than the threshold distance from the location. This criterion optionally corresponds to the "I leave home" criteria 1202-1 represented in FIG. 12A.

Device 600 detects user input corresponding to designation of the location-based criteria (e.g., selection of criteria 1202-1 displayed in FIG. 12A). In response to detecting the user input corresponding to designation of the criteria, device 600 adds the location-based criteria to the automation criteria of the automation profile associated with the location.

User interface screen 1810-1 also includes additional selectable criteria or triggering conditions for the automation profile. User interface objects 1804-1 to 1804-4 represent respective time-based criteria that determine when an automation profile can be enabled: "All day", "Only if it's daytime", "Only if it is night", and a specified window of time (e.g., "From" and "To"). User interface screen 1810-1 also includes options 1806-1 to 1806-7 for selecting on what days, if any, an automation is repeated.

Device 600 also provides an option to further specify the time-based criteria of selected objects 1804-1 to 1804-4. In some embodiments, in response to selection of info icon 1808 on user interface screen 1810-1, device 600 displays user interface screen 1810-2 illustrated in FIG. 18B, which provides additional time-based criteria for the automation profile including: relative start and end times (e.g., sunrise and sunset), specific start time (e.g., time of day), specific ending time, relative ending time, duration, and time-based constraints (e.g., only on Monday). Device 600 also optionally provides the option to specify the time-based criteria even further for a selected relative start and end time. In some embodiments, in response to selection of info icon 1812 on user interface screen 1810-2, device 600 displays user interface screen 1810-3 illustrated in FIG. 18C, which provides the option to add or subtract an offset from a relative time (e.g., sunrise).

Device 600 detects user input corresponding to designation of the time-based criteria (e.g., a tap on one or more of user interface objects shown in FIGS. 18A-18C), and in response, adds the selected time-based criteria to the automation criteria of the automation profile for controlling the at least one affordance associated with the automation profile.

In some embodiments, the user interfaces and time-based criteria described with respect to FIGS. 18A-18C are provided during the creation and/or configuration of an automation profile as described above with reference to FIGS. 12A-12B (e.g., "I leave home" 1202-1 and "I arrive home" 1202-2). Conversely, in some embodiments, the automation criteria are based in part on a state of an accessory at the location as described with reference to the event criteria 1202-4, "An accessory is controlled", in FIG. 12A. (e.g., automation criteria is based on whether an accessory is controlled and/or triggered or an accessory detects an event).

Once the automation criteria are established, the position of device 600 is determined. In some embodiments, device 600 determines its position, e.g., via GPS, WiFi, or other signal. In some embodiments, device 600 determines its position based on information obtained from an external device.

Device 600 determines whether the automation criteria are met based at least in part on the determined position. In accordance with a determination that the automation criteria is met, device 600 sends instructions to implement the automation profile, which includes setting at least one accessory to a designated state. In some embodiments, in accordance with a determination that the automation criteria are not met, device 600 forgoes sending instructions to implement the automation profile.

Figure 19:
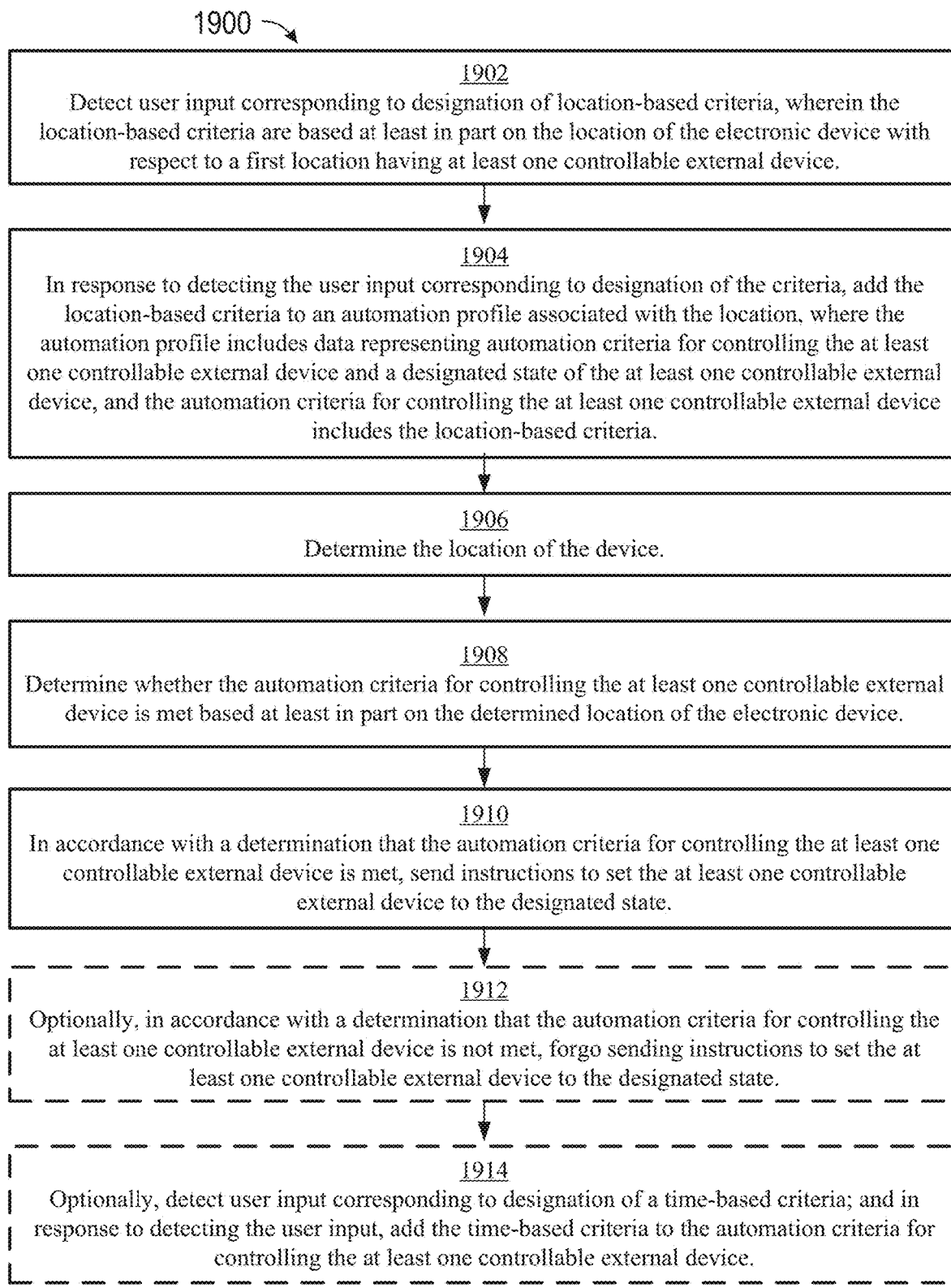
FIG. 19 is a flow diagram illustrating a process for managing controllable external devices in accordance with some embodiments.

FIG. 19 is a flow diagram illustrating a method for managing controllable external devices using an electronic device in accordance with some embodiments. Method 1900 is performed at a device (e.g., 100, 300, 500, or 600) with a display and, optionally, a touch-sensitive surface. Some operations in method 1900 are, optionally, combined, the order of some operations is, optionally, changed, and some operations are, optionally, omitted.

As described below, method 1900 provides an intuitive way for managing controllable external devices. The method reduces the cognitive burden on a user for managing controllable external devices, thereby creating a more efficient human-machine interface. For battery-operated computing devices, enabling a user to manage controllable external devices faster and more efficiently conserves power and increases the time between battery charges.

At block 1902, the device detects user input (e.g., 1220-1) corresponding to designation of location-based criteria (e.g., 1202-1), where the location-based criteria are based at least in part on the location of the electronic device with respect to a first location having at least one controllable external device. Optionally, the device displays a map view (e.g., 1802) with an indication (e.g., 1804) of the location-based criteria. Optionally, the location-based criteria include one or more of: whether the electronic device is less than a threshold distance from the first location, whether the electronic device is greater than a threshold distance from the first location, whether the electronic device has moved from greater than a threshold distance from the first location to less than the threshold distance from the location, and whether the electronic device has moved from less than a threshold distance from the first location to greater than the threshold distance from the location.

At block 1904, in response to detecting the user input corresponding to designation of the criteria, the device adds the location-based criteria to an automation profile associated with the location, where the automation profile includes data representing automation criteria for controlling the at least one controllable external device and a designated state of the at least one controllable external device, and the automation criteria for controlling the at least one controllable external device includes the location-based criteria. Optionally, the automation criteria for controlling the at least one controllable external device are based in part on a state of a first controllable external device of the at least one controllable external device (e.g., 1202-4).

At block 1906, the device determines the location of the electronic device.

At block 1908, the device determines whether the automation criteria for controlling the at least one controllable external device is met based at least in part on the determined location of the electronic device.

At block 1910, in accordance with a determination that the automation criteria for controlling the at least one controllable external device is met, the device sends instructions to set the at least one controllable external device to the designated state.

Optionally, at block 1912, in accordance with a determination that the automation criteria for controlling the at least one controllable external device is not met, the device forgoes sending instructions to set the at least one controllable external device to the designated state.

Optionally, at block 1914, the device detects user input corresponding to designation of a time-based criteria (e.g., 1202-3 and 1804-1 to 1804-4); and in response to detecting the user input, adds the time-based criteria to the automation criteria for controlling the at least one controllable external device.

Note that details of the processes described above with respect to method 1900 (e.g., FIG. 19) are also applicable in an analogous manner to the methods described above and below. For example, methods 700, 1000, 1300, 1600, 2100, 2300, 2600, 2900, and 3200 optionally include one or more of the characteristics of the various methods described above with reference to method 1900.

Figure 20:
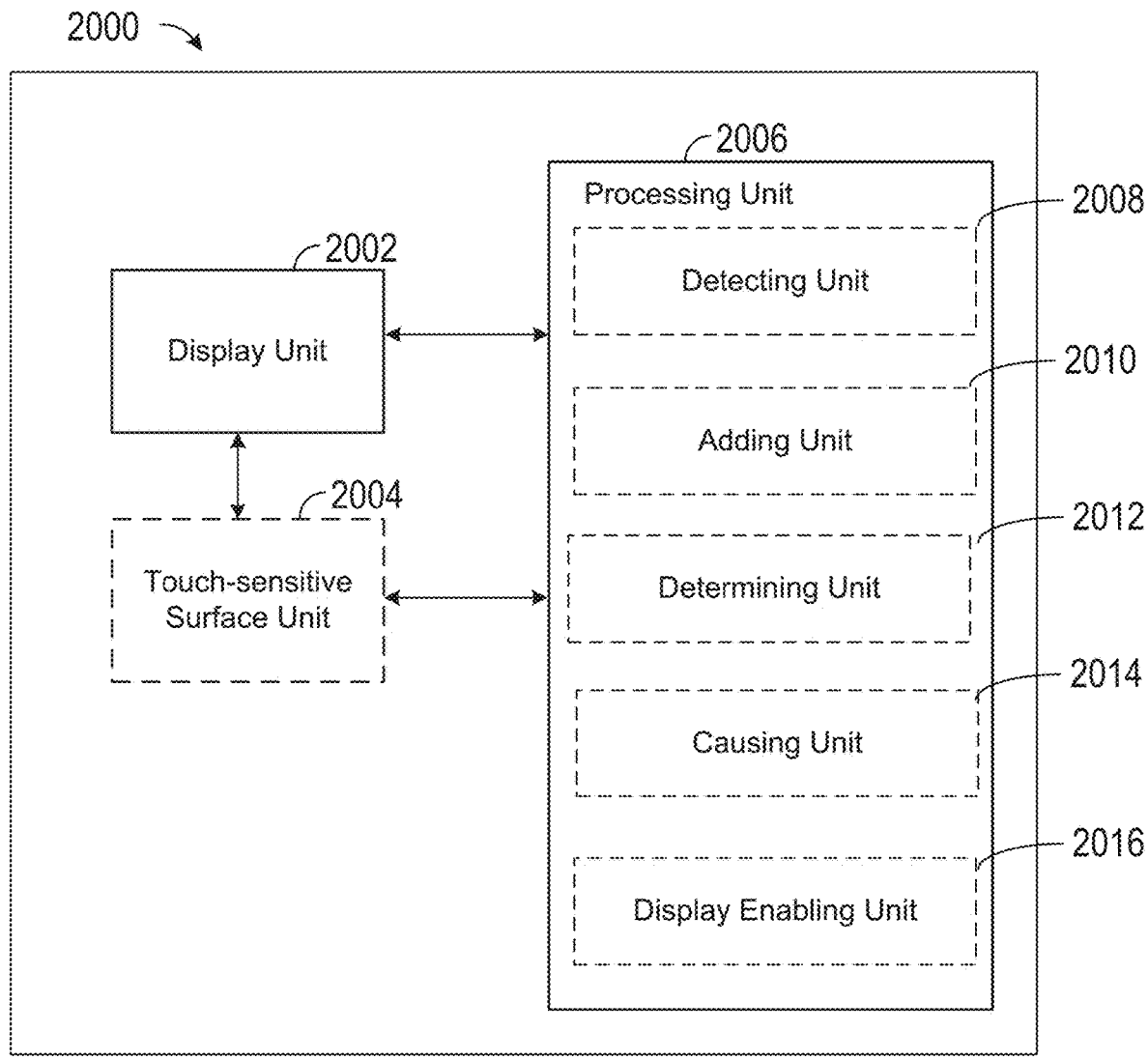
FIG. 20 is a functional block diagram of an electronic device in accordance with some embodiments.

In accordance with some embodiments, FIG. 20 shows an exemplary functional block diagram of an electronic device 2000 configured in accordance with the principles of the various described embodiments. In accordance with some embodiments, the functional blocks of electronic device 2000 are configured to perform the techniques described above. The functional blocks of the device 2000 are, optionally, implemented by hardware, software, or a combination of hardware and software to carry out the principles of the various described examples. It is understood by persons of skill in the art that the functional blocks described in FIG. 20 are, optionally, combined or separated into sub-blocks to implement the principles of the various described examples. Therefore, the description herein optionally supports any possible combination or separation or further definition of the functional blocks described herein.

As shown in FIG. 20, an electronic device 2000 includes a display unit 2002 configured to display a graphic user interface, optionally, a touch-sensitive surface unit 2004 configured to receive contacts, and a processing unit 2006 coupled to the display unit 2002 and, optionally, the touch-sensitive surface unit 2004. In some embodiments, the processing unit 2006 includes a detecting unit 2008, an adding unit 2010, a determining unit 2012, a causing unit 2014, and a display enabling unit 2016.

The processing unit 2006 is configured to: detect (e.g., with detecting unit 2008) user input corresponding to designation of location-based criteria, where the location-based criteria are based at least in part on the location of the electronic device with respect to a first location having at least one controllable external device; in response to detecting the user input corresponding to designation of the criteria, add (e.g., with adding unit 2010) the location-based criteria to an automation profile associated with the location, where the automation profile includes data representing automation criteria for controlling the at least one controllable external device and a designated state of the at least one controllable external device, and where the automation criteria for controlling the at least one controllable external device includes the location-based criteria; determine (e.g., with determining unit 2012) the location of the electronic device; determine (e.g., with determining unit 2012) whether the automation criteria for controlling the at least one controllable external device is met based at least in part on the determined location of the electronic device; and in accordance with a determination that the automation criteria for controlling the at least one controllable external device is met, cause (e.g., with causing unit 2014) sending of instructions to set the at least one controllable external device to the designated state.

In some embodiments, the processing unit 2006 is further configured to: in accordance with a determination that the automation criteria for controlling the at least one controllable external device is not met, forgoing sending instructions to set the at least one controllable external device to the designated state.

In some embodiments, the processing unit 2006 is further configured to enable display (e.g., with display enabling unit 2016) of a map view with an indication of the location-based criteria.

In some embodiments, the location-based criteria include whether the electronic device is less than a threshold distance from the first location. In some embodiments, the location-based criteria include whether the electronic device is greater than a threshold distance from the first location. In some embodiments, the location-based criteria include whether the electronic device has moved from greater than a threshold distance from the first location to less than the threshold distance from the location. In some embodiments, the location-based criteria include whether the electronic device has moved from less than a threshold distance from the first location to greater than the threshold distance from the location.

In some embodiments, the processing unit 2006 is further configured to: detect (e.g., with detecting unit 2008) user input corresponding to designation of a time-based criteria; and in response to detecting the user input, add (e.g., with adding unit 2010) the time-based criteria to the automation criteria for controlling the at least one controllable external device.

In some embodiments, the automation criteria for controlling the at least one controllable external device are based in part on a state of a first controllable external device of the at least one controllable external device.

The operations described above with reference to FIG. 19 are, optionally, implemented by components depicted in FIGS. 1A-1B or FIG. 20. For example, detecting operations 1902 and 1914, adding operations 1904 and 1914, determining operations 1906 and 1908, sending operation 1910, and forgoing operation 1912 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIG. 21 is a flow diagram illustrating a method for managing controllable external devices using an electronic device in accordance with some embodiments. Method 2100 is performed at a device (e.g., 100, 300, 500, or 600) with a display and, optionally, a touch-sensitive surface. Some operations in method 2100 are, optionally, combined, the order of some operations is, optionally, changed, and some operations are, optionally, omitted.

As described below, method 2100 provides an intuitive way for managing controllable external devices. The method reduces the cognitive burden on a user for managing controllable external devices, thereby creating a more efficient human-machine interface. For battery-operated computing devices, enabling a user to manage controllable external devices faster and more efficiently conserves power and increases the time between battery charges.

At block 2102, the device determines whether criteria of an automation profile (e.g., 1202-1 to 1202-4 and 1804-1 to 1804-4) are met, where the automation profile includes data representing criteria for controlling a state of at least one controllable external device and designated states for the at least one controllable external device. Optionally, the criteria of the automation profile are based at least in part on one or more of: the location of the electronic device with respect to a location associated with the at least one controllable external device, time, and a state of a first controllable external device of the at least one controllable external device (e.g., FIGS. 12A and 18A).

At block 2104, in accordance with a determination that the criteria of the automation profile are met, the device displays a notification (e.g., 1208), where the notification includes an indication that identifies the automation profile and an indication to confirm implementation of the automation profile (e.g., 1212 in FIG. 12C).

At block 2106, the device detects a user input (e.g., selection of affordance 1212 or 1214).

At block 2108, in response to detecting the user input, the device: in accordance with the user input corresponding to confirmation of implementation of the automation profile (e.g., selection of affordance 1212), sends instructions to implement the designated states of the automation profile;

and in accordance with the user input corresponding to non-confirmation of implementation of the automation profile (e.g., selection of affordance 1214), sends instructions not to implement the designated states of the automation profile.

Note that details of the processes described above with respect to method 2100 (e.g., FIG. 21) are also applicable in an analogous manner to the methods described above and below. For example, methods 700, 1000, 1300, 1600, 1900, 2300, 2600, 2900, and 3200 optionally include one or more of the characteristics of the various methods described above with reference to method 2100.

Figure 22:
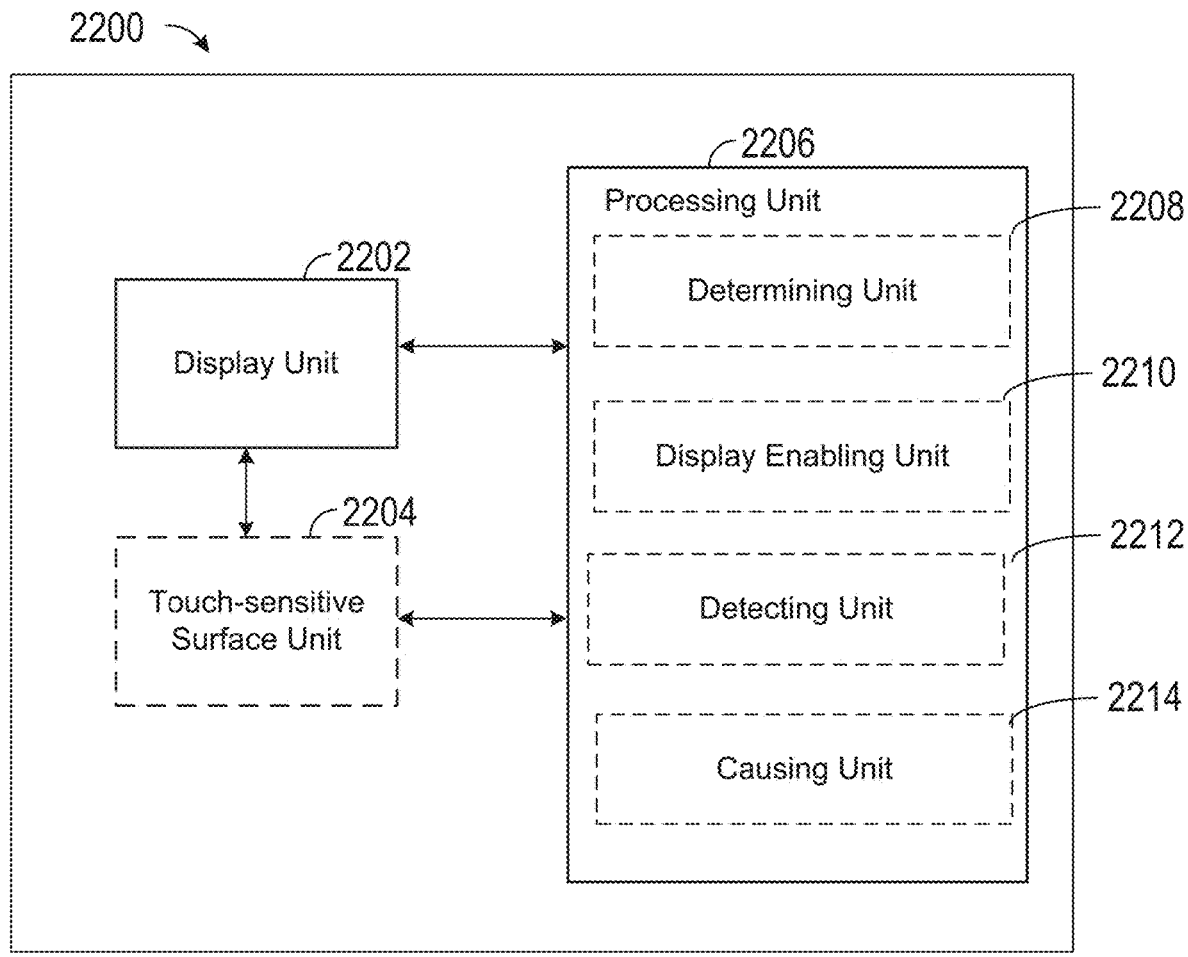
FIG. 22 is a functional block diagram of an electronic device in accordance with some embodiments.

In accordance with some embodiments, FIG. 22 shows an exemplary functional block diagram of an electronic device 2200 configured in accordance with the principles of the various described embodiments. In accordance with some embodiments, the functional blocks of electronic device 2200 are configured to perform the techniques described above. The functional blocks of the device 2200 are, optionally, implemented by hardware, software, or a combination of hardware and software to carry out the principles of the various described examples. It is understood by persons of skill in the art that the functional blocks described in FIG. 22 are, optionally, combined or separated into sub-blocks to implement the principles of the various described examples. Therefore, the description herein optionally supports any possible combination or separation or further definition of the functional blocks described herein.

As shown in FIG. 22, an electronic device 2200 includes a display unit 2202 configured to display a graphic user interface, optionally, a touch-sensitive surface unit 2204 configured to receive contacts, and a processing unit 2206 coupled to the display unit 2202 and, optionally, the touch-sensitive surface unit 2204. In some embodiments, the processing unit 2206 includes a determining unit 2208, a display enabling unit 2210, a detecting unit 2212, and a causing unit 2214.

The processing unit 2206 is configured to: determine (e.g., with determining unit 2208) whether criteria of an automation profile are met, where the automation profile includes data representing criteria for controlling a state of at least one controllable external device and designated states for the at least one controllable external device; in accordance with a determination that the criteria of the automation profile are met, enable display (e.g., with display enabling unit 2210) of a notification, where the notification includes an indication that identifies the automation profile and an indication to confirm implementation of the automation profile; detect (e.g., with detecting unit 2212) a user input; and in response to detecting the user input: in accordance with the user input corresponding to confirmation of implementation of the automation profile, cause (e.g., with causing unit 2214) sending of instructions to implement the designated states of the automation profile; and in accordance with the user input corresponding to non-confirmation of implementation of the automation profile, cause (e.g., with causing unit 2214) sending of instructions not to implement the designated states of the automation profile.

In some embodiments, the criteria of the automation profile are based at least in part on the location of the electronic device with respect to a location associated with the at least one controllable external device. In some embodiments, the criteria of the automation profile are based at least in part on time. In some embodiments, the criteria of the automation profile are based at least in part on a state of a first controllable external device of the at least one controllable external device.

The operations described above with reference to FIG. 21 are, optionally, implemented by components depicted in FIGS. 1A-1B or FIG. 22. For example, determining operation 2102, displaying operation 2104, detecting operation 2106 and sending operation 2108 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIG. 23 is a flow diagram illustrating a method for managing controllable external devices using an electronic device in accordance with some embodiments. Method 2300 is performed at a device (e.g., 100, 300, 500, or 600) with a display and, optionally, a touch-sensitive surface. Some operations in method 2300 are, optionally, combined, the order of some operations is, optionally, changed, and some operations are, optionally, omitted.

As described below, method 2300 provides an intuitive way for managing controllable external devices. The method reduces the cognitive burden on a user for managing controllable external devices, thereby creating a more efficient human-machine interface. For battery-operated computing devices, enabling a user to managing controllable external devices faster and more efficiently conserves power and increases the time between battery charges.

At block 2302, the device displays a representation (e.g., 620-1) of a controllable external device, where the controllable external device is configured to operate in a plurality of states, and where the controllable external device is in a first state of a plurality of states. Optionally, the representation of the controllable external device includes an indication of the current state of the controllable external device. In some embodiments, the states of the plurality of states are continuous (e.g., FIGS. 6J-6K). In some embodiments, the states of the plurality of states are discrete (e.g., FIGS. 6D-6I). In some embodiments, the controllable external device is a color-adjustable light bulb, and the plurality of states includes a plurality of colors (e.g., FIG. 6K).

At block 2304, the device detects a first user input corresponding to a selection of the controllable external device (e.g., 630-1).

At block 2306, the device determines whether the first user input meets input criteria.

At block 2308, in accordance with a determination that the first user input does not meet the input criteria, the device sends instructions to set the state of the controllable external device to a second state of the plurality of states (e.g., 620-1 in FIGS. 6B-6C).

At block 2310, in accordance with a determination that the first user input meets the input criteria, the device: displays an affordance indicating the plurality of states of the controllable external device (e.g., 608); while displaying the affordance indicating the plurality of states of the controllable external device, detects a second user input (e.g., 630-2) on the affordance corresponding to selection of a third state of the plurality of states; and in response to detecting the second user input, sends instructions to set the state of the controllable external device to the third state.

Optionally, at block 2312, the device, while displaying the affordance indicating the plurality of states of the controllable external device, detects a third user input corresponding to selection of a location on the display that does not correspond to the affordance (e.g., 612); and in response to detecting the third user input, ceases to display the affordance.

Note that details of the processes described above with respect to method 2300 (e.g., FIG. 23) are also applicable in an analogous manner to the methods described above and below. For example, methods 700, 1000, 1300, 1600, 1900, 2100, 2600, 2900, and 3200 optionally include one or more of the characteristics of the various methods described above with reference to method 2300.

Figure 24:
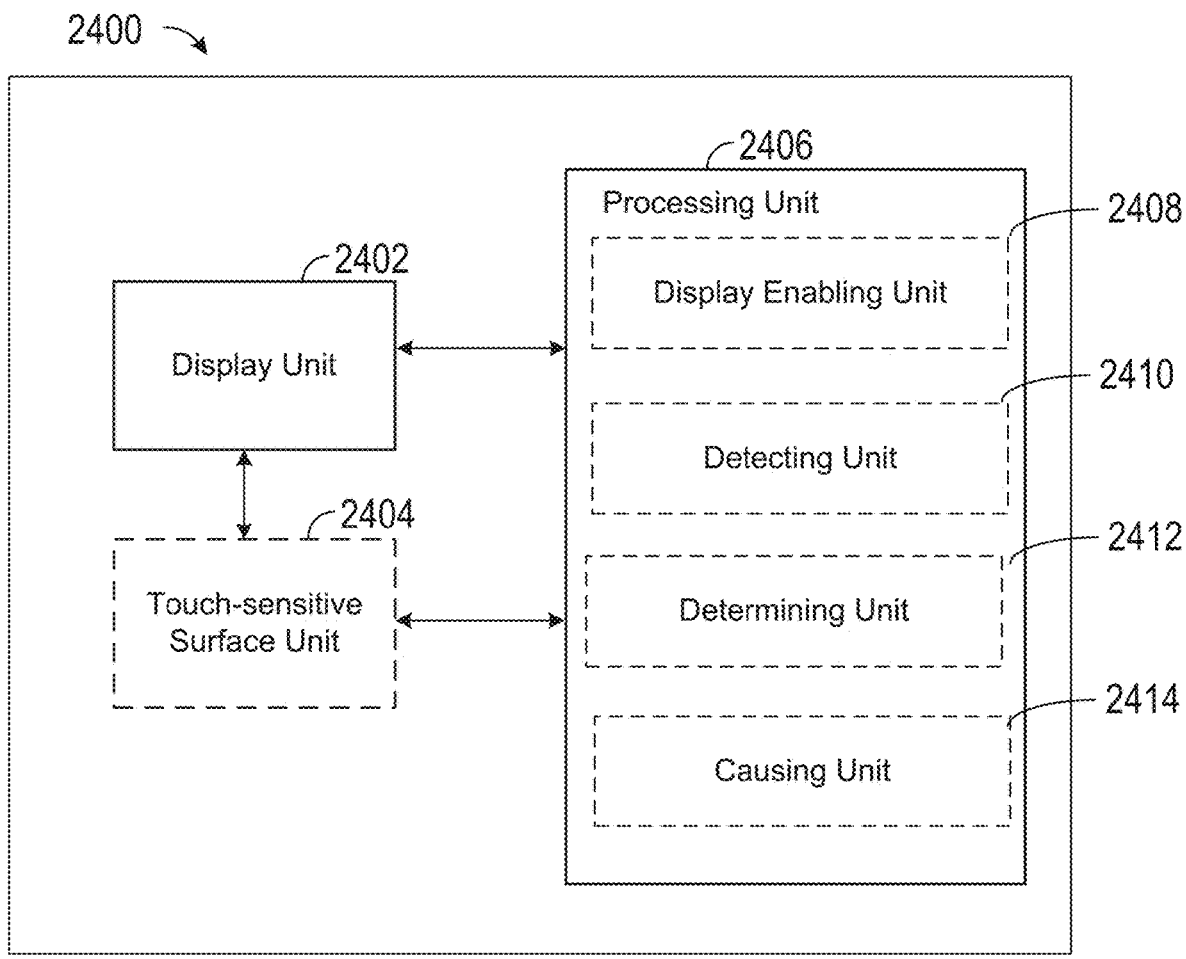
FIG. 24 is a functional block diagram of an electronic device in accordance with some embodiments.

In accordance with some embodiments, FIG. 24 shows an exemplary functional block diagram of an electronic device 2400 configured in accordance with the principles of the various described embodiments. In accordance with some embodiments, the functional blocks of electronic device 2400 are configured to perform the techniques described above. The functional blocks of the device 2400 are, optionally, implemented by hardware, software, or a combination of hardware and software to carry out the principles of the various described examples. It is understood by persons of skill in the art that the functional blocks described in FIG. 24 are, optionally, combined or separated into sub-blocks to implement the principles of the various described examples. Therefore, the description herein optionally supports any possible combination or separation or further definition of the functional blocks described herein.

As shown in FIG. 24, an electronic device 2400 includes a display unit 2402 configured to display a graphic user interface, optionally, a touch-sensitive surface unit 2404 configured to receive contacts, and a processing unit 2406 coupled to the display unit 2402 and, optionally, the touch-sensitive surface unit 2404. In some embodiments, the processing unit 2406 includes a display enabling unit 2408, a detecting unit 2410, a determining unit 2412, and a causing unit 2414.

The processing unit 2406 is configured to: enable display (e.g., with display enabling unit 2408) of a representation of a controllable external device, where the controllable external device is configured to operate in a plurality of states, and where the controllable external device is in a first state of a plurality of states; detect (e.g., with detecting unit 2410) a first user input corresponding to a selection of the controllable external device; determine (e.g., with determining unit 2412) whether the first user input meets input criteria; in accordance with a determination that the first user input does not meet the input criteria, cause (e.g., with causing unit 2414) sending of instructions to set the state of the controllable external device to a second state of the plurality of states; and in accordance with a determination that the first user input meets the input criteria: enable display (e.g., with display enabling unit 2408) of an affordance indicating the plurality of states of the controllable external device; while displaying the affordance indicating the plurality of states of the controllable external device, detect a second user input on the affordance corresponding to selection of a third state of the plurality of states; and in response to detecting the second user input, cause (e.g., with causing unit 2414) sending of instructions to set the state of the controllable external device to the third state.

In some embodiments, the states of the plurality of states are continuous. In some embodiments, the states of the plurality of states are discrete. In some embodiments, the controllable external device is a color-adjustable light bulb, and the plurality of states includes a plurality of colors. In some embodiments, the representation of the controllable external device includes an indication of the current state of the controllable external device.

In some embodiments, the processing unit 2406 is further configured to: while the affordance indicating the plurality of states of the controllable external device is displayed, detect (e.g., with detecting unit 2410) a third user input corresponding to selection of a location on the display that does not correspond to the affordance; and in response to detecting the third user input, cause (e.g., with causing unit 2414) display of the affordance to cease.

The operations described above with reference to FIG. 23 are, optionally, implemented by components depicted in FIGS. 1A-1B or FIG. 24. For example, displaying operations 2302 and 2310, detecting operations 2304, 2310, and 2312, determining operation 2306, and sending operation 2308 and 2310 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 25:
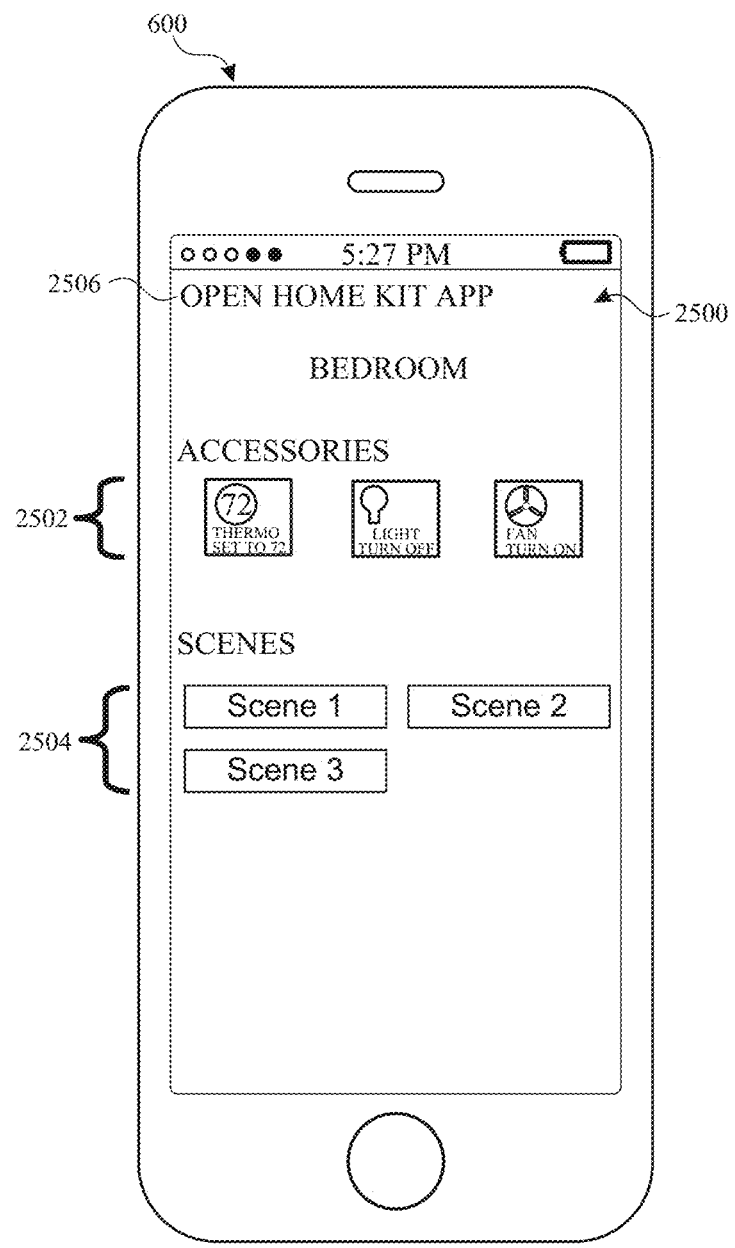
FIG. 25 illustrates an exemplary user interface in accordance with some embodiments.

FIG. 25 illustrates an exemplary user interface for managing controllable external devices, in accordance with some embodiments. The user interfaces in these figures are used to illustrate the processes described below, including the processes in FIG. 26.

In some embodiments, device 600 determines its position at a first position within a location, where the location includes at least one designated room. In some embodiments, the position of device 600 is determined using GPS, Bluetooth, and/or WiFi signals. Exemplary techniques for determining the position of device 600 include: comparing the strength of a signal (or signals) from a first set of devices with known positions to the strength of a signal (or signals) from a second set of devices with known positions; (2) determining the strength of a signal received from a WiFi source with a known position (e.g., the strength of the signal corresponds to a radius that is used to determine a position based on the layout of the location); (3) detecting Bluetooth signals (e.g., Bluetooth low energy signals) from a beacon device (e.g., the iBeacon protocol developed by Apple Inc. of Cupertino, California); (4) dead reckoning (e.g., using a previously determined position and advancing that position based upon known or estimated speeds over elapsed time and course, as determined, for example, by sensors in device 600); and GPS.

After determining the first position, device 600 determines that the first position corresponds to a first room of the location. In response to determining that the first position corresponds to the first room, device 600 displaying a representation of an accessory associated with the first room. In some embodiments, device 600 also displays, based on the determination of the room, a representation of a scene profile, where the scene profile includes data regarding a designated state of at least one accessory associated with the determined room.

FIG. 25 illustrates an exemplary user interface screen 2500 displayed in response to determining that the position corresponds to the bedroom of a location. User interface screen includes representations 2502 of three accessories associated with the bedroom and representations 2504 of three scene profiles that include accessories associated with the bedroom. Each representation 2502 of the accessories indicates the current state of the corresponding accessory (e.g., Set to 72 degrees) or an action that selection of the representation would cause (e.g., Turn OFF or Turn ON, which in some circumstances implies the current state). In some embodiments, the representations 2504 include affordances for controlling the state of the corresponding accessories as described above with reference to FIGS. 6B-6K. In some embodiments, the representations 2504 of the scene profiles can be selected to implement the scene profile.

In some embodiments, device 600 periodically determines its position and whether the position corresponds to a designated room in the location. In some embodiments, device 600 automatically displays representations of the accessories in a room upon determining that its position corresponds to a room (e.g., without being prompted by the user). In some embodiments, device 600 displays a notification in response to determining that the position corresponds to the room. The notification can be selected by a user to display the accessories associated with the determined room. These techniques may allow the user to quickly and easily control the accessories in a room upon approaching or entering the room.

Optionally, while displaying the representation of the accessory associated with the first room, device 600 detect a user input, and in response to detecting the user input, opens an application for controlling accessories at the location. For example, as shown in FIG. 25, user interface screen 2500 includes an affordance 2506 to open the application provides access to control all of the accessories associated with the other rooms in a location. In some embodiments, the application launched by selection of affordance 2506 is the application or an application with user interfaces similar to the application described with reference to FIGS. 6A-6S. In this way, device 600 can potentially reduce the burden on the user to control an accessory in a different room if device 600 determines the room incorrectly.

In some embodiments, device 600 determines its position, determines a room, and/or displays representation of accessories associated with the determined room in response to user input. For example, when choosing accessories for a scene profile or an automation profile as described above with reference to FIGS. 9B-9C and 12B, device 600 optionally displays the accessories or scene profiles associated with the determined room above accessories and scene profiles in other rooms. For example, with respect to FIG. 9C, in some embodiments, if device 600 determines that it is positioned in the Bathroom, the Bathroom heading and representations 908-4 and 908-5 appear above the Bedroom heading and representations 908-1 to 908-3.

In some embodiments, after displaying a representation of the accessory associated with the first room, device 600 determines its position at a second position within the location, determines that the second position corresponds to a second room of the location, where the second room is different than the first room. In response to determining that the second position corresponds to the second room, device 600 ceases to display the representation of the accessory associated with the first room and displays a representation of an accessory associated with the second room.

FIG. 26 is a flow diagram illustrating a method for managing controllable external devices using an electronic device in accordance with some embodiments. Method 2600 is performed at a device (e.g., 100, 300, 500, or 600) with a display and, optionally, a touch-sensitive surface. Some operations in method 2600 are, optionally, combined, the order of some operations is, optionally, changed, and some operations are, optionally, omitted.

As described below, method 2600 provides an intuitive way for managing controllable external devices. The method reduces the cognitive burden on a user for managing controllable external devices, thereby creating a more efficient human-machine interface. For battery-operated computing devices, enabling a user to manage controllable external devices faster and more efficiently conserves power and increases the time between battery charges.

At block 2602, the device determines a first position of the device within a location, where the location includes at least one designated room. Optionally, the position of the device is determined using GPS, Bluetooth, and/or WiFi signals.

At block 2604, the device determines that the first position corresponds to a first room of the at least one designated room.

At block 2606, in response to determining that the first position corresponds to the first room, the device displays a representation of a first controllable external device associated with the first room (e.g., 2502). Optionally, the representation of the first controllable external device indicates a current state of the first controllable external device. Optionally, the device displays, based on the determination of the room, a representation of a scene profile, where the scene profile includes data regarding designated states of a plurality of controllable external devices at the location including at least one controllable external device associated with the determined room.

Optionally, at block 2608, the device detects a first user input (e.g., selection of one of representations 2502); and in response to the first user input, sends instructions to set the first controllable external device to a first state.

Optionally, at block 2610, the device, while displaying the representation of the first controllable external device, detects a second user input (e.g., selection of affordance 2506); and in response to detecting the second user input, opens an application for controlling a plurality of controllable external devices at the location (e.g., 610-1).

Optionally, at block 2612, the device determines a second position of the electronic device within the location; determines that the second position corresponds to a second room of the at least one designated room, where the second room is different than the first room; and in response to determining that the second position corresponds to the second room: ceases to display the representation of the first controllable external device associated with the first room; and displays a representation of a second controllable external device associated with the second room.

Note that details of the processes described above with respect to method 2600 (e.g., FIG. 26) are also applicable in an analogous manner to the methods described above and below. For example, methods 700, 1000, 1300, 1600, 1900, 2100, 2300, 2900, and 3200 optionally include one or more of the characteristics of the various methods described above with reference to method 2600.

Figure 27:
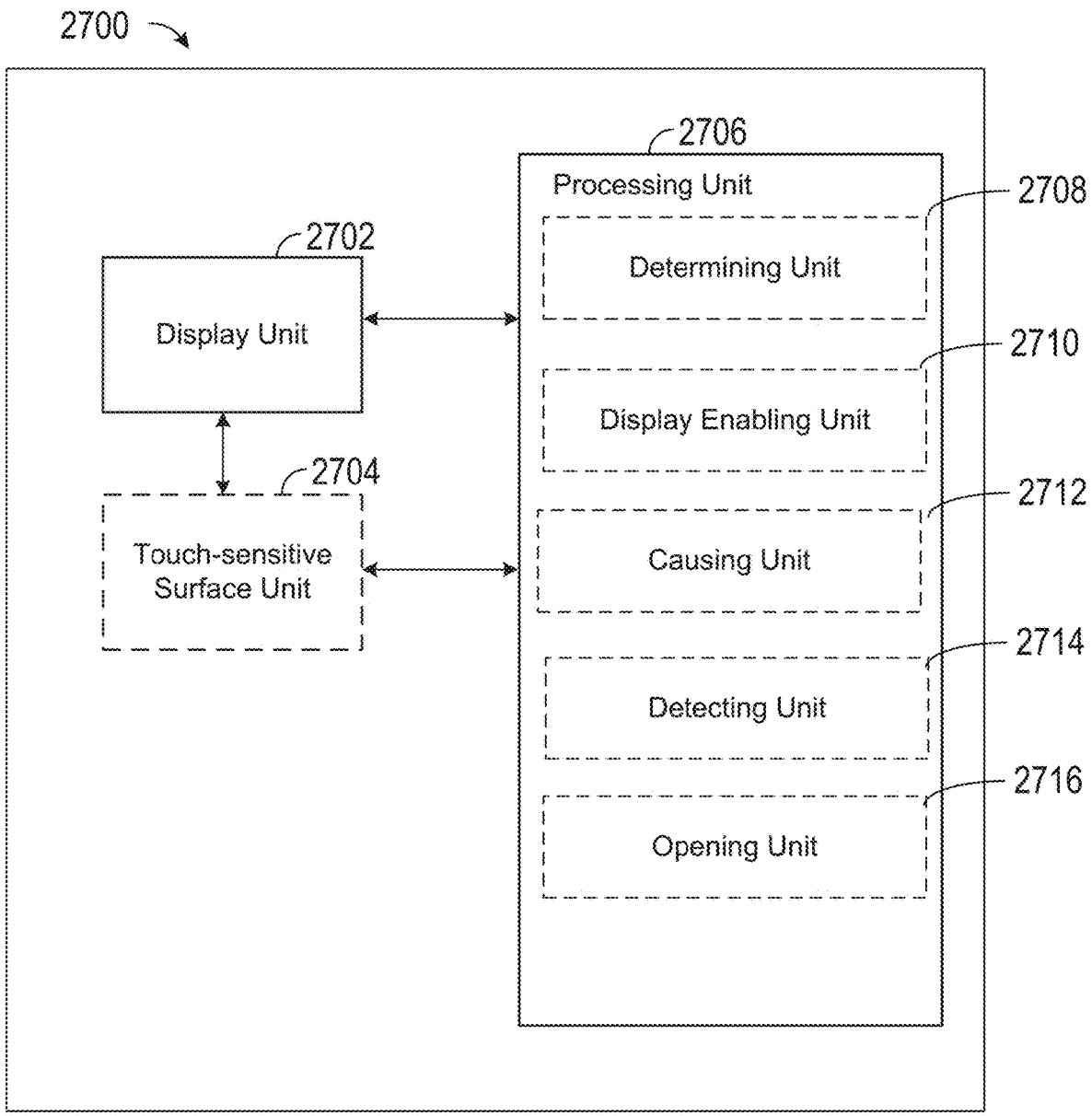
FIG. 27 is a functional block diagram of an electronic device in accordance with some embodiments.

In accordance with some embodiments, FIG. 27 shows an exemplary functional block diagram of an electronic device 2700 configured in accordance with the principles of the various described embodiments. In accordance with some embodiments, the functional blocks of electronic device 2700 are configured to perform the techniques described above. The functional blocks of the device 2700 are, optionally, implemented by hardware, software, or a combination of hardware and software to carry out the principles of the various described examples. It is understood by persons of skill in the art that the functional blocks described in FIG. 27 are, optionally, combined or separated into sub-blocks to implement the principles of the various described examples. Therefore, the description herein optionally supports any possible combination or separation or further definition of the functional blocks described herein.

As shown in FIG. 27, an electronic device 2700 includes a display unit 2702 configured to display a graphic user interface, optionally, a touch-sensitive surface unit 2704 configured to receive contacts, and a processing unit 2706 coupled to the display unit 2702 and, optionally, the touch-sensitive surface unit 2704. In some embodiments, the processing unit 2706 includes a determining unit 2708, a display enabling unit 2710, a causing unit 2712, a detecting unit 2714, and an opening unit 2716.

The processing unit 2706 is configured to: determine (e.g., with determining unit 2708) a first position of the electronic device within a location, where the location includes at least one designated room; determine (e.g., with determining unit 2708) that the first position corresponds to a first room of the at least one designated room; and in response to determining that the first position corresponds to the first room, enable display (e.g., with display enabling unit 2710) of a representation of a first controllable external device associated with the first room.

In some embodiments, the processing unit 2706 is further configured to: after a representation of the first controllable external device associated with the first room is displayed, determine (e.g., with determining unit 2708) a second position of the electronic device within the location; determine (e.g., with determining unit 2708) that the second position corresponds to a second room of the at least one designated room, where the second room is different than the first room; and in response to determining that the second position corresponds to the second room: cause (e.g., with causing unit 2712) display of the representation of the first controllable external device associated with the first room to cease; and enable display (e.g., with display enabling unit 2710) of a representation of a second controllable external device associated with the second room. In some embodiments, the representation of the first controllable external device indicates a current state of the first controllable external device.

In some embodiments, the processing unit 2706 is further configured to: detect (e.g., with detecting unit 2714) a first user input; and in response to the first user input, cause (e.g., with causing unit 2712) sending of instructions to set the first controllable external device to a first state.

In some embodiments, the position of the electronic device is determined using GPS, Bluetooth, and/or WiFi signals.

In some embodiments, the processing unit 2706 is further configured to: while the representation of the first controllable external device is displayed, detect (e.g., with detecting unit 2714) a second user input; and in response to detecting the second user input, open (e.g., with opening unit 2716) an application for controlling a plurality of controllable external devices at the location.

In some embodiments, the processing unit 2706 is further configured to: enable display (e.g., with display enabling unit 2710) of, based on the determination of the room, a representation of a scene profile, where the scene profile includes data regarding designated states of a plurality of controllable external devices at the location including at least one controllable external device associated with the determined room.

The operations described above with reference to FIG. 26 are, optionally, implemented by components depicted in FIGS. 1A-1B or FIG. 27. For example, determining operations 2602, 2604, and 2612, displaying operations 2606 and 2612, detecting operation 2608 and 2610, sending operation 2608, and opening operation 2610 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 28A-28E illustrate exemplary user interfaces for providing an electronic device with access to a location profile, in accordance with some embodiments. The user interfaces in these figures are used to illustrate the processes described below, including the processes in FIG. 29.

Figure 28A:
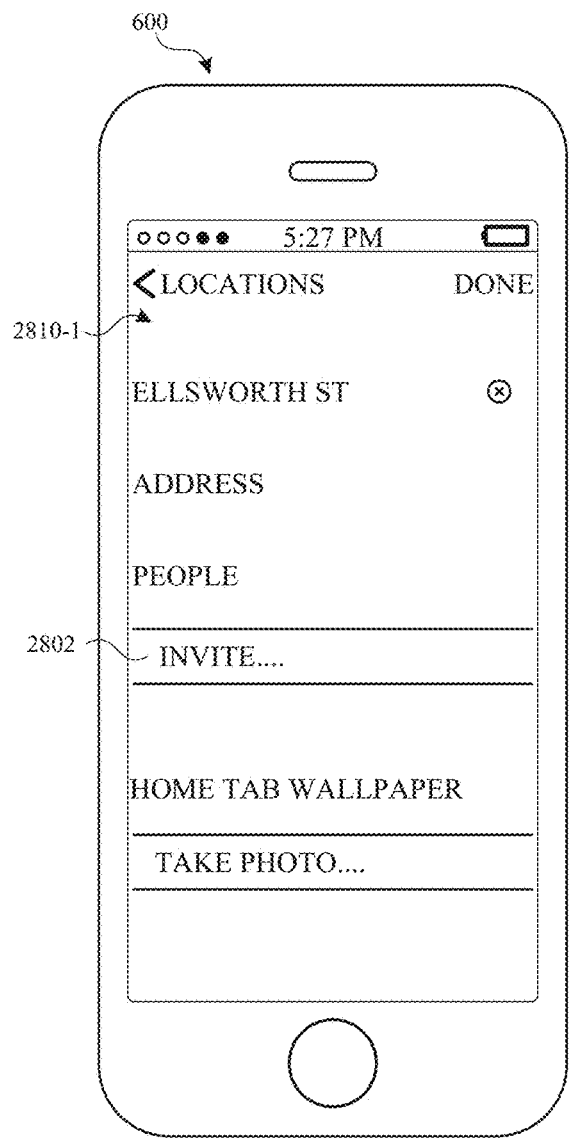
FIGS. 28A-28E illustrate exemplary user interfaces in accordance with some embodiments.

FIG. 28A illustrates user interface screen 2810-1 displayed on device 600. User interface screen 2810-1 is associated with a location and includes affordance 2802 indicating an option to invite a personal contact to access the location profile of the location.

Figure 28B:
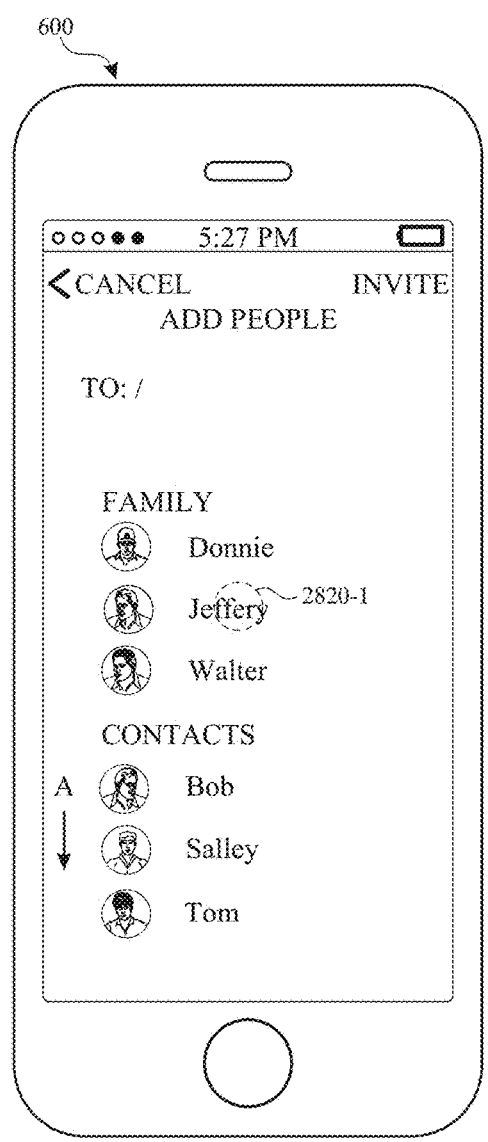
Figure 28C:
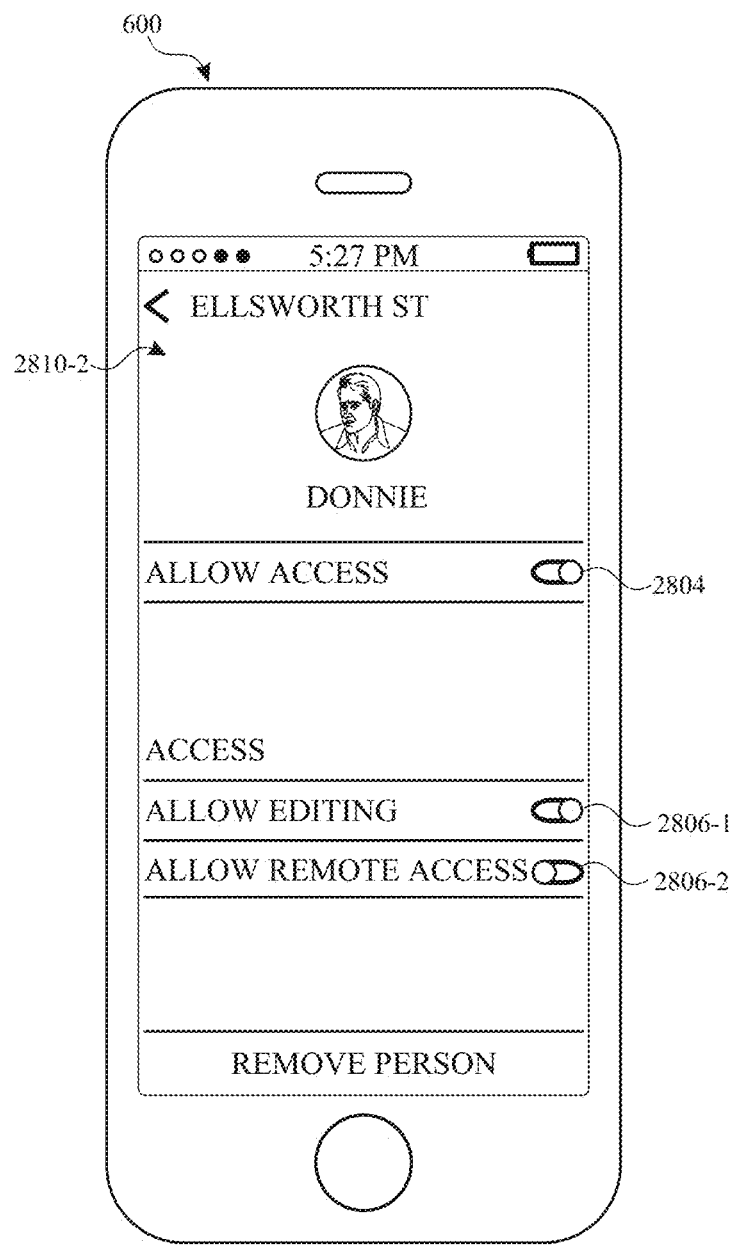

In response to selection of affordance 2802, device 600 displays a list of personal contacts, as shown in FIG. 28B. Device 600 detects a user input 2820-1 corresponding to selection of a first personal contact (e.g., Jeffery). After selection of the first personal contact, device 600 displays user interface screen 2810-2 as shown in FIG. 28C. User interface screen includes affordance 2804 representing an access parameter and affordances 2806-1 and 2806-2 representing parameters that further specify a user's access. The access parameter determines whether a device or user profile associated with the selected first personal contact has access to the location profile associated with the location. In some embodiments, access to a location profile permits a user to view any of the information of the profile (e.g., current status of accessories and/or people associated with the location) and to control accessories associated with the location. The parameter associated with affordance 2806-1 determines the editing privileges of the device or user profile associated with the selected first personal contact including, e.g., the ability to edit the states of accessories, automation profiles, and scene profiles. The parameter associated with affordance 2806-2 determines the remote access privileges of the selected contact.

Device 600 detects a user input corresponding to selection of the access affordance 2804 and/or the affordances 2806-1 and 2806-2 and grants an external device associated with the first personal contact access to the location profile based on the selected parameters. In some embodiments, granting access includes sending instructions to another device (e.g., a server) to allow the external device associated with the first personal contact to access the location profile.

Figure 28D:
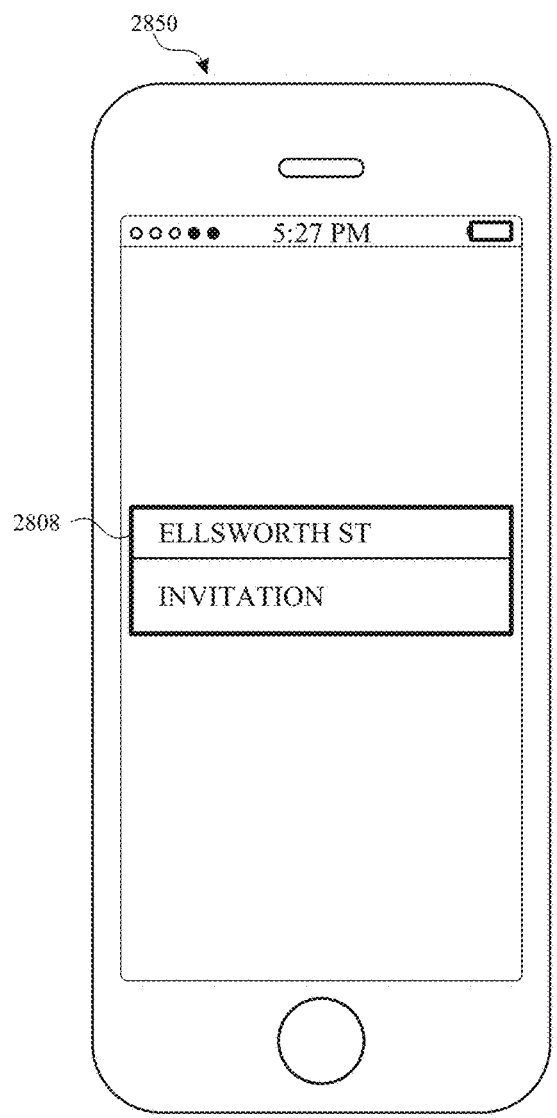
Figure 28E:
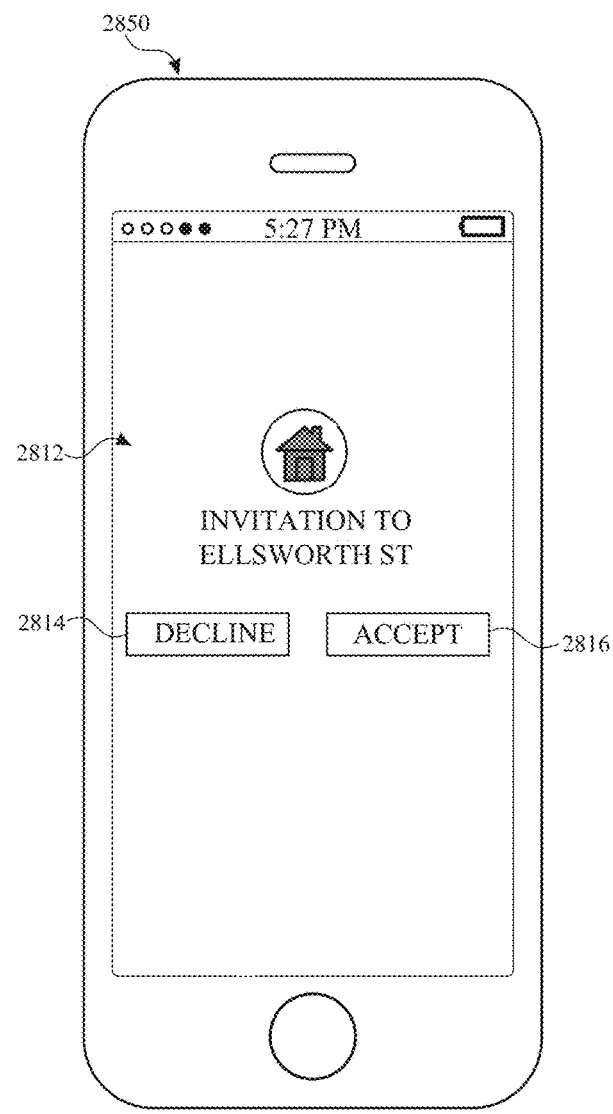

Device 600 also sends data including an invitation to access the location profile to the external device associated with the first personal contact. FIG. 28D illustrates an external device 2850 that displays an exemplary notification 2808 of the invitation, and FIG. 28E illustrates an embodiment of an invitation 2812 displayed on external device 2850. Optionally, the invitation is sent either before or after the access parameter is selected. In some embodiments, after sending the invitation to the external device associated with the first personal contact, device 600 displays an indication that the first personal contact has been invited to the location. For example, Home screen 610-1 in FIG. 6A and/or user interface screen 610-7 in FIG. 6S showing the People tab, both described above, optionally include an indication that a personal contact has been invited to the location (e.g., 644-3 "Cory" on user interface screen 610-7 in FIG. 6S).

Optionally, the invitation is sent either before or after granting the external device access to the location profile. In some embodiments, the invitation includes a request to decline or accept the invitation (e.g., FIG. 28E, affordances 2814 and 2816, respectively). In some embodiments, the invitation is sent before granting access to the location profile, device 600 receives data indicating that the first personal contact has accepted the invitation, and then access to the location profile is granted to the external device associated with the first personal contact in response to receiving the data indicating that the first personal contact has accepted the invitation. In some embodiments, further in response to receiving the data indicating that the first personal contact has accepted the invitation, device 600 displays an indication of the relative physical location of the external device associated with the first personal contact with respect to the location. For example, Home screen 610-1 and/or user interface screen 610-7 in FIG. 6S showing the People tab, both described above, optionally include an indication that a personal contact is "At home" or "Away". In some embodiments, a representation of a contact on Home screen 610-1 by itself indicates that the contact is at the location (see also, e.g., 644-2 "Steve" on user interface screen 610-7 in FIG. 6S).

FIG. 29 is a flow diagram illustrating a method for managing access to a system of controllable external devices using an electronic device in accordance with some embodiments. Method 2900 is performed at a device (e.g., 100, 300, 500, or 600) with a display and, optionally, a touch-sensitive surface. Some operations in method 2900 are, optionally, combined, the order of some operations is, optionally, changed, and some operations are, optionally, omitted.

As described below, method 2900 provides an intuitive way for managing access to a system of controllable external devices. The method reduces the cognitive burden on a user for managing access to a system of controllable external devices, thereby creating a more efficient human-machine interface. For battery-operated computing devices, enabling a user to manage access to a system of controllable external devices faster and more efficiently conserves power and increases the time between battery charges.

At block 2902, the device displays a first affordance representing a first personal contact (e.g., FIG. 28B).

At block 2904, the device detects a first user input corresponding to selection of the first affordance representing the first personal contact (e.g., 2820-1).

At block 2906, the device displays a second affordance representing an access parameter that determines access to a location profile associated with a location (e.g., 2804), where the location profile includes information regarding a controllable external device at the location.

At block 2908, the device detects a second user input corresponding to selection of the second affordance (e.g., selection of affordance 2804).

At block 2910, the device grants an external device associated with the first personal contact access to the location profile, where the access is based on the access parameter.

At block 2912, the device sends data to the external device associated with the first personal contact, where the data includes an invitation to access the location profile (e.g., 2808 and 2812). In some embodiments, the invitation is sent before granting access to the location profile and access to the location profile is granted to the external device associated with the first personal contact in response to receiving data indicating that the first personal contact has accepted the invitation. Optionally, further in response to receiving the data indicating that the first personal contact has accepted the invitation, the device displays an indication of the relative physical location of the external device associated with the first personal contact with respect to the location.

Optionally, at block 2914, after sending the invitation to the external device associated with the first personal contact, the device displays an indication that the first personal contact has been invited to the location (e.g., FIG. 6S).

Note that details of the processes described above with respect to method 2900 (e.g., FIG. 29) are also applicable in an analogous manner to the methods described above and below. For example, methods 700, 1000, 1300, 1600, 1900, 2100, 2300, 2600, and 3200 optionally include one or more of the characteristics of the various methods described above with reference to method 2900.

Figure 30:
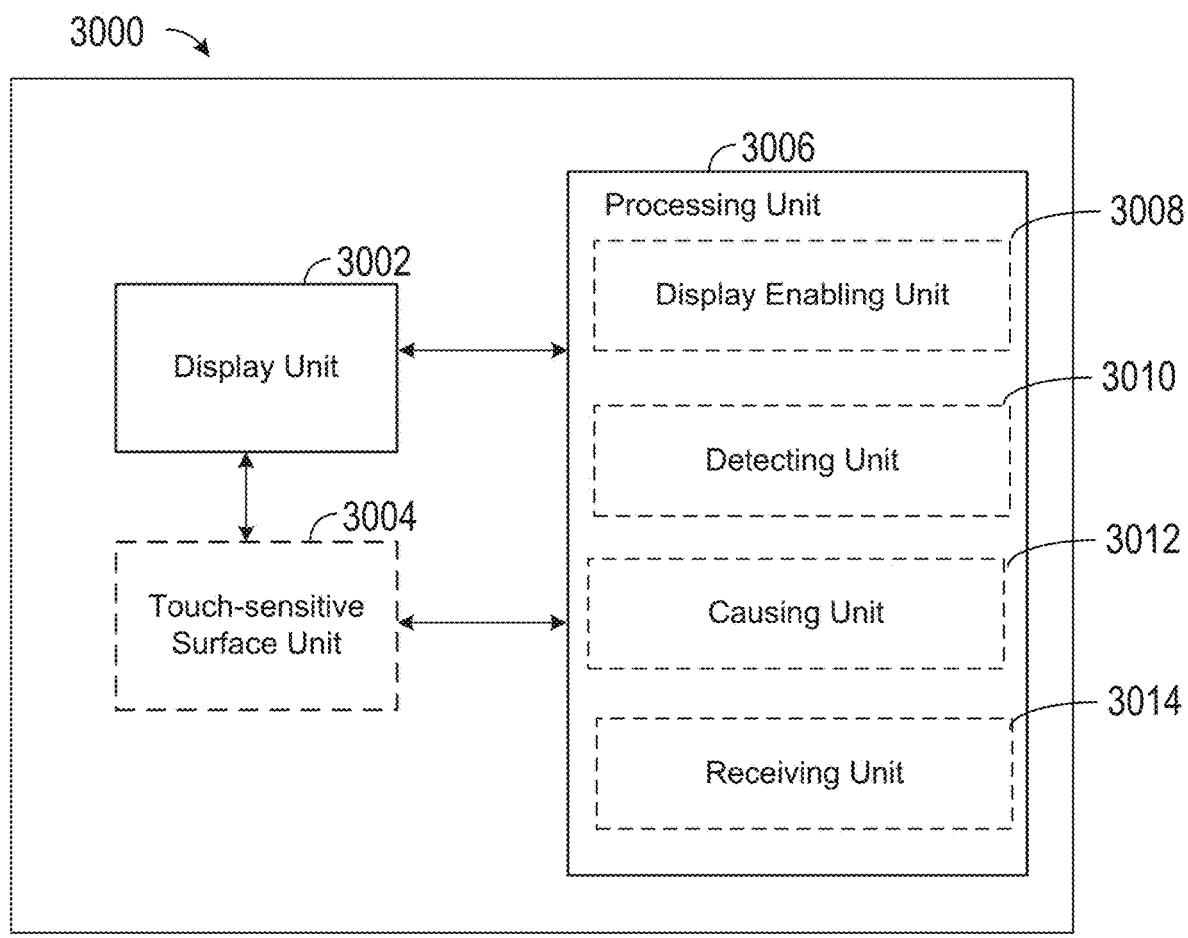
FIG. 30 is a functional block diagram of an electronic device in accordance with some embodiments.

In accordance with some embodiments, FIG. 30 shows an exemplary functional block diagram of an electronic device 3000 configured in accordance with the principles of the various described embodiments. In accordance with some embodiments, the functional blocks of electronic device 3000 are configured to perform the techniques described above. The functional blocks of the device 3000 are, optionally, implemented by hardware, software, or a combination of hardware and software to carry out the principles of the various described examples. It is understood by persons of skill in the art that the functional blocks described in FIG. 30 are, optionally, combined or separated into sub-blocks to implement the principles of the various described examples. Therefore, the description herein optionally supports any possible combination or separation or further definition of the functional blocks described herein.

As shown in FIG. 30, an electronic device 3000 includes a display unit 3002 configured to display a graphic user interface, optionally, a touch-sensitive surface unit 3004 configured to receive contacts, and a processing unit 3006 coupled to the display unit 3002 and, optionally, the touch-sensitive surface unit 3004. In some embodiments, the processing unit 3006 includes a display enabling unit 3008, a detecting unit 3010, a causing unit 3012, and a receiving unit 3014.

The processing unit 3006 is configured to: enable display (e.g., with display enabling unit 3008) of a first affordance representing a first personal contact; detect (e.g., with detecting unit 3010) a first user input corresponding to selection of the first affordance representing the first personal contact; enable display (e.g., with display enabling unit 3008) of a second affordance representing an access parameter that determines access to a location profile associated with a location, where the location profile includes information regarding a controllable external device at the location; detect (e.g., with detecting unit 3010) a second user input corresponding to selection of the second affordance; cause (e.g., with causing unit 3012) an external device associated with the first personal contact to be granted access to the location profile, where the access is based on the access parameter; and cause (e.g., with causing unit 3012) sending data to the external device associated with the first personal contact, the data including an invitation to access the location profile.

In some embodiments, the processing unit 3006 is further configured to: after the invitation to the external device associated with the first personal contact is sent, enable display (e.g., with display enabling unit 3008) of an indication that the first personal contact has been invited to the location.

In some embodiments, the invitation is sent before granting access to the location profile, and where the processing unit is further configured to: receive (e.g., with receiving unit 3014) data indicating that the first personal contact has accepted the invitation, where access to the location profile is caused to be granted to the external device associated with the first personal contact in response to receiving the data indicating that the first personal contact has accepted the invitation.

In some embodiments, the processing unit 3006 is further configured to: further in response to receiving the data indicating that the first personal contact has accepted the invitation, enable display (e.g., with display enabling unit 3008) of an indication of the relative physical location of the external device associated with the first personal contact with respect to the location.

The operations described above with reference to FIG. 29 are, optionally, implemented by components depicted in FIGS. 1A-1B or FIG. 30. For example, displaying operations 2902, 2906, and 2914, detecting operations 2904 and 2908, granting operation 2910, and sending operation 2912 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figures 31A, 31B:
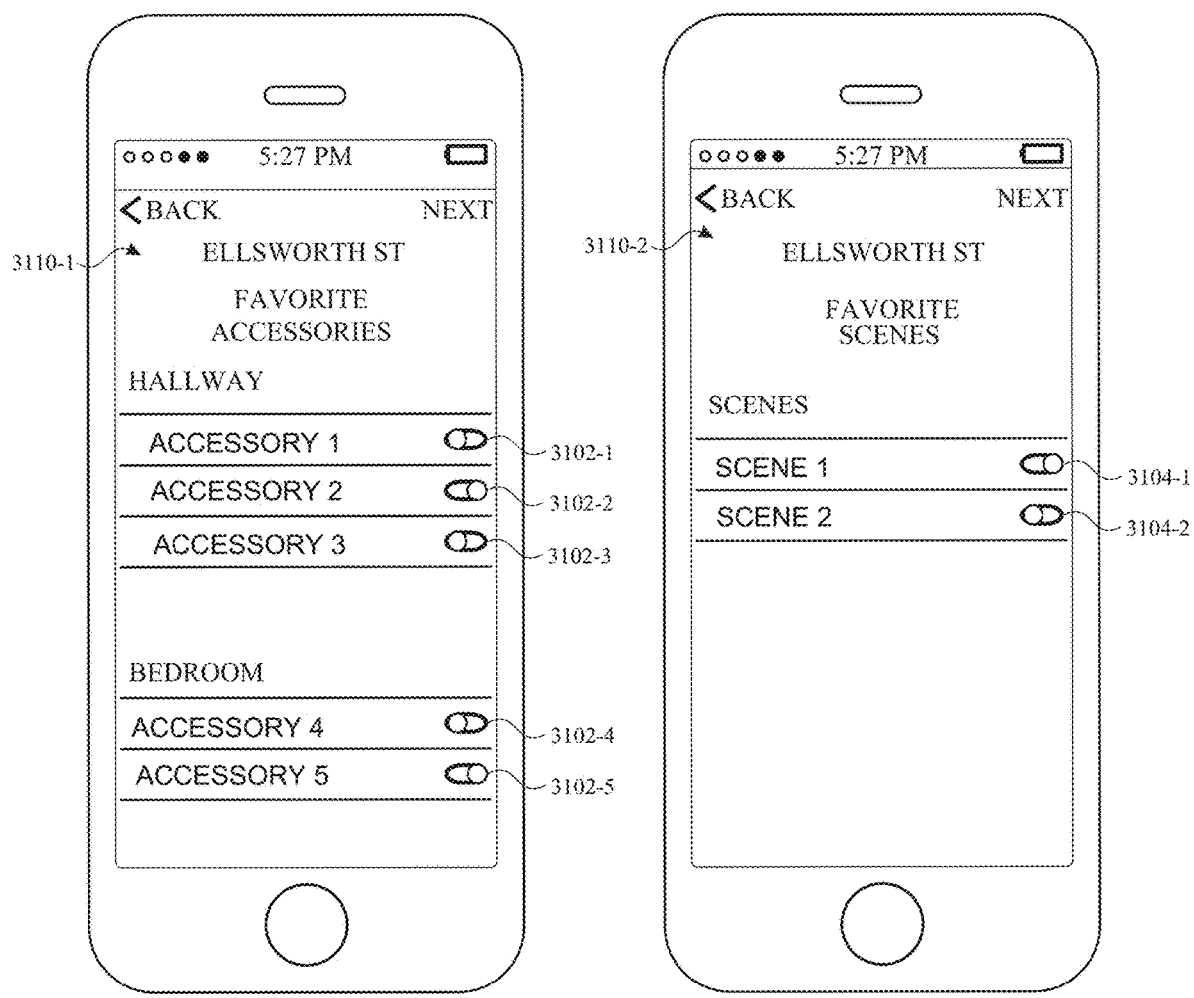
FIGS. 31A-31B illustrate exemplary user interfaces in accordance with some embodiments.

FIGS. 31A-31B illustrate exemplary user interfaces for customizing the display of a user interface for managing controllable external devices, in accordance with some embodiments. In particular, the user interface screens illustrated in FIGS. 31A-31B may allow a user to customize the Home screen (e.g., 610-1 in FIG. 6A) that is presented to the user. The user interfaces in these figures are used to illustrate the processes described below, including the processes in FIG. 32.

In some embodiments, device 600 receives data including information related to a location, where the data includes information related to at least one accessory at the location. In some embodiments, the information includes the location profile of a location, which includes information such as, e.g., name, address, people, wallpaper, year built, and/or notes, and accessories, scene profiles, automation profiles associated with the location.

In accordance with receiving the data, device 600 displays an affordance corresponding to at least one of the accessories at the location. FIG. 31A illustrates an exemplary user interface screen 3110-1 displayed in accordance with receiving the data. User interface screen 3110-1 includes a list of accessories associated with a location and affordances 3102-1 to 3102-5 corresponding to the accessories for optionally designating the accessories (e.g., as a "Favorite Accessory"). The accessories are grouped according to rooms.

Device 600 detects a user input corresponding to selection of one or more of affordances 3102-1 to 3102-5. In response, device 600 displays a user interface screen including an indication of the location and a representation of the accessory associated with selected affordance. For example, in response to selection of affordance 3102-1, device 600 displays a representation of the Accessory 1 under the "Favorite Accessories" heading of the Home screen 610-1 shown in FIG. 6A, which also includes an indication of the location and additional information such as representations of people associated with devices that are determined to be currently at the location.

In some embodiments, device 600 displays an affordance corresponding to at least one scene profile associated with the location. FIG. 31B illustrates an exemplary user interface screen 3110-2 including a list of scene profiles and affordances 3102-1 and 3104-2 corresponding to the scene profiles for optionally designating the scene profiles (e.g., as a "Favorite Scene"). Optionally, device 600 detects a user input corresponding to selection of one or both of affordances 3102-1 and 3104-2. In response, device 600 displays a user interface screen including an indication of the location and a representation of the scene profile associated with the selected affordance(s). For example, in response to selection of affordance 3104-2, device 600 displays a representation of the Scene 2 under the "Favorite Scenes" heading of the Home screen 610-1 shown in FIG. 6A.

In some embodiments, device 600 receives data representing an invitation to obtain the information related to the location (e.g., FIG. 28E), and then receives the information related to the location after accepting the invitation. For example, in some embodiments, in response to receiving the data representing the invitation to obtain the information related to the location, device 600 displays the invitation shown in FIG. 28E. Device 600 then receives the information related to the location after accepting the invitation (e.g., by selecting affordance 2816).

Figure 32:
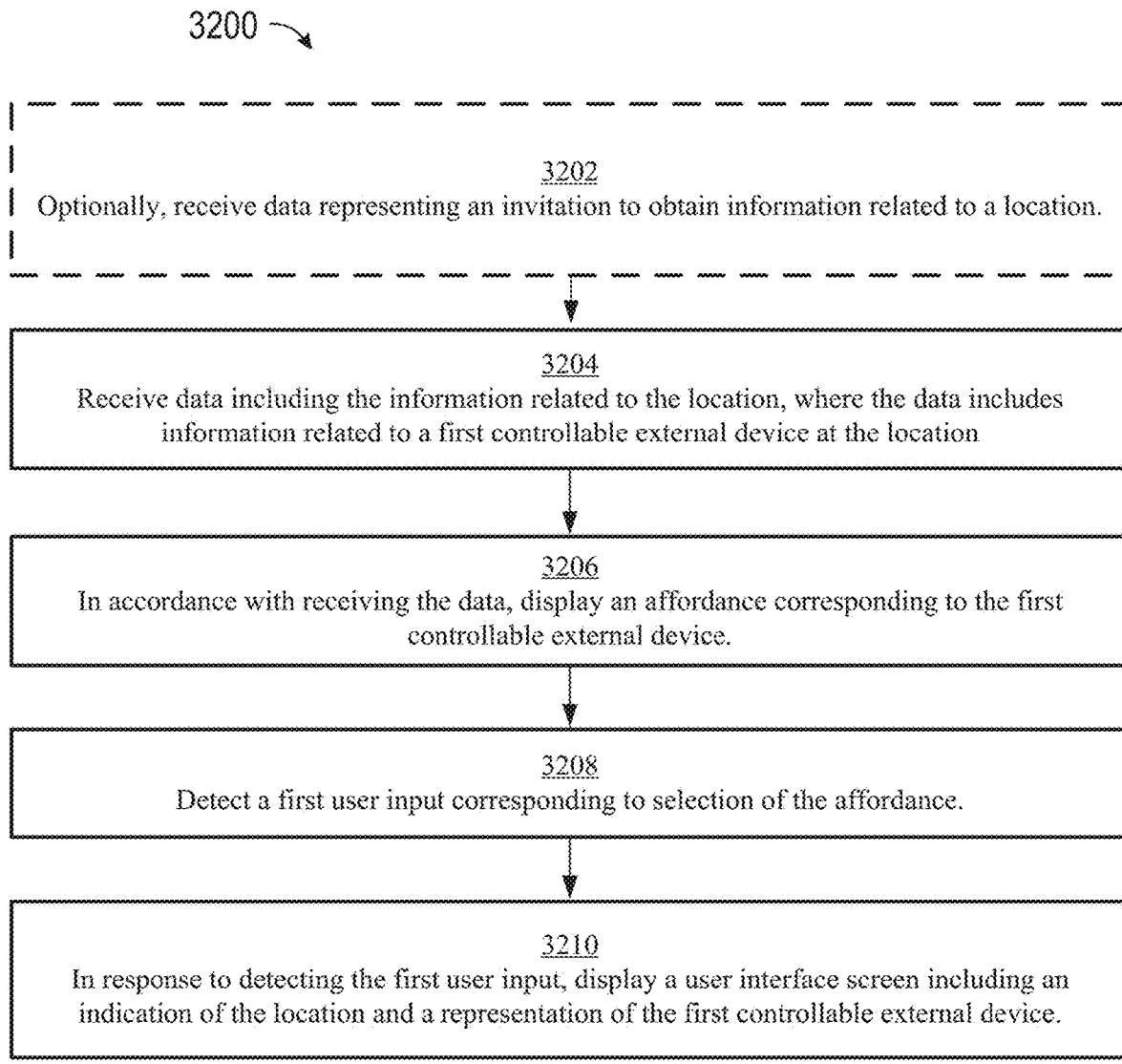
FIG. 32 is a flow diagram illustrating a process for managing controllable external devices in accordance with some embodiments.

FIG. 32 is a flow diagram illustrating a method for customizing the display of a user interface for managing controllable external devices using an electronic device in accordance with some embodiments. Method 3200 is performed at a device (e.g., 100, 300, 500, or 600) with a display and, optionally, a touch-sensitive surface. Some operations in method 3200 are, optionally, combined, the order of some operations is, optionally, changed, and some operations are, optionally, omitted.

As described below, method 3200 provides an intuitive way for customizing the display of a user interface for managing controllable external devices. The method reduces the cognitive burden on a user for managing controllable external devices, thereby creating a more efficient human-machine interface. For battery-operated computing devices, enabling a user to manage controllable external devices faster and more efficiently conserves power and increases the time between battery charges.

Optionally, at block 3202, the device receives data representing an invitation to obtain information related to a location (e.g., 2808 and 2812 in FIGS. 28D-28E).

At block 3204, the device receives data including the information related to the location, where the data includes information related to a first controllable external device at the location (e.g., 3110-1). Optionally, the information related to the location is received after accepting the invitation.

At block 3206, in accordance with receiving the data, the device displays an affordance corresponding to the first controllable external device (e.g., 3102-1). Optionally, the affordance corresponding to the first controllable external device corresponds to a scene profile (e.g., 3104-1), where the scene profile includes data regarding a designated state of the first controllable external device.

At block 3208, the device detects a first user input corresponding to selection of the affordance (e.g., selection of affordance 3102-1 to 3102-5 or 3104-1 to 3104-2).

At block 3210, in response to detecting the first user input, the device displays a user interface screen including an indication of the location and a representation of the first controllable external device (e.g., 620-1). Optionally, the representation of the first controllable external device on the user interface screen includes a representation of the scene profile (e.g., 640-1). Optionally, the user interface screen further includes an indication of the location and a representation of a person associated with a remote electronic device currently at the location.

Note that details of the processes described above with respect to method 3200 (e.g., FIG. 32) are also applicable in an analogous manner to the methods described above. For example, methods 700, 1000, 1300, 1600, 1900, 2100, 2300, 2600, and 2900 optionally include one or more of the characteristics of the various methods described above with reference to method 3200.

Figure 33:
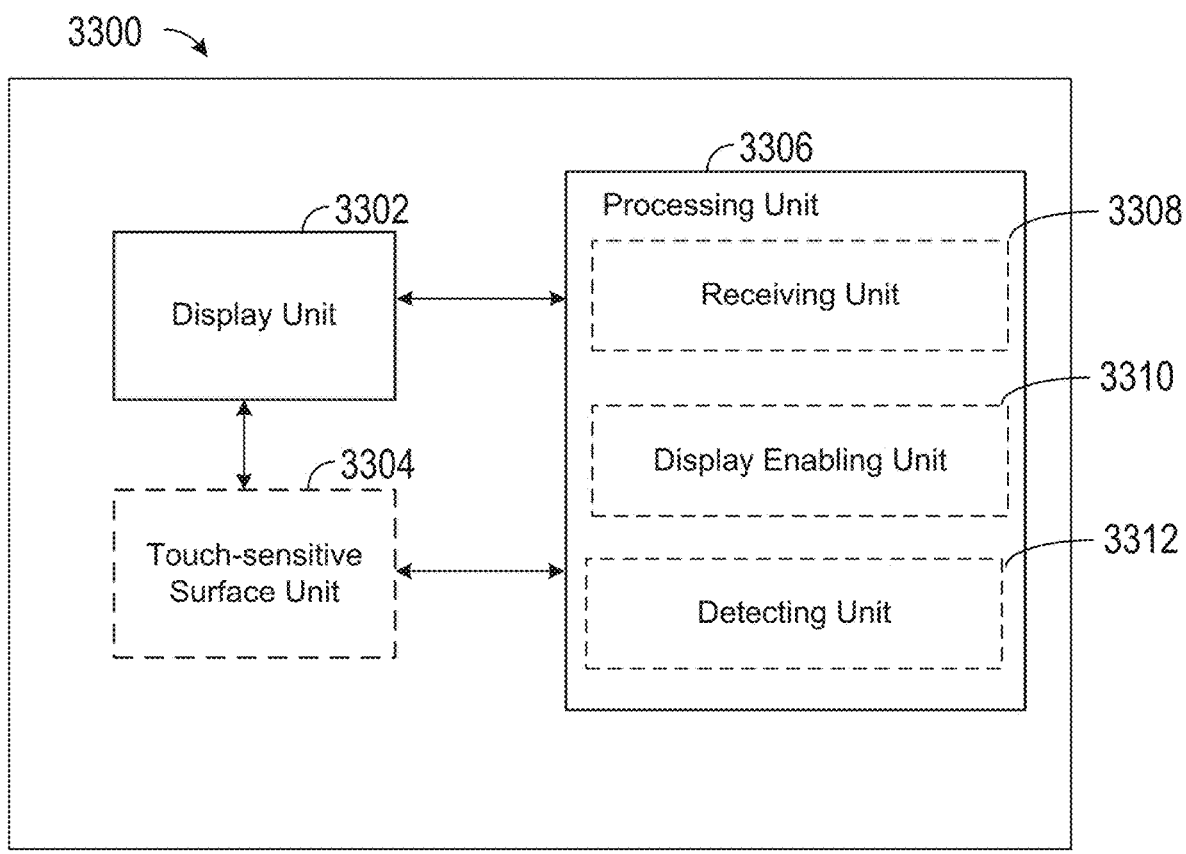
FIG. 33 is a functional block diagram of an electronic device in accordance with some embodiments.

In accordance with some embodiments, FIG. 33 shows an exemplary functional block diagram of an electronic device 3300 configured in accordance with the principles of the various described embodiments. In accordance with some embodiments, the functional blocks of electronic device 3300 are configured to perform the techniques described above. The functional blocks of the device 3300 are, optionally, implemented by hardware, software, or a combination of hardware and software to carry out the principles of the various described examples. It is understood by persons of skill in the art that the functional blocks described in FIG. 33 are, optionally, combined or separated into sub-blocks to implement the principles of the various described examples. Therefore, the description herein optionally supports any possible combination or separation or further definition of the functional blocks described herein.

As shown in FIG. 33, an electronic device 3300 includes a display unit 3302 configured to display a graphic user interface, optionally, a touch-sensitive surface unit 3304 configured to receive contacts, and a processing unit 3306 coupled to the display unit 3302 and, optionally, the touch-sensitive surface unit 3304. In some embodiments, the processing unit 3306 includes a receiving unit 3308, a display enabling unit 3310, and a detecting unit 3312.

The processing unit 3306 is configured to: receive (e.g., with receiving unit 3308) data including information related to a location, where the data includes information related to a first controllable external device at the location; in accordance with receiving the data, display (e.g., with display enabling unit 3310) an affordance corresponding to the first controllable external device; detect (e.g., with detecting unit 3312) a first user input corresponding to selection of the affordance; and in response to detecting the first user input, display (e.g., with display enabling unit 3310) a user interface screen including an indication of the location and a representation of the first controllable external device.

In some embodiments, the affordance corresponding to the first controllable external device corresponds to a scene profile, the scene profile includes data regarding a designated state of the first controllable external device, and the representation of the first controllable external device on the user interface screen includes a representation of the scene profile.

In some embodiments, the processing unit 3306 is further configured to: receive (e.g., with receiving unit 3308) data representing an invitation to obtain the information related to the location, where the information related to the location is received after accepting the invitation.

In some embodiments, the user interface screen further includes an indication of the location and a representation of a person associated with a remote electronic device currently at the location.

The operations described above with reference to FIG. 32 are, optionally, implemented by components depicted in FIGS. 1A-1B or FIG. 33. For example, receiving operations 3202 and 3204, displaying operations 3206 and 3210, and detecting operation 3208 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 34G:
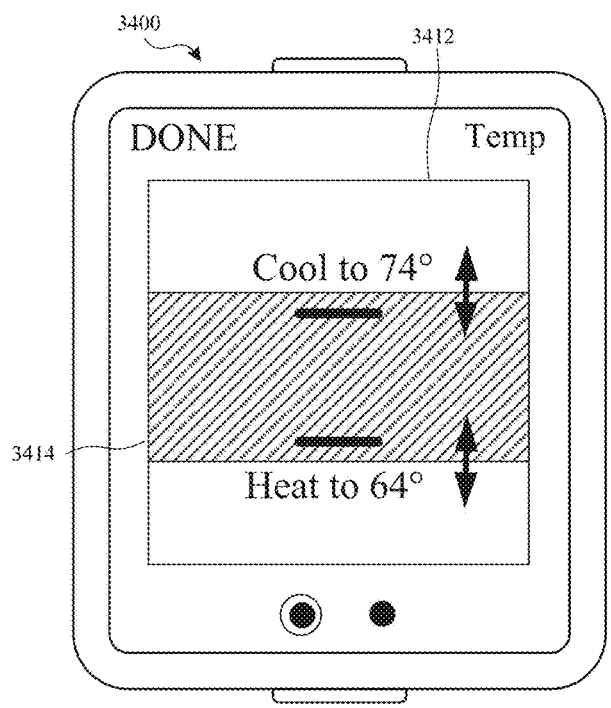

FIGS. 34A-34K illustrate additional user interfaces for managing controllable external devices according to some embodiments. FIG. 34A illustrates electronic device 3400 having some or all of the features of device 500 described above, including a touch-sensitive display 3402 and a rotatable input mechanism 3404. In some embodiments, electronic device 3400 includes some or all of the features of device 100 or device 300, described above. In FIG. 34A, device 3400 displays information related to the location profile for location "Ellsworth St." described above with reference to, e.g., FIG. 6A. More specifically, device 3400 displays a representation 3406-1 of an accessory associated with the location. In some embodiments, representation 3406-1 provides some or all of the features of accessory representations described above, such as, e.g., representation 620-1 in FIG. 6A. For example, a user can provide touch inputs on representation 3406-1 to control the state of Accessory 1. In some embodiments, device 3400 displays only a single representation of an accessory at a time.

FIG. 34B illustrates device 34 displaying representations 3408-1 and 3408-1 of scene profiles. As with accessory representation 3406-1, in some embodiments, representations 3408-1 and 3408-1 provide some or all of the features of scene profile representations described above, such as, e.g., representation 640-1 in FIG. 6A. In some embodiments, device 3400 displays only representations of accessories or representations of scene profile at a time.

FIG. 34C illustrates one exemplary technique for accessing additional representations of scene profiles on device 3400. Device 3400 receives user input 3410-1 corresponding to a rotation of rotatable input mechanism 3404. In response to user input 3410-1, device 3400 scrolls the display to show a portion of a representation 3408-3 of a third scene profile. In some embodiments, user input 3410-1 ceases before representation 3408-3 is completely displayed. As shown in FIG. 34D, device 3400 determines that one or more representations are partially displayed, and in response, continues scrolling the display to show two complete scene profile representations, 3408-2 and 3408-3. In some embodiments, device 3400 performs an analogous technique with respect to representations of accessories, such that only a single accessory representation is displayed following user input.

In FIGS. 34E-34F, device 3400 displays a representation 3406-2 of a ceiling light accessory. Representation 3406-2 includes an affordance 3410. In some embodiments, in response to user input (e.g., a tap) on affordance 3410, device 3400 displays a control affordance for setting a state of the ceiling light accessory. In some embodiments, the control affordance is one of the control affordances described above with reference to FIGS. 6C-6K. In FIG. 34E, the ceiling light is set to 80 percent brightness. FIG. 34F illustrates the display of device 3400 when the ceiling light accessory is turned off. Compared to FIG. 34E, the display is darker or shaded to indicate that the accessory is in an off state.

Figure 34H:
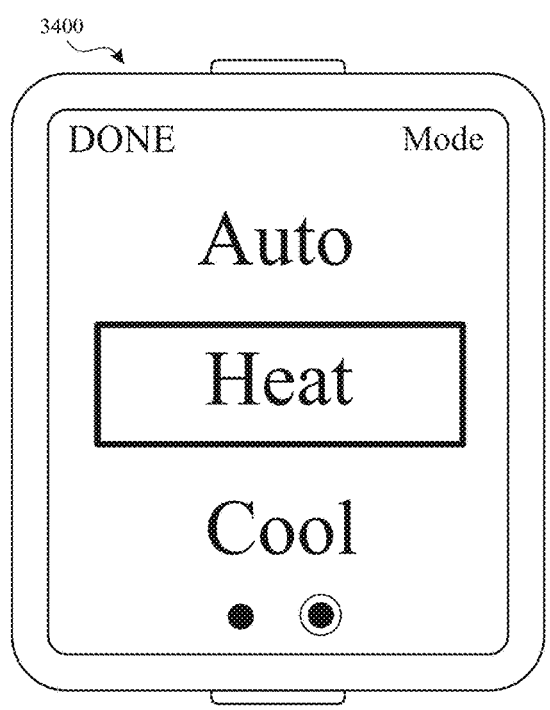

FIG. 34G illustrates a control affordance 3412 corresponding to a thermostat accessory. As indicted by the vertical arrows, control affordance 3412 can be adjusted to set an upper temperature (e.g., 74 degrees) and a lower temperature (e.g., 64 degrees). In some embodiments, similar to control affordance 621 in FIG. 6J, control affordance 3412 can be tapped at a location on the affordance to set the upper and lower temperatures. In some embodiments, a user can drag the upper or lower edge of bar 3414 to adjust the upper and lower temperature, respectively. In some embodiments, device 3400 provides an interface for selecting the mode of the thermostat, as shown in FIG. 34H. In some embodiments, device 3400 switches between the interfaces shown in FIGS. 34G and 34H in response to a horizontal swipe on the display.

Figure 34I:
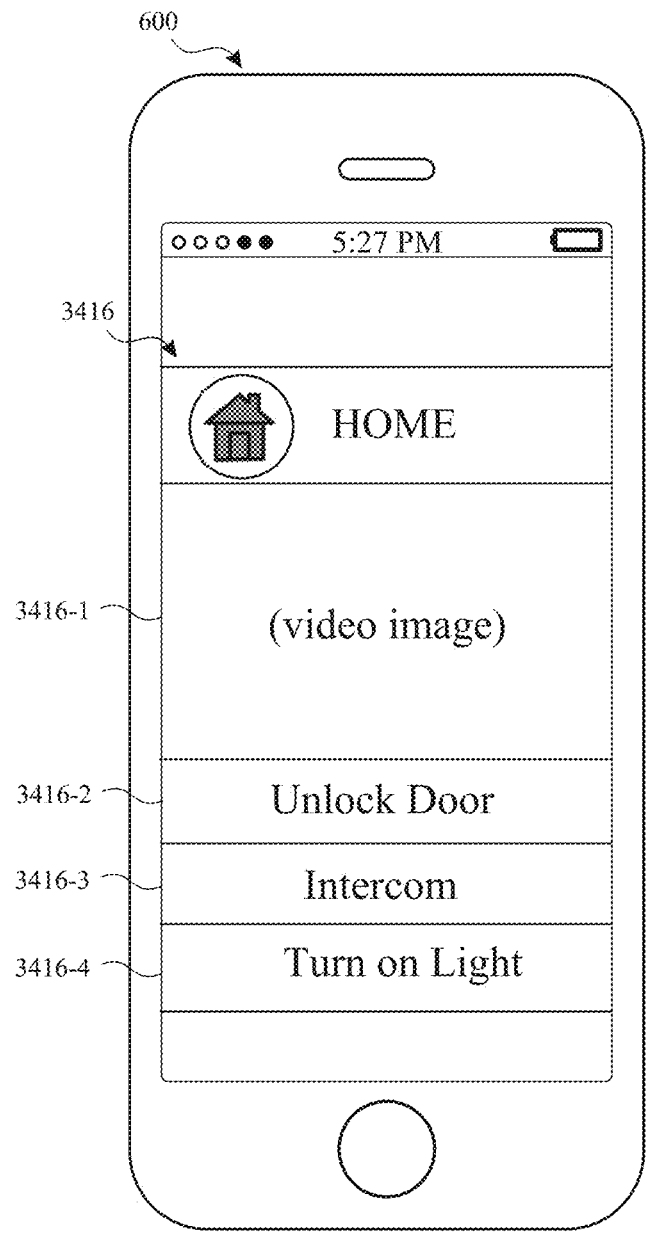

FIG. 34I illustrates an embodiment of a notification displayed on device 600. As discussed above, in some embodiments, when an accessory is activated, device 600 displays a notification indicating that the accessory has been activated and provides affordances for controlling accessories related to the activated accessory. FIG. 34I illustrates an exemplary notification displayed in response to activation of a doorbell. When the doorbell is rung, device 600 displays notification 3416 including an image captured by a camera on the front porch (3416-1) and affordances that can be selected (e.g., via a tap input) to unlock the door (3416-2), activate an intercom system (3416-3), and turn on the porch light (3416-4). In some embodiments, image 3416-1 is a live video feed from the camera. In some embodiments, image 3416-1 is a still image. In some embodiments, tapping image 3416-1 provides a live video feed from the camera.

Figure 34J:
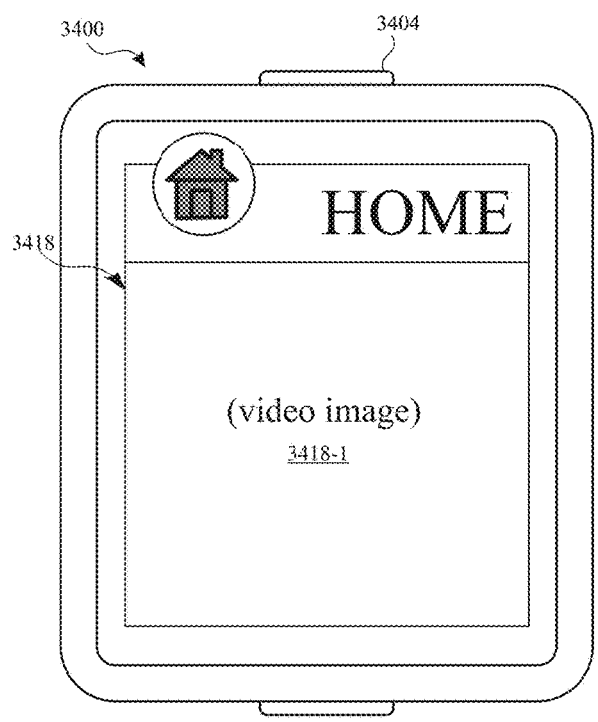
Figure 34K:

FIG. 34J illustrates an embodiment of a notification 3418 displayed on device 3400 in response to the doorbell activation event described with respect to FIG. 34I. As indicated in FIG. 34J, device 3400 initially displays only an image 3418-1 captured by the camera on the front porch. In response to user input, device 3400 provides affordances for unlocking the door, activating the intercom system, and turning on the porch light analogous to affordances 3416-2 to 3416-4 in notification 3416 on device 600. In the illustrated embodiment, in response to user input (e.g., a swipe on the display or rotation of rotatable input mechanism 3404), device 3400 displays affordance 3418-2, which can be selected (e.g., via a tap) to unlock the front door. In response to further input, device 3400 sequentially displays affordances for activating the intercom system and turning on the porch light.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
a display;
one or more processors;
a memory; and
one or more programs, wherein the one or more programs are stored in the memory and configured to be executed by the one or more processors, the one or more programs including instructions for:
receiving data including information related to a location, wherein the data includes information related to a first controllable external device at the location and a second controllable external device at the location;

in accordance with receiving the data, displaying a first user interface screen including a first affordance corresponding to the first controllable external device and a second affordance corresponding to the second controllable external device;

while displaying the first user interface screen including the first affordance corresponding to the first controllable external device and the second affordance corresponding to the second controllable external device, detecting a set of one or more user inputs including a first user input corresponding to selection of the first affordance corresponding to the first controllable external device;

subsequent to detecting the set of one or more user inputs including the first user input corresponding to selection of the first affordance corresponding to the first controllable external device:

displaying a second user interface screen including an indication of the location and a representation of the first controllable external device; and forgoing displaying a representation of the second controllable external device on the second user interface screen;

subsequent to displaying the second user interface screen and while displaying the first user interface screen including the first affordance corresponding to the first controllable external device and the second affordance corresponding to the second controllable external device, detecting a set of one or more user inputs including a second user input corresponding to selection of the second affordance corresponding to the second controllable external device; and subsequent to detecting the set of one or more user inputs including the second user input corresponding to selection of the second affordance corresponding to the second controllable external device, displaying the second user interface screen that concurrently includes the indication of the location, the representation of the first controllable external device, and the representation of the second controllable external device.

2. The electronic device of claim 1,
wherein the affordance corresponding to the first controllable external device corresponds to a scene profile,
wherein the scene profile includes data regarding a designated state of the first controllable external device, and
wherein the representation of the first controllable external device on the second user interface screen includes a representation of the scene profile.

3. The electronic device of claim 1, the one or more programs further including instructions for:
receiving data representing an invitation to obtain the information related to the location, wherein the information related to the location is received after accepting the invitation.

4. The electronic device of claim 1, wherein the second user interface screen further includes a representation of a person associated with a remote electronic device currently at the location.

5. The electronic device of claim 1, the one or more programs further including instructions for:
subsequent to displaying the second user interface screen, receiving data including information related to a third controllable external device at the location;

in accordance with receiving the data, displaying the first user interface screen including a third affordance corresponding to the third controllable external device;

detecting a set of one or more user inputs including a third user input corresponding to selection of the third affordance; and subsequent to detecting the third user input, displaying the second user interface screen that includes an indication of the location and a representation of the third controllable external device.

6. A non-transitory computer-readable storage medium storing one or more programs, the one or more programs comprising instructions, which when executed by one or more processors of an electronic device with a display, cause the device to:

receive data including information related to a location, wherein the data includes information related to a first controllable external device at the location and a second controllable external device at the location;

in accordance with receiving the data, display a first user interface screen including a first affordance corresponding to the first controllable external device and a second affordance corresponding to the second controllable external device;

while displaying the first user interface screen including the first affordance corresponding to the first controllable external device and the second affordance corresponding to the second controllable external device, detect a set of one or more user inputs including a first user input corresponding to selection of the first affordance corresponding to the first controllable external device;

subsequent to detecting the set of one or more user inputs including the first user input corresponding to selection of the first affordance corresponding to the first controllable external device:

display a second user interface screen including an indication of the location and a representation of the first controllable external device; and forgo displaying a representation of the second controllable external device on the second user interface screen;

subsequent to displaying the second user interface screen and while displaying the first user interface screen including the first affordance corresponding to the first controllable external device and the second affordance corresponding to the second controllable external device, detect a set of one or more user inputs including a second user input corresponding to selection of the second affordance corresponding to the second controllable external device; and subsequent to detecting the set of one or more user inputs including the second user input corresponding to selection of the second affordance corresponding to the second controllable external device, display the second user interface screen that concurrently includes the indication of the location, the representation of the first controllable external device, and the representation of the second controllable external device.

7. The non-transitory computer-readable storage medium of claim 6,
wherein the affordance corresponding to the first controllable external device corresponds to a scene profile,
wherein the scene profile includes data regarding a designated state of the first controllable external device, and wherein the representation of the first controllable external device on the second user interface screen includes a representation of the scene profile.

8. The non-transitory computer-readable storage medium of claim 6, the one or more programs further including instructions that further cause the device to:
receive data representing an invitation to obtain the information related to the location, wherein the information related to the location is received after accepting the invitation.

9. The non-transitory computer-readable storage medium of claim 6, wherein the second user interface screen further includes a representation of a person associated with a remote electronic device currently at the location.

10. The non-transitory computer-readable storage medium of claim 6, the one or more programs further including instructions that cause the device to:
subsequent to displaying the second user interface screen, receive data including information related to a third controllable external device at the location;
in accordance with receiving the data, display the first user interface screen including a third affordance corresponding to the third controllable external device;
detect a set of one or more user inputs including a third user input corresponding to selection of the third affordance; and
subsequent to detecting the third user input, display the second user interface screen that includes an indication of the location and a representation of the third controllable external device.

11. A method, comprising:
at an electronic device with a display, one or more processors, and memory:
receiving data including information related to a location, wherein the data includes information related to a first controllable external device at the location and a second controllable external device at the location;
in accordance with receiving the data, displaying a first user interface screen including a first affordance corresponding to the first controllable external device and a second affordance corresponding to the second controllable external device;
while displaying the first user interface screen including the first affordance corresponding to the first controllable external device and the second affordance corresponding to the second controllable external device, detecting a set of one or more user inputs including a first user input corresponding to selection of the first affordance corresponding to the first controllable external device;
subsequent to detecting the set of one or more user inputs including the first user input corresponding to selection of the first affordance corresponding to the first controllable external device:
displaying a second user interface screen including an indication of the location and a representation of the first controllable external device; and
forgoing displaying a representation of the second controllable external device on the second user interface screen;
subsequent to displaying the second user interface screen and while displaying the first user interface screen including the first affordance corresponding to the first controllable external device and the second affordance corresponding to the second controllable external device, detecting a set of one or more user inputs including a second user input corresponding to selection of the second affordance corresponding to the second controllable external device; and
subsequent to detecting the set of one or more user inputs including the second user input corresponding to selection of the second affordance corresponding to the second controllable external device, displaying the second user interface screen that concurrently includes the indication of the location, the representation of the first controllable external device, and the representation of the second controllable external device.

12. The method of claim 11,
wherein the affordance corresponding to the first controllable external device corresponds to a scene profile,
wherein the scene profile includes data regarding a designated state of the first controllable external device, and
wherein the representation of the first controllable external device on the second user interface screen includes a representation of the scene profile.

13. The method of claim 11, further comprising:
receiving data representing an invitation to obtain the information related to the location, wherein the information related to the location is received after accepting the invitation.

14. The method of claim 11, wherein the second user interface screen further includes a representation of a person associated with a remote electronic device currently at the location.

15. The method of claim 11, further comprising:
subsequent to displaying the second user interface screen, receiving data including information related to a third controllable external device at the location;
in accordance with receiving the data, displaying the first user interface screen including a third affordance corresponding to the third controllable external device;
detecting a set of one or more user inputs including a third user input corresponding to selection of the third affordance; and
subsequent to detecting the third user input, displaying the second user interface screen that includes an indication of the location and a representation of the third controllable external device.

* * * * *